(12) United States Patent
Soon-Shiong et al.

US012551541B2

(10) Patent No.: US 12,551,541 B2
(45) Date of Patent: *Feb. 17, 2026

(54) ALBUMIN BOUND MACROMOLECULE TRI-AGONIST ACTIVATING GLP 1/GIP/GLUCAGON RECEPTORS AND METHODS THEREFOR

(71) Applicant: AlbuNext, LLC, El Segundo, CA (US)

(72) Inventors: Patrick Soon-Shiong, Culver City, CA (US); Martin Robitaille, Saint-Colomban (CA); Bing Song, El Segundo, CA (US)

(73) Assignee: AlbuNext, LLC, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/753,928

(22) Filed: Jun. 25, 2024

(65) Prior Publication Data

US 2024/0424072 A1    Dec. 26, 2024

Related U.S. Application Data

(60) Provisional application No. 63/650,095, filed on May 21, 2024, provisional application No. 63/641,782, filed on May 2, 2024, provisional application No. 63/631,777, filed on Apr. 30, 2024, provisional application No. 63/634,379, filed on Apr. 15, 2024, provisional application No. 63/568,988, filed on Mar. 22, 2024, provisional application No. 63/567,402, filed on Mar. 19, 2024, provisional application No. 63/566,870, filed on Mar. 18, 2024, provisional application No. 63/564,941, filed on Mar. 13, 2024, provisional application No. 63/564,426, filed on Mar. 12, 2024, provisional application No. 63/561,187, filed on Mar. 4, 2024, provisional application No. 63/551,370, filed on Feb. 8, 2024, provisional application No. 63/551,334, filed on Feb. 8, 2024, provisional application No. 63/551,315, filed on Feb. 8, 2024, provisional application No. 63/625,169, filed on Jan. 25, 2024, provisional application No. 63/624,692, filed on Jan. 24, 2024, provisional application No. 63/619,584, filed on Jan. 10, 2024, provisional application No. 63/523,324, filed on Jun. 26, 2023.

(51) Int. Cl.
| | |
|---|---|
| *A61K 39/00* | (2006.01) |
| *A61K 38/38* | (2006.01) |
| *A61P 3/10* | (2006.01) |
| *C07K 14/47* | (2006.01) |
| *C07K 14/765* | (2006.01) |
| *C07K 16/28* | (2006.01) |
| *A61K 38/00* | (2006.01) |

(52) U.S. Cl.
CPC ........ *A61K 39/0005* (2013.01); *A61K 38/385* (2013.01); *A61P 3/10* (2018.01); *C07K 14/4722* (2013.01); *C07K 14/765* (2013.01); *C07K 16/28* (2013.01); *A61K 38/00* (2013.01); *A61K 2039/505* (2013.01); *C07K 2317/75* (2013.01); *C07K 2317/92* (2013.01); *C07K 2319/31* (2013.01)

(58) Field of Classification Search
None
See application file for complete search history.

(56) References Cited

U.S. PATENT DOCUMENTS

| | | | |
|---|---|---|---|
| 6,514,500 B1 | 2/2003 | Bridon et al. | |
| 6,528,486 B1 * | 3/2003 | Larsen ................ | C07K 14/605 530/300 |
| 2007/0269863 A1 * | 11/2007 | Bridon .................. | C07K 14/60 435/71.1 |
| 2009/0186819 A1 | 7/2009 | Carrier et al. | |

(Continued)

FOREIGN PATENT DOCUMENTS

| | | |
|---|---|---|
| CA | 2501421 A1 | 11/2000 |
| CA | 2550050 A1 | 6/2005 |

(Continued)

OTHER PUBLICATIONS

Exibility of fatty acid-free bovine serum albumin proteins enables superior antifouling flMa et al. "Conformational 2020, 01-45 Pages. coatings", Communications Materials.

(Continued)

*Primary Examiner* — Brad Duffy

(74) *Attorney, Agent, or Firm* — Umberg Zipser LLP; Martin Fessenmaier; Priti Phukan

(57) ABSTRACT

A pharmaceutical composition comprises a GPCR agonist fusion protein in which a GPCR agonist peptide is covalently coupled to albumin via a linker in a manner that is resistant to a retro-Michael addition. Advantageously, compositions presented herein avoid decoupling of the agonist form the albumin while retaining the agonist in a steric relationship to the albumin that allows for effective binding and activation of the GPCR while also enabling gp60-mediated transcytosis and FcRn-mediated albumin recycling. These properties enable ultra-low dosages for the GPCR agonist fusion protein to give a therapeutic effect while substantially reducing or even entirely avoiding adverse effects otherwise commonly associated with unbound agonists. Moreover, these properties also enable transport of the GPCR agonist fusion protein across the blood brain barrier and therefore allow treatment of neural disorders.

20 Claims, 39 Drawing Sheets

Specification includes a Sequence Listing.

(56) References Cited

U.S. PATENT DOCUMENTS

| | | | |
|---|---|---|---|
| 2016/0015838 A1 | 1/2016 | Li et al. | |
| 2017/0296684 A1 | 10/2017 | Driver et al. | |
| 2022/0106361 A1 | 4/2022 | Fuhrmann et al. | |
| 2024/0197894 A1 | 6/2024 | Dong et al. | |

FOREIGN PATENT DOCUMENTS

| | | | | |
|---|---|---|---|---|
| CA | 2434237 C | 5/2012 | | |
| WO | 2007053946 A1 | 5/2007 | | |
| WO | 2009075859 A2 | 6/2009 | | |
| WO | 2011109787 A1 | 9/2011 | | |
| WO | WO-2011109784 A1 * | 9/2011 | ........... | A61K 47/643 |

OTHER PUBLICATIONS

Sun et al. "Small-molecule albumin ligand modification to enhance the anti-diabetic ability of GLP-1 derivatives", Elsevier Masson SAS, Feb. 11, 2022, 01-12 Pages.

Scheider et al. "An effective method for defatting albumin using resin columns", Biochim Biophys Acta, Nov. 17, 1970; 221(2); 376-8.

International Search Report and Written Opinion received for International PCT Application Serial No. PCT/US2024/035475 dated Jan. 10, 2025, 25 pages.

Kim. "Development and Characterization of a Glucagon-Like Peptide 1-Albumin Conjugate" 751-759. Diabetes. Web. Mar. 31, 2003; <Figure 1; abstract; pp. 751, 752, 757>; <DOI:10.2337/diabetes.52.3.751>.

Lim. "Evaluation of In Vivo Prepared Albumin-Drug Conjugate Using Immunoprecipitation Linked LC-MS Assay and Its Application to Mouse Pharmacokinetic Study" 2-12. Molecules. Web. Apr. 4, 2023; <pp. 2 and 6>; <DOI: 10.3390/molecules28073223>.

Zyl. "Diagnosis and treatment of diabetic ketoacidosis" 35-39. Taylor and Francis. Web. Aug. 15, 2014; <p. 37; Table III>; <DOI: 10.1080/20786204.2008.10873664>.

Bahne. "Metformin-induced glucagon-like peptide-1 secretion contributes to the actions of metformin in type 2 diabetes" 1-15. JCL Insight. Web. Dec. 6, 2018; ; <DOI: 10.1172/jci.insight.93936>.

International Search Report and Written Opinion received for International PCT Application Serial No. PCT/US2024/035478 dated Dec. 18, 2024, 22 pages.

International Preliminary Report on Patentability received in International Application No. PCT/US24/35478 dated Aug. 7, 2025, 14 pages.

International Preliminary Report on Patentability received in PCT Application No. PCT/US2024/035475 dated Sep. 10, 2025, 11 pages.

* cited by examiner

FIG.17

HbA1c change

| | Test value | | Change (Post treat - baseline) | | |
|---|---|---|---|---|---|
| | Treatment (N=284) | Placebo (N=136) | Treatment (N=284) | Placebo (N=136) | Intergroup comp* |
| Baseline | | | | | |
| N (Lost) | 284 (0) | 136 (0) | | | |
| Mean (SD) | 8.18 (0.873) | 8.18 (0.831) | | | |
| Median | 8.05 | 8.00 | | | |
| Low 4th #, high 4th # | 7.50, 8.70 | 7.60, 8.70 | | | |
| Min., Max | 6.8, 10.9 | 7.0, 10.9 | | | |
| Week 25 | | | | | |
| N (Lost) | 265 (19) | 125 (11) | 265 (19) | 125 (11) | |
| Mean (SD) | 7.51 (0.894) | 7.93 (0.755) | -0.65 (0.740) | -0.16 (0.811) | |
| Median | 7.40 | 7.90 | -0.70 | -0.10 | |
| Low 4th #, high 4th # | 6.80, 8.10 | 7.40, 8.40 | -1.10, -0.20 | -0.60, 0.40 | |
| Min., Max | 5.6, 11.0 | 6.6, 10.9 | -2.9, 1.5 | -2.4, 2.1 | |
| 95% CI | | | -0.74, -0.56 | -0.31, -0.02 | |
| Intragroup comp* | | | <0.0001 | 0.0255 | <0.0001 |

Note 1: The data after remedial treatment and termination of treatment were excluded.
Note 2: "Paired t-test was used for intra-group comparison of change values; grouped t-test was used for inter-group comparison;

FIG.20

Changes of Glycosylated HbA1c During Double Blind Treatment

| | | Values | | Change from Treatment - Baseline | | Comparison Between Groups* |
|---|---|---|---|---|---|---|
| | | Treatment | Placebo | Treatment | Placebo | |
| | | (N=283) | (N=144) | (N=283) | (N=144) | |
| Baseline | N (Lost) | 283 (0) | 144 (0) | | | |
| | Mean (SD) | 8.33 (0.965) | 8.21 (0.902) | | | |
| | Median | 8.30 | 8.00 | | | |
| | Lower Quartile, Upper Quartile | 7.50, 9.00 | 7.50, 8.80 | | | |
| | Min, Max | 6.6, 10.7 | 6.8, 10.5 | | | |
| Baseline HbA1c Classification | <8.5% | 157 (55.5%) | 96 (66.7%) | | | |
| | ≥8.5% | 126 (44.5%) | 48 (33.3%) | | | |
| Week 25 | N (Lost) | 249 (34) | 128 (16) | 249 (34) | 128 (16) | |
| | Mean (SD) | 6.98 (0.808) | 7.48 (0.886) | -1.34 (0.985) | -0.66 (0.902) | <0.0001 |
| | Median | 6.90 | 7.40 | -1.20 | -0.50 | |
| | Lower Quartile, Upper Quartile | 6.50, 7.50 | 6.80, 8.05 | -1.90, -0.60 | -1.40, 0.00 | |
| | Min, Max | 5.3, 9.6 | 5.6, 9.8 | -4.2, 1.6 | -3.4, 1.4 | |
| | 95% CI | | | -1.46, -1.22 | -0.81, -0.50 | |
| | Intergroup Comparison of Change | | | <0.0001 | <0.0001 | |

Note: Data after salvage treatment and termination of treatment were excluded.
Note: *Paired t-test was used for intra-group comparison grouped t-test was used for inter-group comparison

| Agent | Dose (mg) Q Weekly | Dose (mcg) Q Weekly |
|---|---|---|
| Tanzeum (Albiglutide) GLP-1 | 50 mg (SC) | 50,000 mcg |
| Ozempic / Wegovy (Semaglutide) GLP-1 | 2 mg (SC) 2.4 mg (SC) 50 mg (Oral) | 2,000 mcg 2,400 mcg 50,000 mcg |
| Mounjaro / Zepbound (Tirzepatide) GLP-1, GIP | 15 mg (SC) | 15,000 mcg |
| Viking (VK2735) GLP-1, GIP | 15 mg (SC) | 15,000 mcg | vs

| | | |
|---|---|---|
| AlbuNext (Albenatide) Modified Exendin-4 | 0.13mg (SC) | 130 mcg |

FIG.32

** compared to vehicle group, P<0.01
*** compared to vehicle group, P<0.001

*** compared to vehicle group, P<0.001

FIG.45

ALBUMIN BOUND MACROMOLECULE TRI-AGONIST ACTIVATING GLP 1/GIP/GLUCAGON RECEPTORS AND METHODS THEREFOR

This application claims priority to our US Provisional patent applications with the Ser. Nos. 63/523,324, filed Jun. 26, 2023, 63/619,584, filed Jan. 10, 2024, 63/624,692, filed Jan. 24, 2024, 63/625,169, filed Jan. 25, 2024, 63/551,315, filed Feb. 8, 2024, 63/551,334, filed Feb. 8, 2024, 63/551,370, filed Feb. 8, 2024, 63/561,187, filed Mar. 4, 2024, 63/564,426, filed Mar. 12, 2024, 63/564,941, filed Mar. 13, 2024, 63/566,870, filed Mar. 18, 2024, 63/567,402, filed Mar. 19, 2024, 63/568,988, filed Mar. 22, 2024, 63/631,777, filed Apr. 9, 2024, 63/634,379, filed Apr. 15, 2024, 63/641,782, filed May 2, 2024, and 63/650,095, filed May 21, 2024, each of which are incorporated by reference herein.

SEQUENCE LISTING

The content of the XML file of the sequence listing named 1026900063US-M, which is 1,005,176 bytes in size was created on Aug. 7, 2024, and electronically submitted via Patent Center along with the present application, and is incorporated by reference in its entirety.

FIELD OF THE INVENTION

The field of the invention is pharmaceutical composition and methods, particularly as they relate to agonists, di-agonists, and tri-agonists of glucagon-like peptide 1 (GLP-1) receptors, glucose-dependent insulinotropic polypeptide (GIP) receptors, and/or glucagon receptors.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Obesity, a global health crisis, is escalating at an alarming rate. As of 2020, 41.9% of adults in the U.S. were classified as obese. Globally, over 1 billion people, including 650 million adults, are affected by obesity. This condition is associated with a multitude of health complications, including hyperglycemia, type 2 diabetes, hypertension, dyslipidemia, obstructive sleep apnea, atherosclerosis, osteoarthritis, urinary incontinence, non-alcoholic steatohepatitis, cardiovascular diseases, certain cancers, and premature mortality. Furthermore, obesity negatively impacts both physical and mental health, leading to a diminished quality of life and reduced cardiorespiratory fitness, which in turn heightens the risk of cardiovascular diseases and overall mortality.

Similarly, diabetes mellitus has become an increasingly common illness with 537 million adults are affected worldwide in 2021 with a prediction of 783 million by 2045. Of these patients, approximately 90% have type 2 (or non-insulin dependent) diabetes. Often related to obesity, this disease is characterized by increased blood glucose levels, decreased insulin action, and impaired glucose tolerance. Treatment usually includes a diet, weight loss, and exercise regimen as well as the administration of anti-diabetic agents including metformin to decrease hepatic glucose output, sulfonylurea and metformin to increase insulin secretion, and/or thiazolidinediones to enhance insulin sensitivity.

While these drug treatment options are often effective, the disease may progress in spite of treatment, and patients may eventually require daily administration of insulin. Hence, new therapeutic strategies in the form of insulinotropic peptides have been developed for the treatment of Type 2 diabetes, including analogs of peptides that control blood glucose levels, such as glucagon-like peptide 1 (GLP-1), gastric inhibitory polypeptide (GIP), Glucagon, and Amylin.

GLP-1 is a naturally occurring hormone that is released by L cells in the lower intestine in response to nutrient ingestion. In addition to having potent insulinotropic effects, GLP-1 has been shown to suppress glucagon, stimulate pancreatic β-cell proliferation, inhibit gastric emptying, and decrease gastrointestinal (GI) motility, all actions that contribute to the glucose-dependent postprandial maintenance of normal blood glucose levels and regulation of appetite. Because of these pleiotropic effects, GLP-1 analogs make attractive candidates for the treatment of Type 2 diabetes.

One major drawback to the use of native GLP-1 is the extremely short half-life of several minutes, due to cleavage by the ubiquitous proteolytic enzyme dipeptidyl peptidase IV at an N-terminal alanine residue. In contrast to the short-lived GLP-1 peptide, exendin-4 (a 39 amino acid peptide agonist of the glucagon-like peptide 1 (GLP-1) receptor) is resistant to dipeptidyl peptidase IV degradation and has a circulating half-life of approximately 33 minutes in humans. Exendin-4 induces similar physiological effects as GLP-1, through the GLP-1 receptor, and is more potent than native GLP-1. Synthetic exendin-4 (Byetta) has been used as an adjunctive therapy with oral antidiabetic agents in the treatment of non-insulin dependent diabetes mellitus (T2DM). In an approach to further extend half-life of exendin-4, the agonist was encapsulated in poly-(D-L-Lactide-Co-Glycolide) microspheres (Bydureon).

The need for even longer active formulations led to the development of recombinant proteins such as the fusion protein described in CA 2434237 (not marketed) and the fusion protein albiglutide (TANZEUM™, Glaxosmithkline, discontinued), as described in U.S. Pat. No. 7,141,547. Albiglutide is an albumin fusion protein of GLP-1 in which a tandem repeat of Gly8 GLP-1 is directly fused to the N-terminus of human serum albumin. Here, the tandem repeat was intended to improve affinity for the GLP-1 receptor by creating a longer distance between albumin and the distal GLP-1 peptide. While the half-life was extended to 6-8 days, making it suitable for once weekly dosing, the potency of albiglutide was significantly reduced (GLP-1 receptor affinity of albiglutide is 20 nM compared with 0.02 nM for exenatide), most likely due to a combination of the Gly8 modification and the direct covalent fusion with the albumin. When administered as a monotherapy, the decrease in HbA1c from baseline at the 30 mg weekly dose was −0.7% at week 52. At the 50 mg weekly dose, the change from baseline of HbA1c was −0.9%. Despite these high doses of GLP-1 at 30 and 50 mg, the change in HbA1c from baseline never achieved a decrease ≥1%. Based on these findings, it was taught by Knudsen et al (Knudsen L B, Lau J. The Discovery and Development of Liraglutide and Semaglutide. Front Endocrinol (Lausanne). 2019 Apr. 12; 10:155. doi: 10.3389/fendo.2019.00155. PMID: 31031702; PMCID: PMC6474072) that a GLP-1 agonist, when fused to albumin, will not produce an effective composition, under the premise that GLP-1 agonists could bind to albumin or to the GLP-1 receptor, but not to both. Specifically, the industry taught against irreversible binding to albumin and instead implemented the idea "was to build on reversible binding to albumin as a solution for the systemic protraction of GLP-1 analogs. The main challenge identified in earlier studies was that strong binding to albumin had a negative impact on the potency of compounds for the GLP-1R, due to competition between binding to albumin and binding to the receptor). The theory was that only the free fraction in the plasma that was not bound to albumin would be available to activate the GLP-1R. Therefore, the stronger the affinity to albumin the smaller the free and active circulating fraction of the GLP-1 peptide. This phenomenon had previously been observed with liraglutide analogs, where there was a clear trend for longer fatty acids, with improved affinity for albumin, to be associated with diminished potency for the GLP-IR".

On the basis of this assumption, a modified approach was adopted that made use of reversible non-covalent binding of GLP-1 analogs to albumin. In this approach, GLP-1 agonists were acylated to so facilitate non-covalent binding of the acylated GLP-1 agonists to the seven fatty acid binding sites in albumin, resulting in extended half-lives of these compositions. Examples for such approaches include VIC-TOZA™ (liraglutide, Novo Nordisk, albumin with modified GLP-1 agonist), OZEMPIC™/WEGOVY™ (semaglutide, Novo Nordisk, albumin with modified GLP-1 agonist), MOUNJARO™/ZEPBOUND™ (tirzepatide, Eli Lilly, albumin with modified GLP-1/GIP dual agonist), Pemvidutide (AltImmune, albumin with modified GLP-1/Glucagon dual agonist), efinopegdutide (Merck, albumin with modified GLP-1/Glucagon dual agonist), and subroutine (Zealand, Boehringer, albumin with modified GLP-1/Glucagon dual agonist). While at least some of these formulations provided an increased stability and serum half-life, dissociation of the modified agonist from the albumin carrier is nevertheless required for receptor activation, leading once more to renal clearance of the agonist. Moreover, numerous adverse effects such as nausea, vomiting, and diarrhea are common with formulations having reversible and non-covalent binding of GLP-1 analogs. To increase tolerability of such compositions, it is routinely recommended to titrate a subject up to a tolerated therapeutic dosage, which can take several weeks.

In still further known compositions, exendin-4 is covalently bound via a linker to $Cys_{34}$ of albumin as is described in WO 2007/053946, WO 2009/075859, and WO 2011/109787, and CA 2501421 and CA 2550050 teach further insulinotropic agents with a linker that can be coupled to albumin. While conceptually attractive, similar difficulties as observed with the acylated GLP-1 agonists described above remain, as the covalent bond at the $Cys_{34}$ of albumin is in such compounds generally subject to a retro-Michael addition reaction and so liberates the formerly bound exendin-4, leading once more to fast renal clearance and potential adverse effects due to the unbound GLP-1 agonist.

Thus, even though various compositions and methods of GPCR agonists, and especially GLP-1, GIP, and glucagon receptor agonists, are known in the art, all or almost all of them suffer from several drawbacks. In particular, small agonist peptides such as GLP-1 are quickly degraded by endopeptidases and as such require frequent administration. Likewise, small agonist peptide analogs such as exendin-4 are more stable, but still undergo fast renal clearance, once more necessitating frequent administration. On the other hand, GLP-1 albumin direct fusion proteins have significantly longer serum half-life times, but due to steric hindrance with the target receptors, require very high dosages. Alternatively, fatty acid-modified GLP-1 and GLP-1 analogs can be non-covalently bound to hydrophobic pockets in albumin, which requires their dissociation from albumin first to activate their target receptor. Unfortunately, dissociated free fatty acid-modified GLP-1 and analogs thereof lead to adverse effects. Moreover, such albumin-associated fatty acid-modified GLP-1 and GLP-1 analogs will not penetrate the blood brain barrier (BBB). Similarly, where linker-bound exendin-4 is coupled to $Cys_{34}$ in albumin via Michael addition, free exendin-4 is once more encountered due to a retro-Michael addition reaction, leading once more to fast Exendin-4 clearance and adverse effects due to unbound agonists.

Therefore, there is still a need to provide improved compositions in which a GPCR agonist has upon administration a high stability in plasma/serum, retains agonist activity at low concentrations while being bound to a carrier, and in which the GPCR agonist can upon administration readily move from the blood compartment into a target tissue or even pass the blood brain barrier into neural tissues.

SUMMARY OF THE INVENTION

The inventive subject matter is directed to various compositions and methods of GPCR agonists that have upon administration a high stability in plasma/serum, that retain agonist activity while being bound to a carrier, and in which the GPCR agonist can upon administration readily move from the blood compartment into a target tissue or even pass the blood brain barrier into neural tissues. Moreover, owing to their particular chemical structure, compounds presented herein can be administered at an ultra-low dose with high therapeutic efficacy without titration and with minima adverse effects such as nausea, vomiting, and/or diarrhea. Indeed, the compositions presented herein have a heretofore unrealized high therapeutic index in their class.

In one aspect of the inventive subject matter, the inventors contemplate a method of treating a subject that includes a step of administering a therapeutically effective amount of a pharmaceutical composition to the subject in need thereof, wherein the pharmaceutical composition comprises a plurality of fusion proteins in each of which a Class B GPCR agonist peptide is, via a linker, covalently bound to a $Cys_{34}$ amino acid of an albumin. In such methods, the majority of the linkers with the GPCR agonist peptides is bound to the $Cys_{34}$ amino acid in a retro-Michael resistant manner while the fusion protein has a conformation that allows binding of the GPCR agonist to a GPCR receptor to thereby activate the GPCR receptor.

In some embodiments, the therapeutically effective amount is equal or less than 800 mcg, or equal or less than 250 mcg, or even equal or less than 150 mcg of the GPCR agonist peptide, which is typically administered by subcutaneous injection or intranasal administration once weekly. In further embodiments, at last 70%, or at least 90% of the linkers with the GPCR agonist peptides are bound to the $Cys_{34}$ amino acid in the retro-Michael resistant manner, and/or the albumin is recombinant human albumin. Moreover, it should be appreciated that administration of the therapeutically effective amount may be performed without titration. In yet further embodiments, the albumin may be a conformationally modified albumin, and/or the pharmaceutical composition may further comprise additional albumin having an unreacted $Cys_{34}$ group.

In particularly contemplated methods, the fusion protein is retro-Michael resistant albenatide (AB-013-AEEA-succinimide (SEQ ID NO:2)-albumin), retro-Michael resistant albenatidex (AB-014-AEEA-succinimide (SEQ ID NO:185)-albumin), retro-Michael resistant albugiptide (AB-029-AEEA-succinimide (SEQ ID NO:7)-albumin), or retro-Michael resistant albutide (AB-044-AEEA-succinimide (SEQ ID NO:223)-albumin). Viewed from a different perspective, the GPCR agonist peptide may be a GLP-1 agonist peptide, a GLP-1/GIP dual agonist peptide, or a GLP-1/GIP/GcG tri-agonist peptide.

For example, the subject in such method may be diagnosed with a metabolic disorder such as NIDDM (non-insulin dependent diabetes mellitus), NASH (non-alcoholic steatohepatosis/steatohepatitis), chronic kidney disease, obesity cachexia, sarcopenia, diabetic kidney disease, diabetic foot ulcer, and diabetic retinopathy. Or the subject may be diagnosed with a neurodegenerative disease such as Parkinson's Disease, Alzheimer's Disease, peripheral neuropathy, multiple sclerosis, and amyotrophic lateral sclerosis (ALS). In still further contemplated examples, the subject may be diagnosed with an autoimmune or inflammatory disease such as Chron's disease, irritable bowel syndrome (IBS), ulcerative colitis, and polycystic ovary syndrome.

In another aspect of the inventive subject matter, the inventors also contemplate a method of treating a disease in a subject that includes a step of administering a therapeutically effective amount of a pharmaceutical composition to the subject in need thereof, wherein the pharmaceutical composition comprises fusion proteins in which a Class B GPCR agonist peptide is, via a linker, covalently coupled to a $Cys_{34}$ amino acid in an albumin. In such methods, it is contemplated that the fusion proteins have a conformation that allows gp60-mediated transcytosis and neonatal Fc receptor (FcRn) recycling, thereby enabling transport of substantially all of the fusion protein across a blood brain barrier while the GPCR agonist peptide remains bound to the linker and the albumin.

For example, particularly contemplated neurodegenerative diseases include Parkinson's Disease, Alzheimer's Disease, peripheral neuropathy, multiple sclerosis, and amyotrophic lateral sclerosis (ALS). Moreover, it is generally preferred that the therapeutically effective amount in such methods will be equal or less than 1,000 mcg, or equal or less than 250 mcg of the GPCR agonist peptide administered once weekly. As will be readily appreciated, the pharmaceutical composition may be administered by subcutaneous injection or intranasal administration.

In further contemplated embodiments, the albumin is recombinant human albumin, which may be conformationally modified albumin. Alternatively, or additionally, the pharmaceutical composition may further comprise albumin having an unreacted $Cys_{34}$ group. Particularly preferred fusion proteins include retro-Michael resistant albenatide (AB-013-AEEA-succinimide (SEQ ID NO:2)-albumin), retro-Michael resistant albenatidex (AB-014-AEEA-succinimide (SEQ ID NO:185)-albumin), retro-Michael resistant albugiptide (AB-029-AEEA-succinimide (SEQ ID NO:7)-albumin), and retro-Michael resistant albutide (AB-044-AEEA-succinimide (SEQ ID NO:223)-albumin).

In a still further aspect of the inventive subject matter, the inventors contemplate a method of treating a metabolic or neurodegenerative disorder in a subject that includes a step of administering a therapeutically effective amount of a pharmaceutical composition to the subject in need thereof, wherein the pharmaceutical composition comprises a fusion protein in which a Class GPCR agonist peptide is, via a linker, covalently coupled to a $Cys_{34}$ amino acid in a conformationally modified albumin, and wherein the therapeutically effective amount of the Class B GPCR agonist peptide is equal or less than 800 mcg.

In some embodiments of such methods, the subject is diagnosed with a metabolic disorder (e.g., NIDDM (non-insulin dependent diabetes mellitus), NASH (non-alcoholic steatohepatosis/steatohepatitis), chronic kidney disease, obesity cachexia, sarcopenia, diabetic kidney disease, diabetic foot ulcer, or diabetic retinopathy), a neurodegenerative disease (e.g., Parkinson's Disease, Alzheimer's Disease, peripheral neuropathy, multiple sclerosis, or amyotrophic lateral sclerosis (ALS)), or an autoimmune or inflammatory disease (e.g., Chron's disease, irritable bowel syndrome (IBS), ulcerative colitis, or polycystic ovary syndrome).

Moreover, it is contemplated that the GPCR agonist peptide may be a GLP-1 agonist peptide, a GLP-1/GIP dual agonist peptide, or a GLP-1/GIP/GcG tri-agonist peptide. However, especially preferred fusion proteins include retro-Michael resistant albenatide (AB-013-AEEA-succinimide (SEQ ID NO:2)-albumin), retro-Michael resistant albenatidex (AB-014-AEEA-succinimide (SEQ ID NO:185)-albumin), retro-Michael resistant albugiptide (AB-029-AEEA-succinimide (SEQ ID NO:7)-albumin), and retro-Michael resistant albutide (AB-044-AEEA-succinimide (SEQ ID NO:223)-albumin).

In yet another aspect of the inventive subject matter, the inventors also contemplate a method of reducing an adverse effect of administration of a Class B GPCR agonist peptide in a subject. Such methods will typically include a step of administering a pharmaceutical composition to the subject in need thereof in which the GPCR agonist peptide is covalently bound to a $Cys_{34}$ amino acid of an albumin in a stereopreferred or stereoselective configuration, and wherein the pharmaceutical composition is substantially free of unbound GLP-1 agonist peptide.

Among other options, it is contemplated that the GPCR agonist peptide is a GLP-1 agonist peptide, a GLP-1/GIP dual agonist peptide, or a GLP-1/GIP/GcG tri-agonist peptide. Most typically, the adverse effect is at least one of nausea, vomiting, and diarrhea, and the composition is administered to provide equal or less than 800 mcg, or equal or less than 250 mcg of the GPCR agonist peptide once weekly. As noted above, especially preferred fusion proteins include retro-Michael resistant albenatide (AB-013-AEEA-succinimide (SEQ ID NO: 2)-albumin), retro-Michael resistant albenatidex (AB-014-AEEA-succinimide (SEQ ID NO: 185)-albumin), retro-Michael resistant albugiptide (AB-029-AEEA-succinimide (SEQ ID NO: 7)-albumin), and retro-Michael resistant albutide (AB-044-AEEA-succinimide (SEQ ID NO: 223)-albumin).

In some contemplated embodiments, the albumin is conformationally modified, wherein the pharmaceutical composition has a pH of pH <7.0, while in other embodiments the pharmaceutical composition further comprises albumin having an unreacted $Cys_{34}$ group, and wherein the pharmaceutical composition has a pH of pH <7.0.

In view of the above the inventors therefore also contemplate a method of treating a subject diagnosed with a disease that includes a step of administering a therapeutically effective amount of a pharmaceutical composition to the subject in need thereof, wherein the pharmaceutical composition comprises (a) a retro-Michael resistant albenatide (AB-013-AEEA-succinimide (SEQ ID NO:2)-albumin); (b) a retro-Michael resistant albenatidex (AB-014-AEEA-succinimide (SEQ ID NO:185)-albumin); (c) a retro-Michael resistant albugiptide (AB-029-AEEA-succinimide (SEQ ID NO:7)-albumin); or (d) a retro-Michael resistant albutide (AB-044-AEEA-succinimide (SEQ ID NO:223)-albumin). Most typically, the disease is NIDDM (non-insulin dependent diabetes mellitus), NASH (non-alcoholic steatohepatosis/steatohepatitis), or obesity.

In preferred embodiments, the therapeutically effective amount is equal or less than 400 mcg, or equal or less than 200 mcg of the GPCR agonist peptide administered once weekly. Most typically the pharmaceutical composition will be administered by subcutaneous injection or intranasal administration. Moreover, it is contemplated that the pharmaceutical composition has a pH of pH <7.0 (e.g., pH of between 4.0 and 6.0), and/or that the albumin in the albenatide, albenatidex, albugiptide, or albutide is a conformationally modified albumin.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 17 depicts exemplary results for Type 2 diabetic patients at various dosage regimens establishing that a 130 mcg (0.13 mg) dose has a high therapeutic index with minimized GI adverse events.

FIG. 20 depicts exemplary results for subjects with T2D on Metformin to demonstrate the efficacy of the lowest dose of AB-013 to reduce HbA1c over 52 weeks.

FIG. 21 depicts exemplary results for subjects with T2D (naïve) to demonstrate the efficacy of the lowest dose of AB-013 to reduce HbA1c over 52 weeks.

FIG. 22 depicts exemplary results for GI Adverse Events (Vomiting, Nausea, Diarrhea) over 24 weeks at the ultra-low dose of 0.13 mg without titration, establishing that the GI adverse events are minimal with less than 2% by week 4 for vomiting, nausea, and diarrhea.

FIG. 32 is an exemplary dosage comparison of known GLP-1 agonist compounds and AB-013.

FIG. 45 are exemplary photomicrographs of liver sections from mice treated with test compounds and controls.

DETAILED DESCRIPTION

Figure 1:
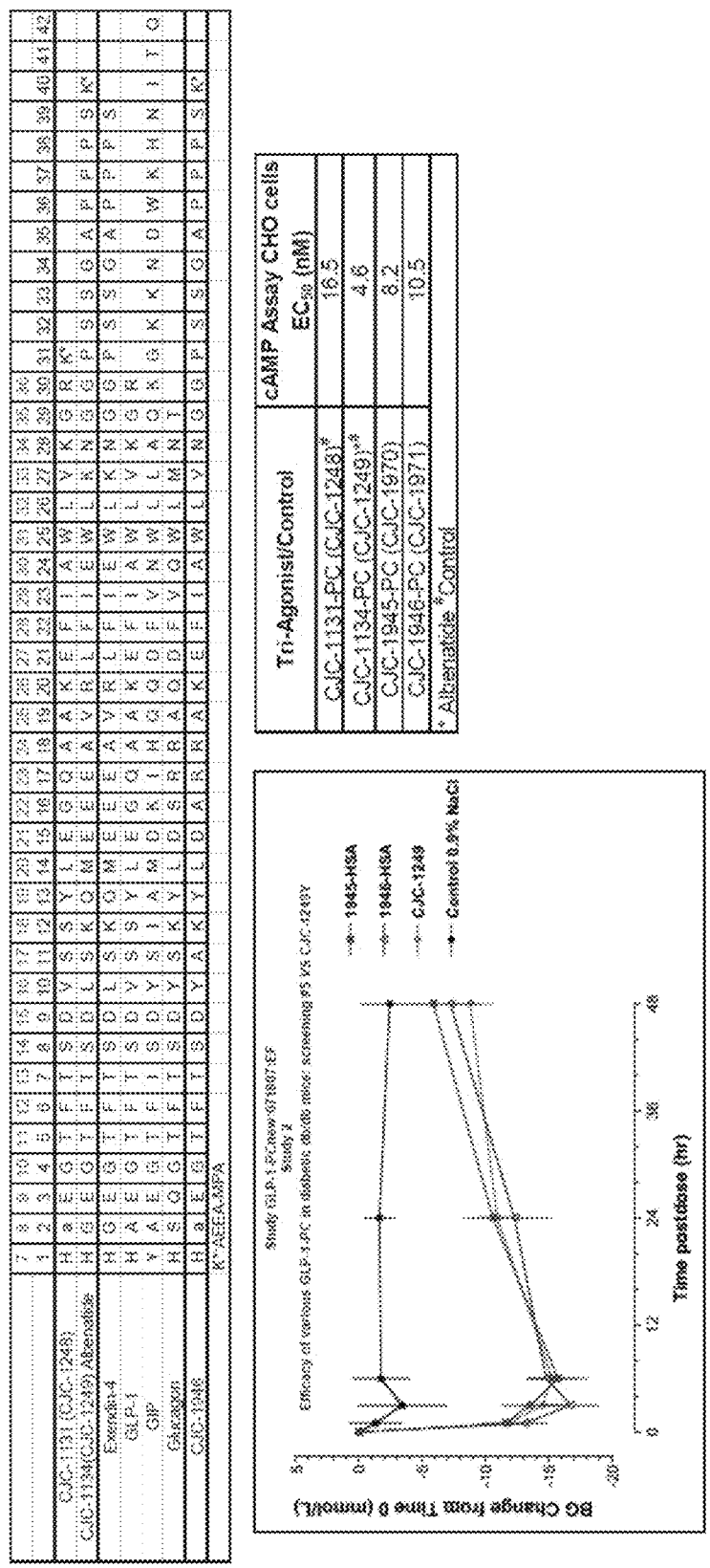
FIG. 1 depicts exemplary results for $EC_{50}$ values in CHO cells and blood glucose changes in mice, demonstrating significant half-life of selected tested compounds and biological activity by the tri-agonist receptor of the albumin bound peptide.

The inventors have discovered therapeutic compositions and methods in which various GPCR agonist peptides, and especially incretins/insulinotropic agents such as GLP-1, GIP, Glucagon (GcG), Amylin, NPY2, Neuropeptide Y, and PYY, and derivatives, analogs, and fragments thereof, can be delivered as a fusion protein to a subject in need thereof at a heretofore unrealized high therapeutic index in their class. Indeed, owing to their particular chemical structure, contemplated compounds and compositions allow for ultra-low dosages at once weekly administration with minimal adverse effects such as nausea, vomiting, and/or diarrhea, and without the need for titration to a tolerated dose. In this context, it should be appreciated that the term 'fusion protein' in conjunction with the compounds presented herein includes proteins in which a first peptide portion (e.g., agonist peptide) is covalently bound to a second peptide portion (e.g., albumin) via a linker moiety, where the linker may be a third peptide portion or a non-peptide portion (e.g., AEEA-MPA). Thus, the term 'fusion protein' in conjunction with the compounds presented herein may also be referred to as 'bioconjugate' or 'conjugate'.

In this context it should be appreciated that as the GPCR agonist peptides remain at all times covalently bound to albumin, numerous shortfalls of currently known agonist peptide formulations such as very high dosages and adverse effects can be avoided. In addition, it should be recognized that such irreversible coupling also allows the fusion protein to readily move from the blood compartment to a target tissue and even pass the blood brain barrier (via gp60 transcytosis and FcRn recycling) into neural tissues, thereby increasing half-live time and reducing required dosage and adverse effects.

In contrast, currently known GLP-1 agonists are formulated as unbound agonists, as PEG-conjugates, as fusion proteins in which the agonist and a protein carrier form a contiguous polypeptide backbone, or as fatty acid derivatives that are non-covalently bound to albumin via hydrophobic interaction with the hydrophobic binding pockets in albumin. Representative compounds for such agonist compositions include Semaglutide (NovoNordisk, GLP-1 agonist), Tirzepatide (Eli Lilly, Dual Agonist) Retatrutide (Eli Lilly, Tri-Agonist), Danuglipron (Pfizer, Abandoned), Albiglutide (GSK, Abandoned), Lixisenatide (Sanofi/Zealand, Abandoned), Efinopegdutide (Merck, GLP-1, Glucagon agonist), Cafraglutide (Amgen, GLP-1 agonist), Survodutide (Boehringer Ingelheim, Glucagon/GLP-1 dual agonist), Pemvidutide (Altimmune), Pegapamodutide (OPKO Health, Mid-stage trials).

Unfortunately, these formulations share numerous common drawbacks, such as the need to titrate a subject to a maximum tolerated or therapeutically effective dose, and a variety of gastrointestinal side effects such as nausea, vomiting, and diarrhea. For example, currently approved products (e.g., semaglutide and tirzepatide) are associated with high incidence of nausea and vomiting, often resulting in patient discontinuance of drug. Likewise, pre-clinical and clinical experience with free exendin-4 (e.g., exenatide) exhibited early onset and high incidence of vomiting as was the case with free unbound GLP-1. More particularly, free unbound exendin-4 (exenatide), even at low doses of 5 mcg and 10 mcg was reported to result in 44% incidence of nausea, and at 100 mcg resulted in violent adverse events including projectile vomiting. In other studies, free unbound exendin-4 at 0.1 pmol/kg infused resulted in nausea and vomiting, and at 0.16 pmol/kg per minute, free unbound GLP-1 resulted in vomiting within eight minutes, consistent with high peak levels at time of administration.

In contrast, the inventors have now discovered that fusion proteins can be prepared by use of a linker that irreversibly and covalently connects albumin to a Class B GPCR agonist peptide. For example, in some preferred embodiments, one end of the linker will be covalently bound to a reactive group at the C-terminus of the agonist peptide (e.g., via an amide bond) while the other end of the linker is covalently bound to the albumin at $Cys_{34}$ via a retro-Michael resistant thioether bond in which the carbon atom of the coupling group in the linker has a stereospecific configuration that renders the bond retro-Michael resistant within the context of the hydrophobic pocket in which the $Cys_{34}$ is located. In other preferred embodiments, one end of the linker will be covalently bound to a reactive group in a side chain of an amino acid at an intermediate position in the agonist peptide (e.g., via an amide bond) and the other end of the linker will be covalently bound to the albumin at $Cys_{34}$ via a retro-Michael resistant thioether bond in which the carbon atom of the coupling group in the linker has a stereospecific configuration that renders the bond retro-Michael resistant within the context of the hydrophobic pocket in which the $Cys_{34}$ is located. In this context it should be appreciated that suitable linkers will provide a rotational degree of freedom and a steric distance between the agonist peptide and the albumin so as to enable binding of the agonist peptide to the target receptor and activation of the target receptor while remining covalently bound to the albumin.

Advantageously, contemplated retro-Michael resistant albumin-bound insulinotropic agonists will transcytose rapidly to the tissue microenvironment of the pancreas and the brain, leaving the plasma compartment through the gp60/caveolin-1/caveoli pathway with long-acting agonist via FcRn rescue. As such, contemplated compounds and compositions can take advantage of cell mediated transport, thereby allowing for ultra-low dose and ultra-low plasma concentration to so enable a therapeutic effect with a high therapeutic index and a substantially lower GI adverse event profile.

As will be appreciated, especially contemplated peptide agonists suitable for use in conjunction with the teachings presented herein will particularly include GPCR agonists (and especially Class B GPCR agonists) and all derivatives, analogs, and fragments thereof. Therefore, and among other contemplated peptide agonists, GLP-1, GIP, Glucagon (GcG), Amylin, NPY2, Neuropeptide Y, and PYY, and derivatives, analogs, and fragments are especially preferred. It should furthermore be appreciated that the peptide agonists contemplated herein may have binding and activation specificity towards a single receptor (mono-agonist), two receptors (dual-agonist), or three receptors (tri-agonist). In this context, it should be particularly appreciated that contrary to conventional wisdom, compounds can be produced in which the ligand is covalently and irreversibly bound to the albumin, and in which the same ligand can bind to and activate two, or even three distinct G-protein coupled receptors (GLP-1, GIP, and/or GcG receptors). Consequently, it should be recognized that the biological activity of fusion proteins containing such peptide agonists may be tailored towards specific uses (e.g., insulinotropic, appetite suppressant, etc.).

In one exemplary fusion protein, retro-Michael resistant albenatide (acting as a GLP-1 agonist) comprises exendin-4 (SEQ ID NO:3) to which on the C-terminus a modified lysine is covalently coupled, wherein the modified lysine contains a linker with a coupling group. In this example, the modified lysine forms a peptide bond with the C-terminal serine of exendin-4, and the modified lysine further includes an AEEA-MPA group that is covalently bound to the epsilon amino group of the lysine via an amide bond. Upon reaction of the MPA coupling group with the thiol group of $Cys_{34}$ in the albumin in a stereopreferred or stereoselective manner as described in more detail below, the retro-Michael resistant albenatide (AB-013-AEEA-succinimide-albumin). Of course, it should be appreciated that various alternative linker moieties may be used, and suitable alternative linkers with coupling groups include MPA, (bromo) MPA, AEEA, AEEA-MPA, AEEA-(bromo) MPA, (AEEA) 2-MPA, (AEEA) 2-(bromo) MPA, AEEEA-OA-MPA, AEEEA-OA-(bromo) MPA, AEEA-OA-AEEA-MPA, AEEA-OA-AEEA-(bromo) MPA, (AEEEA) 2-OA-MPA, and (AEEEA) 2-OA-(bromo) MPA (with MPA denoting maleimidopropionic acid, and with OA denoting 8-aminooctanoate). Where desired, the modified lysine may also be coupled to the C-terminal serine via a single AEEA group. In such case, the modified lysine may once more include coupling groups such as MPA, (bromo) MPA, AEEA, AEEA-MPA, AEEA-(bromo) MPA, (AEEA) 2-MPA, (AEEA) 2-(bromo) MPA, AEEEA-OA-MPA, AEEEA-OA-(bromo) MPA, AEEA-OA-AEEA-MPA, AEEA-OA-AEEA-(bromo) MPA, (AEEEA) 2-OA-MPA, or (AEEEA) 2-OA-(bromo) MPA.

In another exemplary fusion protein, and following the same approach, a retro-Michael resistant albenatidex (AB-014-AEEA-succinimide (SEQ ID NO:185)-albumin) (acting as a GLP-1 agonist) comprises a chimeric GLP-1/exendin-4 portion to which on the C-terminus a modified lysine is covalently coupled, wherein the modified lysine contains a linker with a coupling group. In this example, the modified lysine forms a peptide bond with the C-terminal serine of chimeric peptide, and the modified lysine further includes an AEEA-MPA group that is covalently bound to the epsilon amino group of the lysine via an amide bond as is shown in SEQ ID NO.185. Upon reaction of the MPA coupling group with the thiol group of $Cys_{86}$ in the albumin in a stereopreferred or stereoselective manner as described in more detail below, the retro-Michael resistant albenatidex is formed (AB-014-AEEA-succinimide-albumin). As noted above, it should be appreciated that various alternative linker moieties may be used, and suitable alternative linkers with coupling groups include MPA, (bromo) MPA, AEEA, AEEA-MPA, AEEA-(bromo) MPA, (AEEA) 2-MPA, (AEEA) 2-(bromo) MPA, AEEEA-OA-MPA, AEEEA-OA-(bromo) MPA, AEEA-OA-AEEA-MPA, AEEA-OA-AEEA-(bromo) MPA, (AEEEA) 2-OA-MPA, and (AEEEA) 2-OA-(bromo) MPA (with MPA denoting maleimidopropionic acid, and with OA denoting 8-aminooctanoate). Where desired, the modified lysine may also be coupled to the C-terminal serine via a single AEEA group. In such case, the modified lysine may once more include coupling groups such as MPA, (bromo) MPA, AEEA, AEEA-MPA, AEEA-(bromo) MPA, (AEEA) 2-MPA, (AEEA) 2-(bromo) MPA, AEEEA-OA-MPA, AEEEA-OA-(bromo) MPA, AEEA-OA-AEEA-MPA, AEEA-OA-AEEA-(bromo) MPA, (AEEEA) 2-OA-MPA, or (AEEEA) 2-OA-(bromo) MPA.

In still another exemplary fusion protein, and once more following the same approach, a retro-Michael resistant albugiptide (AB-029-AEEA-succinimide (SEQ ID NO:7)-albumin) (acting as a GIP/GLP-1 dual agonist) comprises a modified exendin-4 portion to which on the C-terminus a modified lysine is covalently coupled, wherein the modified lysine contains a linker with a coupling group. In this example, the modified lysine forms a peptide bond with the C-terminal serine of the modified exendin-4, and the modified lysine further includes an AEEA-MPA group that is covalently bound to the epsilon amino group of the lysine via an amide bond as is shown in SEQ ID NO:7. Once more, upon reaction of the MPA coupling group with the thiol group of $Cys_{34}$ in the albumin in a stereopreferred or stereoselective manner as described in more detail below, the retro-Michael resistant albugiptide is formed (AB-029-

AEEA-succinimide-albumin). As already noted above, it should be appreciated that various alternative linker moieties may be used, and suitable alternative linkers with coupling groups include MPA, (bromo) MPA, AEEA, AEEA-MPA, AEEA-(bromo) MPA, (AEEA) 2-MPA, (AEEA) 2-(bromo) MPA, AEEEA-OA-MPA, AEEEA-OA-(bromo) MPA, AEEA-OA-AEEA-MPA, AEEA-OA-AEEA-(bromo) MPA, (AEEEA) 2-OA-MPA, and (AEEEA) 2-OA-(bromo) MPA (with MPA denoting maleimidopropionic acid, and with OA denoting 8-aminooctanoate). Where desired, the modified lysine may also be coupled to the C-terminal serine via a single AEEA group. In such case, the modified lysine may once more include coupling groups such as MPA, (bromo) MPA, AEEA, AEEA-MPA, AEEA-(bromo) MPA, (AEEA) 2-MPA, (AEEA) 2-(bromo) MPA, AEEEA-OA-MPA, AEEEA-OA-(bromo) MPA, AEEA-OA-AEEA-MPA, AEEA-OA-AEEA-(bromo) MPA, (AEEEA) 2-OA-MPA, or (AEEEA) 2-OA-(bromo) MPA.

In a still further exemplary fusion protein, and yet again following the same approach, a retro-Michael resistant albutide (AB-044-AEEA-succinimide (SEQ ID NO:223)-albumin) (acting as a GIP/GLP-1/GcG tri-agonist) comprises a modified exendin-4 portion to which on the C-terminus a modified lysine is covalently coupled, wherein the modified lysine contains a linker with a coupling group. In this example, the modified lysine forms a peptide bond with the C-terminal serine of the modified exendin-4, and the modified lysine further includes an AEEA-MPA group that is covalently bound to the epsilon amino group of the lysine via an amide bond as is shown in SEQ ID NO:223. Once more, upon reaction of the MPA coupling group with the thiol group of $Cys_{34}$ in the albumin in a stereopreferred or stereoselective manner as described in more detail below, the retro-Michael resistant albutide albutide (AB-044-AEEA-succinimide (SEQ ID NO:223)-albumin) is formed. Additionally, a closely related retro-Michael resistant fusion protein, AB-045-AEEA-succinimide (SEQ ID NO:69)-albumin, is also particularly contemplated. Once more, it should be appreciated that various alternative linker moieties may be used, and suitable alternative linkers with coupling groups include MPA, (bromo) MPA, AEEA, AEEA-MPA, AEEA-(bromo) MPA, (AEEA) 2-MPA, (AEEA) 2-(bromo) MPA, AEEEA-OA-MPA, AEEEA-OA-(bromo) MPA, AEEA-OA-AEEA-MPA, AEEA-OA-AEEA-(bromo) MPA, (AEEEA) 2-OA-MPA, and (AEEEA) 2-OA-(bromo) MPA (with MPA denoting maleimidopropionic acid, and with OA denoting 8-aminooctanoate). Where desired, the modified lysine may also be coupled to the C-terminal serine via a single AEEA group. In such case, the modified lysine may once more include coupling groups such as MPA, (bromo) MPA, AEEA, AEEA-MPA, AEEA-(bromo) MPA, (AEEA) 2-MPA, (AEEA) 2-(bromo) MPA, AEEEA-OA-MPA, AEEEA-OA-(bromo) MPA, AEEA-OA-AEEA-MPA, AEEA-OA-AEEA-(bromo) MPA, (AEEEA) 2-OA-MPA, and (AEEEA) 2-OA-(bromo) MPA.

As will be readily appreciated, contemplated fusion proteins need not be limited to those shown above, and a number of other GPCR agonist peptides are also suitable for use herein, so long as the alternative GPCR agonist peptide is covalently bound via a linker to the albumin in a retro-Michael resistant manner. For example, especially suitable agonist peptides are provided in Table 1 below in which the amino acids and modifying characters are as provided in the sequence listing of this application. Moreover, it should be appreciated that (1) sequences in the table without linker modifications may also include a linker modification as described herein, particularly where the linker modification is covalently attached to an epsilon amino group of a lysine, and suitable linker modifications include MPA, (bromo) MPA, AEEA, AEEA-MPA, AEEA-(bromo) MPA, (AEEA) 2-MPA, (AEEA) 2-(bromo) MPA, AEEEA-OA-MPA, AEEEA-OA-(bromo) MPA, AEEA-OA-AEEA-MPA, AEEA-OA-AEEA-(bromo) MPA, (AEEEA) 2-OA-MPA, and (AEEEA) 2-OA-(bromo) MPA; (2) any specific linker modification shown in the table below (e.g., AEEA-MPA) as indicated by a particular modifying character may be replaced with any other linker modification contemplated herein (e.g., AEEA-AEEA-MPA); (3) the C-terminal amino acid may be covalently attached to a solid phase (e.g., modified Ramage resin), preferably via a spacer group; (4) any sequence in the table below may be covalently coupled via a linker as described herein to albumin at $Cys_{34}$, preferably in a retro-Michael resistant manner (e.g., in a stereopreferred or stereoselective manner); and (5) any sequence in the table below having a linker modification is also contemplated as an agonist peptide sequence without the linker modification.

TABLE 1

| SEQ ID NO: | SEQUENCE |
|---|---|
| 1 | HaEGTFTSDVSSYLEGQAAKEFIAWLVKGRK* |
| 2 | HGEGTFTSDLSKQMEEEAVRLFIEWLKNGGPSSGAPPPSK* (Albenatide - AB013 when bound to $Cys_{34}$ in retro-Michael resistant/ stereopreferred or stereoselective manner via maleimide reactive group) |
| 3 | HGEGTFTSDLSKQMEEEAVRLFIEWLKNGGPSSGAPPPS |
| 4 | HAEGTFTSDVSSYLEGQAAKEFIAWLVKGR |
| 5 | YAEGTFISDYSIAMDKIHQQDFVNWLLAQKGKKNDWKHNITQ |
| 6 | HSQGTFTSDYSKYLDSRRAQDFVQWLMNT |
| 7 | HaEGTFTSDVSSYLEGQAAKEFIAWLVNGGPSSGAPPPSK* (Albugiptide - AB-029 when bound to $Cys_{34}$ in retro-Michael resistant/ stereopreferred or stereoselective manner via maleimide reactive group) |

TABLE 1-continued

| SEQ ID NO: | SEQUENCE |
|---|---|
| 8 | HaEGTFTSDYAKYLDARRAKEFIAWLVKGRPSSGAPPPSK* |
| 9 | HGEGTFTSDLSKQMEEEAVRLFIEWLKNGGPK*SGAPPPS |
| 10 | HaEGTFTSDVSK*YLEGQAAKEFIAWLVKGRPSSGAPPPS |
| 11 | HaEGTFTSDVSSYLEK*QAAKEFIAWLVKGRPSSGAPPPS |
| 12 | HGEGTFTSDLSKQMEEEAVRLFIEWLKNGGPK*SGAPPPS |
| 13 | HaEGTFTSDINKVLDTIAAKEFIAWLVKGRPSSGAPPPSK* |
| 14 | YAibEGTFTSDYSIYLDKQAAAibEFVQWLLAGGPSSGAPPPSK" |
| 15 | YGGGTFTSDSFFYLELSHAKDFINWLQLGaPSSGAPPPSK* |
| 16 | HAibAibGTFTSDEMNYLDDWMQAibAFVNWLVAibGIPSSGAPPPSK* |
| 17 | FAibPGTFTSDGHNYLDWQDAKEFIQWLGWGVPSSGAPPPSK* |
| 18 | YAibMGTFTSDPQIAibLEMKEQAibDFINWLNDGFPSSGAPPPSK* |
| 19 | HaPGTFTSDNHEAibLDTYRQAibDFINWLDTGVPSSGAPPPSK* |
| 20 | YaNGTFTSDIWAYLDSSFAQDFVAWLYIGKPSSGAPPPSK* |
| 21 | HAibDGTFTSDFEHYLEDAVQKAFIAWLSTGVPSSGAPPPSK* |
| 22 | FGDGTFTSDLRGAibLEIMPQAibAFVNWLTSGKPSSGAPPPSK* |
| 23 | HaaGTFTSDsMIYLDNAHQQEFIQWLFNGPPSSGAPPPSK* |
| 24 | HaIGTFTSDsTAibYLEaYKQAibDFVQWLHSGGPSSGAPPPSK* |
| 25 | YsWGTFTSDaGYYLDMsFQQAFIQWLKAGaPSSGAPPPSK* |
| 26 | YGRGTFTSDWIYAibLDTaPQKEFVEWLHsGAPSSGAPPPSK* |
| 27 | YaMGTFTSDSEEAibLEMVYQQAFVAWLPVGGPSSGAPPPSK* |
| 28 | FssGTFTSDWDWAibLDIAibIAAibEFINWLVYGYPSSGAPPPSK* |
| 29 | FAibGGTFTSDDMRYLEPKGQQAFIQWLWVGQPSSGAPPPSK* |
| 30 | YAibSGTFTSDVETYLDLLIAKEFIAWLGAGAibPSSGAPPPSK* |
| 31 | HGRGTFTSDHQFAibLDSMIQAibEFIQWLHYGIPSSGAPPPSK* |
| 32 | YaRGTFTSDFINAibLESGVAKAFVNWLQEGaPSSGAPPPSK* |
| 33 | HsFGTFTSDGWMYLDMNEQKAFVAWLYaGaPSSGAPPPSK* |
| 34 | FsRGTFTSDHYRAibLDQSKAAibEFIEWLESGNPSSGAPPPSK* |
| 35 | FsGGTFTSDHHRYLDQIPQKDFIQWLEFGKPSSGAPPPSK* |
| 36 | FaQGTFTSDaNMAibLDMFaQKAFINWLFQGGPSSGAPPPSK* |
| 37 | FaAGTFTSDVTaAibLEVAibQQKAFIAWLNLGQPSSGAPPPSK* |
| 38 | HaIGTFTSDHMAibYLDsDPAQDFIEWLMPGSPSSGAPPPSK* |
| 39 | HAibNGTFTSDIIHYLDPIVQKAFIEWLNGGAPSSGAPPPSK* |
| 40 | HGEGTFTSDMAibQAibLDREIAKEFVEWLFFGYPSSGAPPPSK* |
| 41 | HsPGTFTSDPDsAibLDENHQQAFVAWLNsGMPSSGAPPPSK* |
| 42 | FsaGTFTSDsLDYLEssEQAibEFINWLAAGVPSSGAPPPSK* |
| 43 | YaAibGTFTSDKDPYLEAibTYAAibEFVAWLVsGRPSSGAPPPSK* |
| 44 | FGRGTFTSDAVMAibLDAMQAKAFIEWLWIGIPSSGAPPPSK* |
| 45 | HaaGTFTSDVDYAibLEWKIQQDFIEWLSTGLPSSGAPPPSK* |
| 46 | YsFGTFTSDIAGYLDLEAibAAibAFVQWLAHGKPSSGAPPPSK* |

TABLE 1-continued

| SEQ ID NO: | SEQUENCE |
|---|---|
| 47 | HsHGTFTSDEVQYLDMDGQQEFINWLDLGYPSSGAPPPSK* |
| 48 | HsRGTFTSDLQGAibLEYADQAibDFVNWLAibTGFPSSGAPPPSK* |
| 49 | HGFGTFTSDGIDAibLEaITAKEFIAWLaIGKPSSGAPPPSK* |
| 50 | HAibTGTFTSDIaIAibLDYKGAAibAFVQWLDAGEPSSGAPPPSK* |
| 51 | HsLGTFTSDLAibMAibLDVNIAAibDFIAWLMIGYPSSGAPPPSK* |
| 52 | YGDGTFTSDKHRAibLEISQQKEFVQWLLsGLPSSGAPPPSK* |
| 53 | FaaGTFTSDQTTAibLDAGSAKDFVNWLVAibGAibPSSGAPPPSK* |
| 54 | YAibGGTFTSDEPPYLDAWTQAibEFVEWLVRGWPSSGAPPPSK* |
| 55 | HaGGTFTSDGSRAibLDIaTQQDFIEWLLEGHPSSGAPPPSK* |
| 56 | HsSGTFTSDPLKYLDHGNQQAFVNWLISGSPSSGAPPPSK* |
| 57 | HAibTGTFTSDISFYLEEYVAQEFVAWLQAGsPSSGAPPPSK* |
| 58 | HsaGTFTSDaYEAibLEPAibDQKAFIAWLWHGLPSSGAPPPSK* |
| 59 | YsRGTFTSDATLAibLEGSKQKAFINWLLEGIPSSGAPPPSK* |
| 60 | FGWGTFTSDLEKAibLELARAQAFVEWLKVGSPSSGAPPPSK* |
| 61 | FAibMGTFTSDPYPYLEWEaAQAFINWLsGGSPSSGAPPPSK* |
| 62 | HaAibGTFTSDMPTAibLDHIQQQDFVAWLVQGIPSSGAPPPSK* |
| 63 | FasGTFTSDHSDAibLELKAQQEFVNWLRNGRPSSGAPPPSK* |
| 64 | HGQGTFTSDYSKYLDARRAQDFVEWLKNGGPSSGAPPPSK* |
| 65 | HAibQGTFTSDYSKAibLDKRRAKDFVEWLKNGGPSSGAPPPSK* |
| 66 | HAibQGTFTSDYSKYLDKRRAKDFVEWLKNGGPSSGAPPPSK* |
| 67 | YAibQGTFTSDYSImeILDKIAQAibAFIEYLLEGGPSSGAPPPSK* |
| 68 | YAibEGTFTSDYSIAibLDKIAQKAFVQWLIAGGPSSGAPPPSK* |
| 69 | HaEGTFTSDYAKYLDARRAKEFIAWLVNGGPSSGAPPPSK* |
| 70 | YAibEGTFTSDYSIYLDKQAAAibEFVQWLLAGGPSSGAPPPSK* |
| 71 | HAibHGTFTSDLSKLLEEQRQAibEFIEWLKAaGPPPSAibKPPPK* |
| 72 | HaMGTFTSDRHWYLDMSHQK*AFVQWLAYGNPSSGAPPPS |
| 73 | YasGTFTSDWGRYLELLIQK*EFVNWLIIGAPSSGAPPPS |
| 74 | HGKGTFTSDsAIAibLEVsaAK*AFIEWLaHGDPSSGAPPPS |
| 75 | HasGTFTSDILEAibLDQAAAK*EFVEWLaHGFPSSGAPPPS |
| 76 | HaYGTFTSDYMAibAibLDFLQQK*DFVAWLFMGVPSSGAPPPS |
| 77 | HAibsGTFTSDAibAYYLDNTTAK*DFIQWLDAGPPSSGAPPPS |
| 78 | FAibKGTFTSDDaVYLEAibHRAK*EFVEWLFGGsPSSGAPPPS |
| 79 | YAibHGTFTSDLTVAibLDEIKAK*EFVEWLAibVGPPSSGAPPPS |
| 80 | FsWGTFTSDFPaAibLEAibMKAK*DFVEWLLDGNPSSGAPPPS |
| 81 | HAibKGTFTSDDADAibLEWYRQK*AFVQWLPsGIPSSGAPPPS |
| 82 | YAibWGTFTSDSNSAibLEAKMQK*EFVNWLsQGFPSSGAPPPS |
| 83 | FaTGTFTSDDADYLELFsQK*AFIAWLDNGVPSSGAPPPS |
| 84 | YSYGTFTSDWDAAibLESAibMQK*EFVQWLFYGQPSSGAPPPS |

TABLE 1-continued

| SEQ ID NO: | SEQUENCE |
|---|---|
| 85 | YaNGTFTSDTNsAibLDSTQAK*EFVAWLVQGDPSSGAPPPS |
| 86 | FAibIGTFTSDKQAYLEHPRQK*AFVAWLDVGYPSSGAPPPS |
| 87 | HAibRGTFTSDKFIAibLEYHNAK*EFVAWLYKGsPSSGAPPPS |
| 88 | FGHGTFTSDSIWYLENYSQK*EFIEWLEKGPPSSGAPPPS |
| 89 | HsaGTFTSDIRAibYLEIMLQK*EFVEWLaEGVPSSGAPPPS |
| 90 | HAibFGTFTSDMLNYLEENsQK*EFVNWLQLGMPSSGAPPPS |
| 91 | FGHGTFTSDIWIYLEVQTAK*DFINWLSWGEPSSGAPPPS |
| 92 | HsGGTFTSDSGPYLDKTDQK*AFINWLPIGNPSSGAPPPS |
| 93 | YsIGTFTSDHsPAibLDHLFAK*DFVEWLENGDPSSGAPPPS |
| 94 | FGYGTFTSDKEGAibLEQsAibAK*EFIQWLPHGPPSSGAPPPS |
| 95 | FsWGTFTSDFAibSAibLDTTRAK*DFVEWLIRGNPSSGAPPPS |
| 96 | HAibPGTFTSDHEKYLEMVsAK*DFIAWLRAibGDPSSGAPPPS |
| 97 | YaAGTFTSDTIaAibLDNaAAK*DFIAWLIQGYPSSGAPPPS |
| 98 | YAibLGTFTSDTIHAibLEFEAQK*DFINWLKAGEPSSGAPPPS |
| 99 | YAibQGTFTSDAMIYLDTPDAK*EFIAWLAibIGGPSSGAPPPS |
| 100 | YGAGTFTSDHAibGAibLDIAibQQK*EFVQWLETGTPSSGAPPPS |
| 101 | YaVGTFTSDLSEYLEMNIAK*DFVQWLLVGGPSSGAPPPS |
| 102 | YGPGTFTSDRYsYLEQHMAK*EFIQWLGPGHPSSGAPPPS |
| 103 | YAibRGTFTSDMRVYLEETLQK*AFVQWLIaGDPSSGAPPPS |
| 104 | YsAibGTFTSDFMEAibLDKKIQK*DFIQWLWYGSPSSGAPPPS |
| 105 | FAibsGTFTSDELRYLEEMHQK*AFIQWLAibTGFPSSGAPPPS |
| 106 | YGPGTFTSDWAKYLEGRDAK*AFINWLsQGSPSSGAPPPS |
| 107 | HGVGTFTSDHHFAibLEIIMAK*AFIEWLWHGaPSSGAPPPS |
| 108 | HGIGTFTSDVPAYLDPAaAK*DFIQWLVSGGPSSGAPPPS |
| 109 | HsNGTFTSDRRKAibLEPPIAK*EFVQWLIAibGIPSSGAPPPS |
| 110 | FAibTGTFTSDTMaYLDYTHAK*DFIAWLIDGKPSSGAPPPS |
| 111 | YaTGTFTSDsVQYLEHPMQK*AFVAWLHTGRPSSGAPPPS |
| 112 | YAibTGTFTSDEEWYLDNWMQK*AFVQWLSNGAibPSSGAPPPS |
| 113 | YsIGTFTSDGNKAibLEAibGRAK*AFIAWLQYGRPSSGAPPPS |
| 114 | YsPGTFTSDMYVYLEPGDAK*EFVQWLKNGGPSSGAPPPS |
| 115 | FsIGTFTSDLMaAibLERAAQK*EFVNWLIIGsPSSGAPPPS |
| 116 | YAibNGTFTSDIEQYLEPMVQK*EFVQWLSPGNPSSGAPPPS |
| 117 | YGWGTFTSDSFsAibLDWMMAK*AFIQWLIVGIPSSGAPPPS |
| 118 | HsPGTFTSDAibTHYLDNDQQK*DFVNWLPEGWPSSGAPPPS |
| 119 | YGaGTFTSDNHTAibLEsFAAK*EFIQWLNSGQPSSGAPPPS |
| 120 | YaMGTFTSDRLRAibLDQFSAK*AFVNWLSWGEPSSGAPPPS |
| 121 | FAibaGTFTSDSLAibAibLDHHNQK*AFVEWLaPGLPSSGAPPPS |
| 122 | HGQGTFTSDYSKYLDK*RRAQDFVEWLKNGGPSSGAPPPS |

TABLE 1-continued

| SEQ ID NO: | SEQUENCE |
|---|---|
| 123 | HAibQGTFTSDYSKAibLDKRRAK*DFVEWLKNGGPSSGAPPPS |
| 124 | HAibQGTFTSDYSKYLDK*RRAQDFVEWLKNGGPSSGAPPPS |
| 125 | YAibEGTFTSDYSIAibLDKIAQK*AFVQWLIAGGPSSGAPPPS |
| 126 | YAibQGTFTSDYSImeILDKIAQK*AFIEYLLEGGPSSGAPPPS |
| 127 | HaEGTFTSDYAKYLDARRAK*EFIAWLVNGGPSSGAPPPS |
| 128 | YaWGTFTSDsKDYLEFK*WAAibEFIQWLDPGDPSSGAPPPS |
| 129 | FAibYGTFTSDINVAibLDIK*WAAibAFINWLPGGIPSSGAPPPS |
| 130 | FaaGTFTSDRQEAibLDVK*LAAibEFVQWLVSGDPSSGAPPPS |
| 131 | FaRGTFTSDSMQAibLETK*RQQEFVNWLsMGVPSSGAPPPS |
| 132 | YaHGTFTSDTNRAibLESK*AAAibEFIAWLEVGAPSSGAPPPS |
| 133 | FAibGGTFTSDFRsAibLDsK*IAAibEFINWLFKGFPSSGAPPPS |
| 134 | YAibNGTFTSDMMPYLEPK*HQKDFVEWLTSGDPSSGAPPPS |
| 135 | HaPGTFTSDIIHYLETK*IAAibEFIQWLKRGSPSSGAPPPS |
| 136 | FsVGTFTSDAibSAAibLDLK*IAAibEFINWLFaGFPSSGAPPPS |
| 137 | YAibaGTFTSDGNMYLDKK*HAKDFIEWLsSGPPSSGAPPPS |
| 138 | YaIGTFTSDPsHAibLEVK*NQKEFVQWLNRGIPSSGAPPPS |
| 139 | FsTGTFTSDFVEAibLEIK*EQKAFIEWLAQGGPSSGAPPPS |
| 140 | FGTGTFTSDFDGYLEDK*aAKAFIQWLsGGMPSSGAPPPS |
| 141 | HsWGTFTSDWYIAibLEEK*NAAibDFIAWLYAGYPSSGAPPPS |
| 142 | FGPGTFTSDKKFAibLELK*GAKAFIAWLAibAibGFPSSGAPPPS |
| 143 | HsNGTFTSDaNsYLEPK*AAAibDFVNWLDAibGWPSSGAPPPS |
| 144 | FsTGTFTSDPWVYLDSK*QQQAFVEWLHFGNPSSGAPPPS |
| 145 | FaEGTFTSDWYPAibLDLK*SAAibDFVQWLYGGPPSSGAPPPS |
| 146 | FGIGTFTSDTARAibLDDK*DQKEFVQWLNDGMPSSGAPPPS |
| 147 | FGYGTFTSDKSTYLDEK*IQAibDFVEWLNDGsPSSGAPPPS |
| 148 | HGSGTFTSDAAibPYLDQK*GAQDFIAWLDGGPPSSGAPPPS |
| 149 | HaIGTFTSDPPVAibLEQK*HQQEFVAWLDPGLPSSGAPPPS |
| 150 | YaYGTFTSDVNKYLDPK*TAAibAFVEWLaQGIPSSGAPPPS |
| 151 | FaIGTFTSDRREYLEPK*EQAibDFIEWLRDGGPSSGAPPPS |
| 152 | YGNGTFTSDAWIYLDDK*LQKEFVQWLRLGNPSSGAPPPS |
| 153 | YaPGTFTSDaaAAibLEDK*YQAibAFIAWLAibQGWPSSGAPPPS |
| 154 | YGaGTFTSDIRAYLDEK*WAKAFVAWLVsGMPSSGAPPPS |
| 155 | YGWGTFTSDPINAibLDLK*AibQKDFVNWLPMGAPSSGAPPPS |
| 156 | HsNGTFTSDsYaYLERK*DQKAFIEWLWSGPPSSGAPPPS |
| 157 | YsMGTFTSDQGKYLEAK*SAQAFINWLMAibGAPSSGAPPPS |
| 158 | YaFGTFTSDLTRAibLDAibK*TAKAFIEWLDaGMPSSGAPPPS |
| 159 | YAibKGTFTSDAibIYYLDWK*NAAibAFVNWLHIGIPSSGAPPPS |
| 160 | HAibQGTFTSDWsAibAibLEKK*VQAibEFVNWLAibTGDPSSGAPPPS |

TABLE 1-continued

| SEQ ID NO: | SEQUENCE |
|---|---|
| 161 | FssGTFTSDDRaAibLDSK*aAQAFVAWLAibAGTPSSGAPPPS |
| 162 | YaIGTFTSDMKIYLDEK*aAKAFVQWLANGsPSSGAPPPS |
| 163 | FGQGTFTSDYDQAibLDNK*PQAibDFIEWLMYGEPSSGAPPPS |
| 164 | FsMGTFTSDLDRAibLDWK*IQKDFVQWLVSGTPSSGAPPPS |
| 165 | YsVGTFTSDLHsYLDLK*GAQDFVNWLVWGQPSSGAPPPS |
| 166 | HAibIGTFTSDDVYYLDLK*PQKEFVEWLGLGSPSSGAPPPS |
| 167 | FGVGTFTSDVMIAibLDIK*EQKEFINWLQSGEPSSGAPPPS |
| 168 | HAibFGTFTSDHAibsYLEsK*MAQDFINWLIIGsPSSGAPPPS |
| 169 | HaGGTFTSDPAKYLDSK*VQQEFVAWLAFGAibPSSGAPPPS |
| 170 | YaNGTFTSDVsFAibLEYK*DQKDFIQWLAsGQPSSGAPPPS |
| 171 | FsVGTFTSDNRQYLDVK*NQAibDFIQWLPWGIPSSGAPPPS |
| 172 | HAibVGTFTSDKETYLDIK*KAAibDFVEWLSTGRPSSGAPPPS |
| 173 | FGWGTFTSDDFNAibLEYK*HAAibEFVNWLDVGQPSSGAPPPS |
| 174 | FaYGTFTSDQSYAibLDYK*TAKDFIQWLTKGRPSSGAPPPS |
| 175 | FGPGTFTSDDAibIYLEaK*NAQAFIEWLFSGQPSSGAPPPS |
| 176 | YAibIGTFTSDSsIAibLDSK*AQAibDFIQWLLFGQPSSGAPPPS |
| 177 | HsGGTFTSDPYGAibLEQK*MAKEFVEWLMTGKPSSGAPPPS |
| 178 | HaEGTFTSDYAKYLDAK*RAKEFIAWLVNGGPSSGAPPPS |
| 179 | YAibQGTFTSDYSImelLDKK*AQAibAFIEYLLEGGPSSGAPPPS |
| 180 | HGQGTFTSDYSKYLDK*RRAQDFVEWLKNGGPSSGAPPPS |
| 181 | HAibQGTFTSDYSKAibLDK*RRAQDFVEWLKNGGPSSGAPPPS |
| 182 | HAibQGTFTSDYSKYLDK*RRAQDFVEWLKNGGPSSGAPPPS |
| 183 | X1X2 X3GTFTSDX4X5 X6X7 LX8X9 X10X11X12X13 X14 FX15X16WLX17X18GX19PSSGAPPPSX20 |
| 184 | X1X2 X3GTFTSDX4X5 X6X7 LX8X9 X10X11X12X13 X14 FX15X16WLX17X18GX19PSSGAPPPSX20X21 |
| 185 | HAibEGTFTSDVSSYLEGQAAKEFIAWLVKGRK* (Albenatidex - AB-014 when bound to $Cys_{34}$ in retro-Michael resistant/stereopreferred or stereoselective manner via maleimidereactive group) |
| 186 | HAibEGTFTSDVSSYLEGQAAKEFIAWLVKGRK^ |
| 187 | HAibEGTFTSDVSSYLEGQAAKEFIAWLVKGRK" |
| 188 | HAibEGTFTSDVSSYLEGQAAKEFIAWLVKGRK' |
| 189 | HAibEGTFTSDVSSYLEGQAAKEFIAWLVKGR9K* |
| 190 | HGEGTFTSDLSKQMEEEAVRLFIEWLKNGGPSSGAPPPSK^ |
| 191 | HGEGTFTSDLSKQMEEEAVRLFIEWLKNGGPSSGAPPPSK" |
| 192 | HGEGTFTSDLSKQMEEEAVRLFIEWLKNGGPSSGAPPPSK' |
| 193 | HGEGTFTSDLSKQMEEEAVRLFIEWLKNGGPSSGAPPPS9K* |
| 194 | HsQGTFTSDYSKYLDSRRAQDFVQWLMNTGPSSGAPPPSK* |
| 195 | HsQGTFTSDYSKYLDSRRAQDFVQWLMNTGPSSGAPPPSK^ |

TABLE 1-continued

| SEQ ID NO: | SEQUENCE |
|---|---|
| 196 | HsQGTFTSDYSKYLDSRRAQDFVQWLMNTGPSSGAPPPSK" |
| 197 | HsQGTFTSDYSKYLDSRRAQDFVQWLMNTGPSSGAPPPSK' |
| 198 | HsQGTFTSDYSKYLDSRRAQDFVQWLMNTGPSSGAPPPS9K* |
| 199 | YaEGTFISDYSIAMDKIHQQDFVNWLLAQGPSSGAPPPSK* |
| 200 | YaEGTFISDYSIAMDKIHQQDFVNWLLAQGPSSGAPPPSK^ |
| 201 | YaEGTFISDYSIAMDKIHQQDFVNWLLAQGPSSGAPPPSK" |
| 202 | YaEGTFISDYSIAMDKIHQQDFVNWLLAQGPSSGAPPPSK' |
| 203 | YaEGTFISDYSIAMDKIHQQDFVNWLLAQGPSSGAPPPS9K* |
| 204 | HAEGTFTSDVSSYLEGQAAK*EFIAWLVRGR |
| 205 | HAibEGTFTSDVSSYLEGQAAK*EFIAWLVRGRG |
| 206 | HVEGTFTSDVSSYLEEQAAREFIK*WLVRGRG |
| 207 | HaEGTFTSDVSSYLEGQAAKEFIAWLVNGGPSSGAPPPSK^ |
| 208 | HaEGTFTSDVSSYLEGQAAKEFIAWLVNGGPSSGAPPPSK" |
| 209 | HaEGTFTSDVSSYLEGQAAKEFIAWLVNGGPSSGAPPPSK' |
| 210 | HaEGTFTSDVSSYLEGQAAKEFIAWLVNGGPSSGAPPPS9K* |
| 211 | HaEGTFTSDVASYLEGQAAKEFIAWLVNGGPSSGAPPPSK* |
| 212 | YAibEGTFTSDYSIYLDKQAAAibEFVNWLLAGGPSSGAPPPSK* |
| 213 | HAibQGTFTSDYSKYLDEKKAK*EFVEWLLEGGPSSG |
| 214 | HAibQGTFTSDYSKYLDEK*AAKEFIQWLLQT |
| 215 | HAibQGTFTSDYSKYLDEKRAKEFVQWLMNTC* |
| 216 | HsQGTFTSDK*SKYLDARAAQDFVQWLLDT |
| 217 | HAc4cQGTFTSDYSKYLDERAAKDFIK*WLESA |
| 218 | HsQGTFTSDLSKQK*ESKAAQDFIEWLKAGGPSSGAPPPS |
| 219 | HSQGTFTSDK*SEYLDSERARDFVAWLEAGG |
| 220 | HAibQGTFTSDK*SKYLDERAAQDFVQWLLDGGPSSGAPPPS |
| 221 | HSQGTFTSDK*SKYLDERRAQDFVQWLLDGGPSSGAPPPS |
| 222 | HAibHGTGTSDLSKLK*EEQRQAibEFIEWLKAaGPPSAibKPPPK |
| 223 | HaQGTFTSDYAKYLDARRAKEFIAWLVNGGPSSGAPPPSK* (Albutide - AB-044 when bound to Cys$_{34}$ in retro-Michael resistant/stereopreferred or stereoselective manner via maleimide reactive group) |
| 224 | HaQGTFTSDYAKYLDARRAKEFIAWLVNGGPSSGAPPPSK^ |
| 225 | HaQGTFTSDYAKYLDARRAKEFIAWLVNGGPSSGAPPPSK" |
| 226 | HaQGTFTSDYAKYLDARRAKEFIAWLVNGGPSSGAPPPSK' |
| 227 | HaEGTFTSDYAKYLDARRAKEFIAWLVNGGPSSGAPPPSK^ |
| 228 | HaEGTFTSDYAKYLDARRAKEFIAWLVNGGPSSGAPPPSK" |
| 229 | HaEGTFTSDYAKYLDARRAKEFIAWLVNGGPSSGAPPPSK' |
| 230 | HaEGTFTSDYAKYLDARRAKEFIAWLVNGGPSSGAPPPS9K* |
| 231 | YAEGTFISDYSIAMDKIHQQDFVNWLLAQKGKKNDWKHNITQ |
| 232 | HaEGTFTSDVASYLEGQAAKEFIAWLVNGGPSSGAPPPS9K* |

TABLE 1-continued

| SEQ ID NO: | SEQUENCE |
|---|---|
| 233 | HAibEGTFTSDVSSYLEGQAAK^EFIAWLVRGRG |
| 234 | HAibEGTFTSDVSSYLEGQAAKEFIAWLVRGRGK* |
| 235 | HAibEGTFTSDVSSYLEGQAAAibEFIAWLVRGRGK" |
| 236 | YAibEGTFTSDYSIAibLDKIAQK"AFVQWLIAGGPSSGAPPPS |
| 237 | YAibEGTFTSDYSIAibLDKIAQK^AFVQWLIAGGPSSGAPPPS |
| 238 | YAibEGTFTSDYSIYLDKQAAAibEFVQWLLAGGPSSGAPPPSK^ |
| 239 | YAibEGTFTSDYSIYLDKQAAAibEFVQWLLAGGPSSGAPPPSK# |
| 240 | HAibQGTFTSDYSKYLDEKKAK^EFVEWLLEGGPSSG |
| 241 | HAibQGTFTSDYSKYLDEKKAK"EFVEWLLEGGPSSG |
| 242 | HAibQGTFTSDYSKYLDEKKAK#EFVEWLLEGGPSSG |
| 243 | HAibQGTFTSDYSKYLDEKKAKEFVEWLLEGGPSSGK* |
| 244 | HAibQGTFTSDYSKYLDEK^AAKEFIQWLLQT |
| 245 | HAibQGTFTSDYSKYLDEK"AAKEFIQWLLQT |
| 246 | HsQGTFTSDLSKQK^ESKAAQDFIEWLKAGGPSSGAPPPS |
| 247 | HsQGTFTSDLSKQK#ESKAAQDFIEWLKAGGPSSGAPPPS |
| 248 | HsQGTFTSDLSKQLESKAAQDFIEWLKAGGPSSGAPPPSK* |
| 249 | HsQGTFTSDLSKQLESKAAQDFIEWLKAGGPSSGAPPPSK" |
| 250 | HSQGTFTSDLSEYLDSERARDFVAWLEAGGK** |
| 251 | YAibQGTFTSDYSIMeLLDKK^AQAibAFIEYLLEGGPSSGAPPPS |
| 252 | YAibQGTFTSDYSIMeLLDKK"AQAibAFIEYLLEGGPSSGAPPPS |
| 253 | YAibQGTFTSDYSIMeLLDKK#AQAibAFIEYLLEGGPSSGAPPPS |
| 254 | YAibQGTFTSDYSIMeLLDKIAQAibAFIEYLLEGGPSSGAPPPSK^ |
| 255 | YAibQGTFTSDYSIMeLLDKIAQAibAFIEYLLEGGPSSGAPPPSK" |
| 256 | YAibQGTFTSDYSIMeLLDKIAQAibAFIEYLLEGGPSSGAPPPSK# |
| 257 | HSQGTFTSDK^SKYLDERRAQDFVQWLLDGGPSSGAPPPS |
| 258 | HSQGTFTSDK"SKYLDERRAQDFVQWLLDGGPSSGAPPPS |
| 259 | HSQGTFTSDYSKYLDERRAQDFVQWLLDGGPSSGAPPPSK* |
| 260 | HSQGTFTSDYSKYLDERRAQDFVQWLLDGGPSSGAPPPSK** |
| 261 | HAibHGTGTSDLSKLK^EEQRQAibEFIEWLKAaGPPSAibKPPPK |
| 262 | HAibHGTGTSDLSKLLEEQRQAibEFIEWLKAaGPPSAibKPPPK* |
| 263 | HAibHGTGTSDLSKLLEEQRQAibEFIEWLKAaGPPSAibKPPP9K* |
| 264 | YaEGTFTSDYAKYLDARRAAibEFIAWLVNGGPSSGAPPPSK* |
| 265 | YAibEGTFTSDYAKYLDARRAAibEFIAWLVNGGPSSGAPPPSK* |
| 266 | YAibEGTFTSDYSIAibLDKRRAAibEFIAWLVNGGPSSGAPPPSK* |
| 267 | HaEGTFTSDYSIAibLDKRRAAibEFIAWLVNGGPSSGAPPPSK* |
| 268 | YaEGTFTSDYSIAibLDKRRAAibEFIAWLVNGGPSSGAPPPSK* |
| 269 | YAibEGTFTSDYSIAibLDKIAQAibAFIAWLVNGGPSSGAPPPSK* |
| 270 | HaEGTFTSDYSIAibLDKIAQAibAFIAWLVNGGPSSGAPPPSK* |

TABLE 1-continued

| SEQ ID NO: | SEQUENCE |
|---|---|
| 271 | YaEGTFTSDYSIAibLDKIAQAibAFIAWLVNGGPSSGAPPPSK* |
| 272 | HaEGTFTSDYSIAibLDKIAQAibAFVQWLIAGGPSSGAPPPSK* |
| 273 | YaEGTFTSDYSIAibLDKIAQAibAFVQWLIAGGPSSGAPPPSK* |
| 274 | YAibEGTFTSDYSIAibLDKIAQAibAFVQWLIAGGPSSGAPPPS9K* |
| 275 | HaEGTFTSDYAKYLDARRAAibEFVQWLIAGGPSSGAPPPSK* |
| 276 | YaEGTFTSDYAKYLDARRAAibEFVQWLIAGGPSSGAPPPSK* |
| 277 | YAibEGTFTSDYAKYLDARRAAibEFVQWLIAGGPSSGAPPPSK* |
| 278 | HaEGTFTSDYAKYLDKIAQAibAFVQWLIAGGPSSGAPPPSK* |
| 279 | YaEGTFTSDYAKYLDKIAQAibAFVQWLIAGGPSSGAPPPSK* |
| 280 | YAibEGTFTSDYAKYLDKIAQAibAFVQWLIAGGPSSGAPPPSK* |
| 281 | YAibQGTFTSDYAKYLDARRAKEFIAWLVNGGPSSGAPPPSK* |
| 282 | YaQGTFTSDYAKYLDARRAKEFIAWLVNGGPSSGAPPPSK* |
| 283 | YAibQGTFTSDYSIMeLLDKRRAKEFIAWLVNGGPSSGAPPPSK* |
| 284 | YaQGTFTSDYSIMeLLDKRRAKEFIAWLVNGGPSSGAPPPSK* |
| 285 | HaQGTFTSDYSIMeLLDKRRAKEFIAWLVNGGPSSGAPPPSK* |
| 286 | YAibQGTFTSDYSIMeLLDKIAQAibAFIAWLVNGGPSSGAPPPSK* |
| 287 | YaQGTFTSDYSIMeLLDKIAQAibAFIAWLVNGGPSSGAPPPSK* |
| 288 | HaQGTFTSDYSIMeLLDKIAQAibAFIAWLVNGGPSSGAPPPSK* |
| 289 | YaQGTFTSDYSIMeLLDKIAQAibAFIEYLLEGGPSSGAPPPSK* |
| 290 | HaQGTFTSDYSIMeLLDKIAQAibAFIEYLLEGGPSSGAPPPSK* |
| 291 | YAibQGTFTSDYSIMeLLDKIAQAibAFIEYLLEGGPSSGAPPPS9K* |
| 292 | HaQGTFTSDYAKYLDARRAKEFIEYLLEGGPSSGAPPPSK* |
| 293 | HAibQGTFTSDYAKYLDARRAKEFIEYLLEGGPSSGAPPPSK* |
| 294 | YAibQGTFTSDYAKYLDARRAKEFIEYLLEGGPSSGAPPPSK* |
| 295 | YaQGTFTSDYAKYLDARRAKEFIEYLLEGGPSSGAPPPSK* |
| 296 | HaQGTFTSDYAKYLDKIAQAibAFIEYLLEGGPSSGAPPPSK* |
| 297 | HAibQGTFTSDYAKYLDKIAQAibAFIEYLLEGGPSSGAPPPSK* |
| 298 | YAibQGTFTSDYAKYLDKIAQAibAFIEYLLEGGPSSGAPPPSK* |
| 299 | YaQGTFTSDYAKYLDKIAQAibAFIEYLLEGGPSSGAPPPSK* |
| 300 | HAibQGTFTSDYSIMeLLDKIAQAibAFIEYLLEGGPSSGAPPPSK* |
| 301 | HaQGTFTSDYAKYLDARRAKEFIAWLVNGGPSSGAPPPSK# |
| 302 | HaEGTFTSDYAKYLDAK*RAKEFIAWLVNGGPSSGAPPPS |
| 303 | HaEGTFTSDYAKYLDAK^ARAKEFIAWLVNGGPSSGAPPPS |
| 304 | HaEGTFTSDYAKYLDAK&RAKEFIAWLVNGGPSSGAPPPS |
| 305 | HaEGTFTSDYAKYLDAK'RAKEFIAWLVNGGPSSGAPPPS |
| 306 | HaEGTFTSDYAKYLDARRAK^EFIAWLVNGGPSSGAPPPS |
| 307 | HaEGTFTSDYAKYLDARRAK&EFIAWLVNGGPSSGAPPPS |
| 308 | HaEGTFTSDYAKYLDARRAK'EFIAWLVNGGPSSGAPPPS |

TABLE 1-continued

| SEQ ID NO: | SEQUENCE |
|---|---|
| 309 | HaQGTFTSDYAKYLDARRAKEFIAWLVNGGPSSGAPPPSK2 |
| 310 | HaQGTFTSDYAKYLDARRAKEFIAWLVNGGPSSGAPPPSK3 |
| 311 | HaQGTFTSDYAKYLDARRAKEFIAWLVNGGPSSGAPPPSK1 |
| 312 | HaQGTFTSDYAKYLDARRAKEFIAWLVNGGPSSGAPPPSC2 |
| 313 | HaQGTFTSDYAKYLDAK2RAKEFIAWLVNGGPSSGAPPPS |
| 314 | HaQGTFTSDYAKYLDAK5RAKEFIAWLVNGGPSSGAPPPS |
| 315 | HaQGTFTSDYAKYLDAK1RAKEFIAWLVNGGPSSGAPPPS |
| 316 | HaQGTFTSDYAKYLDAK4RAKEFIAWLVNGGPSSGAPPPS |
| 317 | YAibQGTFTSDYSILLDKk*AQAibAFIEYLLEGGPSSGAPPPS |
| 318 | HADGSFSDEMNTILDNLAARDFINWLIQTKITD |
| 319 | HSDAVFTDNYTRLRKQMAVKKYLNSILN |
| 320 | KCNTATCATQRLANFLVHSSNNFGAILSSTNVGSNTY |
| 321 | YADAIFTNSYRKVLGQLSARKLLQDIMSR |
| 322 | X1X2X3GTFTSDX4X5X6X7LX8X9X10X11X12X13X14FX15X16 WLX17X18GX19PSSGAPPPSX20 |
| 323 | X1X2X3GTFTSDX4X5X6X7LX8X9X10X11X12X13X14FX15X16 WLX17X18GX19PSSGAPPPS |
| 324 | X19PSSGAPPPSX20 |
| 325 | X11X12X13X14FX15X16WLX17X18G |
| 326 | X1X2X3GTFTSDX4X5X6X7LX8X9X10 |
| 327 | X19PSSGAPPPSK |
| 328 | X11X12X13X14FX15X16WLX17X18G-X19PSSGAPPPSX20 |
| 329 | X1X2X3GTFTSDX4X5X6X7LX8X9X10-X11X12X13X14FX15X16 WLX17X18G-X19PSSGAPPPSX20 |
| 330 | HaEGTFTSDVSSYLEGQAAKEFIAWLVKGRPSSGAPPPSK* |
| 331 | HAEGTFTSDVSSYLEGQAAKEFIAWLVKGRPSSGAPPPSK* |
| 332 | HaEGTFTSDVSSYLEGQAAKEFIAWLVNGGK* |
| 333 | HaEGTFTSDINKVLDTIAAKEFIAWLVKGRK* |
| 334 | HaEGTFTSDAEKAKEAEKAKEFIAWLVKGRK* |
| 335 | HaEGTFTSDAibEKAibKEAibEKAKEFIAWLVKGRK* |
| 336 | HaEGTFTSDAibESAibKEAibEKAibKEFIAWLVKGRPSSGAPPPSK* |
| 337 | HaEGTFTSDVAibSYAibEGQAibAKEFIAWLVKGRPSSGAPPPSK* |
| 338 | HaEGTFTSDVSSYLEGK*AAKEFIAWLVKGRPSSGAPPPS |
| 339 | HaEGTFTSDVSSYLEGQAAKEFIAWLVKGRLLLLLLLLLK* |
| 340 | HaEGTFTSDVSSYLEGQAAKEFIAWLVKGRPEAPTDPEAPTD |
| 341 | HGEGTFTSDLSKQMEEEAVRLFIEWLKNGGGGGGGGGGK* |
| 342 | HaEGTFTSDVSSYLEGQAAKEFIAWLVKGRK% |
| 343 | HaEGTFTSDVSSYLEGK*AAKEFIAWLVKGR |
| 344 | HaEGTFTSDVSSYLEGQAAKEFIAWLVKGRK@ |

TABLE 1-continued

| SEQ ID NO: | SEQUENCE |
| --- | --- |
| 345 | HSQGTFTSDYSKYLDSRRAQDFVQWLMNTKRNKNNIA |
| 346 | HaEGTFTSDVSSYLEGQAAKEFIAWLVKGPEAPTDPEAPTD |
| 347 | HaEGTFTSDVSSYLEGQAAKEFIAWLVKGRK** |
| 348 | HaEGTFTSDINKVLDIIAAKEFIAWLVKGRPSSGAPPPSK* |
| 349 | HaEGTFTSDINKVLDIIAAKEFIAWLVKGRK* |
| 350 | HGEGTFTSDLSKQMEEEAVRLFIEWLKNGGPSSGAPPPSK** |
| 351 | HAibEGTFTSDYSKYLDKIRAQEFVAWLMNGGPSSGAPPPSK* |
| 352 | HAibQGTFTSDYSKYLDKIAAQDFVAWLLNGGPSSGAPPPSK* |
| 353 | HAibQGTFTSDYAKYLDKIAAQDFVAWLLDGGPSSGAPPPSK* |
| 354 | HAibQGTFTSDYSKYLDKIAAQDFVAWLLDGGPSSGAPPPSK* |
| 355 | HAibQGTFTSDYSKYLDKIAAQDFVAYLLDGGPSSGAPPPSK* |
| 356 | HAibQGTFTSDLSKYLDEIAVQDFIEWLLDGGPSSGAPPPSK* |
| 357 | HSQGTFTSDYSKYLDSRRAQDFVQWLMNTKRNRNNIA |
| 358 | IKPEAPGEDASPEELNRYYASLRHYLNLVTRQRY |
| 359 | HAibEGTFTSDVSSYLEGQALRHYINWLTRQRY |
| 360 | HGEGTFTSDLSKQMEEEAVRLFIEWLKNGGPSSRHYLNLVTRQRY |
| 361 | HdsQGTFTSDLSKYLEEEAVREFIAWLKNGGPSSGAPPPSRHYLNLVTRQRY |
| 362 | HdsQGTYTNDVSKYXDSRRAQDFIEWLKNGGPSSGAPPPS |
| 363 | HdsQGTYTNDVSKYKDSRRAQDFIEWLKNGGPSSGAPPPSC |
| 364 | HdsQGTFTSDLSKQKDSRRAQDFIEWLKNGGPSSGAPPPSC |
| 365 | HdsQGTYTNDVSKYXDSRRAQDFIEWLKNGGPSSGAPPPSC |
| 366 | PKPEAPGKDASPEEWNRYYADLRHYLNWLTRQRY |
| 367 | IKPEAPGEDASPEELNRYYASLRHYLNWVTRQXY |
| 368 | YAibEGTFTSDYSIYLDKQAAAibAFVQWLIAGGPSSGAPPPSK* |
| 369 | YAibEGTFTSDYSIYLDKQAAAibAFVQWLLAGGPSSGAPPPSK* |
| 370 | YAibEGTFTSDYSIYLDKQAAAibEFVQWLIAGGPSSGAPPPSK* |
| 371 | HaEGTFTSDYSIYLDKQAAAibEFVQWLLAGGPSSGAPPPSK* |
| 372 | YaEGTFTSDYSIYLDKQAAAibEFVQWLLAGGPSSGAPPPSK* |
| 373 | HAibEGTFTSDYSIYLDKQAAAibEFVQWLLAGGPSSGAPPPSK* |
| 374 | HaEGTFTSDYSIYLDKQAAAibAFVQWLIAGGPSSGAPPPSK* |
| 375 | HaEGTFTSDYSIYLDKQAAAibAFVQWLLAGGPSSGAPPPSK* |
| 376 | HaEGTFTSDYSIYLDKQAAAibEFVQWLIAGGPSSGAPPPSK* |
| 377 | YaEGTFTSDYSIYLDKQAAAibAFVQWLIAGGPSSGAPPPSK* |
| 378 | YaEGTFTSDYSIYLDKQAAAibAFVQWLLAGGPSSGAPPPSK* |
| 379 | YaEGTFTSDYSIYLDKQAAAibEFVQWLIAGGPSSGAPPPSK* |
| 380 | YAibEGTFTSDYAKYLDARRAKEFVQWLLAGGPSSGAPPPSK* |
| 381 | YAibEGTFTSDYSKYLDARRAKEFVQWLLAGGPSSGAPPPSK* |
| 382 | YAibEGTFTSDYSKYLDKRRAKEFVQWLLAGGPSSGAPPPSK* |

TABLE 1-continued

| SEQ ID NO: | SEQUENCE |
|---|---|
| 383 | HaEGTFTSDYAKYLDARRAKEFVQWLLAGGPSSGAPPPSK* |
| 384 | HaEGTFTSDYSKYLDARRAKEFVQWLLAGGPSSGAPPPSK* |
| 385 | HaEGTFTSDYSKYLDKRRAKEFVQWLLAGGPSSGAPPPSK* |
| 386 | YaEGTFTSDYAKYLDARRAKEFVQWLLAGGPSSGAPPPSK* |
| 387 | YaEGTFTSDYSKYLDARRAKEFVQWLLAGGPSSGAPPPSK* |
| 388 | YaEGTFTSDYSKYLDKRRAKEFVQWLLAGGPSSGAPPPSK* |
| 389 | HAibEGTFTSDYAKYLDARRAKEFVQWLLAGGPSSGAPPPSK* |
| 390 | HAibEGTFTSDYSKYLDARRAKEFVQWLLAGGPSSGAPPPSK* |
| 391 | HAibEGTFTSDYSKYLDKRRAKEFVQWLLAGGPSSGAPPPSK* |
| 392 | YAibEGTFTSDYAKYLDARRAKAFVQWLIAGGPSSGAPPPSK* |
| 393 | YAibEGTFTSDYSKYLDARRAKAFVQWLIAGGPSSGAPPPSK* |
| 394 | YAibEGTFTSDYSKYLDKRRAKAFVQWLIAGGPSSGAPPPSK* |
| 395 | HaEGTFTSDYAKYLDARRAKAFVQWLIAGGPSSGAPPPSK* |
| 396 | HaEGTFTSDYSKYLDARRAKAFVQWLIAGGPSSGAPPPSK* |
| 397 | HaEGTFTSDYSKYLDKRRAKAFVQWLIAGGPSSGAPPPSK* |
| 398 | YaEGTFTSDYAKYLDARRAKAFVQWLIAGGPSSGAPPPSK* |
| 399 | YaEGTFTSDYSKYLDARRAKAFVQWLIAGGPSSGAPPPSK* |
| 400 | YaEGTFTSDYSKYLDKRRAKAFVQWLIAGGPSSGAPPPSK* |
| 401 | HAibEGTFTSDYAKYLDARRAKAFVQWLIAGGPSSGAPPPSK* |
| 402 | HAibEGTFTSDYSKYLDARRAKAFVQWLIAGGPSSGAPPPSK* |
| 403 | HAibEGTFTSDYSKYLDKRRAKAFVQWLIAGGPSSGAPPPSK* |
| 404 | HaQGTFTSDLSKQLESKAAQDFIEWLKAGGPSSGAPPPSK* |
| 405 | HsQGTFTSDYAKYLDARRAKEFIEWLKAGGPSSGAPPPSK* |
| 406 | HsQGTFTSDYSKYLDARRAKEFIEWLKAGGPSSGAPPPSK* |
| 407 | HsQGTFTSDYAKYLDSRRAKEFIEWLKAGGPSSGAPPPSK* |
| 408 | HsQGTFTSDYSKYLDSRRAKEFIEWLKAGGPSSGAPPPSK* |
| 409 | HaQGTFTSDYSKYLDSRRAKEFIEWLKAGGPSSGAPPPSK* |
| 410 | HaQGTFTSDYAKYLDARRAKEFIEWLKAGGPSSGAPPPSK* |
| 411 | HaQGTFTSDLSKQLESKAAQDFIAWLVNGGPSSGAPPPSK* |
| 412 | HaQGTFTSDYAKYLDARRAKDFIEWLKAGGPSSGAPPPSK* |
| 413 | HaQGTFTSDYSKYLDARRAQEFIEWLKAGGPSSGAPPPSK* |
| 414 | HaQGTFTSDYAKYLDSRAAKEFIEWLKAGGPSSGAPPPSK* |
| 415 | HaQGTFTSDYSKYLDSKRAKEFIEWLKAGGPSSGAPPPSK* |
| 416 | HaQGTFTSDYAKYLEARRAKEFIEWLKAGGPSSGAPPPSK* |
| 417 | HaQGTFTSDYAKQLEARRAKEFIEWLKAGGPSSGAPPPSK* |
| 418 | HAibQGTFTSDYSKYLDERAAQAFIEYLLEGGPSSGAPPPSK* |
| 419 | HaQGTFTSDYSKYLDERAAQDFVQWLLDGGPSSGAPPPSK* |
| 420 | HaQGTFTSDYSKYLDERAAQAFIEYLLEGGPSSGAPPPSK* |

TABLE 1-continued

| SEQ ID NO: | SEQUENCE |
|---|---|
| 421 | HAibQGTFTSDYSKYLDARRAKEFVQWLLDGGPSSGAPPPSK* |
| 422 | HAibQGTFTSDYSKYLDARRAKEFIEYLLEGGPSSGAPPPSK* |
| 423 | HAibQGTFTSDYAKYLDARRAKEFVQWLLDGGPSSGAPPPSK* |
| 424 | HaQGTFTSDYSKYLDARRAKEFVQWLLDGGPSSGAPPPSK* |
| 425 | HaQGTFTSDYAKYLDARRAKEFVQWLLDGGPSSGAPPPSK* |
| 426 | HaQGTFTSDYSKYLDARRAKEFIEYLLEGGPSSGAPPPSK* |
| 427 | HAibQGTFTSDYSKYLDERAAQAFIEYLLDGGPSSGAPPPSK* |
| 428 | HaQGTFTSDYSKYLDERAAQDFVQWLLEGGPSSGAPPPSK* |
| 429 | HaQGTFTSDYSKYLDERAAQAFIEYLLDGGPSSGAPPPSK* |
| 430 | HAibQGTFTSDYSKYLDARRAKEFVQWLLEGGPSSGAPPPSK* |
| 431 | HAibQGTFTSDYSKYLDARRAKEFIEYLLDGGPSSGAPPPSK* |
| 432 | HAibQGTFTSDYAKYLDARRAKEFVQWLLEGGPSSGAPPPSK* |
| 433 | HAibQGTFTSDYAKYLDARRAKEFIEYLLDGGPSSGAPPPSK* |
| 434 | HaQGTFTSDYSKYLDARRAKEFVQWLLEGGPSSGAPPPSK* |
| 435 | HaQGTFTSDYAKYLDARRAKEFVQWLLEGGPSSGAPPPSK* |
| 436 | HaQGTFTSDYSKYLDARRAKEFIEYLLDGGPSSGAPPPSK* |
| 437 | HaQGTFTSDYAKYLDARRAKEFIEYLLDGGPSSGAPPPSK* |
| 438 | HAibQGTFTSDYSKYLDERAAQAFIEWLLEGGPSSGAPPPSK* |
| 439 | HaQGTFTSDYSKYLDERAAQDFVQYLLDGGPSSGAPPPSK* |
| 440 | HaQGTFTSDYSKYLDERAAQAFIEWLLEGGPSSGAPPPSK* |
| 441 | HAibQGTFTSDYSKYLDARRAKEFVQYLLDGGPSSGAPPPSK* |
| 442 | HAibQGTFTSDYSKYLDARRAKEFIEWLLEGGPSSGAPPPSK* |
| 443 | HAibQGTFTSDYAKYLDARRAKEFVQYLLDGGPSSGAPPPSK* |
| 444 | HAibQGTFTSDYAKYLDARRAKEFIEWLLEGGPSSGAPPPSK* |
| 445 | HaQGTFTSDYSKYLDARRAKEFVQYLLDGGPSSGAPPPSK* |
| 446 | HaQGTFTSDYAKYLDARRAKEFVQYLLDGGPSSGAPPPSK* |
| 447 | HaQGTFTSDYSKYLDARRAKEFIEWLLEGGPSSGAPPPSK* |
| 448 | HaQGTFTSDYAKYLDARRAKEFIEWLLEGGPSSGAPPPSK* |
| 449 | HAibQGTFTSDYSKYLDERAAQAFVQYLLEGGPSSGAPPPSK* |
| 450 | HaQGTFTSDYSKYLDERAAQDFIEWLLDGGPSSGAPPPSK* |
| 451 | HaQGTFTSDYSKYLDERAAQAFVQYLLEGGPSSGAPPPSK* |
| 452 | HAibQGTFTSDYSKYLDARRAKEFIEWLLDGGPSSGAPPPSK* |
| 453 | HAibQGTFTSDYSKYLDARRAKEFVQYLLEGGPSSGAPPPSK* |
| 454 | HAibQGTFTSDYAKYLDARRAKEFIEWLLDGGPSSGAPPPSK* |
| 455 | HAibQGTFTSDYAKYLDARRAKEFVQYLLEGGPSSGAPPPSK* |
| 456 | HaQGTFTSDYSKYLDARRAKEFIEWLLDGGPSSGAPPPSK* |
| 457 | HaQGTFTSDYAKYLDARRAKEFIEWLLDGGPSSGAPPPSK* |
| 458 | HaQGTFTSDYSKYLDARRAKEFVQYLLEGGPSSGAPPPSK* |

TABLE 1-continued

| SEQ ID NO: | SEQUENCE |
|---|---|
| 459 | HaQGTFTSDYAKYLDARRAKEFVQYLLEGGPSSGAPPPSK* |
| 460 | HaEGTFTSDYAKYLDARRAKEFVQWLVNGGPSSGAPPPSK* |
| 461 | HaEGTFTSDYAKYLDARRAKEFIAWLLDGGPSSGAPPPSK* |
| 462 | HaEGTFTSDYAKYLDARRAKEFIEYLVNGGPSSGAPPPSK* |
| 463 | HaEGTFTSDYAKYLDARRAKEFIAYLLEGGPSSGAPPPSK* |
| 464 | HaEGTFTSDYAKYLDARRAKEFIEWLVNGGPSSGAPPPSK* |
| 465 | HaEGTFTSDYAKYLDARRAKEFVQWLKAGGPSSGAPPPSK* |
| 466 | YaEGTFTSDYAIYLDAQAQQDFVQWLLAGGPSSGAPPPSK^ |
| 467 | YaEGTFTSDYSIYLDKIAQQDFVQWLLAGGPSSGAPPPSK^ |
| 468 | HAibQGTFTSDYSKYLDERAAQDFVQWLLDGGPSSGAPPPSK* |
| 469 | HAibQGTFTSDYSKYLDKIAAQDFVAYLLDGGPSSGAPPPSK^ |
| 470 | YaEGTFTSDYSIYLDKIAQQDFVQWLLAGGPSSGAPPPSK* |
| 471 | YAibEGTFTSDYSIAibLDKIAQK^AFVQWLIAGGPSSGAPPPS |

With regard to retro-Michael resistance of contemplated fusion proteins presented herein, the inventors unexpectedly discovered that a retro-Michael resistant fusion protein can be prepared where a peptide (most typically a Class B GPCR agonist as shown herein) is attached at the C-terminus to a linker group (typically via an amide bond), which further includes a planar Michael acceptor group as a coupling group (e.g., maleimide or bromomaleimide group) that can then react with the Michael donor group (e.g., thiol group of $Cys_{34}$ in albumin) to so form a Michael addition conjugate. Suitable linkers will provide sufficient flexibility and steric distance such that the bound agonist peptide will be able to bind (typically in a two-step process) to the GPCR such that the GPCR will be activated.

Therefore, in at least some embodiments, the reactive group (e.g., maleimide group) that couples the linker to the $Cys_{34}$ thiol group of albumin and the group (e.g., amino group) that couples the linker to the agonist peptide will have a linear distance equivalent to at least 6 carbon-carbon bonds, or at least 8 carbon-carbon bonds, or at least 10 carbon-carbon bonds, or at least 12 carbon-carbon bonds, or at least 14 carbon-carbon bonds, or at least 18 carbon-carbon bonds, or at least 24 carbon-carbon bonds. As will also be readily appreciated, the linker may further include one or more non-carbon atoms to so form an amide bond, an ether bond, etc. Thus, in at least some embodiments preferred linkers will be hydrophilic linkers.

For example, contemplated linkers include AEEA, AEEA-MPA, AEEA-(bromo) MPA, (AEEA) 2-MPA, (AEEA) 2-(bromo) MPA, AEEEA-OA-MPA, AEEEA-OA-(bromo) MPA, AEEA-OA-AEEA-MPA, AEEA-OA-AEEA-(bromo) MPA, (AEEEA) 2-OA-MPA, or (AEEEA) 2-OA-(bromo) MPA in which AEEA denotes (amido (ethoxy) ethoxy acetic acyl), MPA denotes maleimidopropionic acid, and OA denotes 8-aminooctanoate.

In this context, it should be particularly appreciated that upon Michael reaction of a thiol group with a planar maleimide group, absent any stereochemically biasing factors, the reaction product includes a newly generated chiral carbon atom (to which the sulfur atom is covalently bound), which will result in a racemic product. Viewed from a different perspective, a Michael addition reaction product, absent any stereochemically biasing factors, will be an equal mixture of R- and S-configured chiral carbon atoms. Moreover, it should be appreciated that (as with any other chemical reaction) a Michael addition reaction is a reversible reaction unless other factors will hinder such reaction. Indeed, such retro-Michael addition reaction is well known in the context of antibody-drug conjugates where a drug can readily de-conjugate in a retro-Michael addition reaction where the drug was attached to an exposed thiol group.

In view of the above, the inventors have unexpectedly discovered that a peptide agonist with a linker having a maleimide or bromo maleimide coupling group can be coupled to $Cys_{34}$ of albumin in a stereoselective and retro-Michael resistant manner such that the peptide agonist remains covalently bound to the albumin without decoupling. More specifically, the inventors recognized that as the $Cys_{34}$ is located in a hydrophobic crevice that is 9.5-10 Å deep in which the walls of the crevice are populated by multiple amino acid side chains, the spatial organization surrounding the $Cys_{34}$ thiol group can have a substantial impact on the stereo-specificity of the newly created chiral center. Surprisingly, the inventors noticed that the spatial organization of the hydrophobic crevice can be modulated by changing the levels of sodium octanoate (or other fatty acids or hydrophobic ligands) present in the hydrophobic fatty acid binding pockets of albumin during the bioconjugation process. In particular, the inventors observed that where a Michael addition was performed when all or most hydrophobic fatty acid binding pockets were occupied by octanoate or other hydrophobic molecule, the reaction product was substantially a racemic mixture (i.e., a 50/50 mix of R- and S-configured chiral carbon in the conjugate), whereas stereospecificity of the reaction increased with decreasing octanoate levels in the binding pockets. Moreover, this unexpected finding was further accentuated where the pH during the conjugation reaction was below pH 7.0.

Without wishing to be bound by any theory or hypothesis, the inventors contemplate that fatty acid (or other hydrophobic ligand) binding to albumin changes the 3D conformation in such a manner that the thiol group at $Cys_{34}$ will be preferentially or be even exclusively available for a Michael addition reaction in only one plane of the maleimide ring and as such preferentially or even exclusively produce only one stereoisomer, resulting in a stereoselective chiral product. Moreover, and particularly at a lower pH (i.e., pH <7.0) the resulting micro-environment inside the "$Cys_{34}$ hydrophobic crevice" becomes prohibitive to the mechanistic steps required to support a retro-Michael reaction. Hence, unanticipatedly, the stereospecificity of the bioconjugation adduct and its corresponding microenvironment in conformationally modified albumin guard against retro-Michael bond $Cys_{34}$ sulfur-carbon (MPA) cleavage.

With respect to the removal of octanoate or other hydrophobic compounds from albumin it is contemplated that all methods that are able to reduce the octanoate or other hydrophobic compounds without denaturing the albumin are deemed suitable for use herein, and especially preferred methods include charcoal filtration, dialysis, ion exchange chromatography, etc. (see e.g., *Biochim Biophys Acta* 1970 Nov. 17; 221 (2): 376-8; *Nature Communications Materials*; (2020) 1:45). As will be readily appreciated, the albumin is preferably human serum albumin, which may be isolated and purified from human serum, or may be recombinantly produced using a bacterial, or more typically, yeast expression system. Thus, albumin contemplated herein may or may not be glycosylated. In this context is should be appreciated that commercially available highly purified natural or recombinant albumin is typically stabilized with exogenously added octanoate or other short or medium-chain fatty acid.

Moreover, it should be appreciated that the albumin can be entirely or only partially defatted such that at least one, or at least two, or at least three, or at least four, or at least five, or at least five, or at least six, or all hydrophobic fatty acid binding pockets of the albumin are free from a hydrophobic ligand to so form the conformationally modified albumin. The suitable degree of defatting will be at least in part determined by the desired degree of a stereoselective reaction product. Thus, and most typically, the albumin will be fully (all hydrophobic fatty acid binding pockets of the albumin are free from a hydrophobic ligand) or almost fully (at least four hydrophobic fatty acid binding pockets of the albumin are free from a hydrophobic ligand) defatted. Once defatted, the so prepared conformationally modified albumin is then reacted with the linker containing the coupling group (typically comprising a maleimide or bromo-maleimide group) following standard Michael addition reaction conditions, preferably at an equimolar ratio, and preferably at a pH that is pH <7.0 (e.g., pH between 6.0 and 6.9, or pH between 5.5 and 6.0, or pH between 5.0 and 5.5, or pH between 4.5 and 5.0, or pH between 4.0 and 4.5). However, excess albumin during the coupling reaction is also deemed suitable, such as a molar excess of 1.1-fold, or 1.2-fold, or 1.3-fold, or 1.4-fold, or 1.5-fold, and even more. Exemplary reaction conditions for coupling the linker to the $Cys_{34}$ of the conformationally modified albumin are described, for example at *Endocrinology* (2005) 146 3052-3058, *Bioorg. Med. Chem. Lett.* (2003) 13 3571-3575, and *Bioconjug. Chem.* (2005) 16 1000-1008, each of which are incorporated by reference herein. As such, these reactions may be used to reduce or even entirely avoid retro-Michael reactions in albumin with Michael conjugates, particularly where such conjugates have therapeutic use such as with the agonist peptides with linkers and reactive group as listed in SEQ ID NO: 1-471.

In yet another unexpected finding, the inventors discovered that even when octanoate levels are at higher levels during conjugation, a retro-Michael resistant fusion protein can nevertheless be generated via a stereoselective translocation to an unreacted albumin having an unreacted $Cys_{34}$ group (which may or may not be conformationally modified) in a pharmaceutical formulation post standard purification. Alternatively, the conjugation ratio of peptide intermediate with a linker and MPA as a reactive coupling moiety to the albumin can be adjusted such as to provide an excess amount of unreacted albumin having an unreacted $Cys_{34}$ group (which may or may not be conformationally modified) when the purification step is an ultrafiltration or diafiltration step, leading to a formulation that also contains an excess amount of unreacted albumin.

In view of the above, it should therefore be recognized that albumin can be chemically modified with a coupling group at $Cys_{34}$ such that a sulfur atom of the $Cys_{34}$ is covalently bound to a chiral carbon atom of the coupling group, and such that the chiral atom has a favored stereochemical configuration (instead of a racemic carbon atom where the thiol group is not sterically constrained as discussed above). Indeed, it is contemplated (and has been observed) that the favored stereochemical configuration can be favored at a ratio of at least 60:40, or at least 70:30, or at least 80:20, or at least 85:15, or at least 90:10, or at least 95:5, particularly with increasing degree of defatting (i.e., at least one, or at least two, or at least three or at least four, or at least five, or at least six, or all hydrophobic binding pockets are not occupied by a non-covalently bound lipid).

Therefore, it is noted that the inventors discovered that a chemically modified albumin can be produced, where the albumin is modified at $Cys_{34}$ with a Michael addition conjugate, and where the Michael addition conjugate is resistant to a retro-Michael addition reaction. Indeed, it should be appreciated that it is now possible to prepare compositions in which a coupling group (carrying a (hydrophilic) linker and optionally a peptide coupled to the linker) can be covalently attached to $Cys_{34}$ of albumin in a stereopreferred (i.e., at least 55%, at least 60%, at least 75%, at least 80%, at least 85%, at least 90%, at least 95% of all chiral carbon atoms in C—S bonds in coupling groups have a configuration that is retro-Michael resistant) or even stereoselective (between 98 and 100% of all chiral carbon atoms in C—S bonds in coupling groups have a configuration that is retro-Michael resistant) manner, thereby rendering the molecular entity attached to the coupling group retro-Michael resistant.

Viewed from a different perspective, in an isotonic buffered (pH 7.0) solution containing contemplated retro-Michael resistant conjugates of albumin and agonist peptide, no more than 40%, or no more than 30%, or no more than 20%, or no more than 15%, or no more than 10%, or no more than 8%, or no more than 6%, or no more than 4%, or no more than 2%, of all bound agonist peptide will dissociate from the albumin in a retro-Michael reaction over a period of 24 hours at room temperature. Therefore, it should be appreciated that the majority of the linkers with covalently bound GPCR agonist peptides will be bound to the $Cys_{34}$ amino acid of albumin in a retro-Michael resistant manner. Thus, pharmaceutical compositions in which a GPCR agonist peptide is covalently bound to a $Cys_{34}$ amino acid of albumin in a stereopreferred or stereoselective configuration will be substantially free of unbound GLP-1 agonist peptide (e.g., no more than 10%, or no more than 7%, or no more than 5%, or no more than 3%, or no more than 2% of total agonist peptide in the composition are unbound).

As already noted above, such compositions can be prepared via reacting the coupling group and linker (with or without attached peptide or other molecular entity) to the $Cys_{34}$ of a conformationally modified albumin, by performing the Michael addition in the presence of free albumin in molar excess relative to the coupling group, and/or by adding free albumin to a Michael addition product that was produced by reacting $Cys_{34}$ of an albumin with a coupling group and linker (with or without attached peptide or other molecular entity such as a linker-bound GPCR agonist peptide). As will be readily appreciated, the ratio of free albumin to albumin with a ligand bound to $Cys_{34}$ can vary, and suitable ratios will typically be 1:5, or 1:4, or 1:3, or 1:2, or 1:1.5, or 1:1.2, or 1:1, or 1.2:1, or 1.5:1, or 2:1, or 3:1, or 4:1, or 5:1. In each of the cases where additional albumin is used, such albumin can be conformationally modified and/or conformationally unmodified albumin. Moreover, it should be recognized that once the coupling reaction of the linker (typically also containing the agonist peptide) with the albumin is concluded, the GPCR agonist fusion protein can then be purified using standard methods well known in the art. Moreover, and where desired, octanoate or hydrophobic agents may be added to the fusion protein to re-occupy the hydrophobic binding sites, thereby improving stability of the fusion protein.

Further aspects, examples, and details of synthesis of the compounds presented herein are described in Applicant's International application with the title "Albumin Bound Macromolecule Tri-Agonist Activating GLP-1/GIP/Glucagon Receptors", filed on or about Jun. 25, 2024, incorporated by reference herein.

Notably, the compounds presented herein exhibited significant biological effects due to the specific binding to and activation of the GPCR such as the GLP-1 receptor, the GIP receptor, and/or the GcG receptor as is shown in more detail below. Moreover, it should be appreciated that by the appropriate choice of amino acids in the agonist peptide, the biological activity could be modulated such as to produce a mono-agonist (e.g., agonist activating only GLP-1 receptor), a dual agonist (e.g., agonist activating GLP-1 and GIP receptors), or a tri-agonist (e.g., agonist activating GLP-1, GIP, GcG receptors). Consequently, it should be appreciated that the compounds presented herein can be tailored to a specific therapeutic profile.

Viewed from a different perspective, the covalent binding of albumin to single or multi-agonist peptides, optionally combined with amino acid sequences which inhibit peptide degradation create therapeutic entities with reduced endocytic degradation intracellularly at any level and enable an order of magnitude higher potency of the agonist peptides compared to currently known peptide agonist compositions. Moreover, the covalent binding of albumin to single or multi-agonist peptides limits the degrees of rotational freedom and thereby enables maximum affinity binding of the agonist peptide to multiple agonist receptors such as the GLP-1 receptor, the GIP receptor, and/or the glucagon receptor, resulting in an increase glycemic control with increased food intake. Still further, HbA1c reduction, weight loss improvement, nausea reduction with increase food intake and balanced blood sugar decrease upon feeding reflect the activation of GLP-1, GIP and Glucagon in terms of each physiological activity.

Moreover, peptides with irreversible binding to albumin will enable transcytosis through the endothelial cell via gp60 receptor and Caveolin-1 to reach beta or alpha cells in the pancreas or small bowel tissue microenvironment, and binding to the various receptors on these cells involved in the incretin and glucose homeostasis and appetite pathway. In addition, irreversible binding also reduces lysosomal degradation and increases half-life via FcRn receptor transcytosis/recycling.

Therefore, it should be appreciated that the compounds and compositions presented herein can be used as pharmaceutical agents that are effective in the treatment of a disease or disorder that is responsive to activation of one or more specific GPCR such as the GLP-1, GIP, and/or GcG receptors. Thus, contemplated diseases or disorders suitable for treatment with contemplated compounds include various metabolic disorders, including NIDDM (non-insulin dependent diabetes mellitus), NASH (non-alcoholic steatohepatosis/steatohepatitis), chronic kidney disease, obesity, cachexia, sarcopenia, diabetic kidney disease, diabetic foot ulcer, and diabetic retinopathy. Moreover, contemplated diseases or disorders suitable for treatment with the compounds presented herein include select neurodegenerative diseases such as Parkinson's Disease, Alzheimer's Disease, peripheral neuropathy, multiple sclerosis, and ALS (amyotrophic lateral sclerosis). Still further contemplated diseases and disorders deemed to be responsive to treatment with contemplated compounds include autoimmune or inflammatory diseases such as Chron's disease, irritable bowel syndrome (IBS), ulcerative colitis (UC), and polycystic ovary syndrome (PCOS).

Moreover, it should be particularly appreciated that the treatments contemplated herein will even include treatments that are otherwise difficult to reach with peptide agonists or other protein-base drugs such as the cerebrovascular space that is typically protected by the blood brain barrier. As contemplated retro-Michael resistant compounds retain the therapeutic ligand bound to the albumin at all times, the ligand can be transported across cell membranes via gp60-mediated transcytosis and/or FcRn recycling. Therefore, target tissues suitable for treatment include all tissues that can import albumin and therefore not only include hepatic tissue, pancreatic tissue, and neural tissue, but also tumor tissues that exhibit higher expression and/or activity of gp60 and/or FcRn.

Contemplated pharmaceutical formulations will contain retro-Michael resistant fusion proteins presented herein in an amount such as to allow administration of between about 1 mg and 15 mg of the retro-Michael resistant fusion protein, equating to about 20 mcg and 1,000 mcg of the peptide agonist, preferably in a single dose. Therefore, suitable pharmaceutical formulations will typically contain the retro-Michael resistant fusion protein at a concentration of between 1-2 mg/mL, or 2-5 mg/mL, or 5-7.5 mg/mL, or 7.5-10 mg/mL, or 10-12 mg/mL, or 12-15 mg/mL, or 15-17 mg/mL, or 17-20 mg/mL, or 20-22 mg/mL, and in some cases even higher. Viewed from a different perspective, contemplated pharmaceutical formulations will contain the peptide agonist at a concentration of between 20-60 mcg/mL, or between 50-150 mcg/mL, or between 100-300 mcg/mL, or between 250-500 mcg/mL, or between 300-700 mcg/mL, or between 700 and 1,400 mcg/mL. Consequently, it should be noted that therapeutically effective doses can be administered in a single injection (e.g., subcutaneous) at a volume of equal or less than 5 mL, or equal or less than 2.5 mL, or equal or less than 1 mL, or equal or less than 0.75 mL, or equal or less than 0.5 mL, or equal or less than 0.25 mL, or equal or less than 0.1 mL, or equal or less than 0.075 mL, and even less.

Thus, it should also be recognized that the pharmaceutical formulations contemplated herein will be formulated for administration once weekly, but different schedules also contemplated such as twice weekly, four times weekly, and even daily. However, administration is more preferably no more than once weekly, and in some embodiments every 10 days, every other week, once monthly, etc. Still further, it should be appreciated that contemplated pharmaceutical compositions can be administered without the need for titration, particularly where the dosage administered is at or below 200 mcg of agonist peptide. However, titration to the therapeutically desired dosage is also contemplated and may include titration over at least 1 week or at least 2 weeks, or at least 3 weeks, or at least 4 weeks, or even longer. Moreover, it should be noted that the treatment using contemplated compositions may accompanied by other pharmaceutical treatments such as treatment with another blood glucose regulatory agent, including metformin or a thiazolidinedione drug.

Most preferably, contemplated pharmaceutical formulations will have a pH that is less than pH <7.0, such as pH <6.8, or pH <6.6, or pH <6.4, or pH <6.2. However, in preferred embodiments the pH will be between pH 4.0 and 6.0, such as between 4.0 and 4.4, or between 4.4 and 4.8, or between 4.8 and 5.2, or between 5.2 and 5.6, or between 5.6 and 6.0. Moreover, it is contemplated that the pharmaceutical formulation will typically include a buffer to maintain the pH, and exemplary buffers include a phosphate buffer, a citrate buffer, an acetate buffer, a succinate buffer, a histidine buffer, a glycine buffer, etc. In most embodiments, it is contemplated that the buffer strength will be at a strength of equal or less than 100 mM, or equal or less than 75 mM, or equal or less than 50 mM, or equal or less than 25 mM, or equal or less than 10 mM, or even less, but more than 1 mM. For example, suitable buffer strengths will be between 10-50 mM, or between 25-75 mM, or between 50-100 mM.

Furthermore, it should be appreciated that the formulations herein will be isotonic formulations containing a tonicity agent such as sodium chloride, calcium chloride, magnesium chloride, lactose, sorbitol, sucrose, mannitol, trehalose, raffinose, polyethylene glycol, hydroxyethyl starch, glycine, etc. Where desired, one or more surfactants may be included to reduce protein aggregation, control droplet size for spray formulations, etc., and contemplated surfactants include polysorbates (e.g. polysorbates 20 or 80); poloxamers (e.g. poloxamer 188 (pluronic F68)); Triton; sodium dodecyl sulfate (SDS); sodium laurel sulfate; sodium octyl glycoside, etc. In addition, and especially where the formulation is packed for multiple administrations, preservatives are also contemplated and include m-cresol, benzyl alcohol, methanol, ethanol, iso-propanol, butyl paraben, ethyl paraben, methyl paraben, phenol, glycerol, xylitol, resorcinol, cathechol, 2,6-dimethylcyclohexanol, 2-methyl-2,4-pentadiol, dextran, polyvinylpyrrolidone, 2-chlorophenol, benzethonium chloride, merthiolate (thimersosal), benzoic acid, etc.

Figure 2:
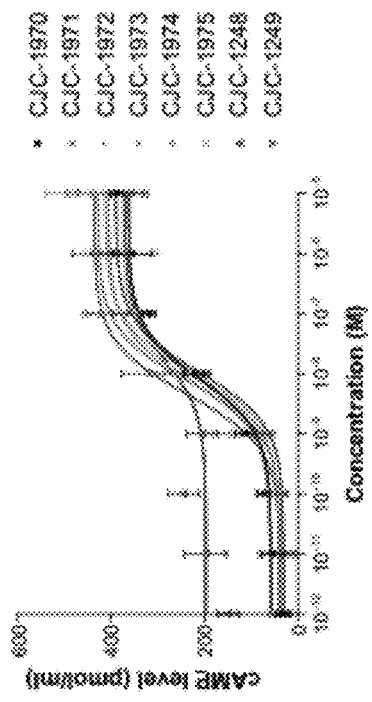
FIG. 2 depicts exemplary results for $EC_{50}$ values in CHO cells, demonstrating biological signaling activity by the tri-agonist receptor of selected albumin bound peptides with different anchoring sites.
Figure 3:
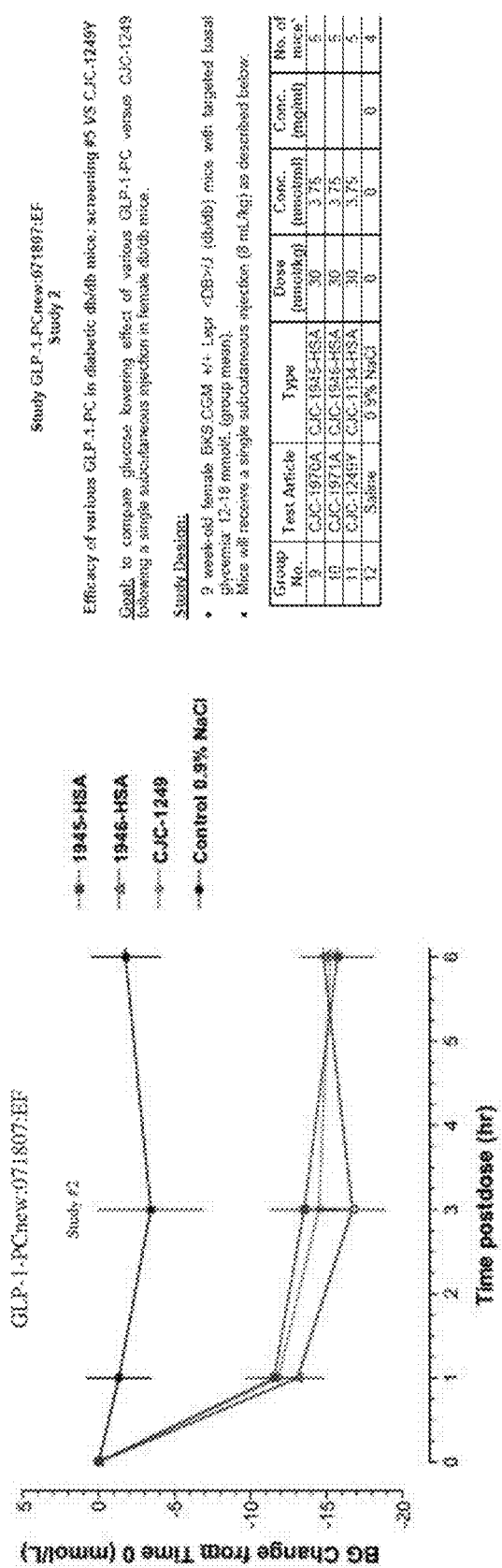
FIG. 3 depicts exemplary results for blood glucose changes in diabetic mice, demonstrating significant half-life and biological activity of selected tested compounds.

To demonstrate the in vitro and in vivo activity of the compounds presented herein, the inventors performed numerous experiments using selected compounds in vitro with CHO cells quantitating $EC_{50}$ for the tested compounds following protocols well known in the art (e.g., using cAMP Hunter CHO-K1 GLPIR Gs Cell Line, EUROFINS, Cat No: 95-0062C2), and diabetic db/db mice. Here, FIGS. 1-11 provide exemplary in vitro and in vivo data for selected retro-Michael resistant fusion proteins according to the inventive subject matter, demonstrating that the compounds presented herein can be tailored to exhibit GLP-1, GIP, and/or GcG mediated activity. For example, FIG. 1 depicts exemplary results for retro-Michael resistant albenatide (AB-013-AEEA-succinimide-albumin) CJC-1249 compared to other retro-Michael resistant albumin conjugates. As can be readily seen from the data in FIG. 1, Michael resistant albenatide and the other exemplary conjugates not only had nanomolar $EC_{50}$ values but also exhibited biological activity in diabetic mice reducing blood glucose over at least 48 hours. Such long reduction is indicative of substantially increased half-life of the tested retro-Michael resistant albumin conjugates while retaining substantial binding and glycemic control in vivo. Similarly, FIG. 2 depicts exemplary results for retro-Michael resistant albenatide (AB-013-AEEA-succinimide-albumin) (CJC-1249) compared to other retro-Michael resistant albumin conjugates. As can be once more seen from the data in FIG. 2, Michael resistant albenatide and the other exemplary conjugates had nanomolar $EC_{50}$ values with effective CAMP signaling. Here, it should be noted that the agonist peptide in some of the conjugates was covalently anchored to albumin via an AEEA linker at the C-terminus of the agonist peptide, while other conjugates were attached to the albumin via an AEEA linker at an intermediate position of the agonist peptide.

Figure 4:
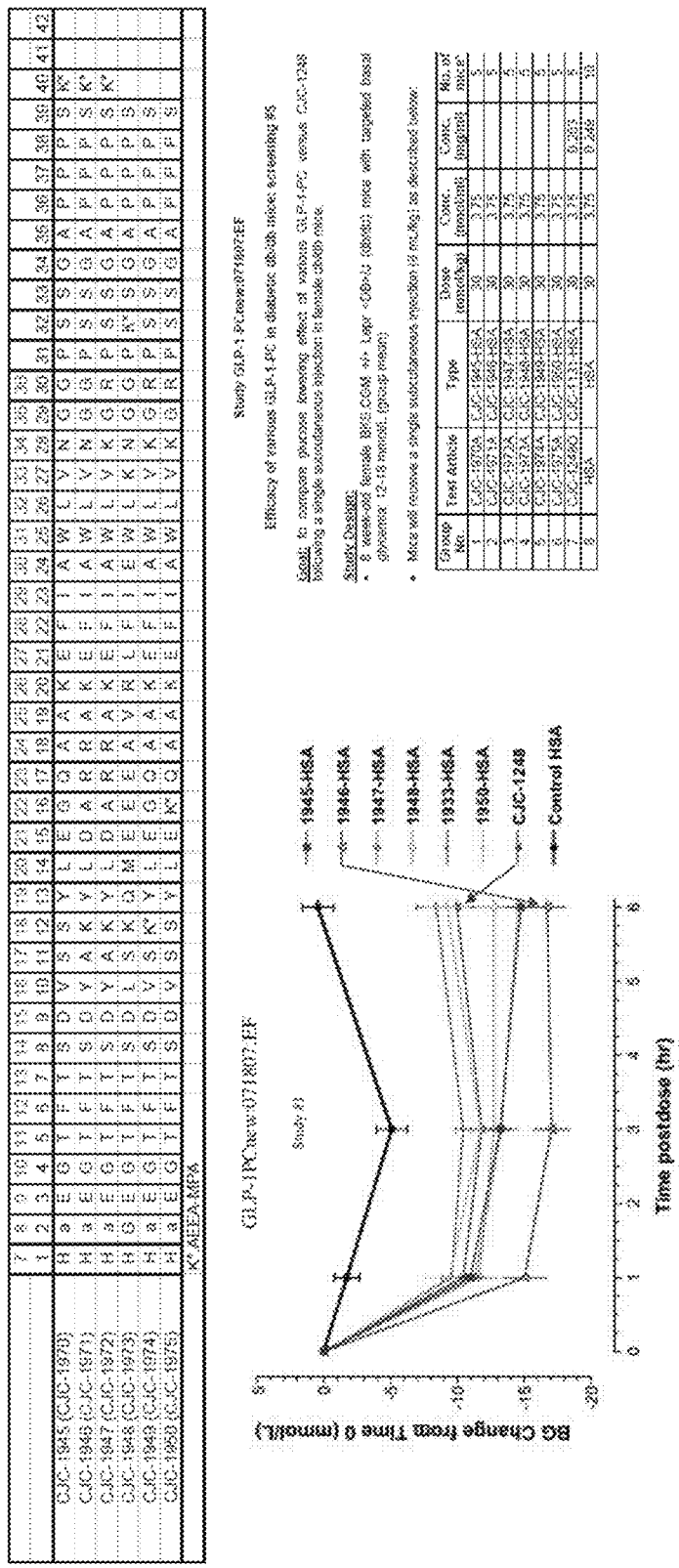
FIG. 4 depicts exemplary results for blood glucose changes in diabetic mice, demonstrating significant half-life and biological activity of further selected tested compounds with different anchoring sites.
Figure 5:
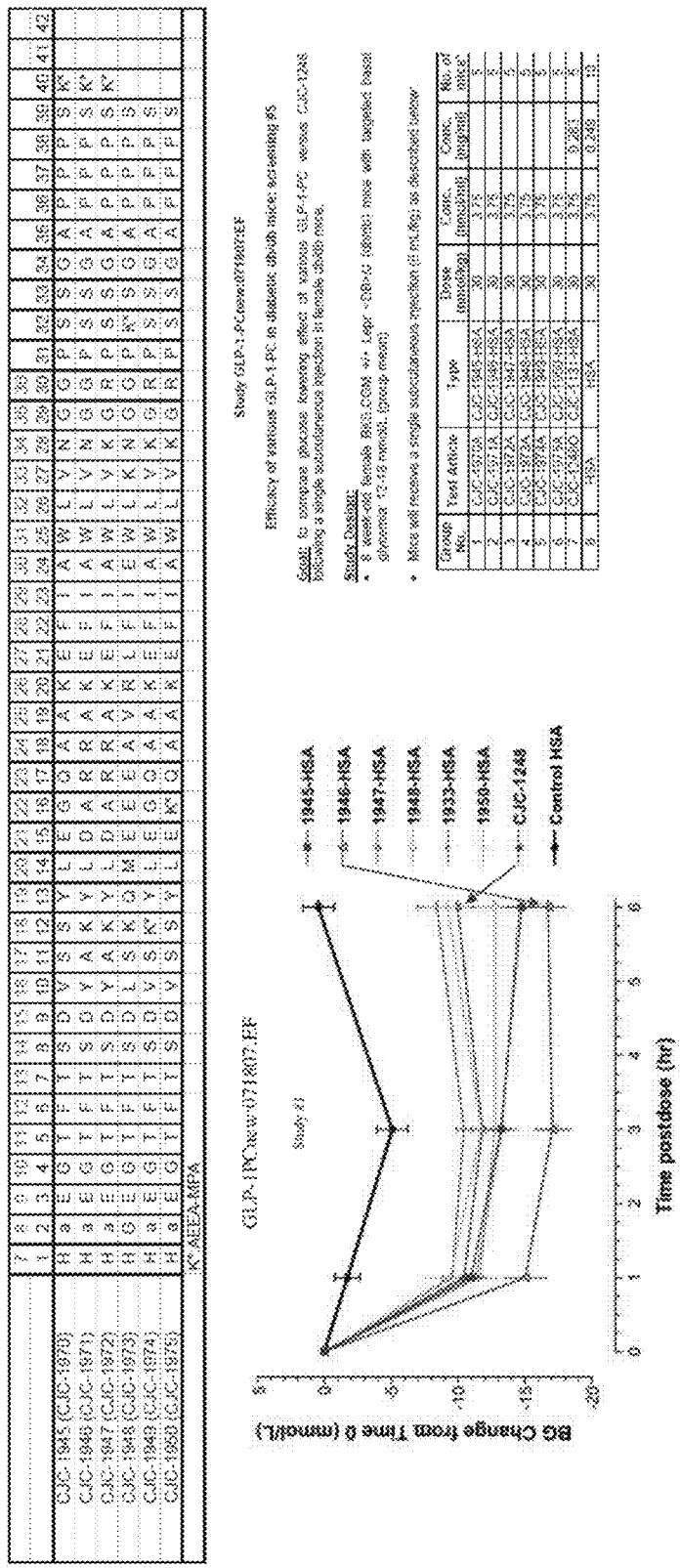
FIG. 5 depicts exemplary results for blood glucose changes in diabetic mice, demonstrating significant half-life and biological activity of still further selected tested compounds with different anchoring sites and demonstrating that different amino acid modifications in the tri-agonist macromolecule peptide result in different potencies and biological activity of blood glucose change.

Biological activity was once more tested in vivo using diabetic db/db mice that received a single subcutaneous injection of various tested retro-Michael resistant albumin conjugates (including retro-Michael resistant albenatide) at a dose of 30 nmol/kg. Once more, as can be seen form the exemplary results in FIG. 3, all tested retro-Michael resistant albumin conjugates exhibited significant of blood glucose post injection compared to saline control. FIG. 4 provides additional exemplary data for blood glucose control in db/db mice using various retro-Michael resistant albumin conjugates. Similar to FIG. 2, it should be noted that the agonist peptide in some of the conjugates was covalently anchored to albumin via an AEEA linker at the C-terminus of the agonist peptide, while other conjugates were attached to the albumin via an AEEA linker at an intermediate position of the agonist peptide.

In still further experiments, the inventors tested whether different amino acid modifications would result in different biological potencies. To that end, biological activity was once more tested in vivo using diabetic db/db mice that received a single subcutaneous injection of various retro-Michael resistant tri-agonist albumin conjugates at a dose of 30 nmol/kg. As can be seen from FIG. 5, while all tested compounds other than blank human serum albumin control (albumin without agonist peptide) exerted significant reduction in blood glucose, some of the compounds were more effective than others over the tested period of 6 hours.

Figure 6:
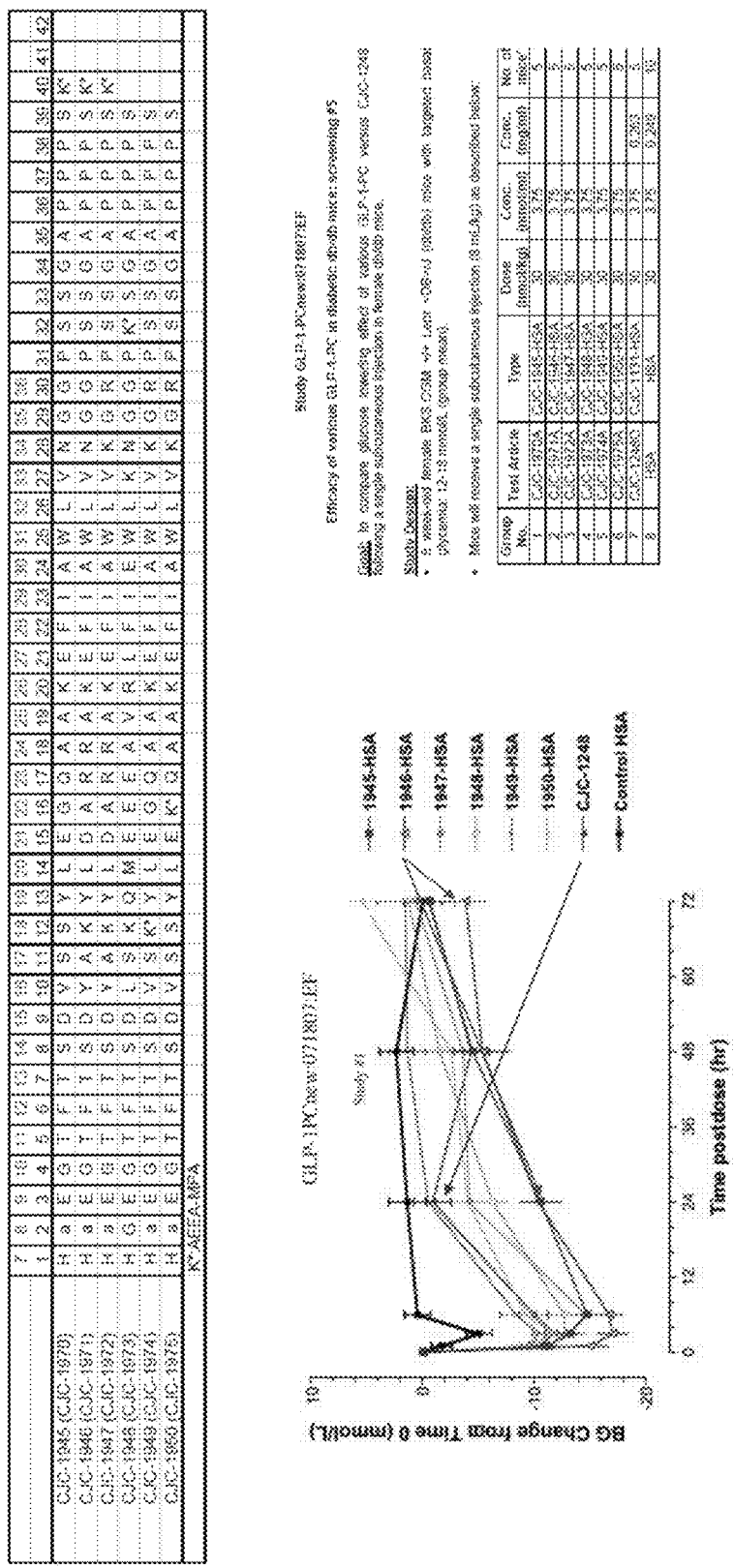
FIG. 6 depicts exemplary results for blood glucose changes in diabetic mice, demonstrating significant half-life and biological activity of additional selected tested compounds with different anchoring sites.
Figure 7:
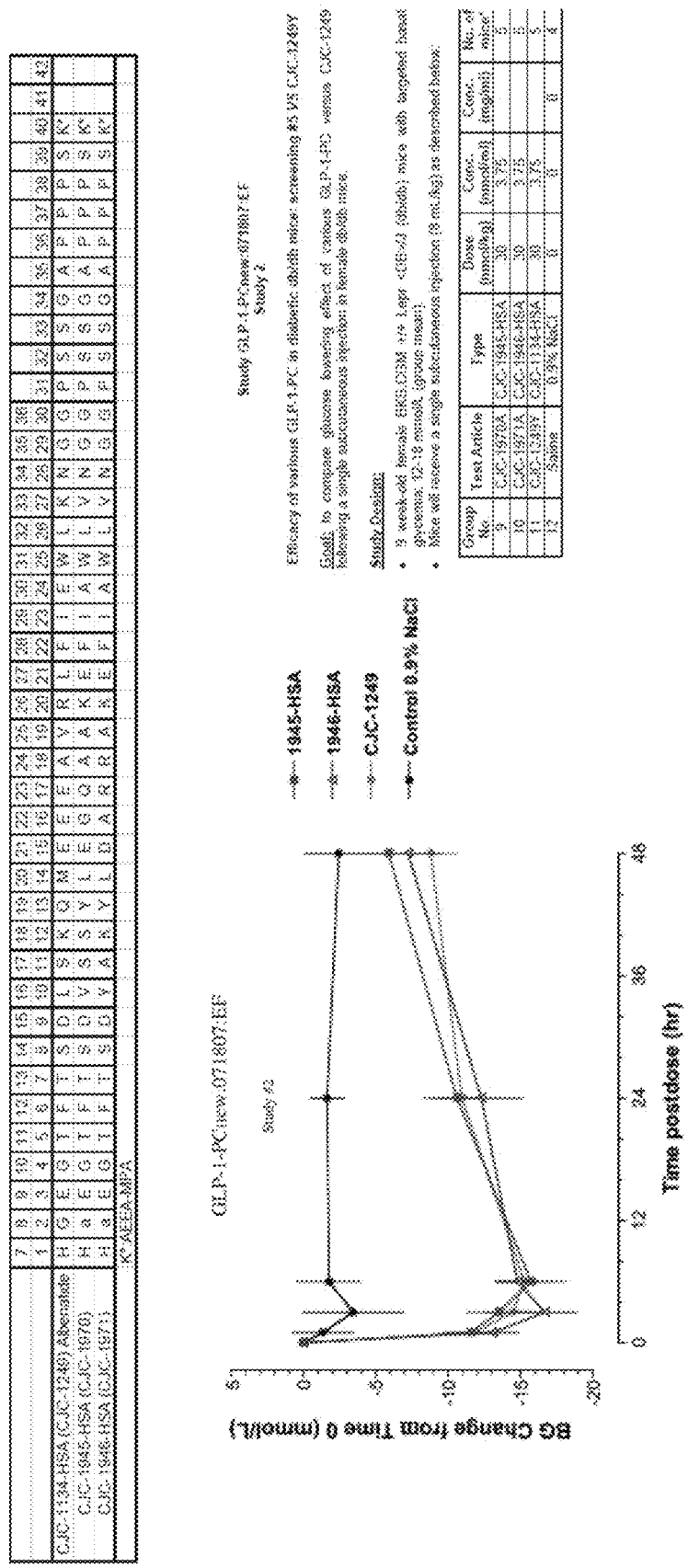
FIG. 7 depicts exemplary results for blood glucose changes in diabetic mice, demonstrating that despite being reactive to three receptors, the half-life of the GLP-1/GIP/glucagon tri-agonist peptide has equivalent half-life to a single agonist HSA bound molecules.

To investigate whether or not the biological effects of the retro-Michael resistant albumin tri-agonist conjugates would persist over an extended period (e.g., at least 24 hours, or at least 48 hours, or at least 72 hours), the inventors tested blood glucose reduction in vivo using diabetic db/db mice that received a single subcutaneous injection of various tested retro-Michael resistant albumin conjugates (including retro-Michael resistant albenatide) at a dose of 30 nmol/kg. Exemplary test data are shown in FIG. 6. Here, it is readily apparent that for most tested compounds the blood glucose reduction persisted through 48 hours, and lasted out to even 72 hours for some of the tested compounds. Notably, the tested retro-Michael resistant albumin tri-agonist conjugates had comparable half-life with regard to blood glucose changes as compared with the retro-Michael resistant (GLP-1 mono agonist) albenatide (AB-013-AEEA-succinimide-albumin) (CJC-1249) as shown in the exemplary data of FIG. 7.

Figure 8:
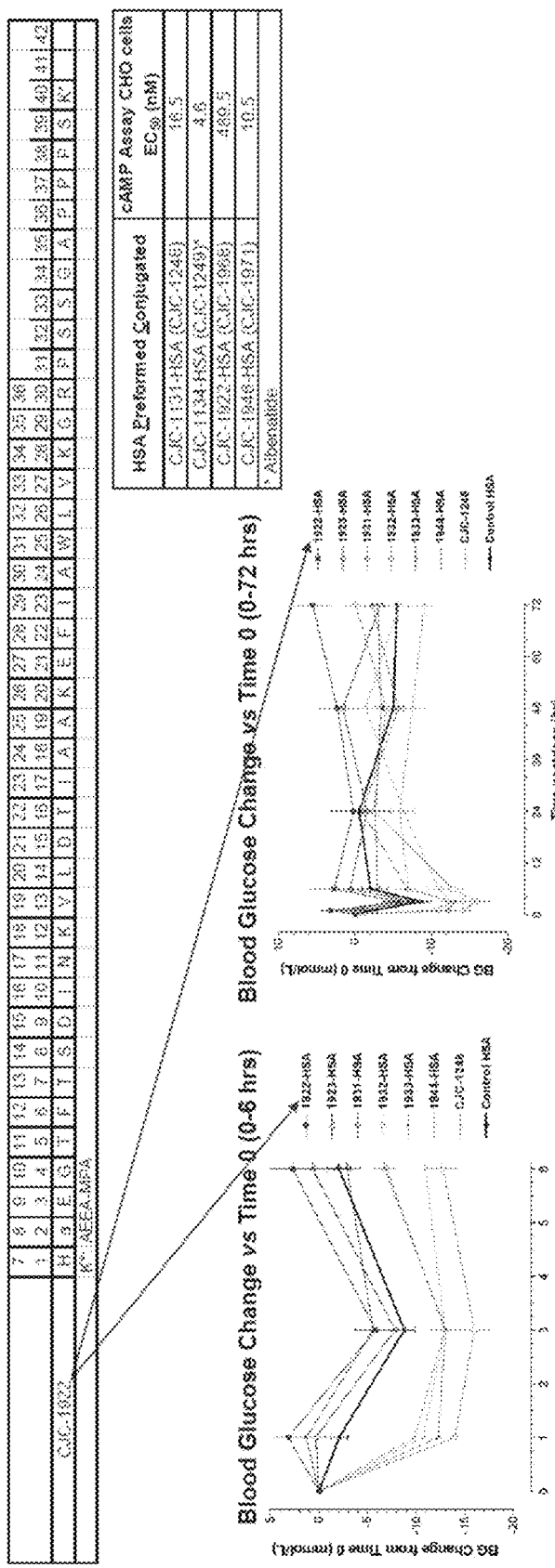
FIG. 8 depicts exemplary results for $EC_{50}$ data in CHO cells and blood glucose changes in diabetic mice, demonstrating that specific amino acid sequences are necessary for binding affinity and biological activity of albumin bound macromolecule peptide with tri-agonist receptor activity. No biological of CJC-1922-HSa with $EC_{50}$ of 489.5 nM.
Figure 9:
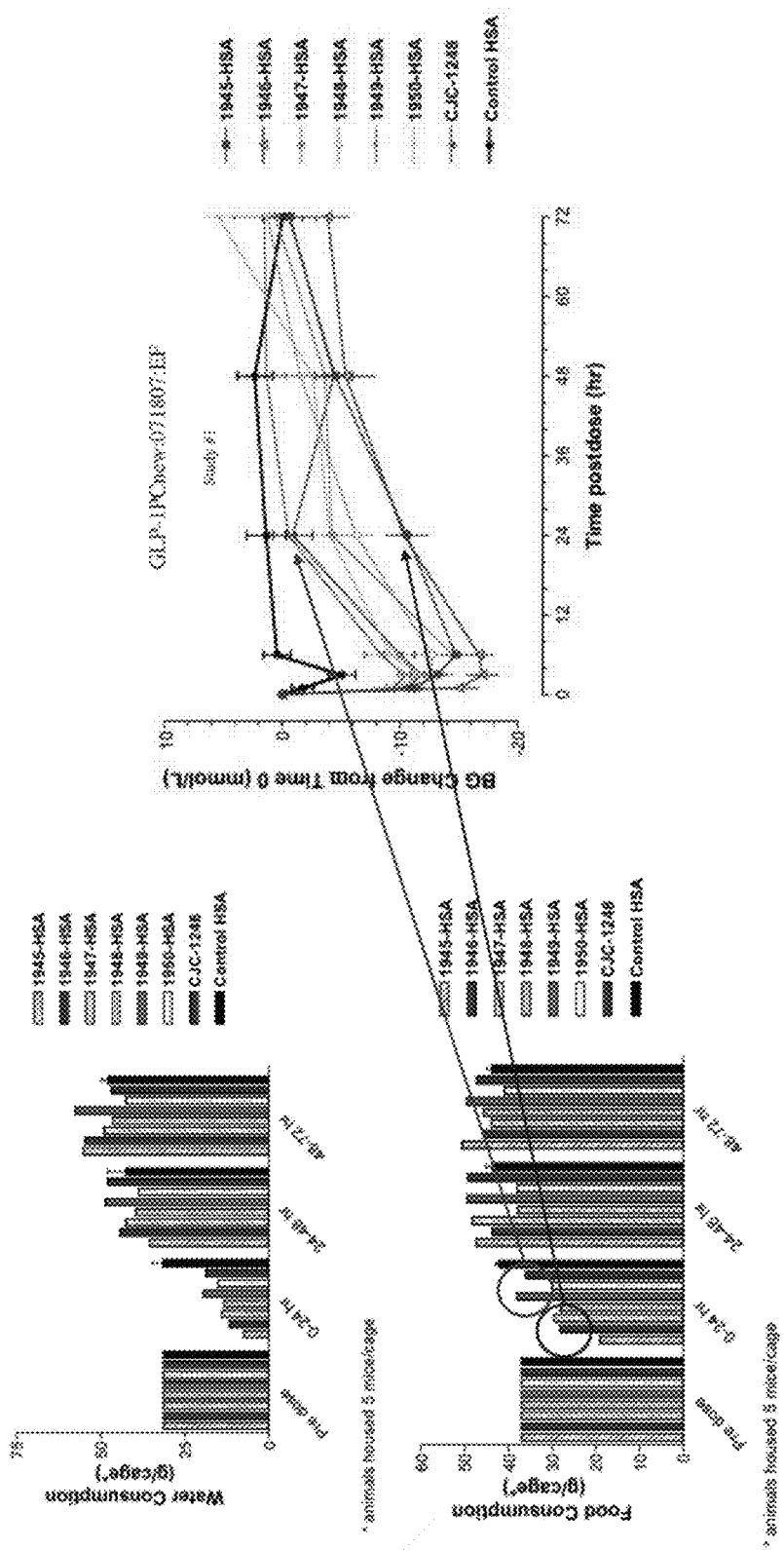
FIG. 9 depicts exemplary results for in vivo physiological activity (food and water consumption) and blood glucose changes in diabetic mice for various covalently albumin bound peptides with tri-agonist activity.

Despite the apparent possibility that numerous amino acids can be modified in the GPCR agonist peptides, the inventors noted that specific amino acid sequences are indeed necessary for binding affinity and biological activity (here: blood glucose reduction). For example, and as is shown in FIG. 8, relatively small changes in the amino acid sequence (relative to the retro-Michael resistant albenatide) led to a dramatic increase of $EC_{50}$ and substantially abrogated biological activity in an acute (6 hour) and long-term (72 hr) study in retro-Michael resistant CJC-1968.

Figure 10:
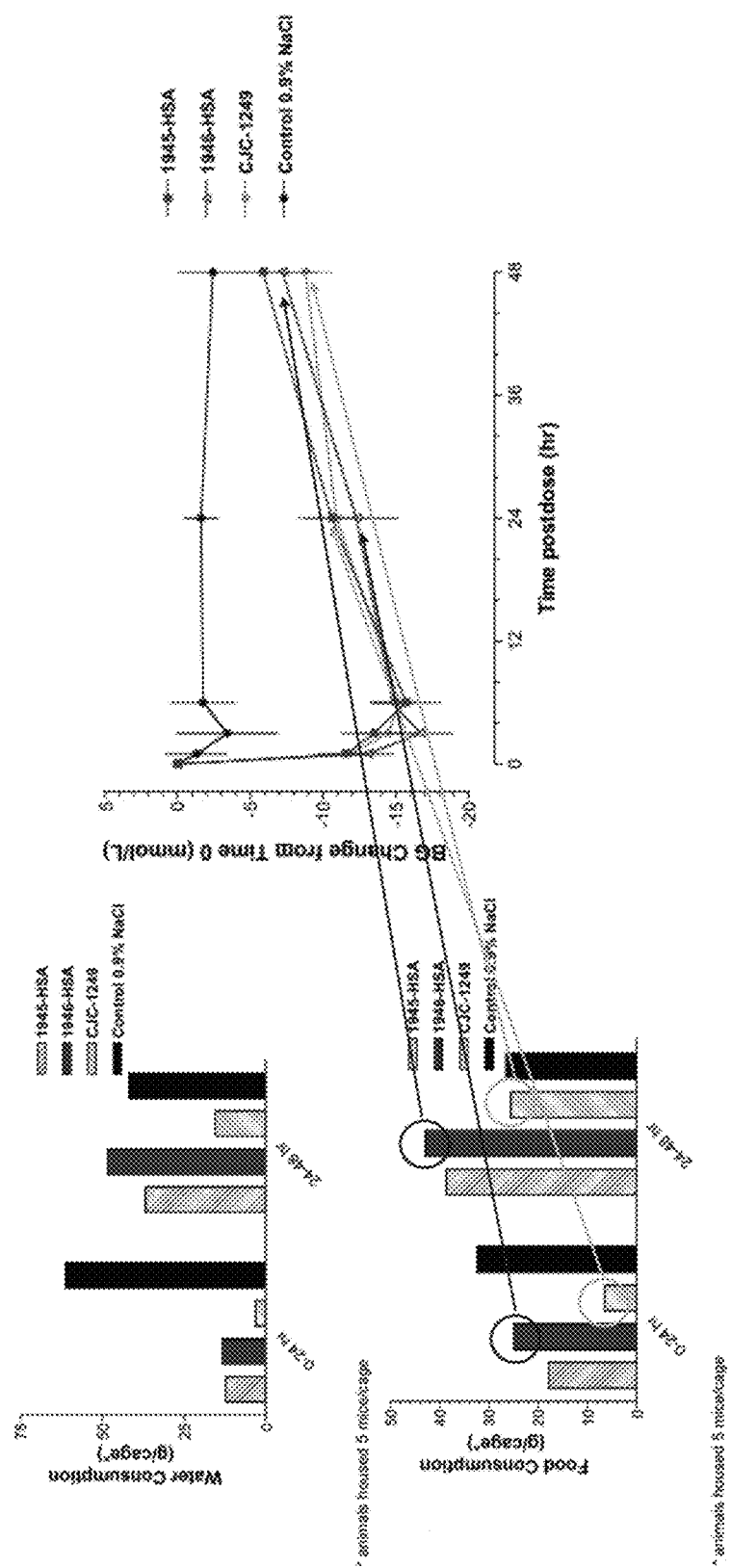
FIG. 10 depicts further exemplary results for in vivo physiological activity (food and water consumption) and blood glucose changes in diabetic mice for various covalently albumin bound peptides with tri-agonist activity
Figure 11:
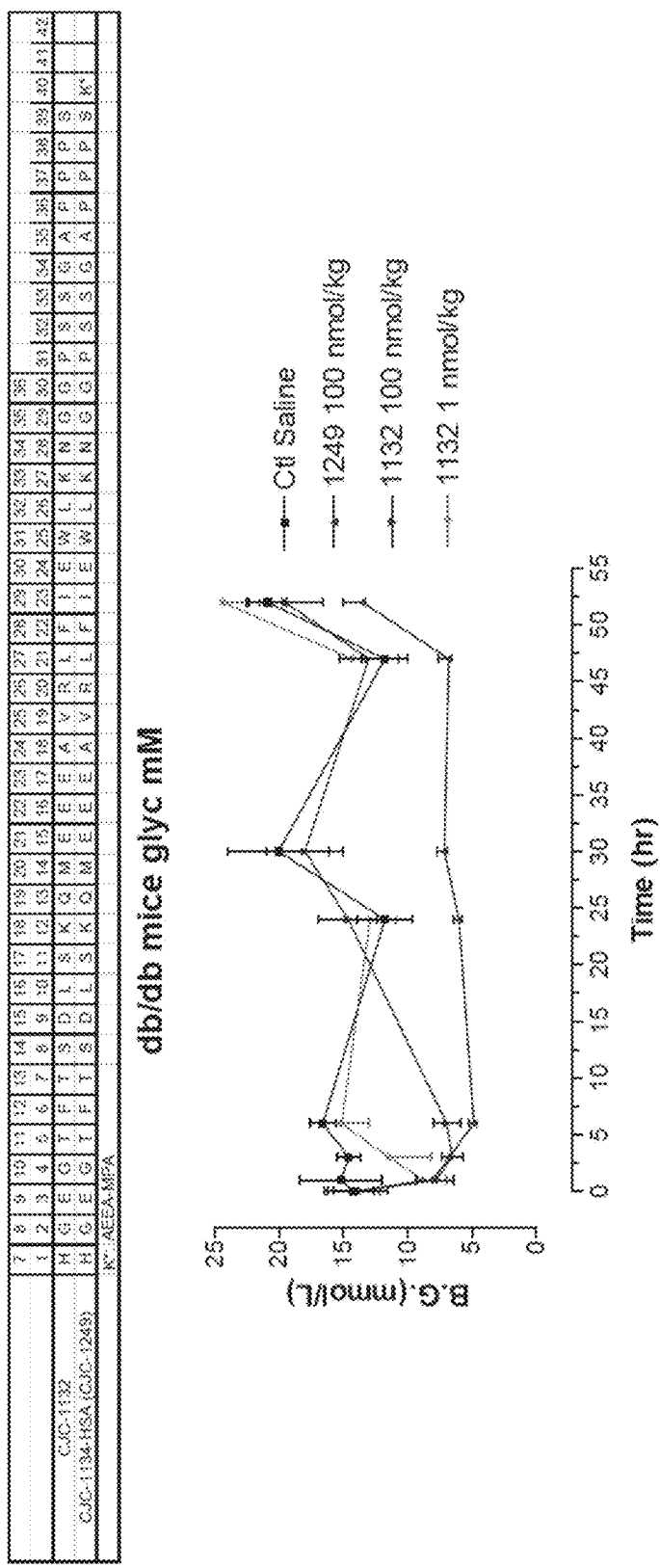
FIG. 11 depicts exemplary results for blood glucose changes in diabetic mice, showing prolonged half-life of albumin bound macromolecules with capabilities to activate multiple receptors (GLP-1/GIP/Glucagon).

To further explore the physiological effects of various retro-Michael resistant fusion proteins with a tri-agonist peptide agonist, the inventors measured water and food consumption along with blood glucose in the db/db mouse model after a single subcutaneous injection of 30 nmol/kg of the tested fusion proteins. As can be taken from FIG. 9, and consistent with earlier results, the blood glucose was reduced over at least 48 hours while food and water intake was reduced in most cases over at least 24 hours. FIG. 10 depicts further comparative results for selected tri-agonist fusion proteins and retro-Michael resistant (GLP-1 mono agonist) albenatide (AB-013-AEEA-succinimide-albumin) (CJC-1249) in the db/db mouse model. FIG. 11 is a further exemplary result from an in vivo db/db mouse model illustrating the unexpected and significant extension of half-life of the retro-Michael resistant (GLP-1 mono agonist) albenatide (AB-013-AEEA-succinimide-albumin) (CJC-1249) as compared to the corresponding unbound peptide agonist CJC-1132. As can be readily seen from the data, the retro-Michael resistant albenatide fusion protein had extended glucose reducing effects beyond 48 hours, whereas the corresponding unbound agonist peptide had no activity over control in as little as 20 hours. Moreover, it should be noted that the extended activity of the retro-Michael resistant albenatide (AB-013-AEEA-succinimide-albumin) was pronounced, even though the agonist peptide was irreversibly and covalently bound to albumin via a linker. Such activity was entirely contrary to conventional wisdom based on the experience with other fusion proteins (e.g., albiglutide).

Figure 23:
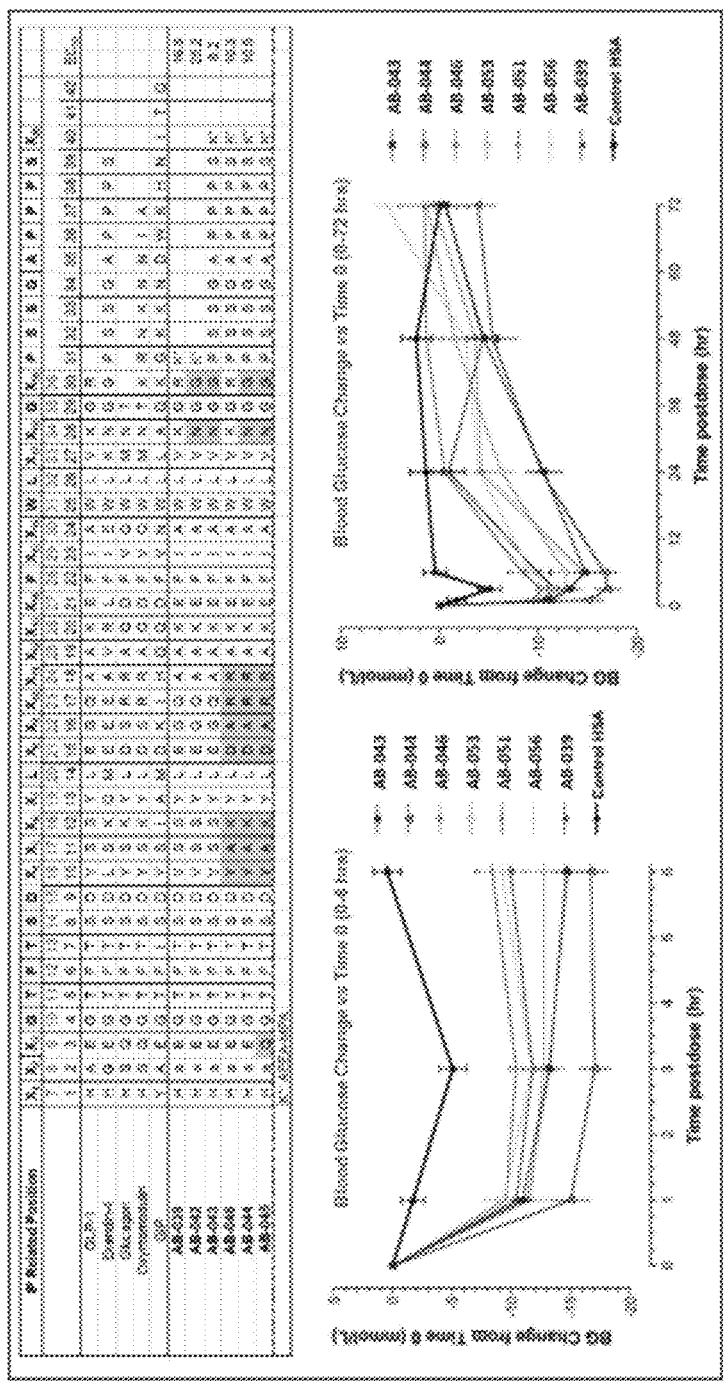
FIG. 23 depicts exemplary results for additional compounds tested in mice with blood glucose change over time (0-6 hrs and 0-72 hrs).
Figure 24:
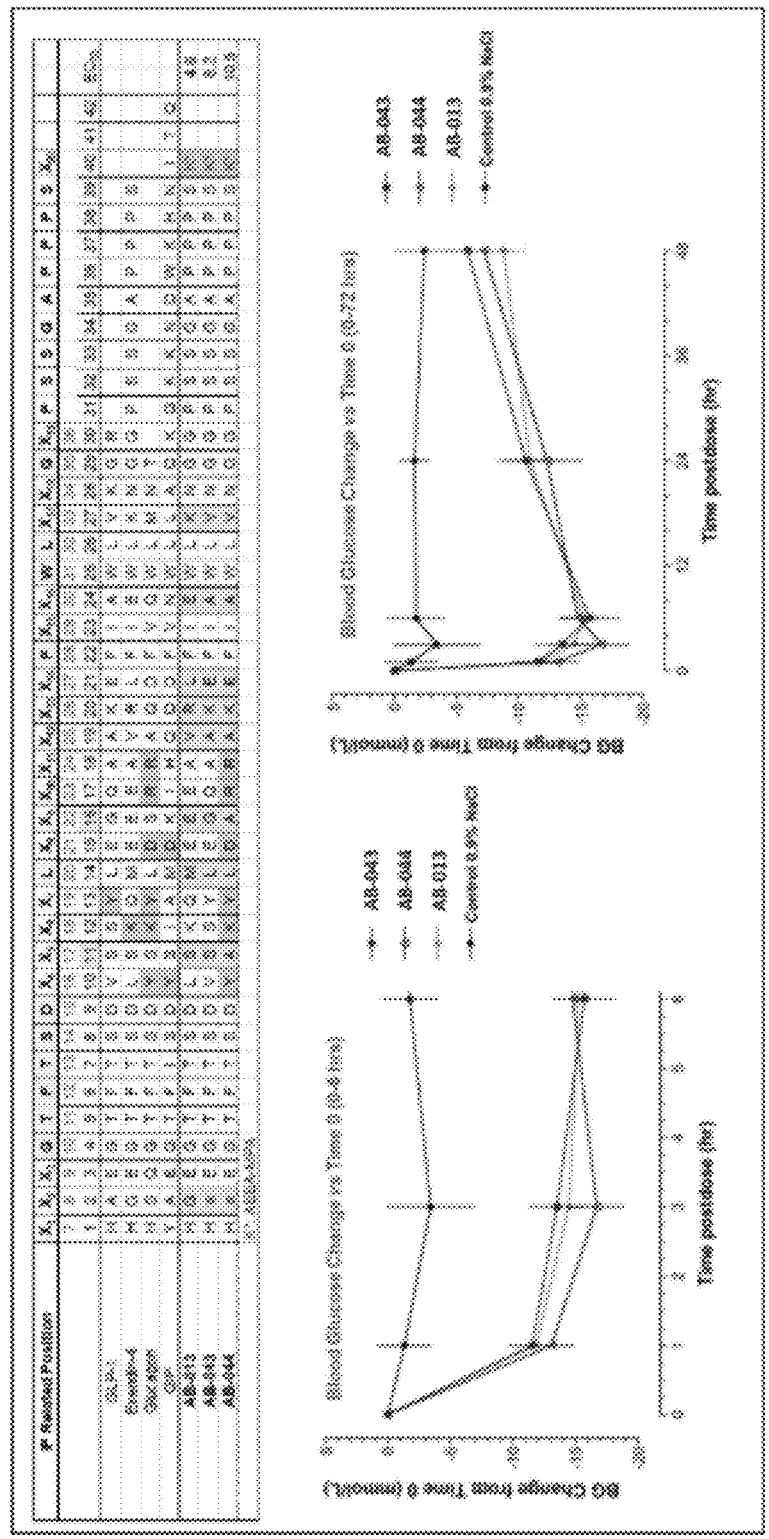
FIG. 24 depicts exemplary results for additional compounds tested in mice with blood glucose change over time (0-6 hrs and 0-48 hrs).
Figure 25:
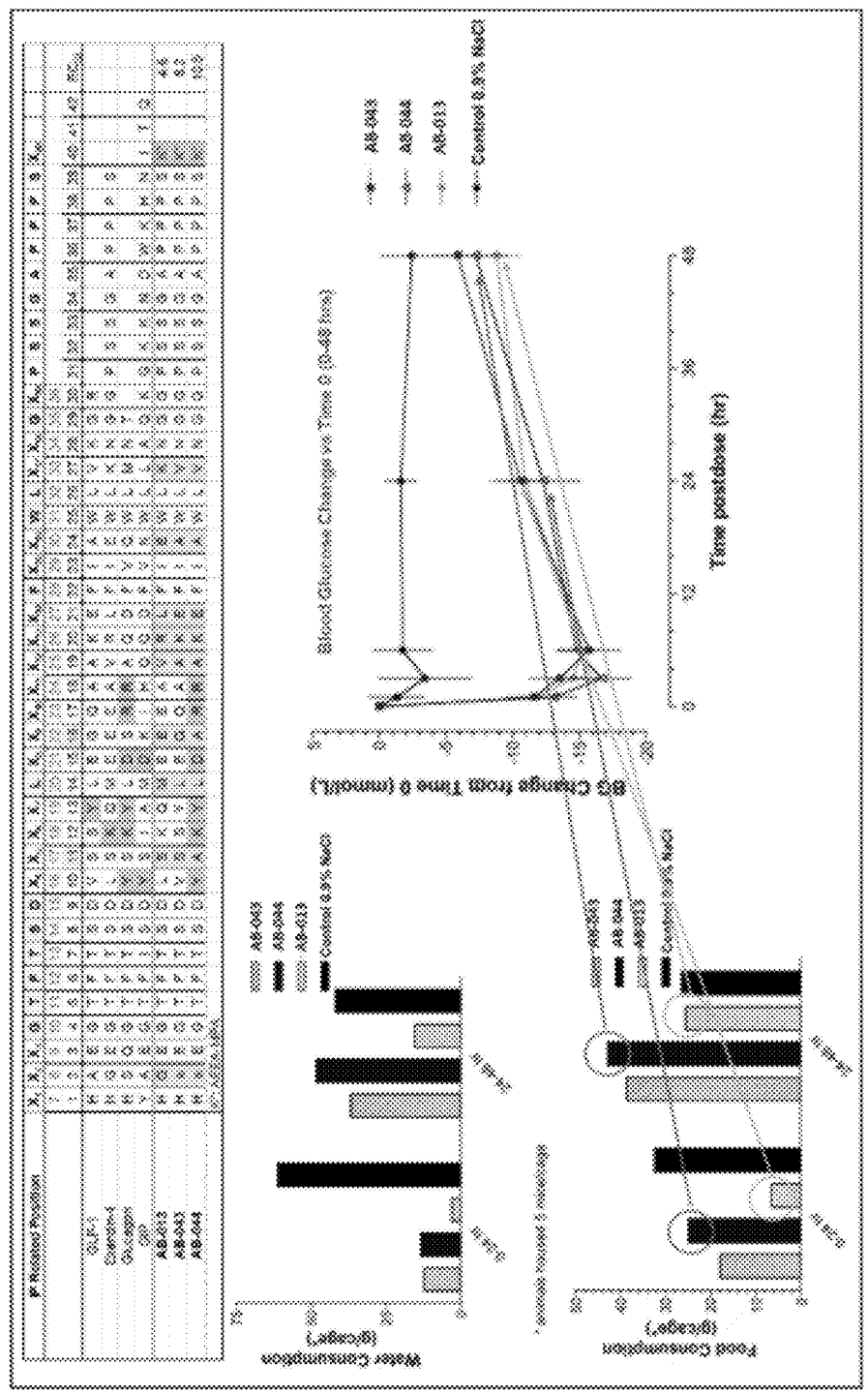
FIG. 25 depicts exemplary results for additional compounds tested in mice with blood glucose change over time (0-6 hrs and 0-48 hrs).

In yet further experiments, the inventors conducted further in vivo studies to test the biological activity of additional retro-Michael resistant fusion proteins according to the inventive subject matter. Unless noted otherwise, the in vivo model used db/db mice, and each test article was administered once by subcutaneous injection. Blood glucose was then measured over the indicated times and exemplary results are depicted in FIGS. 23-31. More specifically, FIG. 23 shows acute (6 hrs) and long-term (72 hrs) changes in blood glucose after administration of the indicated compounds, while FIG. 24 depicts comparative results for changes in blood glucose between the retro-Michael resistant albenatide (AB-013-AEEA-succinimide-albumin) and selected compounds of FIG. 23 over 6 hrs and 48 hours. FIG. 25 depicts further exemplary results for the compounds tested in FIG. 24 with respect to food and water consumption.

Figure 26:
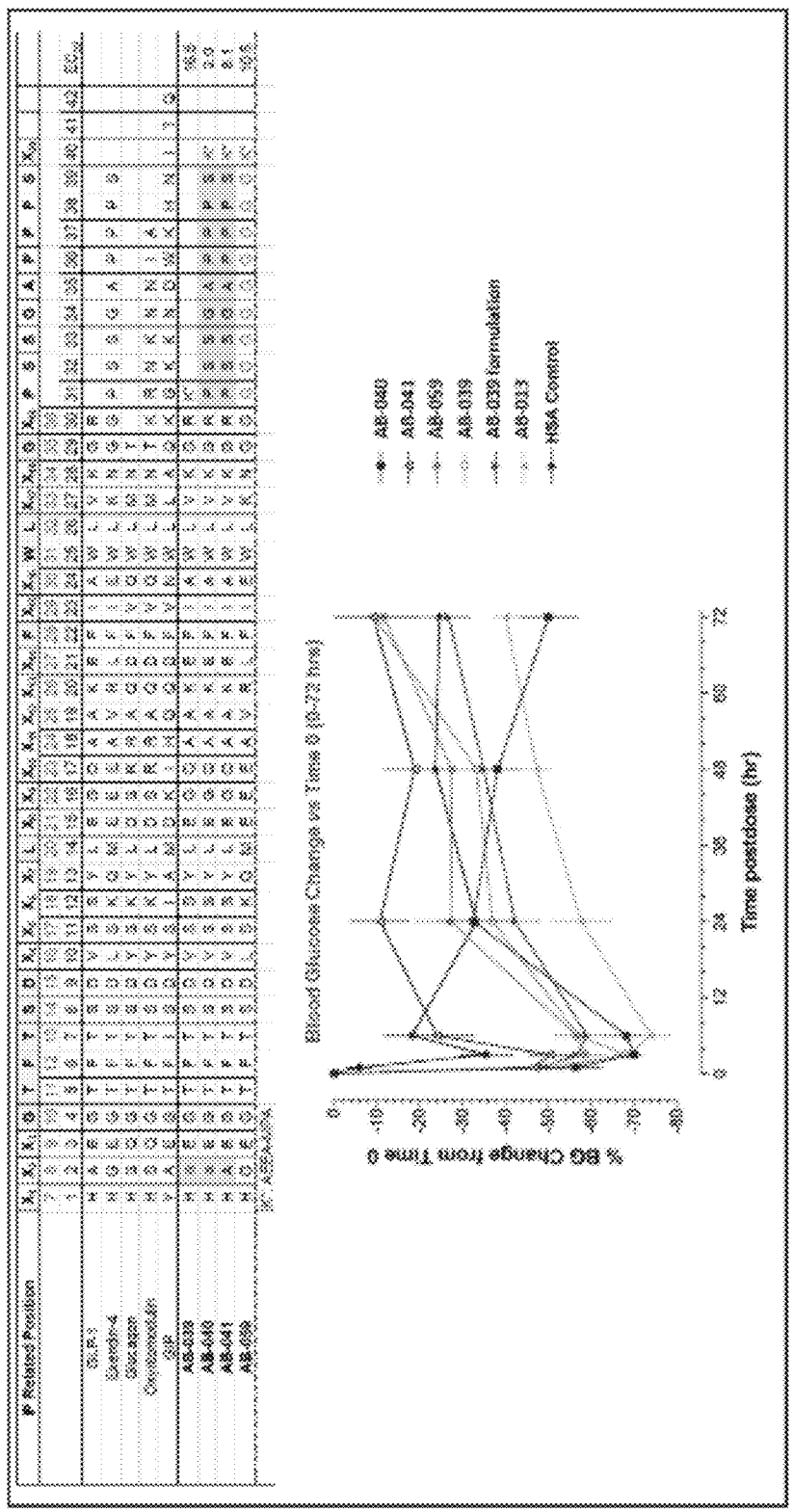
FIG. 26 depicts exemplary results for additional compounds tested in mice with blood glucose change over time (0-6 hrs and 0-72 hrs).
Figure 27:
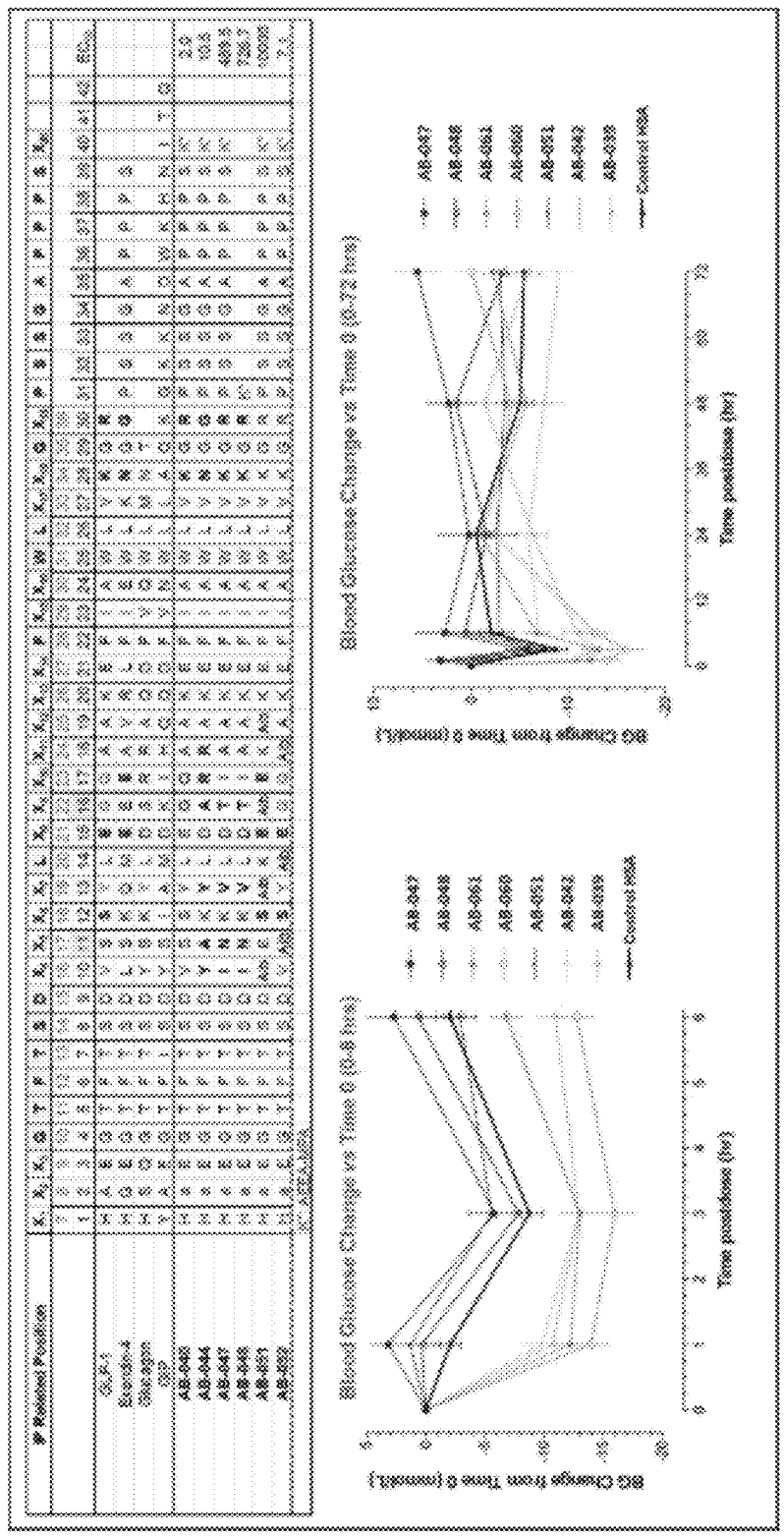
FIG. 27 depicts exemplary results for additional compounds tested in mice with blood glucose change over time (0-6 hrs and 0-72 hrs).

In FIG. 26, still further retro-Michael resistant fusion proteins according to the inventive subject matter were tested with regard to their effect on blood glucose and compared to the retro-Michael resistant albenatide (AB-013-AEEA-succinimide-albumin) over a period of 72 hours. As can be readily taken from the graphs, the retro-Michael resistant albenatide (AB-013-AEEA-succinimide-albumin) had the most potent in vivo effect over the entire test cycle. On the other hand, other tested retro-Michael resistant fusion proteins had limited or even no effect in acute and long-term observations for blood glucose as is shown in FIG. 27.

Figure 28:
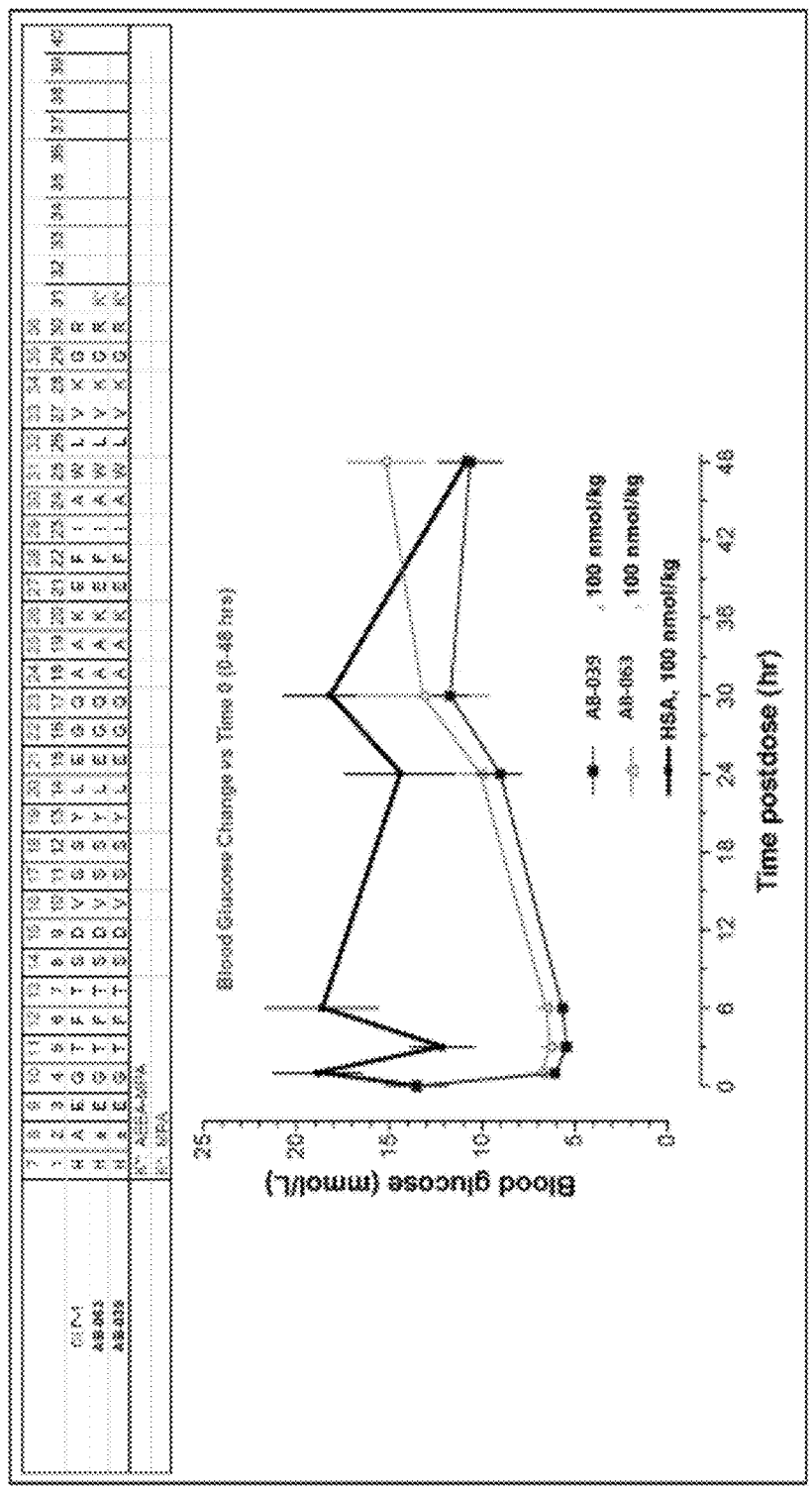
FIG. 28 depicts exemplary results for additional compounds tested in mice with blood glucose change over time (0-48).
Figure 29:
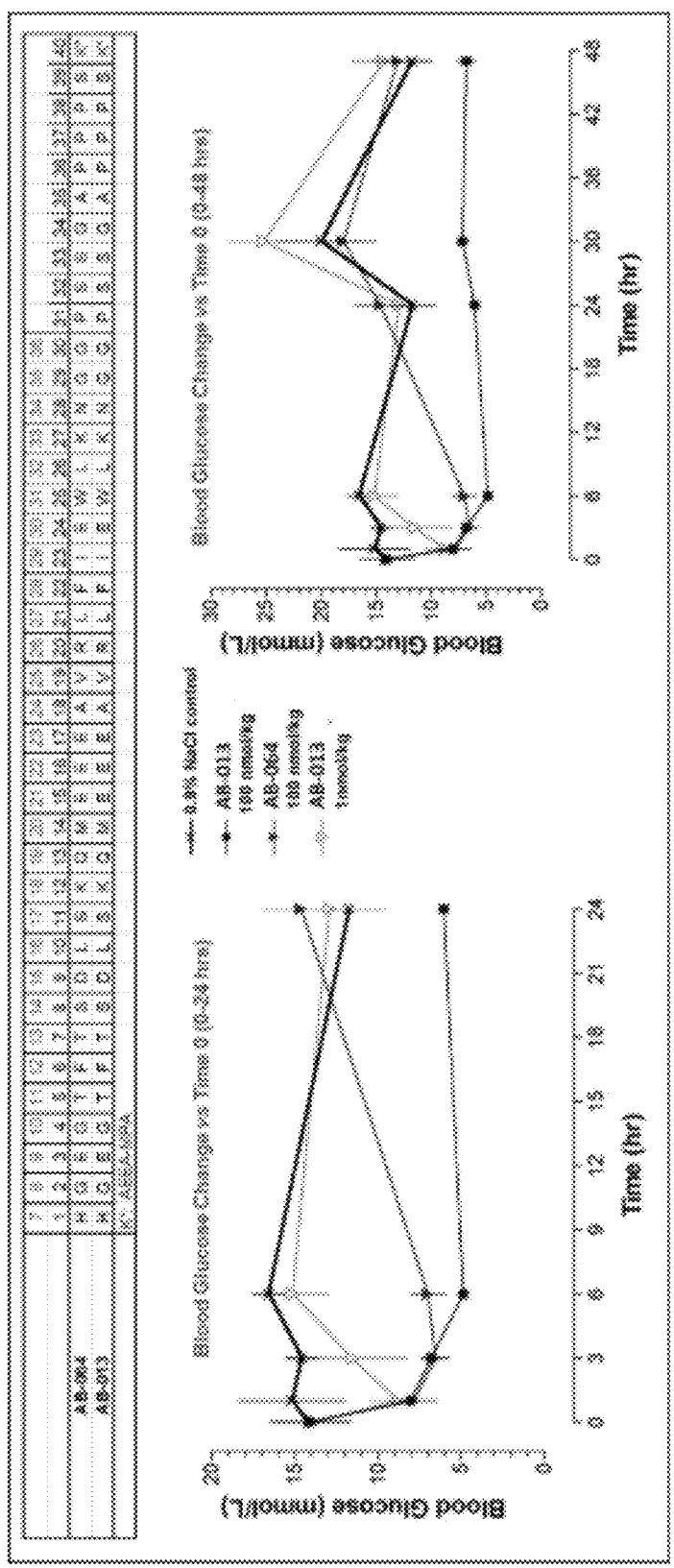
FIG. 29 depicts exemplary results for additional compounds tested in mice with blood glucose change over time (0-24 hrs and 0-48 hrs).
Figure 30:
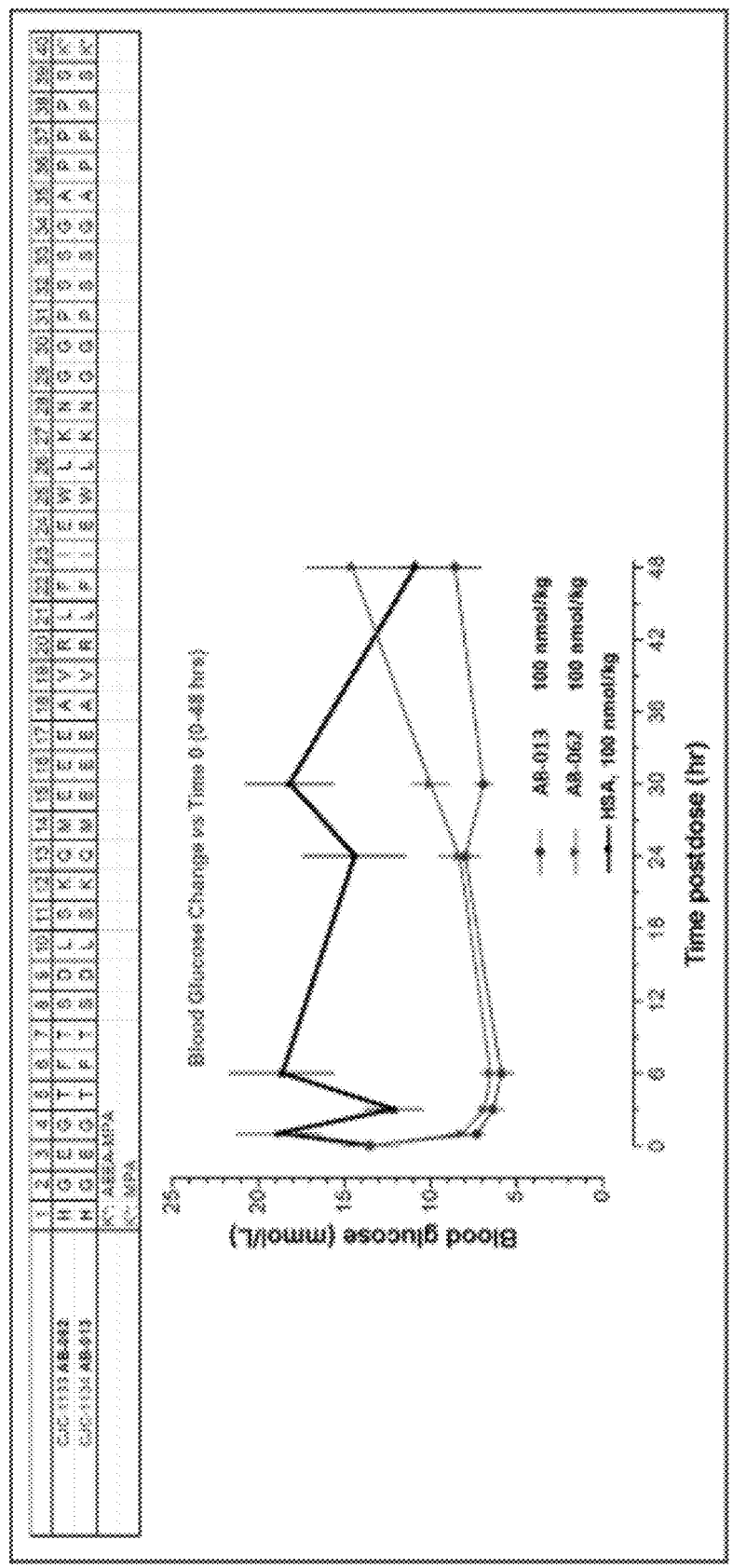
FIG. 30 depicts exemplary results for additional compounds tested in mice with blood glucose change over time (0-48 hrs).

The effect of the linker/coupling group was investigated for a specific peptide agonist sequence where one sequence had only MPA as a linker/coupling group, while the other peptide agonist sequence had an AEEA-MPA linker/coupling group. Notably, as shown in FIG. 28, both tested peptide agonis had significant activity in reducing blood glucose. However, the agonist peptide with the MPA group was over time less effective as the agonist with the AEEA-MPA group.

In yet further experiments, the retro-Michael resistant albenatide (AB-013-AEEA-succinimide-albumin) was tested at 1 nmol/kg and 100 mmol/kg and compared to 100 nmol/kg of another retro-Michael resistant fusion protein, AB-064. Interestingly, even at the minute dose of 1 nmol/kg, the retro-Michael resistant albenatide (AB-013-AEEA-succinimide-albumin) still had a measurable effect on blood glucose in the short term, and a sustained substantial effect over 48 hr whereas AB-064 returned to baseline after only 24 hrs as is shown in the exemplary results of FIG. 29.

Figure 31:
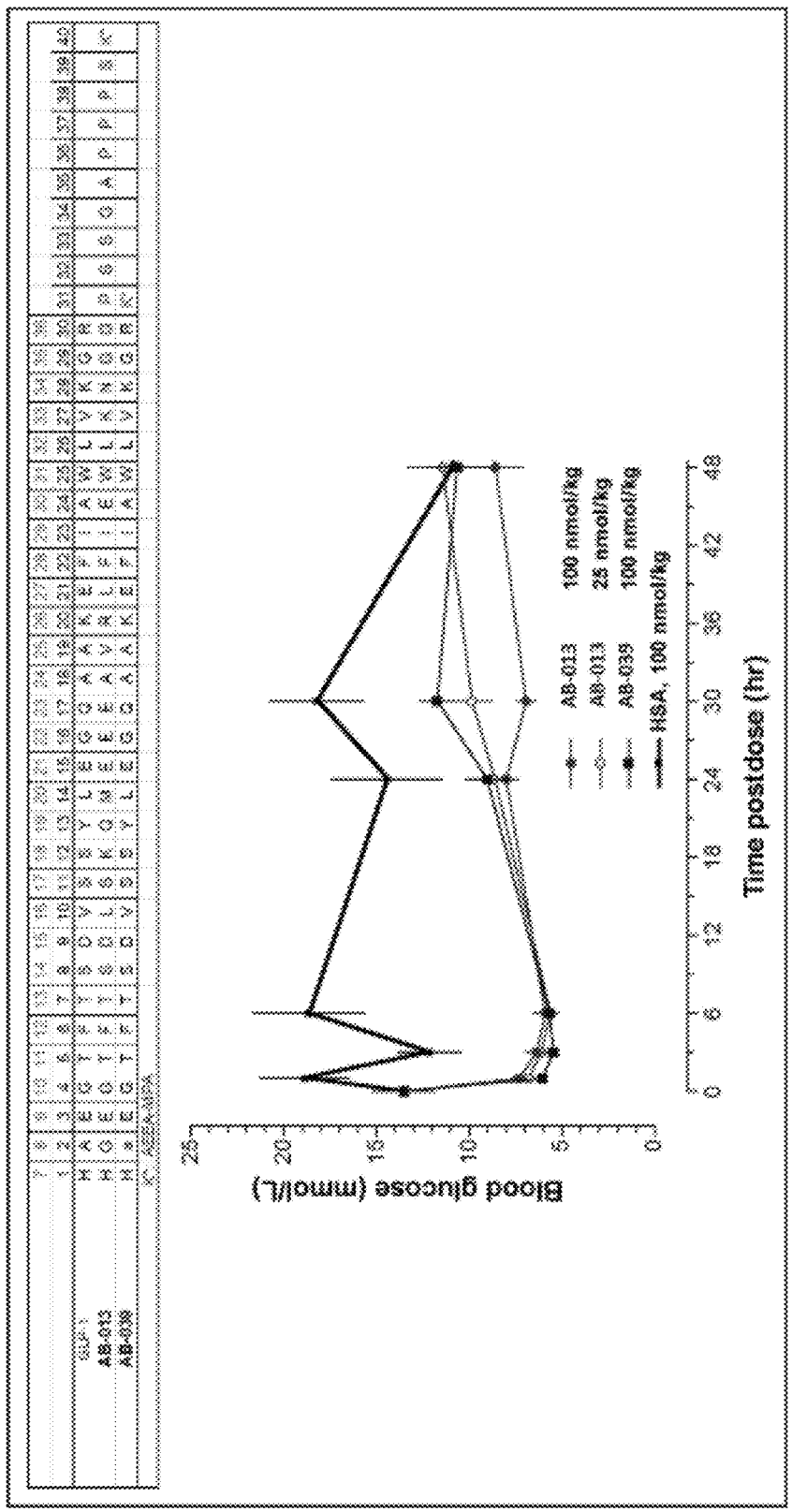
FIG. 31 depicts exemplary results for additional compounds tested in mice with blood glucose change over time (0-48 hrs).

Higher dose administration of 100 nmol/kg of retro-Michael resistant albenatide (AB-013-AEEA-succinimide-albumin) and another retro-Michael resistant fusion protein (AB-062) was evaluated over 48 hours. Notably, and as can be taken from FIG. 30, while AB-062 significantly reduced blood glucose in this mouse model over 24 hours, the reduction in blood glucose was lost at 48 hours. In contrast, administration of retro-Michael resistant albenatide resulted in s sustained reduction in blood glucose beyond the 48 hour time point. Additionally, the inventors tested the retro-Michael resistant albenatide (AB-013-AEEA-succinimide-albumin) at 100 nmol/kg and 25 nmol/kg, and another retro-Michael resistant fusion protein (AB-039) at 100 nmol/kg, and exemplary results are depicted in FIG. 31. As can be readily seen from the graphs, the 100 nmol/kg dose of retro-Michael resistant albenatide (AB-013-AEEA-succinimide-albumin) had sustained effect at 48 hrs, while the 25 nmol/kg dose was still effective at 30 hours.

Figure 12:
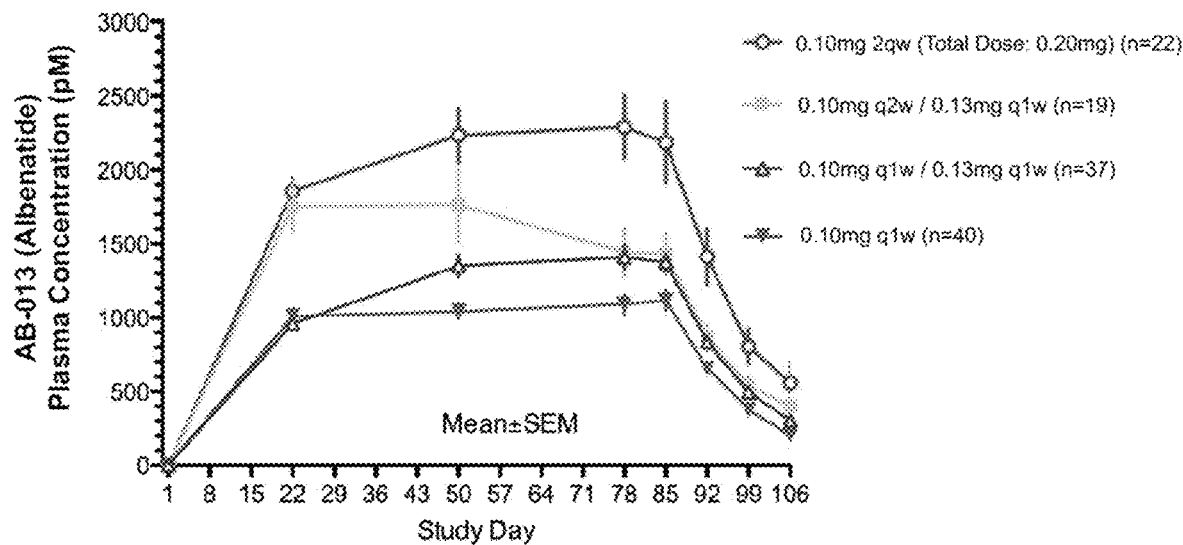
FIG. 12 depicts an exemplary pharmacokinetics profile of ultra-low dose AB-013 in Type 2 diabetic human subjects with prolonged and flattened profile in the plasma, showing that the pharmacokinetic profile is dose-proportional.
Figure 13:
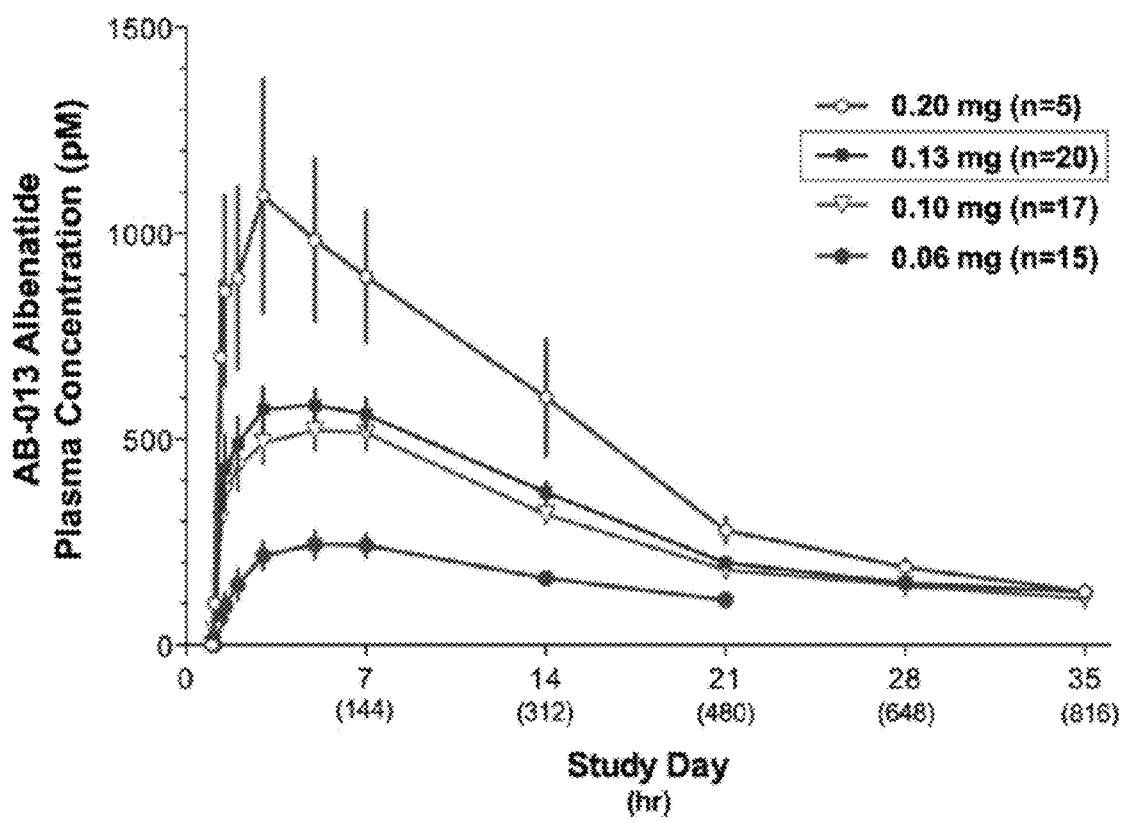
FIG. 13 depicts exemplary results for is an ultra-low dose of fully-bound exendin-4 (AB-013: Albenatide) with low and flattened pk profile.
Figure 14:
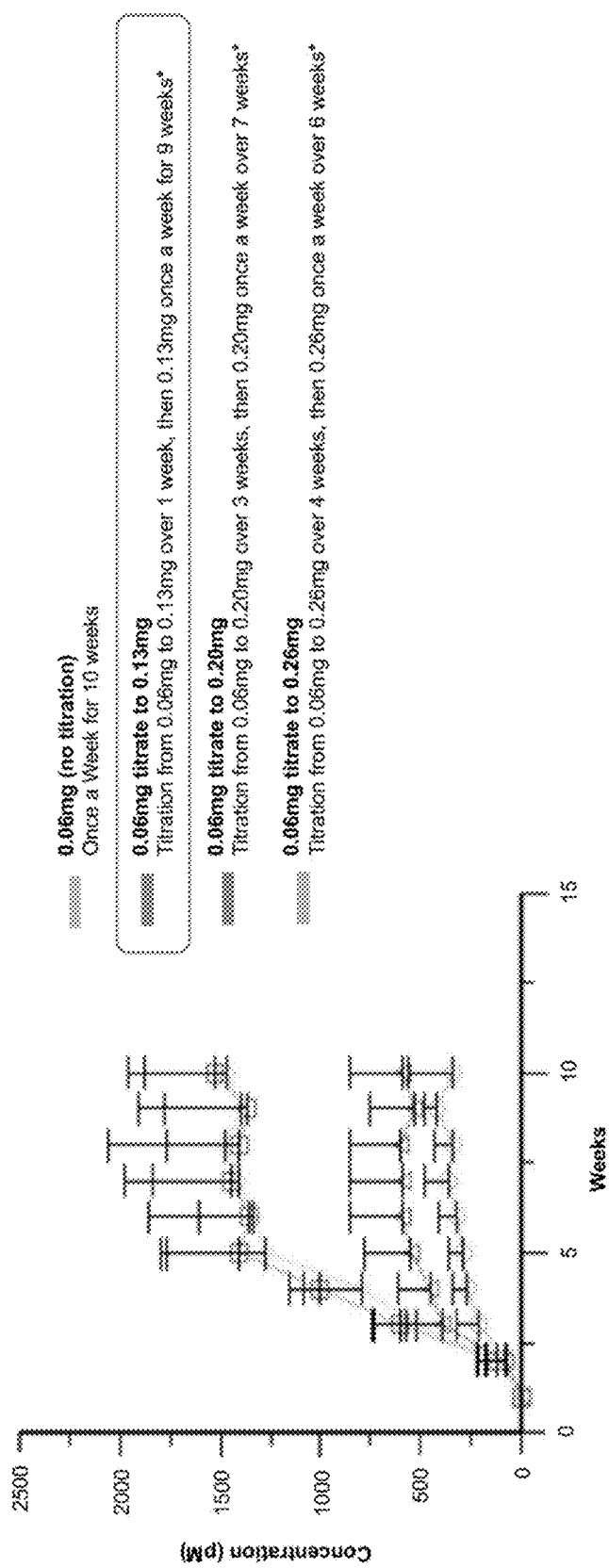
FIG. 14 depicts exemplary results for further pharmacokinetic data for AB-013 that are consistent with previous pharmacokinetic data, once more showing a low and flattened plasma profile at low concentrations over several weeks.

Based on the encouraging data from the in vitro and in vivo experiments, the inventors then set out to determine various pharmacokinetic parameters for retro-Michael resistant albenatide (AB-013-AEEA-succinimide-albumin) in human, and exemplary results are depicted in FIGS. 12-14. In particular, the inventors conducted a dose-finding, randomized, double-blind comparison of retro-Michael resistant albenatide (AB-013-AEEA-succinimide-albumin) versus placebo. Escalating single doses of 0.31, 0.62, 1.25, 2.5, 5.0, and 3.75 mg were administered to dosing cohorts of seven T2DM participants each (6:1 active drug to placebo), and a final cohort of 16 participants (12:4 active drug to placebo) was administered a single dose of 3.0 mg. No dose-limiting toxicities were observed at all doses tested (0.31 to 5.0 mg), and the maximum dose administered (5.0 mg) was considered to be the maximum tolerated dose for this study. In this context it should be appreciated that these doses include the mass of albumin. The dose of 0.31 mg to 5.0 mg translates to 0.02 mg to 0.33 mg of modified Exendin-4 (active peptide). It should also be noted that the study was performed without a 4-week dose escalation titration. All doses were well tolerated.

The inventors then conducted a multiple-dose study conducted in 70 participants with T2DM. This study was a randomized, double-blind comparison of 5 weekly injections of retro-Michael resistant albenatide (AB-013-AEEA-succinimide-albumin) versus placebo, with participants evenly randomized into each of 4 parallel treatment groups: 1.0 mg, 2.0 mg, or 3.0 mg of retro-Michael resistant albenatide (AB-013-AEEA-succinimide-albumin) or placebo. Retro-Michael resistant albenatide (AB-013-AEEA-succinimide-albumin) was well tolerated by participants, and the most common adverse event (AE) that was reported was headache (15 of 52 participants or 17% in the treated groups versus 2 of 18 participants or 11% in the placebo group). Nausea occurred in 17% of participants in the placebo group and 21% of participants in all 3 treatment groups combined (1.0 mg, 2.0 mg, and 3.0 mg). Although vomiting is a common AE associated with GLP-1 agonists, participants in the 1.0- and 2.0 mg groups reported no cases of vomiting, while 5 of 17 (30%) participants in the 3.0 mg group reported at least 1 case of vomiting. No injection-related skin reactions (a 30-gauge needle was used) were reported in the 2.0- or 3.0 mg groups, whereas the placebo group reported 4 skin reactions and the 1.0 mg group reported 1 skin reaction. Furthermore, 21% of participants were found to have low-titer antibodies to retro-Michael resistant albenatide (AB-013-AEEA-succinimide-albumin), but these antibodies had no apparent effects on efficacy or tolerability. No deaths were reported during the study, and 2 serious AEs (SAEs) occurred that were not considered related to study drug.

A second study with a purified composition of retro-Michael resistant albenatide (AB-013-AEEA-succinimide-albumin) was performed with the administration of single escalating-doses of study drug versus placebo to cohorts of 7 participants (6:1 active drug to placebo) followed by larger cohorts who demonstrated tolerability of further exploratory doses (16 to 24 participants randomized 3:1 active drug to placebo). No SAEs or deaths were reported in this study, and there were no clinically relevant changes in safety laboratory parameters and electrocardiograms (ECGs).

Retro-Michael resistant albenatide (AB-013-AEEA-succinimide-albumin) was generally well tolerated at the clinically relevant doses of 1.0 mg, 1.5 mg, and 2.0 mg. The incidence of these AEs in the 1.0- and 1.5 mg groups was similar to that observed in the placebo group. Of the participants in the placebo group, 2 of 26 (8%) reported nausea and 3 of 26 (12%) reported vomiting. When administered at a single dose of 1.0 mg, 2 of 18 (11%) participants experienced either mild nausea or vomiting. When this dose was increased to 1.5 mg, 2 of 18 (11%) participants experienced mild nausea and 1 of 18 (6%) participants reported mild vomiting after dosing. At 2.0 mg, approximately 8 of 23 (35%) and 6 of 23 (26%) participants experienced mild to moderate nausea or vomiting, respectively. Following the administration of 3.0 mg of study drug, 3 of 6 (50%) participants experienced nausea and/or vomiting. The majority of AEs were mild to moderate in severity. No study drug-related injection site reactions were observed. Low-titer antibodies (1:1 to 1:10) specific to retro-Michael resistant albenatide (AB-013-AEEA-succinimide-albumin) were detected in a small number of participants (6%) after a single administration of the therapeutically relevant doses of 1.0 to 3.0 mg. Once more, it should be noted that these doses included the mass of albumin and the study was performed without 4-week dose escalation titration. The dose of 1.0 mg to 3.0 mg translates to 0.065 mg to 0.195 mg of modified Exendin-4 (active peptide agonist).

Data from the 3-month weekly dosing study showed plasma concentrations of retro-Michael resistant albenatide (AB-013-AEEA-succinimide-albumin) increased with weekly administration and appeared to reach a steady state in a dose-proportional manner. The mean steady-state observed predose concentration (Cpredose) value on Day 78 for the antibody-negative participants in the weekly 1.5/2.0 mg (0.10/0.13 mg Ex4) dose group was 33% higher than the mean Cpredose value for the antibody-negative participants in the weekly 1.5 mg (0.10 mg Ex4) dose group in the PP population, indicating a dose-proportional increase in exposure between the 2 dose levels.

As was expected form the mouse models, after the last dose on Day 78, retro-Michael resistant albenatide (AB-013-AEEA-succinimide-albumin) levels decreased very slowly. The mean (coefficient of variation [CV]) half-life (t½) values of retro-Michael resistant albenatide (AB-013-AEEA-succinimide-albumin) in the 1.5 mg (0.10 mg Ex4) and 1.5/2.0 mg (0.10/0.13 mg Ex4) dose groups were 9.16 (20) days and 9.42 (24) days, respectively, for all participants in the PP population. The mean (CV) t½ values of AB-013 in the 1.5 mg (0.10 mg Ex4) and 1.5/2.0 mg (0.10/0.13 mg Ex4) dose groups were 9.19 (20) days and 9.01 (21) days, respectively, for antibody negative participants in the PP population.

As can be seen from FIG. 12, a dose response effect was observed from 0.1 mg q weekly to 0.13 mg q weekly to 0.20 mg q weekly with peak and steady state plasma concentration levels of AB-013 reaching >2,000 picomole of unbound and fully bound agonist. Once more, it is noted that the dose indicated above included the mass of albumin and the study was performed without q 4-week dose escalation titration. The doses of 1.5 mg to 2.0 mg translates to 0.10 mg to 0.20 mg of modified Exendin-4 (active peptide agonist).

Data from the 3-month twice-weekly dosing study showed plasma concentrations of retro-Michael resistant albenatide (AB-013-AEEA-succinimide-albumin) increased after the initiation of twice weekly dosing in both dose groups. In the 2×1.5 mg (2×0.10 mg Ex4) dose group, plasma concentrations appeared to reach steady state by Day 22 and remained relatively constant over the rest of the treatment period. In the 2×1.5/2.0 mg (2×0.10/0.13 mg Ex4) dose group, plasma concentrations were highest on Day 22 with slightly lower levels observed on Day 50 and later. This observation is consistent with the dose reduction from 3.0 mg per week to 2.0 mg per week (0.20 mg per week to 0.13 mg per week Ex4) after the fourth week of dosing in this group. The mean steady-state Cpredose value on Day 78 for the antibody-negative participants in the 2×1.5/2.0 mg (2×0.10/0.13 mg Ex4) dose group was approximately 36% lower than the mean Cpredose value for the antibody-negative participants in the 2×1.5 mg (2×0.10 mg Ex4) dose group in the PP population. The mean (CV) t½ values of retro-Michael resistant albenatide (AB-013-AEEA-succinimide-albumin) in the 2×1.5 mg (2×0.10 mg Ex4) and 2×1.5/2.0 mg (2×0.10/0.13 mg Ex4) dose groups were 9.26 (20) days and 9.94 (31) days, respectively, for all participants in the PP population. For antibody-negative participants in the PP population, the mean (CV) t½ values of AB-013 were 9.25 (21) days and 9.19 (25) days in the 2×1.5 mg (2×0.10 mg Ex4) and 2×1.5/2.0 mg (2×0.10/0.13 mg Ex4) dose groups, respectively.

As can be seen from FIG. 13, a dose response effect can be observed from 0.06 mg q weekly to 0.10 mg q weekly to 0.13 mg q weekly to 0.20 mg q weekly with peak plasma concentration levels of retro-Michael resistant albenatide (AB-013-AEEA-succinimide-albumin) reaching >1,100 picomole. Once more, the indicated doses include the mass of albumin and the study was performed without q 4-week dose escalation titration. The doses of 1.0 mg to 3.0 mg translates to 0.06 mg to 0.20 mg of modified Exendin-4 (active peptide agonist). FIG. 14 shows results of another PK study in which subjects received retro-Michael resistant albenatide (AB-013-AEEA-succinimide-albumin) as follows: (a) 0.06 mg once a week for 10 weeks, no titration, (b) titration from 0.06 mg to 0.13 mg over 1 week, then 0.13 mg once a week over 9 weeks, (c) titration from 0.06 mg to 0.20 mg over 3 weeks, then 0.20 mg once a week over 7 weeks, and (d) titration from 0.06 mg to 0.26 mg over 4 weeks, then 0.26 mg once a week over 6 weeks. Here, it can be seen that the results are once more consistent with earlier studies and pharmacokinetic data, and that retro-Michael resistant albenatide (AB-013-AEEA-succinimide-albumin) achieved a low and flattened plasma profile.

Figure 15:
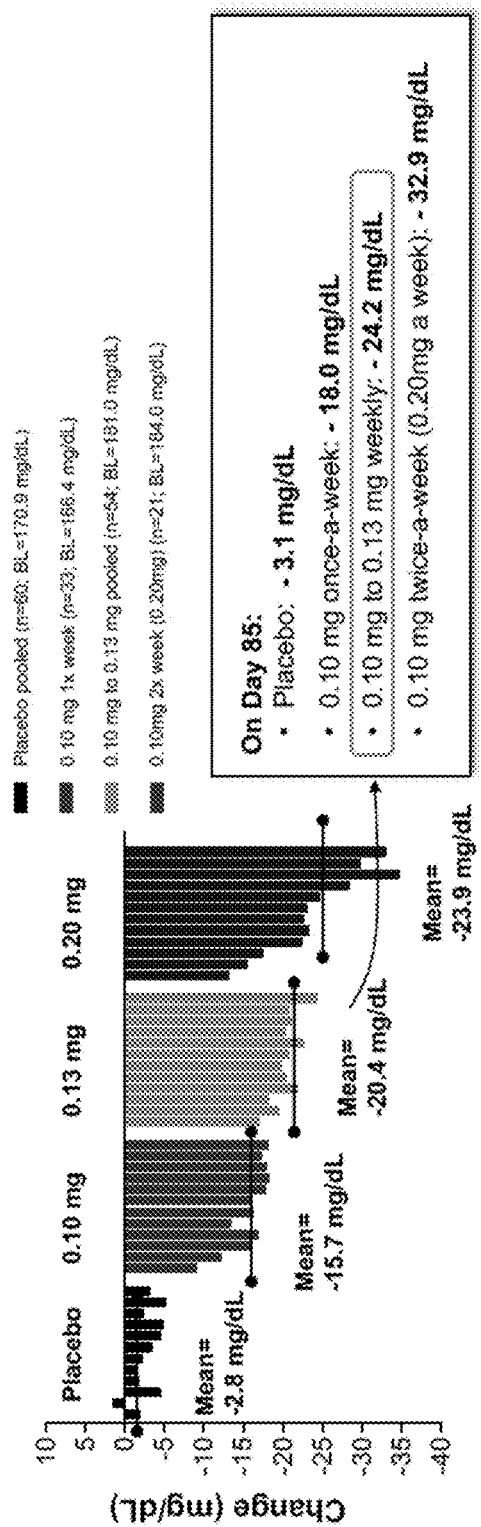
FIG. 15 depicts exemplary results for Type 2 diabetic patients at various dosage regimens establishing that a 130 mcg (0.13 mg) dose has therapeutic effect on lowering fasting plasma glucose vs. placebo.
Figure 16:
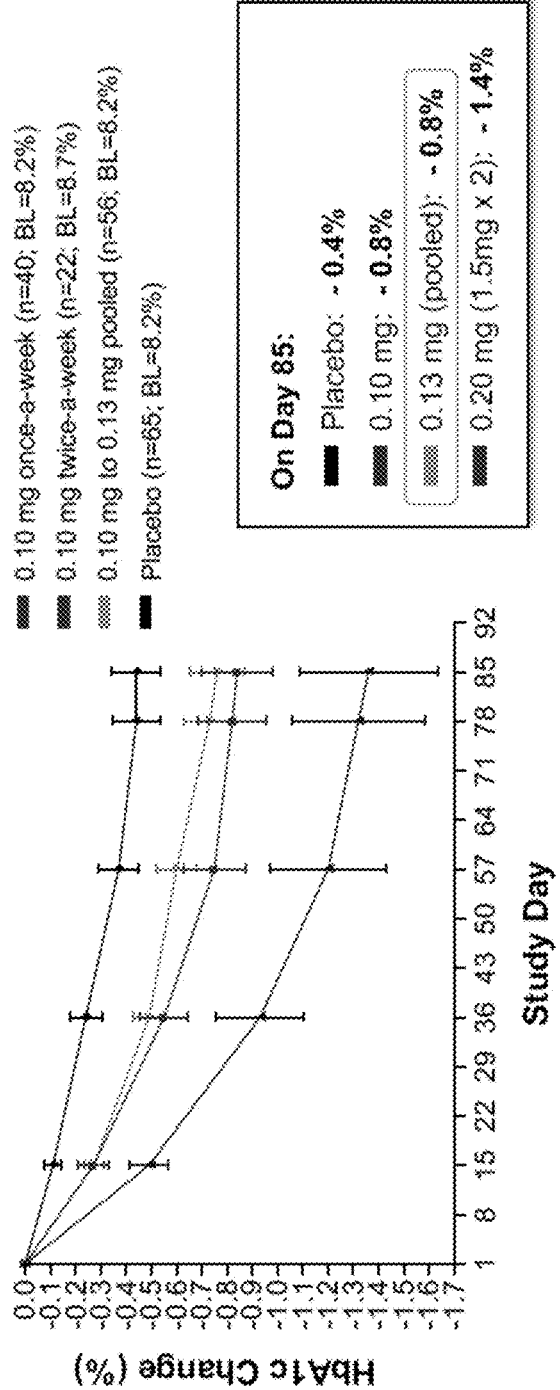
FIG. 16 depicts exemplary results for Type 2 diabetic patients at various dosage regimens establishing that a 130 mcg (0.13 mg) dose has therapeutic effect on lowering HbA1c vs. Placebo.

It should further be noted that the differences in peak values between the studies support the evidence that in the presence of free-unbound agonist, a higher peak ensues. The absence of such material in the later study supports the evidence that fully albumin bound results in rapid transit of the molecule to the tissue compartment via the gp60 pathway. These findings furthermore support the evidence that fully bound albumin agonist participates provides a prolonged half-life of the GLP-1R agonist via not only through FcRn recycling but also via the transcytosis effect mediated through the endothelial cell receptor pathway of gp60, transporting the Albumin-bound molecule from the plasma compartment to the tissue compartment. The presence of fully-bound agonist with functional albumin resulting in rapid transcytosis of the albumin-bound agonist from the plasma compartment to the tissue compartment, thus contributes to the lower peak levels noted in this study. The difference in peak plasma values of unbound versus fully bound agonist is seen for both the 0.10 mg and the 0.20 mg doses, reflecting the biological potential of gp60/caveolin-1/caveolae transcytosis induced by albumin, transporting the molecule from the blood compartment to the tissue compartment. In conclusion, fully albumin-bound agonists may provide a lower peak plasma level at equivalent doses with steady state half-life and in so doing, may reduce the adverse events associated with rapid acute onset of peak plasma levels upon administration of the drug.

once a week, 0.1 mg to 0.13 mg once a week, and 0.1 mg twice a week over a period of 85 days, and exemplary results are shown in FIG. 15. As can be clearly taken from FIG. 15, administration of the retro-Michael resistant albenatide had a statistically significant and dose-dependent effect of the reduction of fasting blood glucose. Indeed, subjects receiving 0.1 mg weekly had a reduction in blood glucose of about 18 mg/dl, subjects receiving 0.1-0.13 mg weekly had a reduction in blood glucose of about 20.4 mg/dl, and subjects receiving 0.1 mg twice weekly had a reduction in blood glucose of about 23.9 mg/dl on day 85. Similarly, when looking at a reduction in HbA1c over 85 days in Type 2 diabetic subjects, the inventors noted that subjects receiving 0.1 mg weekly had a reduction in HbA1c of about 0.8%, subjects receiving 0.1-0.13 mg weekly had a reduction in HbA1c of about 0.8%, and subjects receiving 0.1 mg twice weekly had a reduction in HbA1c of about 1.4%, on day 85. Thus, therapeutic efficacy at a very low dose was achieved.

Figure 17:
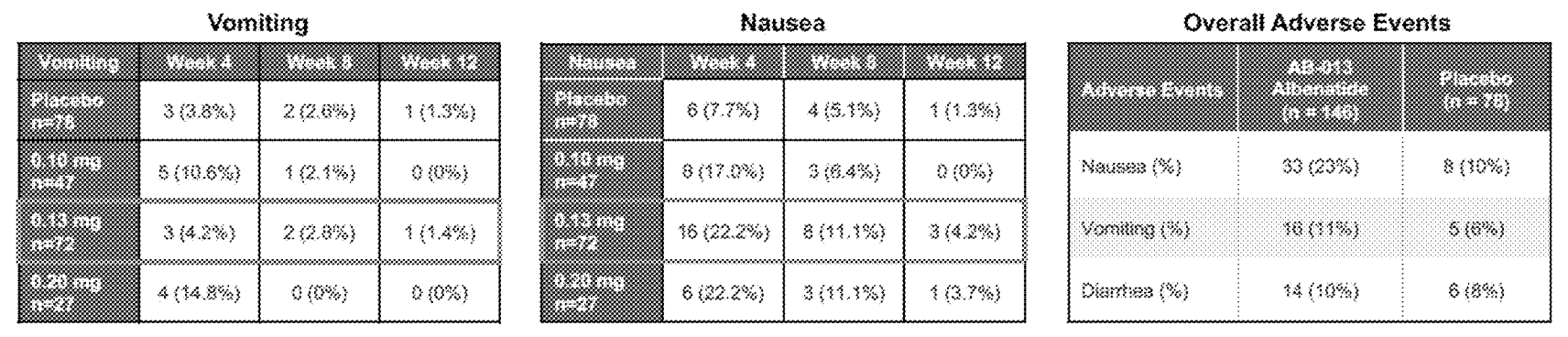

Even more advantageously, the inventors discovered that the same group of subjects experienced a substantially lowered rate of adverse events, and particularly a reduced incidence of vomiting and nausea, indicating that contemplated retro-Michael resistant compounds have a very high therapeutic index. As can be readily seen from the exemplary results in FIG. 17, the retro-Michael resistant albenatide (AB-013-AEEA-succinimide-albumin) was well tolerated at the 0.13 mg dose. Indeed, base don the data shown in FIG. 17 the inventors contemplated that the dose can be increased via a titration program to 0.2 mg at week 12.

Figure 18:
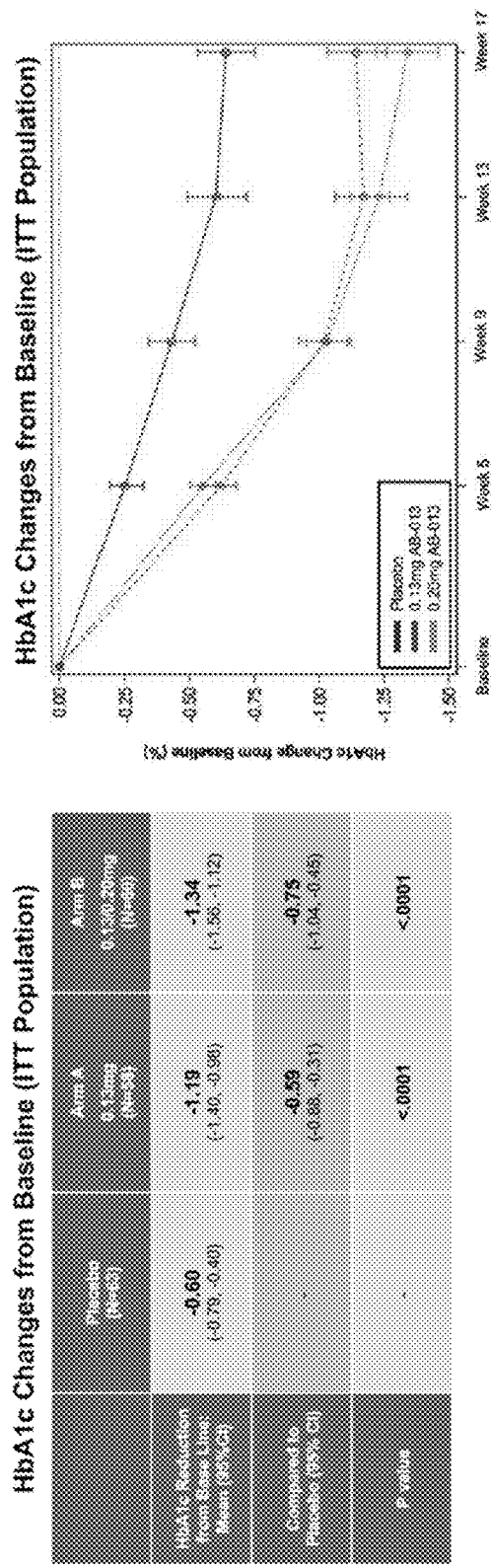
FIG. 18 depicts exemplary results establishing that a 0.13 mg ultra-low dose of AB-013 could achieve a therapeutic effect in T2D subjects on metformin. Here, an ultra-low dose of 0.13 mg of albenatide resulted in a HbA1c reduction by week 5 with reduction of >1% by Week 9 and sustained this reduction to the end of the study at Week 17, which confirms the hypothesis that an albumin-bound Exendin-4 binds to the GLP-1 receptor with therapeutic effect at an ultralow dose (0.13 mg compared to 2.4 mg of semaglutide)).

In additional studies extending up to 25 weeks in subjects with Type 2 diabetes with metformin therapy, the inventors once mor found that low dosages of the retro-Michael resistant albenatide (AB-013-AEEA-succinimide-albumin) at 0.13 mg or 0.20 mg consistently lowered HbA1c in a statistically significant manner at very low adverse effect rates as is exemplarily shown in FIG. 18. Here, an ultra-low dose of 0.13 mg of retro-Michael resistant albenatide (AB-013-AEEA-succinimide-albumin) resulted in a significant HbA1c reduction by week 5, and a reduction of >1% by Week 9. Such findings, along with the substantially lowered The Table below provides exemplary pharmacokinetic at 1 mg to 3 mg of retro-Michael resistant albenatide (AB-013-AEEA-succinimide-albumin).

|  | 1.0 mg (0.065 mg) (n = 18) | 1.5 mg (0.10 mg) (n = 18) | 2.0 mg (0.13 mg) (n = 23) | 3.0 mg (0.20 mg) (n = 6) |
| --- | --- | --- | --- | --- |
| Cmax (ng/mL) | 18.2 | 40.3 | 46.4 | 81.5 |
| Tmax (h) | 112.0 | 82.6 | 88.8 | 112.8 |
| AUC0-24 (ng · h/mL) | 138 | 500 | 577 | 1,146 |
| AUClast (ng · h/mL) | 4,778 | 13,209 | 15,654 | 27,277 |
| AUC0-inf (ng · h/mL) | 11,512 | 17,376 | 19,516 | 30,361 |
| AUCextra (%) | 25.6 | 21.5 | 19.8 | 11.2 |
| t½ (h) | 249.9 | 229.8 | 232.1 | 212.9 |
| kel (h−1) | 0.00325 | 0.00313 | 0.00307 | 0.00337 |
| MRT (h) | 385.4 | 355.7 | 367.4 | 335.2 |
| Cl/F (mL/min) | 1.48 | 1.55 | 1.82 | 1.86 |
| Vd/F (L) | 33.8 | 31.2 | 37.1 | 34.9 |

Figure 19:
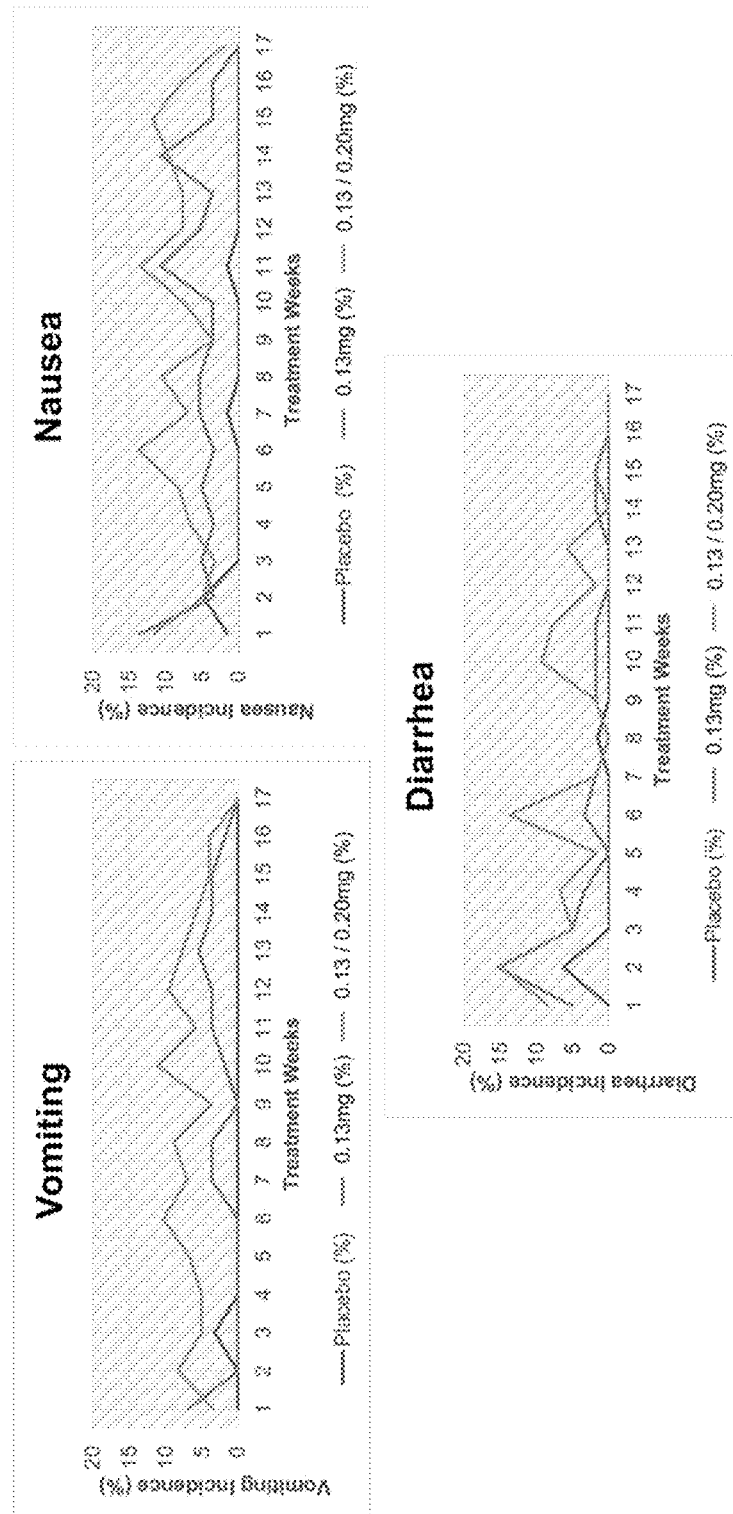
FIG. 19 depicts exemplary results for GI Adverse Effect (Nausea, Vomiting, Diarrhea) at 0.13 mg and 0.20 mg Versus Placebo in T2D Subjects. Here, GI adverse events were less than <5% by week 9 (vomiting, nausea, and diarrhea) in subjects receiving 0.13 mg without titration. At this ultra-low dose, HbA1c decreased >1%. Thus, highest therapeutic index achieved with demonstration that even at this ultra-low dose, a therapeutic activity is observed.
Figure 22:
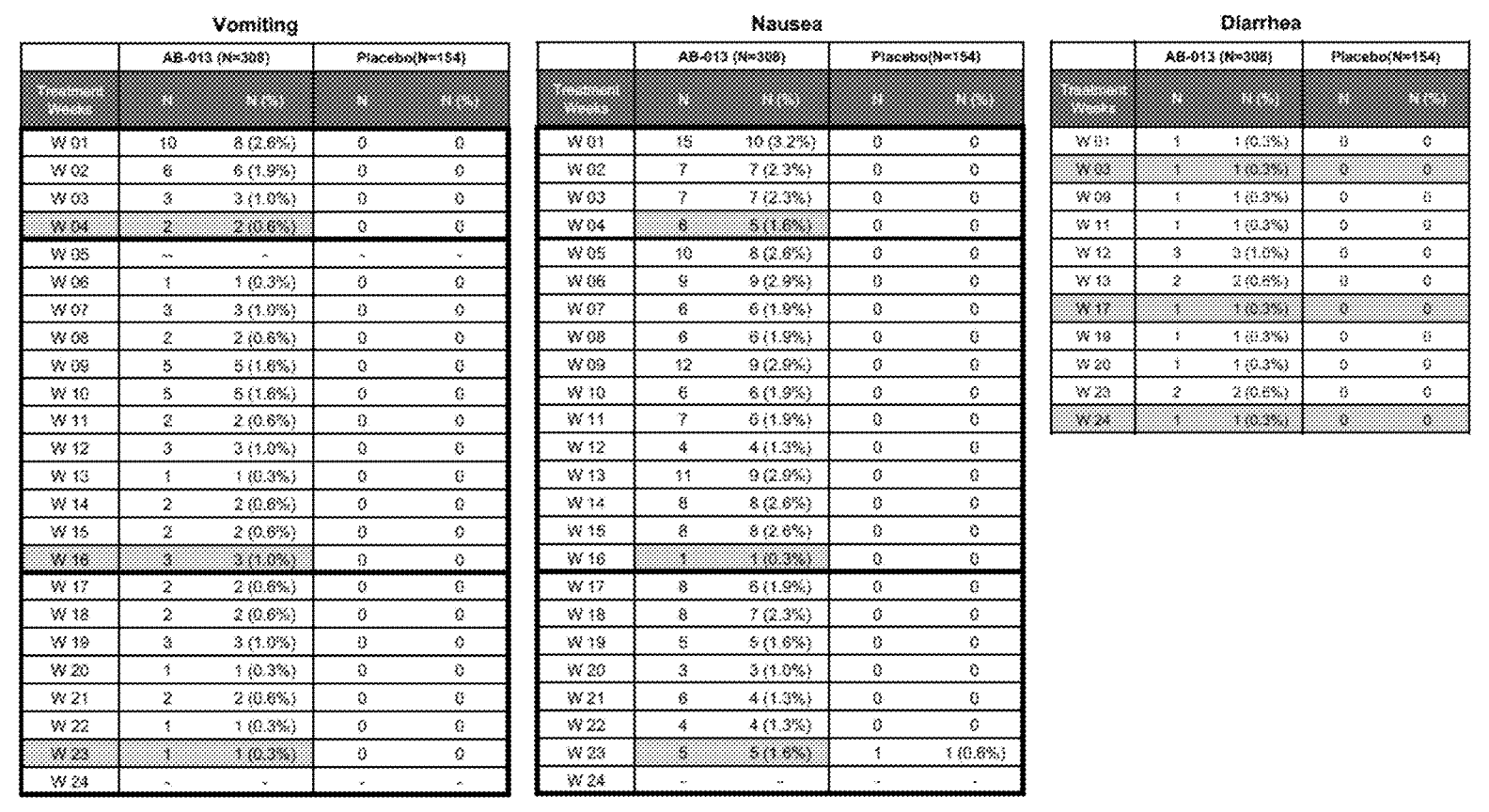

The inventors further set out to determine whether contemplated compounds, and in particular the retro-Michael resistant albenatide (AB-013-AEEA-succinimide-albumin) would be effective in human subjects at a low dose (here: 130 mcg of agonist peptide) to reduce fasting blood glucose and HbA1c upon administration of the compound. To that effect, the inventors analyzed that glucose and HbA1c from Type 2 diabetic subjects that had received placebo, 0.1 mg blood glucose in earlier studies confirms the hypothesis that the irreversibly albumin-bound Exendin-4 binds effectively to the GLP-1 receptor with a therapeutic effect at an ultralow dose. In that context, it should be noted that a comparable effect with semaglutide (reversibly associated exendin-4) requires a substantially higher dosage of at least 2.4 mg exendin-4, leading to significantly higher rates adverse effects due to the unbound exendin-4 concentration in plasma. FIG. 19 depicts exemplary results for adverse effects in the same patient population. As can be readily seen from FIG. 19, GI adverse events were less than <5% by week 9 (vomiting, nausea, and diarrhea) in subjects receiving 0.13 mg without titration and sustained this reduction to the end of the study at Week 17. At this ultra-low dose, HbAIC decrease by more than 1.0%. FIG. 20 and FIG. 21 depict results of two further studies in which Type 2 diabetes patients on metformin or metformin-naïve, respectively, received once weekly 0.13 mg doses of retro-Michael resistant albenatide (AB-013-AEEA-succinimide-albumin) without titration. Here, at week 25, subjects with Type 2 diabetes patients on metformin had a reduction of HbA1c of 0.7%, while subjects with Type 2 diabetes patients (metformin-naïve) had a reduction of HbA1c of 1.2%. FIG. 22 depicts adverse events after week 24 for these study populations. Once more, it should be appreciated that at the ultra-low dose of 0.13 mg without titration, the GI adverse events were minimal with less than 2% by week 4 for vomiting, nausea, and diarrhea.

Figure 33:
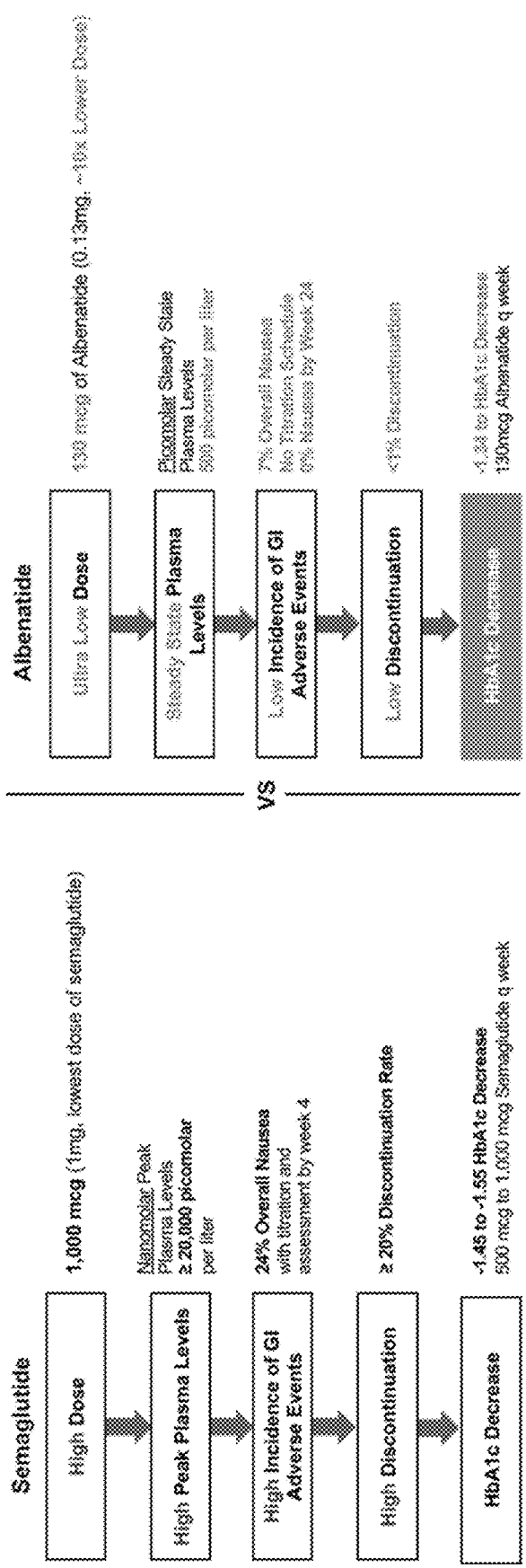
FIG. 33 is an exemplary comparison of AB-013 with semaglutide, illustrating higher therapeutic index and other benefits.

FIG. 32 is illustrative of the unexpected advantages of contemplated compounds, and particularly of retro-Michael resistant fusion proteins, such as retro-Michael resistant albenatide (AB-013-AEEA-succinimide-albumin). Heretofore it was believed that only the free fraction of a peptide agonist in the plasma that is not bound to albumin would be available to activate GLP-1, GIP, and/or Glucagon Receptors, and it was believed that albumin-bound GLP-1 is not available for binding to a receptor in an effective manner (or at all). Indeed, albugiptide had activity only at ultra-high quantities of the peptide agonist (50,000 mcg), while other compositions in which the peptide agonist was non-covalently associated with albumin administered quantities were about 15,000 mcg for some injected forms, while semaglutide still required 2,400 mcg at the lowest administered dose. In contrast, retro-Michael resistant albenatide (AB-013-AEEA-succinimide-albumin) provides about 130 mcg per dosage of the modified exendin-4, rendering the retro-Michael resistant fusion protein much more tolerable while maintaining therapeutic effect. FIG. 33 illustrates the same situation in more detail, comparing semaglutide administration with retro-Michael resistant albenatide (AB-013-AEEA-succinimide-albumin) administration. As can be readily taken from FIG. 33, administration of retro-Michael resistant albenatide required for steady-state plasma levels and zero nausea by the end of the study with similar drops in HbA1c a dose that is about 10 times lower that the lowest dose for semaglutide.

Figure 34A:
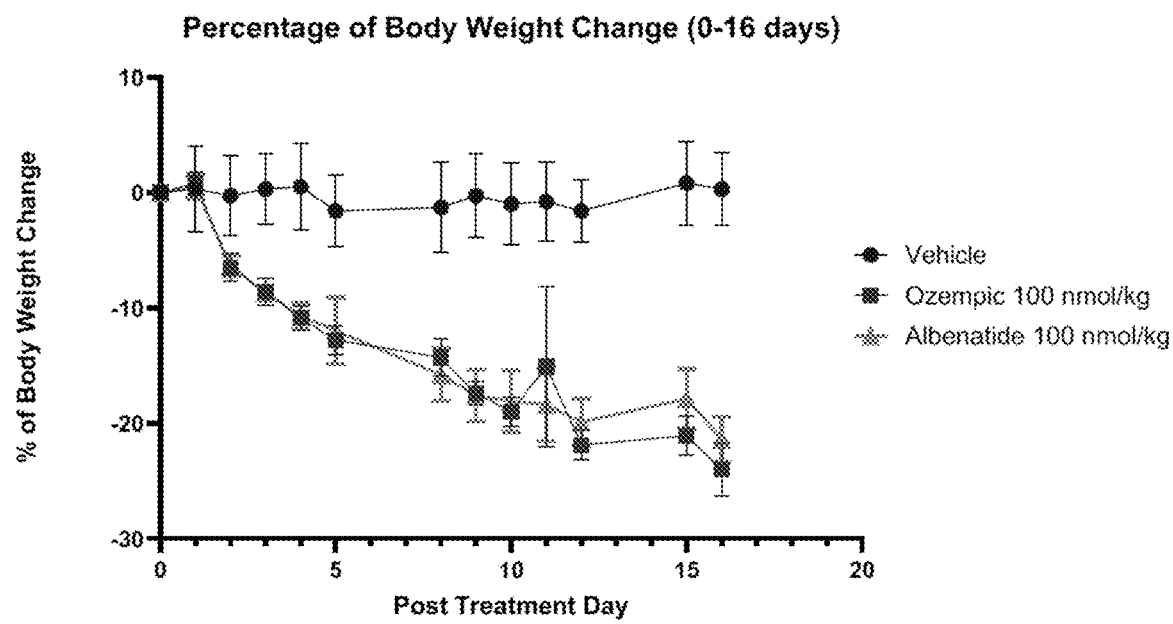
FIGS. 34A and 34B are graphs depicting exemplary results for average body weight changes of mice after dosing with test compounds and control.
Figure 34B:
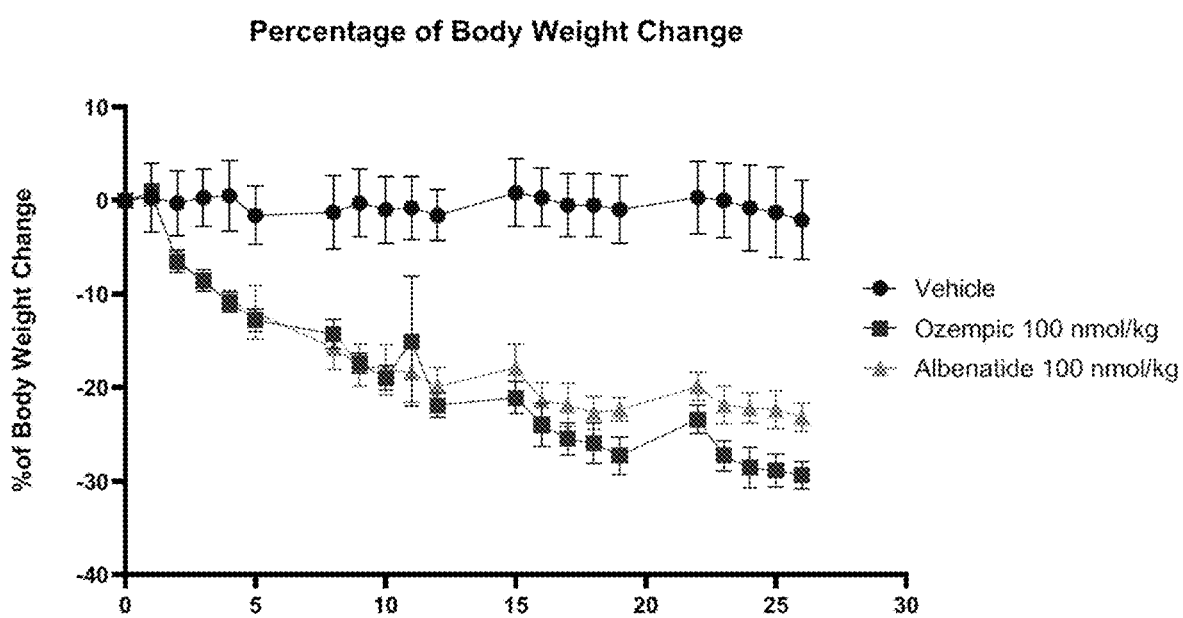
Figure 35:
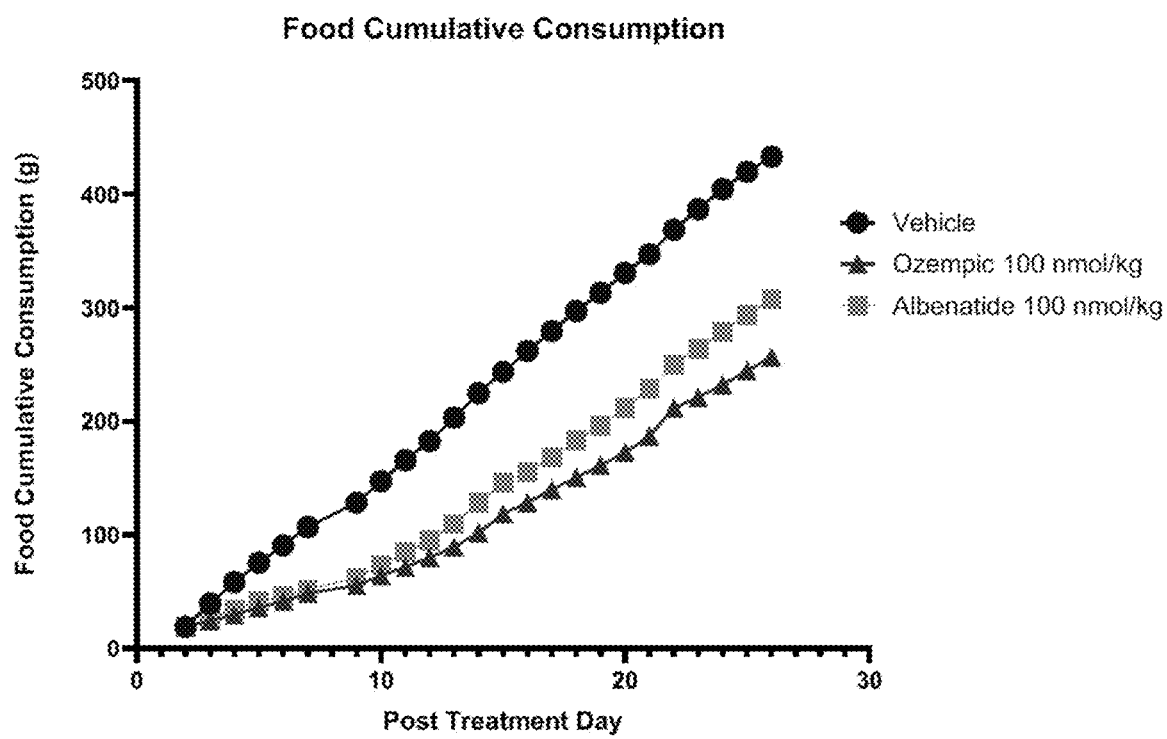
FIG. 35 is a graph depicting exemplary results for cumulative food consumption of mice after dosing with test compounds and controls.
Figure 36:
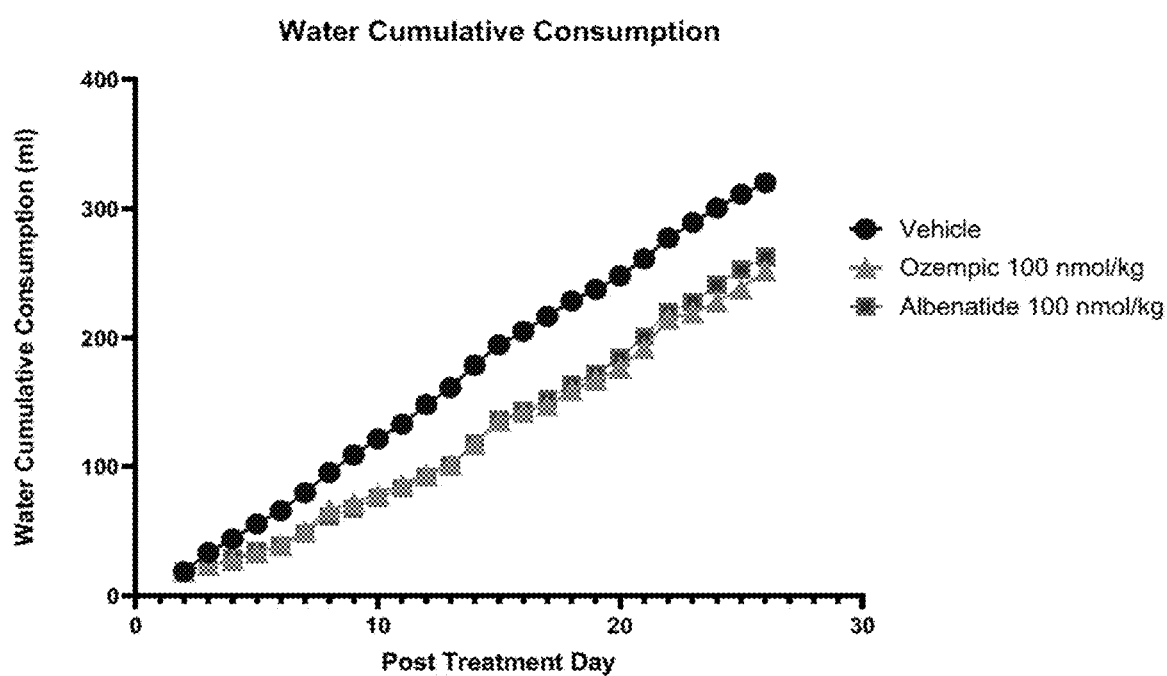
FIG. 36 is a graph depicting exemplary results for cumulative water consumption of mice after dosing with test compounds and controls.

In still further experiments to confirm that contemplated compounds presented herein are also effective as modulators for hepatic metabolism, and particularly in the treatment and even at least partial reversion of NASH (non-alcoholic steatohepatosis), the inventors tested selected compounds in DIO (diet induced obesity) mice. More particularly, DIO mice received a subcutaneous injection of either semaglutide (OZEMPIC™, NovoNordisk) or retro-Michael resistant albenatide (AB-013-AEEA-succinimide-albumin) at a single dosage of 100 nmol/kg. The body weight of all treated animals was recorded over 26 days, and average body weight over time for 16 and 26 days are shown in FIG. 34A and FIG. 34B, respectively. AS can be readily seen, both tested compounds were effective in reduction of body weight, which is also reflected in FIG. 35 showing results for cumulative food consumption and FIG. 36 showing results for cumulative water consumption.

Figure 37:
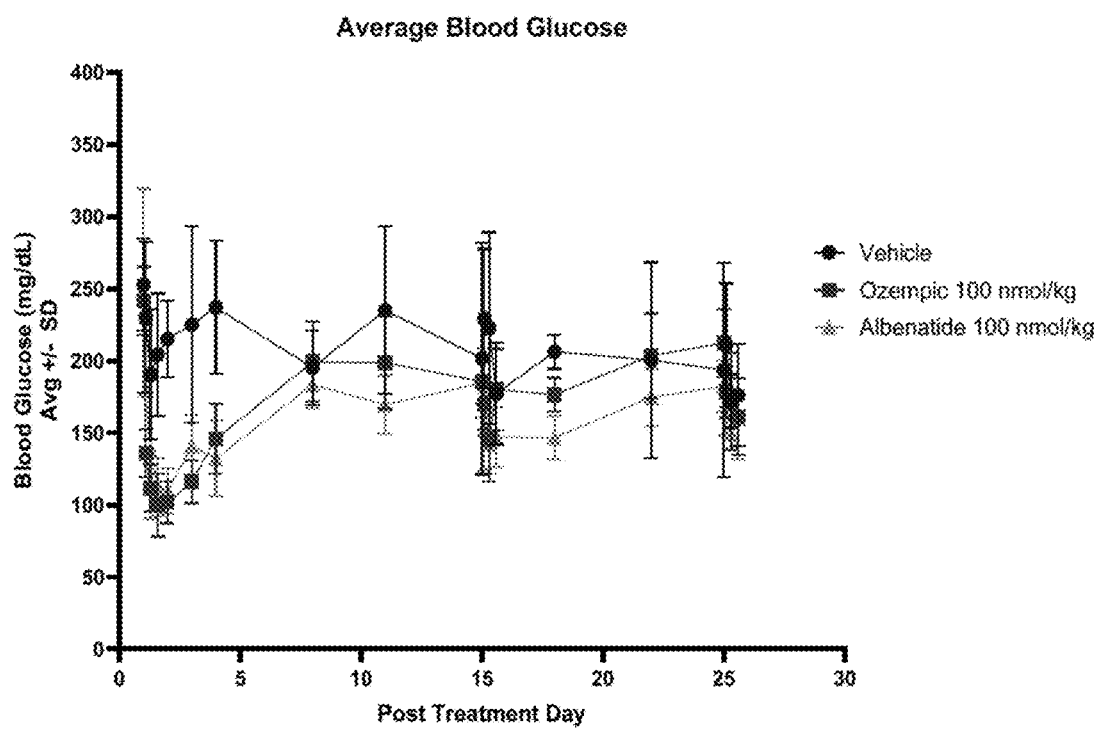
FIG. 37 is a graph depicting exemplary results for average blood glucose of mice after dosing with test compounds and controls.
Figure 38:
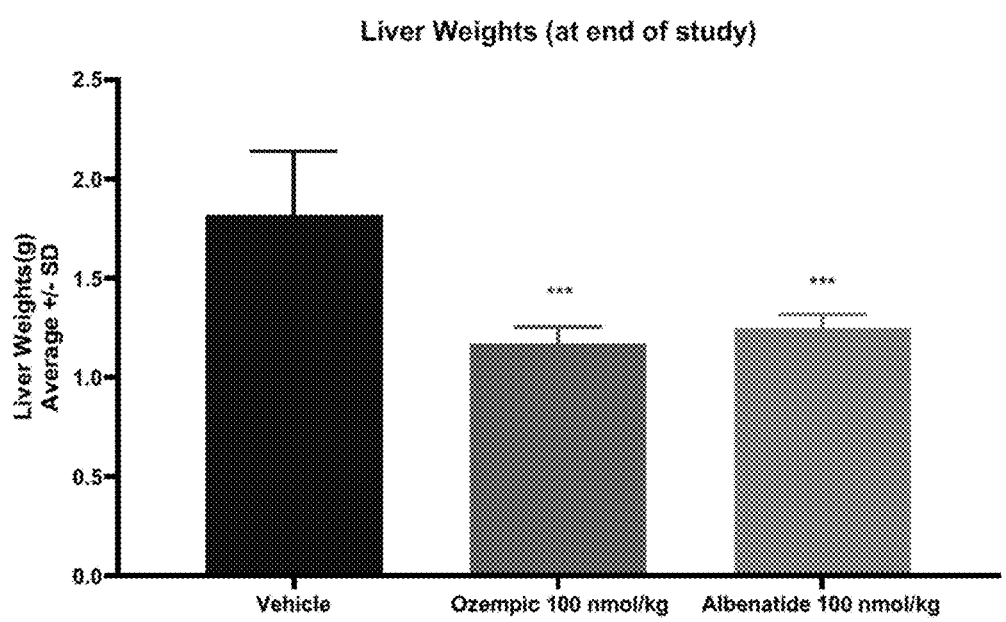
FIG. 38 is a graph depicting exemplary results for liver weight of mice after dosing with test compounds and controls.
Figure 39:
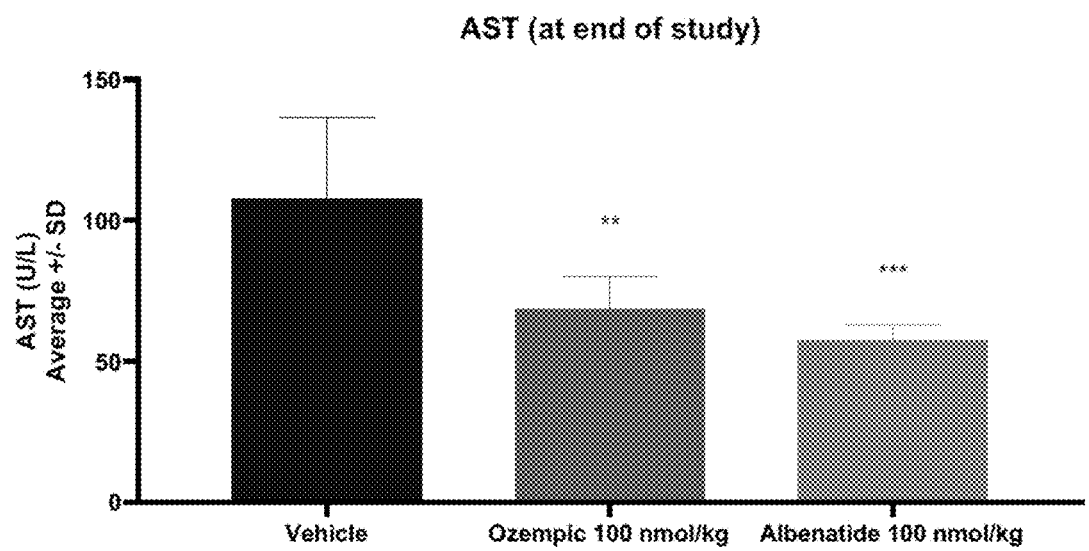
FIG. 39 is a graph depicting exemplary results for AST values of mice at the end of the study after dosing with test compounds and controls.
Figure 40:
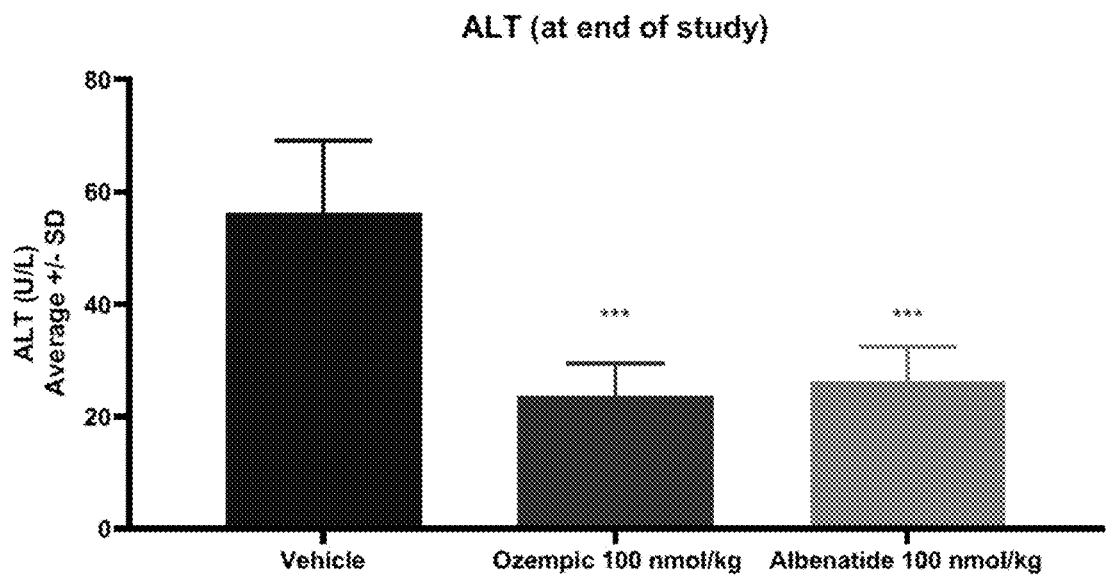
FIG. 40 is a graph depicting exemplary results for ALT values of mice at the end of the study after dosing with test compounds and controls.

Blood glucose was followed over the entire test period, and as can be seen from the data in FIG. 37, the blood glucose level was substantially reduced post injection and trended towards control over time. To investigate liver function and metabolism, liver weight was determined at the end of the study and results are shown in FIG. 38. As can be readily seen from FIG. 38, liver weight was significantly reduced in both test groups versus placebo, indicating a reduction in hepatic lipids. In addition, liver function was assessed at the end of the study by testing AST (aspartate aminotransferase) and ALT (alanine transaminase). Notably, as shown in FIG. 39 (AST) and FIG. 40 (ALT), both liver enzymes indicated a significant improvement over control, once more demonstrating the hepatoprotective effect of retro-Michael resistant albenatide (AB-013-AEEA-succinimide-albumin).

Figure 41:
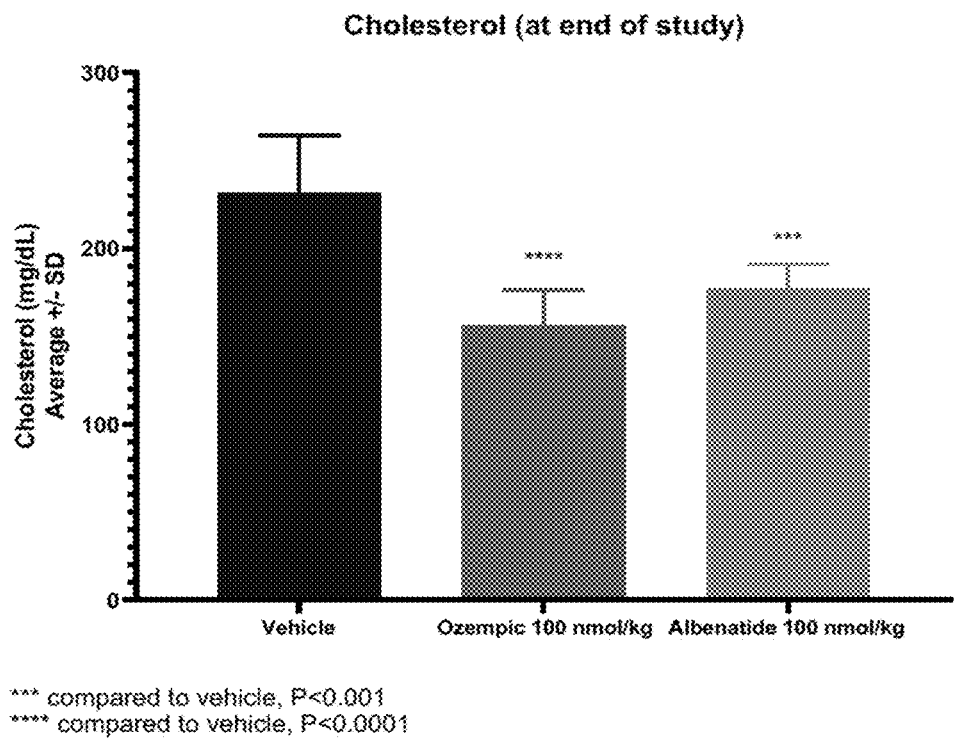
FIG. 41 is a is a graph depicting exemplary results for total cholesterol of mice at the end of the study after dosing with test compounds and controls.
Figure 42:
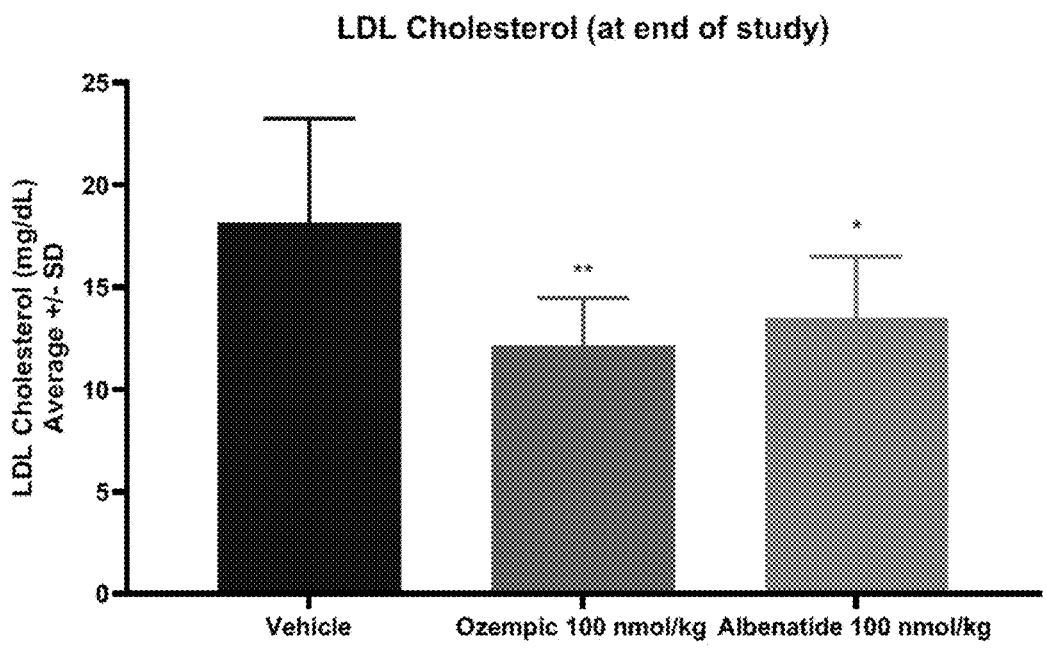
FIG. 42 is a is a graph depicting exemplary results for LDL cholesterol of mice at the end of the study after dosing with test compounds and controls.
Figure 43:
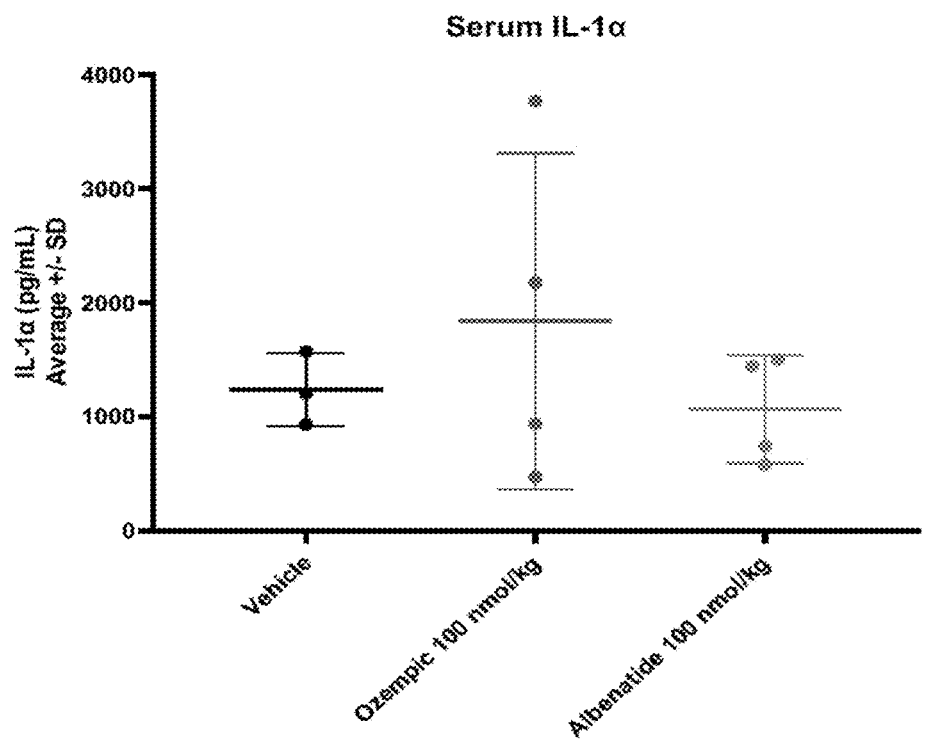
FIG. 43 is a graph depicting exemplary results for serum IL-1a of mice after dosing with test compounds and controls.
Figure 44:
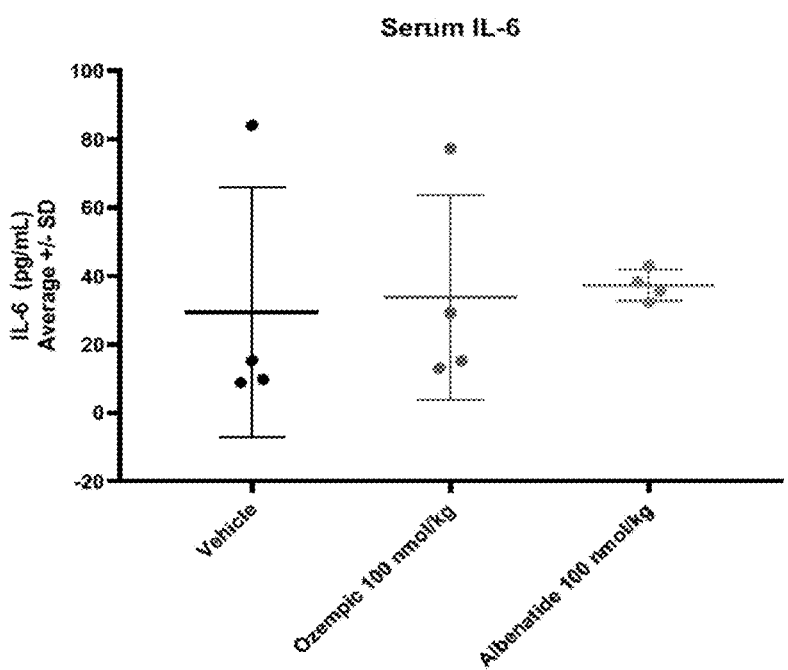
FIG. 44 is a graph depicting exemplary results for serum IL-6 of mice after dosing with test compounds and controls.

In still further tests for hepatic metabolic modulation, the inventors also determined total cholesterol and LDL cholesterol at the end of the study, and exemplary results are shown in FIG. 41 (for total cholesterol) and FIG. 42 (for LDL cholesterol). Remarkably here as well, total cholesterol and LDL cholesterol were substantially reduced after administration of only a single dose. As diet induced obesity is also often associated with inflammation, the inventors also measured levels of selected pro-inflammatory cytokines. Here, IL-1α and IL-6 levels were determined at the end of the study. Interestingly, in animals treated with retro-Michael resistant albenatide (AB-013-AEEA-succinimide-albumin), both measured pro-inflammatory cytokines were tightly grouped as compared to the semaglutide treatment group, suggesting an anti-inflammatory effect even 25 days post injection.

Figure 45:
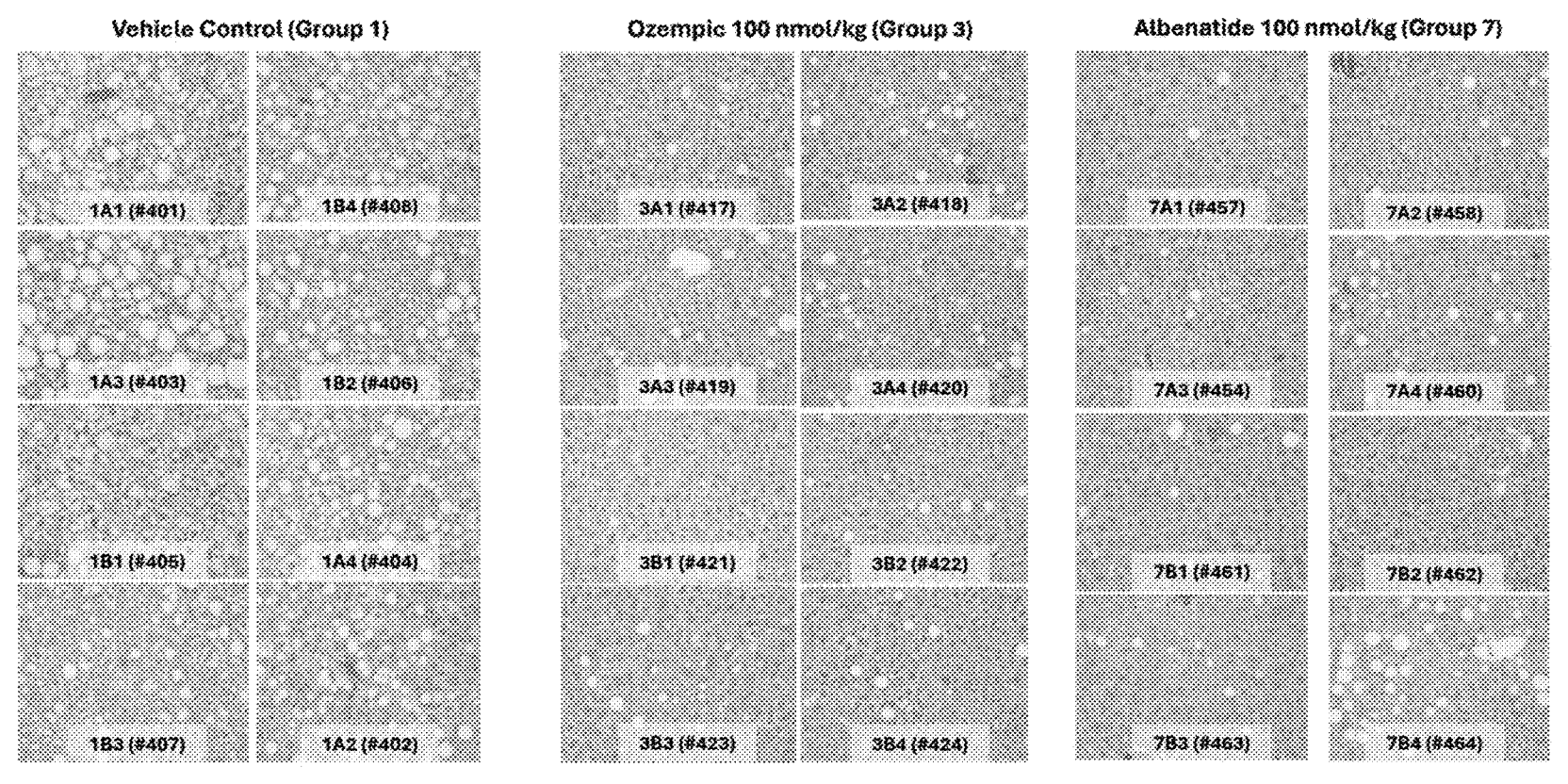

Finally, to confirm that the blood lipid and liver weight reduction by retro-Michael resistant albenatide (AB-013-AEEA-succinimide-albumin) treated animals was due to hepatic lipid loss, the livers of the mice were sectioned and stained with hematoxylin and eosin. AS can be readily seen form the photomicrographs in FIG. 45, intracellular lipid droplets were abundantly present in the control animals whereas in the treatment group with retro-Michael resistant albenatide (AB-013-AEEA-succinimide-albumin), hepatic lipid accumulation was substantially reduced. Therefore, it should be recognized that contemplated compounds, and especially retro-Michael resistant albenatide (AB-013-AEEA-succinimide-albumin) is effective in halting progression of, and even at least partially reversing NASH.

It will be appreciated that the invention extends to any nucleic acid or peptide or variant, derivative or analogue thereof, which comprises substantially the amino acid or nucleic acid sequences of any of the sequences referred to herein, including variants or fragments thereof. The terms "substantially the amino acid/nucleotide/peptide sequence", "variant" and "fragment", can be a sequence that has at least 40% sequence identity with the amino acid/nucleotide/peptide sequences of any one of the sequences referred to herein, for example 40% identity with the sequence identified as SEQ ID No:1-471 and so on.

Amino acid/polynucleotide/polypeptide sequences with a sequence identity which is greater than 65%, more preferably greater than 70%, even more preferably greater than 75%, and still more preferably greater than 80% sequence identity to any of the sequences referred to are also envisaged. Preferably, the amino acid/polynucleotide/polypeptide sequence has at least 85% identity with any of the sequences referred to, more preferably at least 90% identity, even more preferably at least 92% identity, even more preferably at least 95% identity, even more preferably at least 97% identity, even more preferably at least 98% identity and, most preferably at least 99% identity with any of the sequences referred to herein.

The skilled technician will appreciate how to calculate the percentage identity between two amino acid/polynucleotide/polypeptide sequences. In order to calculate the percentage identity between two amino acid/polynucleotide/polypeptide sequences, an alignment of the two sequences must first be prepared, followed by calculation of the sequence identity value. The percentage identity for two sequences may take different values depending on:—(i) the method used to align the sequences, for example, ClustalW, BLAST, FASTA, Smith-Waterman (implemented in different programs), or structural alignment from 3D comparison; and (ii) the parameters used by the alignment method, for example, local vs global alignment, the pair-score matrix used (e.g. BLOSUM62, PAM250, Gonnet etc.), and gap-penalty, e.g. functional form and constants. Having made the alignment, there are many different ways of calculating percentage identity between the two sequences. For example, one may divide the number of identities by: (i) the length of shortest sequence; (ii) the length of alignment; (iii) the mean length of sequence; (iv) the number of non-gap positions; or (v) the number of equivalenced positions excluding overhangs. Furthermore, it will be appreciated that percentage identity is also strongly length dependent. Therefore, the shorter a pair of sequences is, the higher the sequence identity one may expect to occur by chance. Hence, it will be appreciated that the accurate alignment of protein or DNA sequences is a complex process. The popular multiple alignment program ClustalW (Thompson et al., 1994, Nucleic Acids Research, 22, 4673-4680; Thompson et al., 1997, Nucleic Acids Research, 24, 4876-4882) is a preferred way for generating multiple alignments of proteins or DNA in accordance with the invention. Suitable parameters for ClustalW may be as follows: For DNA alignments: Gap Open Penalty=15.0, Gap Extension Penalty=6.66, and Matrix=Identity. For protein alignments: Gap Open Penalty=10.0, Gap Extension Penalty=0.2, and Matrix=Gonnet. For DNA and Protein alignments: ENDGAP=−1, and GAPDIST=4. Those skilled in the art will be aware that it may be necessary to vary these and other parameters for optimal sequence alignment.

Preferably, suitable calculations of the percentage identities between two amino acid/polynucleotide/polypeptide sequences may then be calculated from such an alignment as (N/T)*100, where N is the number of positions at which the sequences share an identical residue, and T is the total number of positions compared including gaps and either including or excluding overhangs. Preferably, overhangs are included in the calculation. Hence, a most preferred method for calculating percentage identity between two sequences comprises (i) preparing a sequence alignment using the ClustalW program using a suitable set of parameters, for example, as set out above; and (ii) inserting the values of N and T into the following formula:—Sequence Identity=(N/T)*100. Alternative methods for identifying similar sequences will be known to those skilled in the art. For example, a substantially similar nucleotide sequence will be encoded by a sequence which hybridizes to DNA sequences or their complements under stringent conditions. By stringent conditions, we mean the nucleotide hybridizes to filter-bound DNA or RNA in 3× sodium chloride/sodium citrate (SSC) at approximately 45° C. followed by at least one wash in 0.2×SSC/0.1% SDS at approximately 20-65° C.

Alternatively, a substantially similar polypeptide may differ by at least 1, but less than 5, 10, 20, 50 or 100 amino acids from the sequences shown in, for example, in the amino acid sequence that are included within SEQ ID Nos: 1-471. Due to the degeneracy of the genetic code, it is clear that any nucleic acid sequence described herein could be varied or changed without substantially affecting the sequence of the protein encoded thereby, to provide a functional variant thereof. Suitable nucleotide variants are those having a sequence altered by the substitution of different codons that encode the same amino acid within the sequence, thus producing a silent change. Other suitable variants are those having homologous nucleotide sequences but comprising all, or portions of, sequence, which are altered by the substitution of different codons that encode an amino acid with a side chain of similar biophysical properties to the amino acid it substitutes, to produce a conservative change. For example, small non-polar, hydrophobic amino acids include glycine, alanine, leucine, isoleucine, valine, proline, and methionine. Large non-polar, hydrophobic amino acids include phenylalanine, tryptophan and tyrosine. The polar neutral amino acids include serine, threonine, cysteine, asparagine and glutamine. The positively charged (basic) amino acids include lysine, arginine and histidine. The negatively charged (acidic) amino acids include aspartic acid and glutamic acid. It will therefore be appreciated which amino acids may be replaced with an amino acid having similar biophysical properties, and the skilled technician will know the nucleotide sequences encoding these amino acids.

In some embodiments, the numbers expressing quantities of ingredients, properties such as concentration, reaction conditions, and so forth, used to describe and claim certain embodiments of the invention are to be understood as being modified in some instances by the term "about." As used herein, the terms "about" and "approximately", when referring to a specified, measurable value (such as a parameter, an amount, a temporal duration, and the like), is meant to encompass the specified value and variations of and from the specified value, such as variations of +/−10% or less, alternatively +/−5% or less, alternatively +/−1% or less, alternatively +/−0.1% or less of and from the specified value, insofar as such variations are appropriate to perform in the disclosed embodiments. Thus, the value to which the modifier "about" or "approximately" refers is itself also specifically disclosed. The recitation of ranges of values herein is merely intended to serve as a shorthand method of referring individually to each separate value falling within the range. Unless otherwise indicated herein, each individual value is incorporated into the specification as if it were individually recited herein.

As used herein, the term "administering" a pharmaceutical composition or drug refers to both direct and indirect administration of the pharmaceutical composition or drug, wherein direct administration of the pharmaceutical composition or drug is typically performed by a health care professional (e.g., physician, nurse, etc.), and wherein indirect administration includes a step of providing or making available the pharmaceutical composition or drug to the health care professional for direct administration (e.g., via injection, infusion, oral delivery, topical delivery, etc.). It should further be noted that the terms "prognosing" or "predicting" a condition, a susceptibility for development of a disease, or a response to an intended treatment is meant to cover the act of predicting or the prediction (but not treatment or diagnosis of) the condition, susceptibility and/or response, including the rate of progression, improvement, and/or duration of the condition in a subject.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of treating a subject, comprising:
administering a therapeutically effective amount of a pharmaceutical composition to the subject in need thereof;
wherein the pharmaceutical composition comprises a fusion protein in which a Class B G protein-coupled receptor (GPCR) agonist peptide is, via a linker, covalently coupled to a $Cys_{34}$ amino acid of a conformationally modified albumin, wherein the albumin has no hydrophobic ligands in any hydrophobic fatty acid binding pockets, wherein the covalent coupling creates a stereo preferred or stereoselective chirality center;
wherein the pharmaceutical composition is substantially free of unbound GLP-1 agonist peptide; and
wherein the therapeutically effective amount is equal or less than 1,000 mcg of the Class B GPCR agonist peptide administered once per week.

2. The method of claim 1, wherein the therapeutically effective amount is equal or less than 260 mcg of the Class B GPCR agonist peptide administered once per week by subcutaneous injection.

3. The method of claim 1, wherein the therapeutically effective amount is equal or less than 130 mcg of the Class B GPCR agonist peptide administered once per week by subcutaneous injection.

4. The method of claim 1, wherein the step of administering the therapeutically effective amount is performed with titration.

5. The method of claim 1, wherein the albumin is conformationally modified, and wherein the pharmaceutical composition has a pH of pH <7.0.

6. The method of claim 1, wherein the pharmaceutical composition further comprises albumin having an unreacted $Cys_{34}$ group, and wherein the pharmaceutical composition has a pH of pH <7.0.

7. The method of claim 1, wherein the composition, upon administration, reduces blood glucose, reduces HbA1c, and reduces hepatic lipid accumulation.

8. The method of claim 1, wherein the subject is diagnosed with a metabolic disorder.

9. The method of claim 8, wherein the metabolic disorder is selected from the group consisting of NIDDM (non-insulin dependent diabetes mellitus), NASH (non-alcoholic steatohepatosis/steatohepatitis), and obesity.

10. The method of claim 1, wherein the subject is diagnosed with a neurodegenerative disease.

11. The method of claim 10, wherein the neurodegenerative disease is selected from the group consisting of Parkinson's Disease, Alzheimer's Disease, peripheral neuropathy, multiple sclerosis, and amyotrophic lateral sclerosis (ALS).

12. The method of claim 1, wherein the subject is diagnosed with an autoimmune or inflammatory disease.

13. The method of claim 12, wherein the autoimmune or inflammatory disease is selected from the group consisting of Crohn's disease, irritable bowel syndrome (IBS), ulcerative colitis, and polycystic ovary syndrome.

14. The method of claim 1, wherein the GPCR agonist peptide is a GLP-1 agonist peptide.

15. The method of claim 1, wherein the GPCR agonist peptide is a GLP-1/GIP dual agonist peptide.

16. The method of claim 1, wherein the GPCR agonist peptide is a GLP-1/GIP/GcG tri-agonist peptide.

17. The method of claim 1, wherein the fusion protein is retro-Michael resistant albenatide (AB-013-AEEA-succinimide (SEQ ID NO:2)-albumin).

18. The method of claim 1, wherein the fusion protein is retro-Michael resistant albenatidex (AB-014-AEEA-succinimide (SEQ ID NO:185)-albumin).

19. The method of claim 1, wherein the fusion protein is retro-Michael resistant albugiptide (AB-029-AEEA-succinimide (SEQ ID NO:7)-albumin).

20. The method of claim 1, wherein the fusion protein is retro-Michael resistant albutide (AB-044-AEEA-succinimide (SEQ ID NO:223)-albumin).

* * * * *

SEQUENCE LISTING

```
Sequence total quantity: 471
SEQ ID NO: 1            moltype = AA  length = 31
FEATURE                 Location/Qualifiers
source                  1..31
                        mol_type = protein
                        organism = synthetic construct
MOD_RES                 31
                        note = AminoEthoxyEthoxyAcetic Acyl-MaleimidoPropionic Acyl
SITE                    2
                        note = D-alanine
SEQUENCE: 1
HAEGTFTSDV SSYLEGQAAK EFIAWLVKGR K                                      31

SEQ ID NO: 2            moltype = AA  length = 40
FEATURE                 Location/Qualifiers
source                  1..40
                        mol_type = protein
                        organism = synthetic construct
MOD_RES                 40
                        note = AminoEthoxyEthoxyAcetic Acyl-MaleimidoPropionic Acyl
SEQUENCE: 2
HGEGTFTSDL SKQMEEEAVR LFIEWLKNGG PSSGAPPPSK                             40

SEQ ID NO: 3            moltype = AA  length = 39
FEATURE                 Location/Qualifiers
source                  1..39
                        mol_type = protein
                        organism = synthetic construct
SEQUENCE: 3
HGEGTFTSDL SKQMEEEAVR LFIEWLKNGG PSSGAPPPS                              39

SEQ ID NO: 4            moltype = AA  length = 30
FEATURE                 Location/Qualifiers
source                  1..30
                        mol_type = protein
                        organism = synthetic construct
SEQUENCE: 4
HAEGTFTSDV SSYLEGQAAK EFIAWLVKGR                                        30

SEQ ID NO: 5            moltype = AA  length = 42
FEATURE                 Location/Qualifiers
source                  1..42
                        mol_type = protein
                        organism = synthetic construct
SEQUENCE: 5
YAEGTFISDY SIAMDKIHQQ DFVNWLLAQK GKKNDWKHNI TQ                          42

SEQ ID NO: 6            moltype = AA  length = 29
FEATURE                 Location/Qualifiers
source                  1..29
                        mol_type = protein
```

```
                             organism = synthetic construct
SEQUENCE: 6
HSQGTFTSDY SKYLDSRRAQ DFVQWLMNT                                   29

SEQ ID NO: 7              moltype = AA   length = 40
FEATURE                   Location/Qualifiers
source                    1..40
                          mol_type = protein
                          organism = synthetic construct
SITE                      2
                          note = D-alanine
MOD_RES                   40
                          note = AminoEthoxyEthoxyAcetic Acyl-MaleimidoPropionic Acyl
SEQUENCE: 7
HAEGTFTSDV SSYLEGQAAK EFIAWLVNGG PSSGAPPPSK                        40

SEQ ID NO: 8              moltype = AA   length = 40
FEATURE                   Location/Qualifiers
source                    1..40
                          mol_type = protein
                          organism = synthetic construct
SITE                      2
                          note = D-alanine
MOD_RES                   40
                          note = AminoEthoxyEthoxyAcetic Acyl-MaleimidoPropionic Acyl
SEQUENCE: 8
HAEGTFTSDY AKYLDARRAK EFIAWLVKGR PSSGAPPPSK                        40

SEQ ID NO: 9              moltype = AA   length = 39
FEATURE                   Location/Qualifiers
source                    1..39
                          mol_type = protein
                          organism = synthetic construct
MOD_RES                   32
                          note = AminoEthoxyEthoxyAcetic Acyl-MaleimidoPropionic Acyl
SEQUENCE: 9
HGEGTFTSDL SKQMEEEAVR LFIEWLKNGG PKSGAPPPS                         39

SEQ ID NO: 10             moltype = AA   length = 39
FEATURE                   Location/Qualifiers
source                    1..39
                          mol_type = protein
                          organism = synthetic construct
SITE                      2
                          note = D-alanine
MOD_RES                   12
                          note = AminoEthoxyEthoxyAcetic Acyl-MaleimidoPropionic Acyl
SEQUENCE: 10
HAEGTFTSDV SKYLEGQAAK EFIAWLVKGR PSSGAPPPS                         39

SEQ ID NO: 11             moltype = AA   length = 39
FEATURE                   Location/Qualifiers
source                    1..39
                          mol_type = protein
                          organism = synthetic construct
MOD_RES                   16
                          note = AminoEthoxyEthoxyAcetic Acyl-MaleimidoPropionic Acyl
SITE                      2
                          note = D-alanine
SEQUENCE: 11
HAEGTFTSDV SSYLEKQAAK EFIAWLVKGR PSSGAPPPS                         39

SEQ ID NO: 12             moltype = AA   length = 39
FEATURE                   Location/Qualifiers
source                    1..39
                          mol_type = protein
                          organism = synthetic construct
MOD_RES                   32
                          note = AminoEthoxyEthoxyAcetic Acyl-MaleimidoPropionic Acyl
SEQUENCE: 12
HGEGTFTSDL SKQMEEEAVR LFIEWLKNGG PKSGAPPPS                         39

SEQ ID NO: 13             moltype = AA   length = 40
FEATURE                   Location/Qualifiers
source                    1..40
                          mol_type = protein
                          organism = synthetic construct
SITE                      2
                          note = D-alanine
```

```
MOD_RES            40
                   note = AminoEthoxyEthoxyAcetic Acyl-MaleimidoPropionic Acyl
SEQUENCE: 13
HAEGTFTSDI NKVLDTIAAK EFIAWLVKGR PSSGAPPPSK                40

SEQ ID NO: 14      moltype = AA   length = 40
FEATURE            Location/Qualifiers
source             1..40
                   mol_type = protein
                   organism = synthetic construct
MOD_RES            40
                   note = Palmitic acyl // Hexadecanoic acyl
MOD_RES            2
                   note = Aib
MOD_RES            20
                   note = Aib
SEQUENCE: 14
YXEGTFTSDY SIYLDKQAAX EFVQWLLAGG PSSGAPPPSK                40

SEQ ID NO: 15      moltype = AA   length = 40
FEATURE            Location/Qualifiers
source             1..40
                   mol_type = protein
                   organism = synthetic construct
MOD_RES            40
                   note = AminoEthoxyEthoxyAcetic Acyl-MaleimidoPropionic Acyl
SITE               30
                   note = D-alanine
SEQUENCE: 15
YGGGTFTSDS FFYLELSHAK DFINWLQLGA PSSGAPPPSK                40

SEQ ID NO: 16      moltype = AA   length = 40
FEATURE            Location/Qualifiers
source             1..40
                   mol_type = protein
                   organism = synthetic construct
MOD_RES            2..3
                   note = Aib
MOD_RES            20
                   note = Aib
MOD_RES            28
                   note = Aib
MOD_RES            40
                   note = AminoEthoxyEthoxyAcetic Acyl-MaleimidoPropionic Acyl
SEQUENCE: 16
HXXGTFTSDE MNYLDDWMQX AFVNWLVXGI PSSGAPPPSK                40

SEQ ID NO: 17      moltype = AA   length = 40
FEATURE            Location/Qualifiers
source             1..40
                   mol_type = protein
                   organism = synthetic construct
MOD_RES            2
                   note = Aib
MOD_RES            40
                   note = AminoEthoxyEthoxyAcetic Acyl-MaleimidoPropionic Acyl
SEQUENCE: 17
FXPGTFTSDG HNYLDWQDAK EFIQWLGWGV PSSGAPPPSK                40

SEQ ID NO: 18      moltype = AA   length = 40
FEATURE            Location/Qualifiers
source             1..40
                   mol_type = protein
                   organism = synthetic construct
MOD_RES            2
                   note = Aib
MOD_RES            13
                   note = Aib
MOD_RES            20
                   note = Aib
MOD_RES            40
                   note = AminoEthoxyEthoxyAcetic Acyl-MaleimidoPropionic Acyl
SEQUENCE: 18
YXMGTFTSDP QIXLEMKEQX DFINWLNDGF PSSGAPPPSK                40

SEQ ID NO: 19      moltype = AA   length = 40
FEATURE            Location/Qualifiers
source             1..40
                   mol_type = protein
```

```
                            organism = synthetic construct
SITE                        2
                            note = D-alanine
MOD_RES                     13
                            note = Aib
MOD_RES                     20
                            note = Aib
MOD_RES                     40
                            note = AminoEthoxyEthoxyAcetic Acyl-MaleimidoPropionic Acyl
SEQUENCE: 19
HAPGTFTSDN HEXLDTYRQX DFINWLDTGV PSSGAPPPSK                              40

SEQ ID NO: 20               moltype = AA   length = 40
FEATURE                     Location/Qualifiers
source                      1..40
                            mol_type = protein
                            organism = synthetic construct
SITE                        2
                            note = D-alanine
MOD_RES                     40
                            note = AminoEthoxyEthoxyAcetic Acyl-MaleimidoPropionic Acyl
SEQUENCE: 20
YANGTFTSDI WAYLDSSFAQ DFVAWLYIGK PSSGAPPPSK                              40

SEQ ID NO: 21               moltype = AA   length = 40
FEATURE                     Location/Qualifiers
source                      1..40
                            mol_type = protein
                            organism = synthetic construct
MOD_RES                     2
                            note = Aib
MOD_RES                     40
                            note = AminoEthoxyEthoxyAcetic Acyl-MaleimidoPropionic Acyl
SEQUENCE: 21
HXDGTFTSDF EHYLEDAVQK AFIAWLSTGV PSSGAPPPSK                              40

SEQ ID NO: 22               moltype = AA   length = 40
FEATURE                     Location/Qualifiers
source                      1..40
                            mol_type = protein
                            organism = synthetic construct
MOD_RES                     13
                            note = Aib
MOD_RES                     20
                            note = Aib
MOD_RES                     40
                            note = AminoEthoxyEthoxyAcetic Acyl-MaleimidoPropionic Acyl
SEQUENCE: 22
FGDGTFTSDL RGXLEIMPQX AFVNWLTSGK PSSGAPPPSK                              40

SEQ ID NO: 23               moltype = AA   length = 40
FEATURE                     Location/Qualifiers
source                      1..40
                            mol_type = protein
                            organism = synthetic construct
SITE                        2..3
                            note = D-alanine
SITE                        10
                            note = D-serine
MOD_RES                     40
                            note = AminoEthoxyEthoxyAcetic Acyl-MaleimidoPropionic Acyl
SEQUENCE: 23
HAAGTFTSDS MIYLDNAHQQ EFIQWLFNGP PSSGAPPPSK                              40

SEQ ID NO: 24               moltype = AA   length = 40
FEATURE                     Location/Qualifiers
source                      1..40
                            mol_type = protein
                            organism = synthetic construct
SITE                        2
                            note = D-alanine
SITE                        10
                            note = D-serine
MOD_RES                     12
                            note = Aib
SITE                        16
                            note = D-alanine
MOD_RES                     20
                            note = Aib
```

```
                                  MOD_RES          40
                                                   note = AminoEthoxyEthoxyAcetic Acyl-MaleimidoPropionic Acyl
SEQUENCE: 24
HAIGTFTSDS TXYLEAYKQX DFVQWLHSGG PSSGAPPPSK                                           40

SEQ ID NO: 25        moltype = AA   length = 40
FEATURE              Location/Qualifiers
source               1..40
                     mol_type = protein
                     organism = synthetic construct
SITE                 2
                     note = D-serine
SITE                 10
                     note = D-alanine
SITE                 17
                     note = D-serine
MOD_RES              40
                     note = AminoEthoxyEthoxyAcetic Acyl-MaleimidoPropionic Acyl
SITE                 30
                     note = D-alanine
SEQUENCE: 25
YSWGTFTSDA GYYLDMSFQQ AFIQWLKAGA PSSGAPPPSK                                           40

SEQ ID NO: 26        moltype = AA   length = 40
FEATURE              Location/Qualifiers
source               1..40
                     mol_type = protein
                     organism = synthetic construct
MOD_RES              13
                     note = Aib
SITE                 17
                     note = D-alanine
SITE                 28
                     note = D-serine
MOD_RES              40
                     note = AminoEthoxyEthoxyAcetic Acyl-MaleimidoPropionic Acyl
SEQUENCE: 26
YGRGTFTSDW IYXLDTAPQK EFVEWLHSGA PSSGAPPPSK                                           40

SEQ ID NO: 27        moltype = AA   length = 40
FEATURE              Location/Qualifiers
source               1..40
                     mol_type = protein
                     organism = synthetic construct
SITE                 2
                     note = D-alanine
SITE                 10
                     note = D-serine
MOD_RES              13
                     note = Aib
MOD_RES              40
                     note = AminoEthoxyEthoxyAcetic Acyl-MaleimidoPropionic Acyl
SEQUENCE: 27
YAMGTFTSDS EEXLEMVYQQ AFVAWLPVGG PSSGAPPPSK                                           40

SEQ ID NO: 28        moltype = AA   length = 40
FEATURE              Location/Qualifiers
source               1..40
                     mol_type = protein
                     organism = synthetic construct
SITE                 2..3
                     note = D-serine
MOD_RES              13
                     note = Aib
MOD_RES              17
                     note = Aib
MOD_RES              20
                     note = Aib
MOD_RES              40
                     note = AminoEthoxyEthoxyAcetic Acyl-MaleimidoPropionic Acyl
SEQUENCE: 28
FSSGTFTSDW DWXLDIXIAX EFINWLVYGY PSSGAPPPSK                                           40

SEQ ID NO: 29        moltype = AA   length = 40
FEATURE              Location/Qualifiers
source               1..40
                     mol_type = protein
                     organism = synthetic construct
MOD_RES              2
```

```
                         note = Aib
MOD_RES                  40
                         note = AminoEthoxyEthoxyAcetic Acyl-MaleimidoPropionic Acyl
SEQUENCE: 29
FXGGTFTSDD MRYLEPKGQQ AFIQWLWVGQ PSSGAPPPSK                                  40

SEQ ID NO: 30            moltype = AA  length = 40
FEATURE                  Location/Qualifiers
source                   1..40
                         mol_type = protein
                         organism = synthetic construct
MOD_RES                  2
                         note = Aib
MOD_RES                  30
                         note = Aib
MOD_RES                  40
                         note = AminoEthoxyEthoxyAcetic Acyl-MaleimidoPropionic Acyl
SEQUENCE: 30
YXSGTFTSDV ETYLDLLIAK EFIAWLGAGX PSSGAPPPSK                                  40

SEQ ID NO: 31            moltype = AA  length = 40
FEATURE                  Location/Qualifiers
source                   1..40
                         mol_type = protein
                         organism = synthetic construct
MOD_RES                  13
                         note = Aib
MOD_RES                  20
                         note = Aib
MOD_RES                  40
                         note = AminoEthoxyEthoxyAcetic Acyl-MaleimidoPropionic Acyl
SEQUENCE: 31
HGRGTFTSDH QFXLDSMIQX EFIQWLHYGI PSSGAPPPSK                                  40

SEQ ID NO: 32            moltype = AA  length = 40
FEATURE                  Location/Qualifiers
source                   1..40
                         mol_type = protein
                         organism = synthetic construct
SITE                     2
                         note = D-alanine
MOD_RES                  13
                         note = Aib
SITE                     16
                         note = D-serine
SITE                     30
                         note = D-alanine
MOD_RES                  40
                         note = AminoEthoxyEthoxyAcetic Acyl-MaleimidoPropionic Acyl
SEQUENCE: 32
YARGTFTSDF INXLESGVAK AFVNWLQEGA PSSGAPPPSK                                  40

SEQ ID NO: 33            moltype = AA  length = 40
FEATURE                  Location/Qualifiers
source                   1..40
                         mol_type = protein
                         organism = synthetic construct
SITE                     2
                         note = D-serine
SITE                     28
                         note = D-alanine
SITE                     30
                         note = D-alanine
MOD_RES                  40
                         note = AminoEthoxyEthoxyAcetic Acyl-MaleimidoPropionic Acyl
SEQUENCE: 33
HSFGTFTSDG WMYLDMNEQK AFVAWLYAGA PSSGAPPPSK                                  40

SEQ ID NO: 34            moltype = AA  length = 40
FEATURE                  Location/Qualifiers
source                   1..40
                         mol_type = protein
                         organism = synthetic construct
SITE                     2
                         note = D-serine
MOD_RES                  13
                         note = Aib
MOD_RES                  20
                         note = Aib
```

```
MOD_RES              40
                     note = AminoEthoxyEthoxyAcetic Acyl-MaleimidoPropionic Acyl
SEQUENCE: 34
FSRGTFTSDH YRXLDQSKAX EFIEWLESGN PSSGAPPPSK                                40

SEQ ID NO: 35        moltype = AA  length = 40
FEATURE              Location/Qualifiers
source               1..40
                     mol_type = protein
                     organism = synthetic construct
SITE                 2
                     note = D-serine
MOD_RES              40
                     note = Aib
SEQUENCE: 35
FSGGTFTSDH HRYLDQIPQK DFIQWLEFGK PSSGAPPPSK                                40

SEQ ID NO: 36        moltype = AA  length = 40
FEATURE              Location/Qualifiers
source               1..40
                     mol_type = protein
                     organism = synthetic construct
SITE                 2
                     note = D-alanine
SITE                 10
                     note = D-alanine
MOD_RES              13
                     note = Aib
SITE                 18
                     note = D-alanine
MOD_RES              40
                     note = AminoEthoxyEthoxyAcetic Acyl-MaleimidoPropionic Acyl
SEQUENCE: 36
FAQGTFTSDA NMXLDMFAQK AFINWLFQGG PSSGAPPPSK                                40

SEQ ID NO: 37        moltype = AA  length = 40
FEATURE              Location/Qualifiers
source               1..40
                     mol_type = protein
                     organism = synthetic construct
SITE                 2
                     note = D-alanine
SITE                 12
                     note = D-alanine
MOD_RES              13
                     note = Aib
MOD_RES              17
                     note = Aib
MOD_RES              40
                     note = AminoEthoxyEthoxyAcetic Acyl-MaleimidoPropionic Acyl
SEQUENCE: 37
FAAGTFTSDV TAXLEVXQQK AFIAWLNLGQ PSSGAPPPSK                                40

SEQ ID NO: 38        moltype = AA  length = 40
FEATURE              Location/Qualifiers
source               1..40
                     mol_type = protein
                     organism = synthetic construct
SITE                 2
                     note = D-alanine
MOD_RES              12
                     note = Aib
SITE                 16
                     note = D-serine
MOD_RES              40
                     note = AminoEthoxyEthoxyAcetic Acyl-MaleimidoPropionic Acyl
SEQUENCE: 38
HAIGTFTSDH MXYLDSDPAQ DFIEWLMPGS PSSGAPPPSK                                40

SEQ ID NO: 39        moltype = AA  length = 40
FEATURE              Location/Qualifiers
source               1..40
                     mol_type = protein
                     organism = synthetic construct
MOD_RES              2
                     note = Aib
MOD_RES              40
                     note = AminoEthoxyEthoxyAcetic Acyl-MaleimidoPropionic Acyl
SEQUENCE: 39
```

```
HXNGTFTSDI IHYLDPIVQK AFIEWLNGGA PSSGAPPPSK                                   40

SEQ ID NO: 40           moltype = AA   length = 40
FEATURE                 Location/Qualifiers
source                  1..40
                        mol_type = protein
                        organism = synthetic construct
MOD_RES                 11
                        note = Aib
MOD_RES                 13
                        note = Aib
MOD_RES                 40
                        note = AminoEthoxyEthoxyAcetic Acyl-MaleimidoPropionic Acyl
SEQUENCE: 40
HGEGTFTSDM XQXLDREIAK EFVEWLFFGY PSSGAPPPSK                                   40

SEQ ID NO: 41           moltype = AA   length = 40
FEATURE                 Location/Qualifiers
source                  1..40
                        mol_type = protein
                        organism = synthetic construct
SITE                    2
                        note = D-serine
SITE                    12
                        note = D-serine
MOD_RES                 13
                        note = Aib
SITE                    28
                        note = D-serine
MOD_RES                 40
                        note = AminoEthoxyEthoxyAcetic Acyl-MaleimidoPropionic Acyl
SEQUENCE: 41
HSPGTFTSDP DSXLDENHQQ AFVAWLNSGM PSSGAPPPSK                                   40

SEQ ID NO: 42           moltype = AA   length = 40
FEATURE                 Location/Qualifiers
source                  1..40
                        mol_type = protein
                        organism = synthetic construct
SITE                    2
                        note = D-serine
SITE                    3
                        note = D-alanine
SITE                    10
                        note = D-serine
SITE                    16..17
                        note = D-serine
MOD_RES                 20
                        note = Aib
MOD_RES                 40
                        note = AminoEthoxyEthoxyAcetic Acyl-MaleimidoPropionic Acyl
SEQUENCE: 42
FSAGTFTSDS LDYLESSEQX EFINWLAAGV PSSGAPPPSK                                   40

SEQ ID NO: 43           moltype = AA   length = 40
FEATURE                 Location/Qualifiers
source                  1..40
                        mol_type = protein
                        organism = synthetic construct
SITE                    2
                        note = D-alanine
MOD_RES                 3
                        note = Aib
MOD_RES                 16
                        note = Aib
MOD_RES                 20
                        note = Aib
SITE                    28
                        note = D-serine
MOD_RES                 40
                        note = AminoEthoxyEthoxyAcetic Acyl-MaleimidoPropionic Acyl
SEQUENCE: 43
YAXGTFTSDK DPYLEXTYAX EFVAWLVSGR PSSGAPPPSK                                   40

SEQ ID NO: 44           moltype = AA   length = 40
FEATURE                 Location/Qualifiers
source                  1..40
                        mol_type = protein
                        organism = synthetic construct
```

```
MOD_RES                     13
                            note = Aib
MOD_RES                     40
                            note = AminoEthoxyEthoxyAcetic Acyl-MaleimidoPropionic Acyl
SEQUENCE: 44
FGRGTFTSDA VMXLDAMQAK AFIEWLWIGI PSSGAPPPSK                                      40

SEQ ID NO: 45               moltype = AA  length = 40
FEATURE                     Location/Qualifiers
source                      1..40
                            mol_type = protein
                            organism = synthetic construct
SITE                        2..3
                            note = D-alanine
MOD_RES                     13
                            note = Aib
MOD_RES                     40
                            note = AminoEthoxyEthoxyAcetic Acyl-MaleimidoPropionic Acyl
SEQUENCE: 45
HAAGTFTSDV DYXLEWKIQQ DFIEWLSTGL PSSGAPPPSK                                      40

SEQ ID NO: 46               moltype = AA  length = 40
FEATURE                     Location/Qualifiers
source                      1..40
                            mol_type = protein
                            organism = synthetic construct
SITE                        2
                            note = D-serine
MOD_RES                     18
                            note = Aib
MOD_RES                     20
                            note = Aib
MOD_RES                     40
                            note = AminoEthoxyEthoxyAcetic Acyl-MaleimidoPropionic Acyl
SEQUENCE: 46
YSFGTFTSDI AGYLDLEXAX AFVQWLAHGK PSSGAPPPSK                                      40

SEQ ID NO: 47               moltype = AA  length = 40
FEATURE                     Location/Qualifiers
source                      1..40
                            mol_type = protein
                            organism = synthetic construct
SITE                        2
                            note = D-serine
MOD_RES                     40
                            note = AminoEthoxyEthoxyAcetic Acyl-MaleimidoPropionic Acyl
SEQUENCE: 47
HSHGTFTSDE VQYLDMDGQQ EFINWLDLGY PSSGAPPPSK                                      40

SEQ ID NO: 48               moltype = AA  length = 40
FEATURE                     Location/Qualifiers
source                      1..40
                            mol_type = protein
                            organism = synthetic construct
SITE                        2
                            note = D-serine
MOD_RES                     13
                            note = Aib
MOD_RES                     20
                            note = Aib
MOD_RES                     27
                            note = Aib
MOD_RES                     40
                            note = AminoEthoxyEthoxyAcetic Acyl-MaleimidoPropionic Acyl
SEQUENCE: 48
HSRGTFTSDL QGXLEYADQX DFVNWLXTGF PSSGAPPPSK                                      40

SEQ ID NO: 49               moltype = AA  length = 40
FEATURE                     Location/Qualifiers
source                      1..40
                            mol_type = protein
                            organism = synthetic construct
MOD_RES                     13
                            note = Aib
SITE                        16
                            note = D-alanine
MOD_RES                     27
                            note = D-alanine
MOD_RES                     40
```

```
                              note = AminoEthoxyEthoxyAcetic Acyl-MaleimidoPropionic Acyl
SEQUENCE: 49
HGFGTFTSDG IDXLEAITAK EFIAWLAIGK PSSGAPPPSK                                  40

SEQ ID NO: 50           moltype = AA  length = 40
FEATURE                 Location/Qualifiers
source                  1..40
                        mol_type = protein
                        organism = synthetic construct
MOD_RES                 2
                        note = Aib
SITE                    11
                        note = D-alanine
MOD_RES                 13
                        note = Aib
MOD_RES                 20
                        note = Aib
MOD_RES                 40
                        note = AminoEthoxyEthoxyAcetic Acyl-MaleimidoPropionic Acyl
SEQUENCE: 50
HXTGTFTSDI AIXLDYKGAX AFVQWLDAGE PSSGAPPPSK                                  40

SEQ ID NO: 51           moltype = AA  length = 40
FEATURE                 Location/Qualifiers
source                  1..40
                        mol_type = protein
                        organism = synthetic construct
SITE                    2
                        note = D-serine
MOD_RES                 11
                        note = Aib
MOD_RES                 13
                        note = Aib
MOD_RES                 20
                        note = Aib
MOD_RES                 40
                        note = AminoEthoxyEthoxyAcetic Acyl-MaleimidoPropionic Acyl
SEQUENCE: 51
HSLGTFTSDL XMXLDVNIAX DFIAWLMIGY PSSGAPPPSK                                  40

SEQ ID NO: 52           moltype = AA  length = 40
FEATURE                 Location/Qualifiers
source                  1..40
                        mol_type = protein
                        organism = synthetic construct
MOD_RES                 13
                        note = Aib
SITE                    28
                        note = D-serine
MOD_RES                 40
                        note = AminoEthoxyEthoxyAcetic Acyl-MaleimidoPropionic Acyl
SEQUENCE: 52
YGDGTFTSDK HRXLEISQQK EFVQWLLSGL PSSGAPPPSK                                  40

SEQ ID NO: 53           moltype = AA  length = 40
FEATURE                 Location/Qualifiers
source                  1..40
                        mol_type = protein
                        organism = synthetic construct
SITE                    2..3
                        note = D-alanine
MOD_RES                 13
                        note = Aib
MOD_RES                 28
                        note = Aib
MOD_RES                 30
                        note = Aib
MOD_RES                 40
                        note = AminoEthoxyEthoxyAcetic Acyl-MaleimidoPropionic Acyl
SEQUENCE: 53
FAAGTFTSDQ TTXLDAGSAK DFVNWLVXGX PSSGAPPPSK                                  40

SEQ ID NO: 54           moltype = AA  length = 40
FEATURE                 Location/Qualifiers
source                  1..40
                        mol_type = protein
                        organism = synthetic construct
MOD_RES                 2
                        note = Aib
```

| | | |
|---|---|---|
| MOD_RES | 20 | |
| | note = Aib | |
| MOD_RES | 40 | |
| | note = AminoEthoxyEthoxyAcetic Acyl-MaleimidoPropionic Acyl | |
| SEQUENCE: 54 | | |
| YXGGTFTSDE PPYLDAWTQX EFVEWLVRGW PSSGAPPPSK | | 40 |
| | | |
| SEQ ID NO: 55 | moltype = AA  length = 40 | |
| FEATURE | Location/Qualifiers | |
| source | 1..40 | |
| | mol_type = protein | |
| | organism = synthetic construct | |
| SITE | 2 | |
| | note = D-alanine | |
| MOD_RES | 13 | |
| | note = Aib | |
| SITE | 17 | |
| | note = D-alanine | |
| MOD_RES | 40 | |
| | note = AminoEthoxyEthoxyAcetic Acyl-MaleimidoPropionic Acyl | |
| SEQUENCE: 55 | | |
| HAGGTFTSDG SRXLDIATQQ DFIEWLLEGH PSSGAPPPSK | | 40 |
| | | |
| SEQ ID NO: 56 | moltype = AA  length = 40 | |
| FEATURE | Location/Qualifiers | |
| source | 1..40 | |
| | mol_type = protein | |
| | organism = synthetic construct | |
| SITE | 2 | |
| | note = D-serine | |
| MOD_RES | 40 | |
| | note = AminoEthoxyEthoxyAcetic Acyl-MaleimidoPropionic Acyl | |
| SEQUENCE: 56 | | |
| HSSGTFTSDP LKYLDHGNQQ AFVNWLISGS PSSGAPPPSK | | 40 |
| | | |
| SEQ ID NO: 57 | moltype = AA  length = 40 | |
| FEATURE | Location/Qualifiers | |
| source | 1..40 | |
| | mol_type = protein | |
| | organism = synthetic construct | |
| MOD_RES | 2 | |
| | note = Aib | |
| SITE | 30 | |
| | note = D-serine | |
| MOD_RES | 40 | |
| | note = AminoEthoxyEthoxyAcetic Acyl-MaleimidoPropionic Acyl | |
| SEQUENCE: 57 | | |
| HXTGTFTSDI SFYLEEYVAQ EFVAWLQAGS PSSGAPPPSK | | 40 |
| | | |
| SEQ ID NO: 58 | moltype = AA  length = 40 | |
| FEATURE | Location/Qualifiers | |
| source | 1..40 | |
| | mol_type = protein | |
| | organism = synthetic construct | |
| SITE | 2 | |
| | note = D-serine | |
| SITE | 3 | |
| | note = D-alanine | |
| SITE | 10 | |
| | note = D-alanine | |
| MOD_RES | 13 | |
| | note = Aib | |
| MOD_RES | 17 | |
| | note = Aib | |
| MOD_RES | 40 | |
| | note = AminoEthoxyEthoxyAcetic Acyl-MaleimidoPropionic Acyl | |
| SEQUENCE: 58 | | |
| HSAGTFTSDA YEXLEPXDQK AFIAWLWHGL PSSGAPPPSK | | 40 |
| | | |
| SEQ ID NO: 59 | moltype = AA  length = 40 | |
| FEATURE | Location/Qualifiers | |
| source | 1..40 | |
| | mol_type = protein | |
| | organism = synthetic construct | |
| SITE | 2 | |
| | note = D-serine | |
| MOD_RES | 13 | |
| | note = Aib | |
| SITE | 17 | |

```
                                    note = D-serine
MOD_RES                             40
                                    note = AminoEthoxyEthoxyAcetic Acyl-MaleimidoPropionic Acyl
SEQUENCE: 59
YSRGTFTSDA TLXLEGSKQK AFINWLLEGI PSSGAPPPSK                              40

SEQ ID NO: 60           moltype = AA  length = 40
FEATURE                 Location/Qualifiers
source                  1..40
                        mol_type = protein
                        organism = synthetic construct
MOD_RES                 13
                        note = Aib
MOD_RES                 40
                        note = AminoEthoxyEthoxyAcetic Acyl-MaleimidoPropionic Acyl
SEQUENCE: 60
FGWGTFTSDL EKXLELARAQ AFVEWLKVGS PSSGAPPPSK                              40

SEQ ID NO: 61           moltype = AA  length = 40
FEATURE                 Location/Qualifiers
source                  1..40
                        mol_type = protein
                        organism = synthetic construct
MOD_RES                 2
                        note = Aib
SITE                    18
                        note = D-alanine
SITE                    27
                        note = D-serine
MOD_RES                 40
                        note = AminoEthoxyEthoxyAcetic Acyl-MaleimidoPropionic Acyl
SEQUENCE: 61
FXMGTFTSDP YPYLEWEAAQ AFINWLSGGS PSSGAPPPSK                              40

SEQ ID NO: 62           moltype = AA  length = 40
FEATURE                 Location/Qualifiers
source                  1..40
                        mol_type = protein
                        organism = synthetic construct
SITE                    2
                        note = D-alanine
MOD_RES                 3
                        note = Aib
MOD_RES                 13
                        note = Aib
MOD_RES                 40
                        note = AminoEthoxyEthoxyAcetic Acyl-MaleimidoPropionic Acyl
SEQUENCE: 62
HAXGTFTSDM PTXLDHIQQQ DFVAWLVQGI PSSGAPPPSK                              40

SEQ ID NO: 63           moltype = AA  length = 40
FEATURE                 Location/Qualifiers
source                  1..40
                        mol_type = protein
                        organism = synthetic construct
SITE                    2
                        note = D-alanine
SITE                    3
                        note = D-serine
MOD_RES                 13
                        note = Aib
MOD_RES                 40
                        note = AminoEthoxyEthoxyAcetic Acyl-MaleimidoPropionic Acyl
SEQUENCE: 63
FASGTFTSDH SDXLELKAQQ EFVNWLRNGR PSSGAPPPSK                              40

SEQ ID NO: 64           moltype = AA  length = 40
FEATURE                 Location/Qualifiers
source                  1..40
                        mol_type = protein
                        organism = synthetic construct
MOD_RES                 40
                        note = AminoEthoxyEthoxyAcetic Acyl-MaleimidoPropionic Acyl
SEQUENCE: 64
HGQGTFTSDY SKYLDARRAQ DFVEWLKNGG PSSGAPPPSK                              40

SEQ ID NO: 65           moltype = AA  length = 40
FEATURE                 Location/Qualifiers
source                  1..40
```

```
                             mol_type = protein
                             organism = synthetic construct
MOD_RES                      2
                             note = Aib
MOD_RES                      13
                             note = Aib
MOD_RES                      40
                             note = AminoEthoxyEthoxyAcetic Acyl-MaleimidoPropionic Acyl
SEQUENCE: 65
HXQGTFTSDY SKXLDKRRAK DFVEWLKNGG PSSGAPPPSK                            40

SEQ ID NO: 66                moltype = AA   length = 40
FEATURE                      Location/Qualifiers
source                       1..40
                             mol_type = protein
                             organism = synthetic construct
MOD_RES                      2
                             note = Aib
MOD_RES                      40
                             note = AminoEthoxyEthoxyAcetic Acyl-MaleimidoPropionic Acyl
SEQUENCE: 66
HXQGTFTSDY SKYLDKRRAK DFVEWLKNGG PSSGAPPPSK                            40

SEQ ID NO: 67                moltype = AA   length = 40
FEATURE                      Location/Qualifiers
source                       1..40
                             mol_type = protein
                             organism = synthetic construct
MOD_RES                      2
                             note = Aib
MOD_RES                      13
                             note = Alpha-Methyl-Leucine
MOD_RES                      20
                             note = Aib
MOD_RES                      40
                             note = AminoEthoxyEthoxyAcetic Acyl-MaleimidoPropionic Acyl
SEQUENCE: 67
YXQGTFTSDY SIXLDKIAQX AFIEYLLEGG PSSGAPPPSK                            40

SEQ ID NO: 68                moltype = AA   length = 40
FEATURE                      Location/Qualifiers
source                       1..40
                             mol_type = protein
                             organism = synthetic construct
MOD_RES                      2
                             note = Aib
MOD_RES                      13
                             note = Aib
MOD_RES                      40
                             note = AminoEthoxyEthoxyAcetic Acyl-MaleimidoPropionic Acyl
SEQUENCE: 68
YXEGTFTSDY SIXLDKIAQK AFVQWLIAGG PSSGAPPPSK                            40

SEQ ID NO: 69                moltype = AA   length = 40
FEATURE                      Location/Qualifiers
source                       1..40
                             mol_type = protein
                             organism = synthetic construct
SITE                         2
                             note = D-alanine
MOD_RES                      40
                             note = AminoEthoxyEthoxyAcetic Acyl-MaleimidoPropionic Acyl
SEQUENCE: 69
HAEGTFTSDY AKYLDARRAK EFIAWLVNGG PSSGAPPPSK                            40

SEQ ID NO: 70                moltype = AA   length = 40
FEATURE                      Location/Qualifiers
source                       1..40
                             mol_type = protein
                             organism = synthetic construct
MOD_RES                      2
                             note = Aib
MOD_RES                      20
                             note = Aib
MOD_RES                      40
                             note = AminoEthoxyEthoxyAcetic Acyl-MaleimidoPropionic Acyl
SEQUENCE: 70
YXEGTFTSDY SIYLDKQAAX EFVQWLLAGG PSSGAPPPSK                            40
```

```
SEQ ID NO: 71              moltype = AA   length = 40
FEATURE                    Location/Qualifiers
source                     1..40
                           mol_type = protein
                           organism = synthetic construct
MOD_RES                    2
                           note = Aib
MOD_RES                    20
                           note = Aib
MOD_RES                    35
                           note = Aib
MOD_RES                    40
                           note = AminoEthoxyEthoxyAcetic Acyl-MaleimidoPropionic Acyl
SITE                       29
                           note = D-alanine
SEQUENCE: 71
HXHGTFTSDL SKLLEEQRQX EFIEWLKAAG PPPSXKPPPK                                        40

SEQ ID NO: 72              moltype = AA   length = 39
FEATURE                    Location/Qualifiers
source                     1..39
                           mol_type = protein
                           organism = synthetic construct
SITE                       2
                           note = D-alanine
MOD_RES                    20
                           note = AminoEthoxyEthoxyAcetic Acyl-MaleimidoPropionic Acyl
SEQUENCE: 72
HAMGTFTSDR HWYLDMSHQK AFVQWLAYGN PSSGAPPPS                                         39

SEQ ID NO: 73              moltype = AA   length = 39
FEATURE                    Location/Qualifiers
source                     1..39
                           mol_type = protein
                           organism = synthetic construct
SITE                       2
                           note = D-alanine
SITE                       3
                           note = D-serine
MOD_RES                    20
                           note = AminoEthoxyEthoxyAcetic Acyl-MaleimidoPropionic Acyl
SEQUENCE: 73
YASGTFTSDW GRYLELLIQK EFVNWLIIGA PSSGAPPPS                                         39

SEQ ID NO: 74              moltype = AA   length = 39
FEATURE                    Location/Qualifiers
source                     1..39
                           mol_type = protein
                           organism = synthetic construct
SITE                       10
                           note = D-serine
MOD_RES                    13
                           note = Aib
SITE                       17
                           note = D-serine
SITE                       18
                           note = D-alanine
SITE                       27
                           note = D-alanine
MOD_RES                    20
                           note = AminoEthoxyEthoxyAcetic Acyl-AminoEthoxyEthoxyAcetic
                            Acyl-MaleimidoPropionic Acyl
SEQUENCE: 74
HGKGTFTSDS AIXLEVSAAK AFIEWLAHGD PSSGAPPPS                                         39

SEQ ID NO: 75              moltype = AA   length = 39
FEATURE                    Location/Qualifiers
source                     1..39
                           mol_type = protein
                           organism = synthetic construct
SITE                       3
                           note = D-serine
SITE                       2
                           note = D-alanine
MOD_RES                    13
                           note = Aib
SITE                       27
                           note = D-alanine
MOD_RES                    20
```

-continued

```
                            note = AminoEthoxyEthoxyAcetic Acyl-MaleimidoPropionic Acyl
SEQUENCE: 75
HASGTFTSDI LEXLDQAAAK EFVEWLAHGF PSSGAPPPS                             39

SEQ ID NO: 76               moltype = AA   length = 39
FEATURE                     Location/Qualifiers
source                      1..39
                            mol_type = protein
                            organism = synthetic construct
SITE                        2
                            note = D-alanine
MOD_RES                     12..13
                            note = Aib
MOD_RES                     20
                            note = AminoEthoxyEthoxyAcetic Acyl-MaleimidoPropionic Acyl
SEQUENCE: 76
HAYGTFTSDY MXXLDFLQQK DFVAWLFMGV PSSGAPPPS                             39

SEQ ID NO: 77               moltype = AA   length = 39
FEATURE                     Location/Qualifiers
source                      1..39
                            mol_type = protein
                            organism = synthetic construct
MOD_RES                     2
                            note = Aib
SITE                        3
                            note = D-serine
MOD_RES                     10
                            note = Aib
MOD_RES                     20
                            note = AminoEthoxyEthoxyAcetic Acyl-MaleimidoPropionic Acyl
SEQUENCE: 77
HXSGTFTSDX AYYLDNTTAK DFIQWLDAGP PSSGAPPPS                             39

SEQ ID NO: 78               moltype = AA   length = 39
FEATURE                     Location/Qualifiers
source                      1..39
                            mol_type = protein
                            organism = synthetic construct
MOD_RES                     2
                            note = Aib
SITE                        11
                            note = D-alanine
MOD_RES                     16
                            note = Aib
SITE                        30
                            note = D-serine
MOD_RES                     20
                            note = AminoEthoxyEthoxyAcetic Acyl-MaleimidoPropionic Acyl
SEQUENCE: 78
FXKGTFTSDD AVYLEXHRAK EFVEWLFGGS PSSGAPPPS                             39

SEQ ID NO: 79               moltype = AA   length = 39
FEATURE                     Location/Qualifiers
source                      1..39
                            mol_type = protein
                            organism = synthetic construct
MOD_RES                     2
                            note = Aib
MOD_RES                     13
                            note = Aib
MOD_RES                     27
                            note = Aib
MOD_RES                     20
                            note = AminoEthoxyEthoxyAcetic Acyl-MaleimidoPropionic Acyl
SEQUENCE: 79
YXHGTFTSDL TVXLDEIKAK EFVEWLXVGP PSSGAPPPS                             39

SEQ ID NO: 80               moltype = AA   length = 39
FEATURE                     Location/Qualifiers
source                      1..39
                            mol_type = protein
                            organism = synthetic construct
SITE                        2
                            note = D-serine
SITE                        12
                            note = D-alanine
MOD_RES                     13
                            note = Aib
```

```
MOD_RES            16
                   note = Aib
MOD_RES            20
                   note = AminoEthoxyEthoxyAcetic Acyl-MaleimidoPropionic Acyl
SEQUENCE: 80
FSWGTFTSDF PAXLEXMKAK DFVEWLLDGN PSSGAPPPS                    39

SEQ ID NO: 81      moltype = AA  length = 39
FEATURE            Location/Qualifiers
source             1..39
                   mol_type = protein
                   organism = synthetic construct
MOD_RES            2
                   note = Aib
MOD_RES            13
                   note = Aib
SITE               28
                   note = D-serine
MOD_RES            20
                   note = AminoEthoxyEthoxyAcetic Acyl-MaleimidoPropionic Acyl
SEQUENCE: 81
HXKGTFTSDD ADXLEWYRQK AFVQWLPSGI PSSGAPPPS                    39

SEQ ID NO: 82      moltype = AA  length = 39
FEATURE            Location/Qualifiers
source             1..39
                   mol_type = protein
                   organism = synthetic construct
MOD_RES            2
                   note = Aib
MOD_RES            13
                   note = Aib
SITE               27
                   note = D-serine
MOD_RES            20
                   note = AminoEthoxyEthoxyAcetic Acyl-MaleimidoPropionic Acyl
SEQUENCE: 82
YXWGTFTSDS NSXLEAKMQK EFVNWLSQGF PSSGAPPPS                    39

SEQ ID NO: 83      moltype = AA  length = 39
FEATURE            Location/Qualifiers
source             1..39
                   mol_type = protein
                   organism = synthetic construct
SITE               2
                   note = D-alanine
SITE               18
                   note = D-serine
MOD_RES            20
                   note = AminoEthoxyEthoxyAcetic Acyl-MaleimidoPropionic Acyl
SEQUENCE: 83
FATGTFTSDD ADYLELFSQK AFIAWLDNGV PSSGAPPPS                    39

SEQ ID NO: 84      moltype = AA  length = 39
FEATURE            Location/Qualifiers
source             1..39
                   mol_type = protein
                   organism = synthetic construct
SITE               2
                   note = D-serine
MOD_RES            13
                   note = Aib
MOD_RES            17
                   note = Aib
MOD_RES            20
                   note = AminoEthoxyEthoxyAcetic Acyl-MaleimidoPropionic Acyl
SEQUENCE: 84
YSYGTFTSDW DAXLESXMQK EFVQWLFYGQ PSSGAPPPS                    39

SEQ ID NO: 85      moltype = AA  length = 39
FEATURE            Location/Qualifiers
source             1..39
                   mol_type = protein
                   organism = synthetic construct
SITE               2
                   note = D-alanine
SITE               12
                   note = D-serine
MOD_RES            13
```

```
                                note = Aib
MOD_RES                         20
                                note = AminoEthoxyEthoxyAcetic Acyl-MaleimidoPropionic Acyl
SEQUENCE: 85
YANGTFTSDT NSXLDSTQAK EFVAWLVQGD PSSGAPPPS                         39

SEQ ID NO: 86               moltype = AA   length = 39
FEATURE                     Location/Qualifiers
source                      1..39
                            mol_type = protein
                            organism = synthetic construct
MOD_RES                     2
                            note = Aib
MOD_RES                     20
                            note = AminoEthoxyEthoxyAcetic Acyl-MaleimidoPropionic Acyl
SEQUENCE: 86
FXIGTFTSDK QAYLEHPRQK AFVAWLDVGY PSSGAPPPS                         39

SEQ ID NO: 87               moltype = AA   length = 39
FEATURE                     Location/Qualifiers
source                      1..39
                            mol_type = protein
                            organism = synthetic construct
MOD_RES                     2
                            note = Aib
MOD_RES                     13
                            note = Aib
SITE                        30
                            note = D-serine
MOD_RES                     20
                            note = AminoEthoxyEthoxyAcetic Acyl-MaleimidoPropionic Acyl
SEQUENCE: 87
HXRGTFTSDK FIXLEYHNAK EFVAWLYKGS PSSGAPPPS                         39

SEQ ID NO: 88               moltype = AA   length = 39
FEATURE                     Location/Qualifiers
source                      1..39
                            mol_type = protein
                            organism = synthetic construct
SITE                        10
                            note = D-serine
MOD_RES                     20
                            note = AminoEthoxyEthoxyAcetic Acyl-MaleimidoPropionic Acyl
SEQUENCE: 88
FGHGTFTSDS IWYLENYSQK EFIEWLEKGP PSSGAPPPS                         39

SEQ ID NO: 89               moltype = AA   length = 39
FEATURE                     Location/Qualifiers
source                      1..39
                            mol_type = protein
                            organism = synthetic construct
SITE                        2
                            note = D-serine
SITE                        3
                            note = D-alanine
MOD_RES                     12
                            note = Aib
SITE                        27
                            note = D-alanine
MOD_RES                     20
                            note = AminoEthoxyEthoxyAcetic Acyl-MaleimidoPropionic Acyl
SEQUENCE: 89
HSAGTFTSDI RXYLEIMLQK EFVEWLAEGV PSSGAPPPS                         39

SEQ ID NO: 90               moltype = AA   length = 39
FEATURE                     Location/Qualifiers
source                      1..39
                            mol_type = protein
                            organism = synthetic construct
MOD_RES                     2
                            note = Aib
SITE                        18
                            note = D-serine
MOD_RES                     20
                            note = AminoEthoxyEthoxyAcetic Acyl-MaleimidoPropionic Acyl
SEQUENCE: 90
HXFGTFTSDM LNYLEENSQK EFVNWLQLGM PSSGAPPPS                         39

SEQ ID NO: 91               moltype = AA   length = 39
```

```
FEATURE                 Location/Qualifiers
source                  1..39
                        mol_type = protein
                        organism = synthetic construct
MOD_RES                 20
                        note = AminoEthoxyEthoxyAcetic Acyl-MaleimidoPropionic Acyl
SEQUENCE: 91
FGHGTFTSDI WIYLEVQTAK DFINWLSWGE PSSGAPPPS                                39

SEQ ID NO: 92           moltype = AA   length = 39
FEATURE                 Location/Qualifiers
source                  1..39
                        mol_type = protein
                        organism = synthetic construct
SITE                    2
                        note = D-serine
MOD_RES                 20
                        note = AminoEthoxyEthoxyAcetic Acyl-MaleimidoPropionic Acyl
SEQUENCE: 92
HSGGTFTSDS GPYLDKTDQK AFINWLPIGN PSSGAPPPS                                39

SEQ ID NO: 93           moltype = AA   length = 39
FEATURE                 Location/Qualifiers
source                  1..39
                        mol_type = protein
                        organism = synthetic construct
SITE                    2
                        note = D-serine
SITE                    11
                        note = D-serine
MOD_RES                 13
                        note = Aib
MOD_RES                 20
                        note = AminoEthoxyEthoxyAcetic Acyl-MaleimidoPropionic Acyl
SEQUENCE: 93
YSIGTFTSDH SPXLDHLFAK DFVEWLENGD PSSGAPPPS                                39

SEQ ID NO: 94           moltype = AA   length = 39
FEATURE                 Location/Qualifiers
source                  1..39
                        mol_type = protein
                        organism = synthetic construct
MOD_RES                 13
                        note = Aib
MOD_RES                 18
                        note = Aib
SITE                    17
                        note = D-serine
MOD_RES                 20
                        note = AminoEthoxyEthoxyAcetic Acyl-MaleimidoPropionic Acyl
SEQUENCE: 94
FGYGTFTSDK EGXLEQSXAK EFIQWLPHGP PSSGAPPPS                                39

SEQ ID NO: 95           moltype = AA   length = 39
FEATURE                 Location/Qualifiers
source                  1..39
                        mol_type = protein
                        organism = synthetic construct
SITE                    2
                        note = D-serine
MOD_RES                 11
                        note = Aib
MOD_RES                 13
                        note = Aib
MOD_RES                 20
                        note = AminoEthoxyEthoxyAcetic Acyl-MaleimidoPropionic Acyl
SEQUENCE: 95
FSWGTFTSDF XSXLDTTRAK DFVEWLIRGN PSSGAPPPS                                39

SEQ ID NO: 96           moltype = AA   length = 39
FEATURE                 Location/Qualifiers
source                  1..39
                        mol_type = protein
                        organism = synthetic construct
MOD_RES                 2
                        note = Aib
SITE                    18
                        note = D-serine
MOD_RES                 28
```

```
                              note = Aib
MOD_RES                       20
                              note = AminoEthoxyEthoxyAcetic Acyl-MaleimidoPropionic Acyl
SEQUENCE: 96
HXPGTFTSDH EKYLEMVSAK DFIAWLRXGD PSSGAPPPS                                       39

SEQ ID NO: 97                 moltype = AA  length = 39
FEATURE                       Location/Qualifiers
source                        1..39
                              mol_type = protein
                              organism = synthetic construct
SITE                          2
                              note = D-alanine
SITE                          12
                              note = D-alanine
MOD_RES                       13
                              note = Aib
SITE                          17
                              note = D-alanine
MOD_RES                       20
                              note = AminoEthoxyEthoxyAcetic Acyl-MaleimidoPropionic Acyl
SEQUENCE: 97
YAAGTFTSDT IAXLDNAAAK DFIAWLIQGY PSSGAPPPS                                       39

SEQ ID NO: 98                 moltype = AA  length = 39
FEATURE                       Location/Qualifiers
source                        1..39
                              mol_type = protein
                              organism = synthetic construct
MOD_RES                       2
                              note = Aib
MOD_RES                       13
                              note = Aib
MOD_RES                       20
                              note = AminoEthoxyEthoxyAcetic Acyl-MaleimidoPropionic Acyl
SEQUENCE: 98
YXLGTFTSDT IHXLEFEAQK DFINWLKAGE PSSGAPPPS                                       39

SEQ ID NO: 99                 moltype = AA  length = 39
FEATURE                       Location/Qualifiers
source                        1..39
                              mol_type = protein
                              organism = synthetic construct
MOD_RES                       2
                              note = Aib
MOD_RES                       27
                              note = Aib
MOD_RES                       20
                              note = AminoEthoxyEthoxyAcetic Acyl-MaleimidoPropionic Acyl
SEQUENCE: 99
YXQGTFTSDA MIYLDTPDAK EFIAWLXIGG PSSGAPPPS                                       39

SEQ ID NO: 100                moltype = AA  length = 39
FEATURE                       Location/Qualifiers
source                        1..39
                              mol_type = protein
                              organism = synthetic construct
MOD_RES                       11
                              note = Aib
MOD_RES                       13
                              note = Aib
MOD_RES                       17
                              note = Aib
MOD_RES                       20
                              note = AminoEthoxyEthoxyAcetic Acyl-MaleimidoPropionic Acyl
SEQUENCE: 100
YGAGTFTSDH XGXLDIXQQK EFVQWLETGT PSSGAPPPS                                       39

SEQ ID NO: 101                moltype = AA  length = 39
FEATURE                       Location/Qualifiers
source                        1..39
                              mol_type = protein
                              organism = synthetic construct
SITE                          2
                              note = D-alanine
MOD_RES                       20
                              note = AminoEthoxyEthoxyAcetic Acyl-MaleimidoPropionic Acyl
SEQUENCE: 101
YAVGTFTSDL SEYLEMNIAK DFVQWLLVGG PSSGAPPPS                                       39
```

```
SEQ ID NO: 102          moltype = AA   length = 39
FEATURE                 Location/Qualifiers
source                  1..39
                        mol_type = protein
                        organism = synthetic construct
SITE                    12
                        note = D-serine
MOD_RES                 20
                        note = AminoEthoxyEthoxyAcetic Acyl-MaleimidoPropionic Acyl
SEQUENCE: 102
YGPGTFTSDR YSYLEQHMAK EFIQWLGPGH PSSGAPPPS                              39

SEQ ID NO: 103          moltype = AA   length = 39
FEATURE                 Location/Qualifiers
source                  1..39
                        mol_type = protein
                        organism = synthetic construct
MOD_RES                 2
                        note = Aib
SITE                    28
                        note = D-alanine
MOD_RES                 20
                        note = AminoEthoxyEthoxyAcetic Acyl-MaleimidoPropionic Acyl
SEQUENCE: 103
YXRGTFTSDM RVYLEETLQK AFVQWLIAGD PSSGAPPPS                              39

SEQ ID NO: 104          moltype = AA   length = 39
FEATURE                 Location/Qualifiers
source                  1..39
                        mol_type = protein
                        organism = synthetic construct
SITE                    2
                        note = D-serine
MOD_RES                 3
                        note = Aib
MOD_RES                 13
                        note = Aib
MOD_RES                 20
                        note = AminoEthoxyEthoxyAcetic Acyl-MaleimidoPropionic Acyl
SEQUENCE: 104
YSXGTFTSDF MEXLDKKIQK DFIQWLWYGS PSSGAPPPS                              39

SEQ ID NO: 105          moltype = AA   length = 39
FEATURE                 Location/Qualifiers
source                  1..39
                        mol_type = protein
                        organism = synthetic construct
MOD_RES                 2
                        note = Aib
SITE                    3
                        note = D-serine
MOD_RES                 27
                        note = Aib
MOD_RES                 20
                        note = AminoEthoxyEthoxyAcetic Acyl-MaleimidoPropionic Acyl
SEQUENCE: 105
FXSGTFTSDE LRYLEEMHQK AFIQWLXTGF PSSGAPPPS                              39

SEQ ID NO: 106          moltype = AA   length = 39
FEATURE                 Location/Qualifiers
source                  1..39
                        mol_type = protein
                        organism = synthetic construct
SITE                    27
                        note = D-serine
MOD_RES                 20
                        note = AminoEthoxyEthoxyAcetic Acyl-MaleimidoPropionic Acyl
SEQUENCE: 106
YGPGTFTSDW AKYLEGRDAK AFINWLSQGS PSSGAPPPS                              39

SEQ ID NO: 107          moltype = AA   length = 39
FEATURE                 Location/Qualifiers
source                  1..39
                        mol_type = protein
                        organism = synthetic construct
MOD_RES                 13
                        note = Aib
SITE                    30
```

```
                              note = D-alanine
MOD_RES                       20
                              note = AminoEthoxyEthoxyAcetic Acyl-MaleimidoPropionic Acyl
SEQUENCE: 107
HGVGTFTSDH HFXLEIIMAK AFIEWLWHGA PSSGAPPPS                       39

SEQ ID NO: 108                moltype = AA   length = 39
FEATURE                       Location/Qualifiers
source                        1..39
                              mol_type = protein
                              organism = synthetic construct
SITE                          18
                              note = D-alanine
MOD_RES                       20
                              note = AminoEthoxyEthoxyAcetic Acyl-MaleimidoPropionic Acyl
SEQUENCE: 108
HGIGTFTSDV PAYLDPAAAK DFIQWLVSGG PSSGAPPPS                       39

SEQ ID NO: 109                moltype = AA   length = 39
FEATURE                       Location/Qualifiers
source                        1..39
                              mol_type = protein
                              organism = synthetic construct
SITE                          2
                              note = D-serine
MOD_RES                       13
                              note = Aib
MOD_RES                       28
                              note = Aib
MOD_RES                       20
                              note = AminoEthoxyEthoxyAcetic Acyl-MaleimidoPropionic Acyl
SEQUENCE: 109
HSNGTFTSDR RKXLEPPIAK EFVQWLIXGI PSSGAPPPS                       39

SEQ ID NO: 110                moltype = AA   length = 39
FEATURE                       Location/Qualifiers
source                        1..39
                              mol_type = protein
                              organism = synthetic construct
MOD_RES                       2
                              note = Aib
SITE                          12
                              note = D-alanine
MOD_RES                       20
                              note = AminoEthoxyEthoxyAcetic Acyl-MaleimidoPropionic Acyl
SEQUENCE: 110
FXTGTFTSDT MAYLDYTHAK DFIAWLIDGK PSSGAPPPS                       39

SEQ ID NO: 111                moltype = AA   length = 39
FEATURE                       Location/Qualifiers
source                        1..39
                              mol_type = protein
                              organism = synthetic construct
SITE                          2
                              note = D-alanine
SITE                          10
                              note = D-serine
MOD_RES                       20
                              note = AminoEthoxyEthoxyAcetic Acyl-MaleimidoPropionic Acyl
SEQUENCE: 111
YATGTFTSDS VQYLEHPMQK AFVAWLHTGR PSSGAPPPS                       39

SEQ ID NO: 112                moltype = AA   length = 39
FEATURE                       Location/Qualifiers
source                        1..39
                              mol_type = protein
                              organism = synthetic construct
MOD_RES                       2
                              note = Aib
MOD_RES                       30
                              note = Aib
MOD_RES                       20
                              note = AminoEthoxyEthoxyAcetic Acyl-MaleimidoPropionic Acyl
SEQUENCE: 112
YXTGTFTSDE EWYLDNWMQK AFVQWLSNGX PSSGAPPPS                       39

SEQ ID NO: 113                moltype = AA   length = 39
FEATURE                       Location/Qualifiers
source                        1..39
```

```
                        mol_type = protein
                        organism = synthetic construct
SITE                    2
                        note = D-serine
MOD_RES                 13
                        note = Aib
MOD_RES                 16
                        note = Aib
MOD_RES                 20
                        note = AminoEthoxyEthoxyAcetic Acyl-MaleimidoPropionic Acyl
SEQUENCE: 113
YSIGTFTSDG NKXLEXGRAK AFIAWLQYGR PSSGAPPPS                          39

SEQ ID NO: 114          moltype = AA   length = 39
FEATURE                 Location/Qualifiers
source                  1..39
                        mol_type = protein
                        organism = synthetic construct
SITE                    2
                        note = D-serine
MOD_RES                 20
                        note = AminoEthoxyEthoxyAcetic Acyl-MaleimidoPropionic Acyl
SEQUENCE: 114
YSPGTFTSDM YVYLEPGDAK EFVQWLKNGG PSSGAPPPS                          39

SEQ ID NO: 115          moltype = AA   length = 39
FEATURE                 Location/Qualifiers
source                  1..39
                        mol_type = protein
                        organism = synthetic construct
SITE                    2
                        note = D-alanine
MOD_RES                 13
                        note = Aib
SITE                    30
                        note = D-serine
MOD_RES                 20
                        note = AminoEthoxyEthoxyAcetic Acyl-MaleimidoPropionic Acyl
SEQUENCE: 115
FSIGTFTSDL MAXLERAAQK EFVNWLIIGS PSSGAPPPS                          39

SEQ ID NO: 116          moltype = AA   length = 39
FEATURE                 Location/Qualifiers
source                  1..39
                        mol_type = protein
                        organism = synthetic construct
MOD_RES                 2
                        note = Aib
MOD_RES                 20
                        note = AminoEthoxyEthoxyAcetic Acyl-MaleimidoPropionic Acyl
SEQUENCE: 116
YXNGTFTSDI EQYLEPMVQK EFVQWLSPGN PSSGAPPPS                          39

SEQ ID NO: 117          moltype = AA   length = 39
FEATURE                 Location/Qualifiers
source                  1..39
                        mol_type = protein
                        organism = synthetic construct
SITE                    12
                        note = D-serine
MOD_RES                 13
                        note = Aib
MOD_RES                 20
                        note = AminoEthoxyEthoxyAcetic Acyl-MaleimidoPropionic Acyl
SEQUENCE: 117
YGWGTFTSDS FSXLDWMMAK AFIQWLIVGI PSSGAPPPS                          39

SEQ ID NO: 118          moltype = AA   length = 39
FEATURE                 Location/Qualifiers
source                  1..39
                        mol_type = protein
                        organism = synthetic construct
SITE                    2
                        note = D-serine
MOD_RES                 10
                        note = Aib
MOD_RES                 20
                        note = AminoEthoxyEthoxyAcetic Acyl-MaleimidoPropionic Acyl
SEQUENCE: 118
```

```
HSPGTFTSDX THYLDNDQQK DFVNWLPEGW PSSGAPPPS                    39

SEQ ID NO: 119           moltype = AA   length = 39
FEATURE                  Location/Qualifiers
source                   1..39
                         mol_type = protein
                         organism = synthetic construct
SITE                     3
                         note = D-alanine
MOD_RES                  13
                         note = Aib
SITE                     16
                         note = D-serine
MOD_RES                  20
                         note = AminoEthoxyEthoxyAcetic Acyl-MaleimidoPropionic Acyl
SEQUENCE: 119
YGAGTFTSDN HTXLESFAAK EFIQWLNSGQ PSSGAPPPS                    39

SEQ ID NO: 120           moltype = AA   length = 39
FEATURE                  Location/Qualifiers
source                   1..39
                         mol_type = protein
                         organism = synthetic construct
SITE                     2
                         note = D-alanine
MOD_RES                  13
                         note = Aib
MOD_RES                  20
                         note = AminoEthoxyEthoxyAcetic Acyl-MaleimidoPropionic Acyl
SEQUENCE: 120
YAMGTFTSDR LRXLDQFSAK AFVNWLSWGE PSSGAPPPS                    39

SEQ ID NO: 121           moltype = AA   length = 39
FEATURE                  Location/Qualifiers
source                   1..39
                         mol_type = protein
                         organism = synthetic construct
MOD_RES                  2
                         note = Aib
MOD_RES                  12..13
                         note = Aib
SITE                     3
                         note = D-alanine
SITE                     27
                         note = D-alanine
MOD_RES                  20
                         note = AminoEthoxyEthoxyAcetic Acyl-MaleimidoPropionic Acyl
SEQUENCE: 121
FXAGTFTSDS LXXLDHHNQK AFVEWLAPGL PSSGAPPPS                    39

SEQ ID NO: 122           moltype = AA   length = 39
FEATURE                  Location/Qualifiers
source                   1..39
                         mol_type = protein
                         organism = synthetic construct
MOD_RES                  16
                         note = AminoEthoxyEthoxyAcetic Acyl-MaleimidoPropionic Acyl
SEQUENCE: 122
HGQGTFTSDY SKYLDKRRAQ DFVEWLKNGG PSSGAPPPS                    39

SEQ ID NO: 123           moltype = AA   length = 39
FEATURE                  Location/Qualifiers
source                   1..39
                         mol_type = protein
                         organism = synthetic construct
MOD_RES                  2
                         note = Aib
MOD_RES                  13
                         note = Aib
MOD_RES                  20
                         note = AminoEthoxyEthoxyAcetic Acyl-MaleimidoPropionic Acyl
SEQUENCE: 123
HXQGTFTSDY SKXLDKRRAK DFVEWLKNGG PSSGAPPPS                    39

SEQ ID NO: 124           moltype = AA   length = 39
FEATURE                  Location/Qualifiers
source                   1..39
                         mol_type = protein
                         organism = synthetic construct
```

```
MOD_RES              2
                     note = Aib
MOD_RES              16
                     note = AminoEthoxyEthoxyAcetic Acyl-MaleimidoPropionic Acyl
SEQUENCE: 124
HXQGTFTSDY SKYLDKRRAQ DFVEWLKNGG PSSGAPPPS                        39

SEQ ID NO: 125       moltype = AA  length = 39
FEATURE              Location/Qualifiers
source               1..39
                     mol_type = protein
                     organism = synthetic construct
MOD_RES              2
                     note = Aib
MOD_RES              13
                     note = Aib
MOD_RES              20
                     note = AminoEthoxyEthoxyAcetic Acyl-MaleimidoPropionic Acyl
SEQUENCE: 125
YXEGTFTSDY SIXLDKIAQK AFVQWLIAGG PSSGAPPPS                        39

SEQ ID NO: 126       moltype = AA  length = 39
FEATURE              Location/Qualifiers
source               1..39
                     mol_type = protein
                     organism = synthetic construct
MOD_RES              2
                     note = Aib
MOD_RES              13
                     note = Alpha-Methyl-Leucine
MOD_RES              20
                     note = AminoEthoxyEthoxyAcetic Acyl-MaleimidoPropionic Acyl
SEQUENCE: 126
YXQGTFTSDY SIXLDKIAQK AFIEYLLEGG PSSGAPPPS                        39

SEQ ID NO: 127       moltype = AA  length = 39
FEATURE              Location/Qualifiers
source               1..39
                     mol_type = protein
                     organism = synthetic construct
SITE                 2
                     note = D-alanine
MOD_RES              20
                     note = AminoEthoxyEthoxyAcetic Acyl-MaleimidoPropionic Acyl
SEQUENCE: 127
HAEGTFTSDY AKYLDARRAK EFIAWLVNGG PSSGAPPPS                        39

SEQ ID NO: 128       moltype = AA  length = 39
FEATURE              Location/Qualifiers
source               1..39
                     mol_type = protein
                     organism = synthetic construct
SITE                 2
                     note = D-alanine
SITE                 10
                     note = D-serine
MOD_RES              20
                     note = Aib
MOD_RES              17
                     note = AminoEthoxyEthoxyAcetic Acyl-MaleimidoPropionic Acyl
SEQUENCE: 128
YAWGTFTSDS KDYLEFKWAX EFIQWLDPGD PSSGAPPPS                        39

SEQ ID NO: 129       moltype = AA  length = 39
FEATURE              Location/Qualifiers
source               1..39
                     mol_type = protein
                     organism = synthetic construct
MOD_RES              2
                     note = Aib
MOD_RES              13
                     note = Aib
MOD_RES              17
                     note = AminoEthoxyEthoxyAcetic Acyl-MaleimidoPropionic Acyl
MOD_RES              20
                     note = Aib
SEQUENCE: 129
FXYGTFTSDI NVXLDIKWAX AFINWLPGGI PSSGAPPPS                        39
```

```
SEQ ID NO: 130            moltype = AA   length = 39
FEATURE                   Location/Qualifiers
source                    1..39
                          mol_type = protein
                          organism = synthetic construct
SITE                      2..3
                          note = D-alanine
MOD_RES                   13
                          note = Aib
MOD_RES                   20
                          note = Aib
MOD_RES                   17
                          note = AminoEthoxyEthoxyAcetic Acyl-MaleimidoPropionic Acyl
SEQUENCE: 130
FAAGTFTSDR QEXLDVKLAX EFVQWLVSGD PSSGAPPPS                                   39

SEQ ID NO: 131            moltype = AA   length = 39
FEATURE                   Location/Qualifiers
source                    1..39
                          mol_type = protein
                          organism = synthetic construct
SITE                      2
                          note = D-alanine
MOD_RES                   13
                          note = Aib
SITE                      27
                          note = D-serine
MOD_RES                   17
                          note = AminoEthoxyEthoxyAcetic Acyl-MaleimidoPropionic Acyl
SEQUENCE: 131
FARGTFTSDS MQXLETKRQQ EFVNWLSMGV PSSGAPPPS                                   39

SEQ ID NO: 132            moltype = AA   length = 39
FEATURE                   Location/Qualifiers
source                    1..39
                          mol_type = protein
                          organism = synthetic construct
SITE                      2
                          note = D-alanine
MOD_RES                   13
                          note = Aib
MOD_RES                   20
                          note = Aib
MOD_RES                   17
                          note = AminoEthoxyEthoxyAcetic Acyl-MaleimidoPropionic Acyl
SEQUENCE: 132
YAHGTFTSDT NRXLESKAAX EFIAWLEVGA PSSGAPPPS                                   39

SEQ ID NO: 133            moltype = AA   length = 39
FEATURE                   Location/Qualifiers
source                    1..39
                          mol_type = protein
                          organism = synthetic construct
MOD_RES                   2
                          note = Aib
SITE                      12
                          note = D-serine
MOD_RES                   13
                          note = Aib
MOD_RES                   20
                          note = Aib
SITE                      16
                          note = D-serine
MOD_RES                   17
                          note = AminoEthoxyEthoxyAcetic Acyl-MaleimidoPropionic Acyl
SEQUENCE: 133
FXGGTFTSDF RSXLDSKIAX EFINWLFKGF PSSGAPPPS                                   39

SEQ ID NO: 134            moltype = AA   length = 39
FEATURE                   Location/Qualifiers
source                    1..39
                          mol_type = protein
                          organism = synthetic construct
MOD_RES                   2
                          note = Aib
MOD_RES                   17
                          note = AminoEthoxyEthoxyAcetic Acyl-MaleimidoPropionic Acyl
SEQUENCE: 134
YXNGTFTSDM MPYLEPKHQK DFVEWLTSGD PSSGAPPPS                                   39
```

```
SEQ ID NO: 135          moltype = AA  length = 39
FEATURE                 Location/Qualifiers
source                  1..39
                        mol_type = protein
                        organism = synthetic construct
SITE                    2
                        note = D-alanine
MOD_RES                 20
                        note = Aib
MOD_RES                 17
                        note = AminoEthoxyEthoxyAcetic Acyl-MaleimidoPropionic Acyl
SEQUENCE: 135
HAPGTFTSDI IHYLETKIAX EFIQWLKRGS PSSGAPPPS                              39

SEQ ID NO: 136          moltype = AA  length = 39
FEATURE                 Location/Qualifiers
source                  1..39
                        mol_type = protein
                        organism = synthetic construct
SITE                    2
                        note = D-serine
MOD_RES                 10
                        note = Aib
MOD_RES                 13
                        note = Aib
MOD_RES                 20
                        note = Aib
SITE                    28
                        note = D-alanine
MOD_RES                 17
                        note = AminoEthoxyEthoxyAcetic Acyl-MaleimidoPropionic Acyl
SEQUENCE: 136
FSVGTFTSDX SAXLDLKIAX EFINWLFAGF PSSGAPPPS                              39

SEQ ID NO: 137          moltype = AA  length = 39
FEATURE                 Location/Qualifiers
source                  1..39
                        mol_type = protein
                        organism = synthetic construct
MOD_RES                 2
                        note = Aib
SITE                    3
                        note = D-alanine
SITE                    27
                        note = D-serine
MOD_RES                 17
                        note = AminoEthoxyEthoxyAcetic Acyl-MaleimidoPropionic Acyl
SEQUENCE: 137
YXAGTFTSDG NMYLDKKHAK DFIEWLSSGP PSSGAPPPS                              39

SEQ ID NO: 138          moltype = AA  length = 39
FEATURE                 Location/Qualifiers
source                  1..39
                        mol_type = protein
                        organism = synthetic construct
SITE                    2
                        note = D-alanine
SITE                    11
                        note = D-serine
MOD_RES                 13
                        note = Aib
MOD_RES                 17
                        note = AminoEthoxyEthoxyAcetic Acyl-MaleimidoPropionic Acyl
SEQUENCE: 138
YAIGTFTSDP SHXLEVKNQK EFVQWLNRGI PSSGAPPPS                              39

SEQ ID NO: 139          moltype = AA  length = 39
FEATURE                 Location/Qualifiers
source                  1..39
                        mol_type = protein
                        organism = synthetic construct
SITE                    2
                        note = D-serine
MOD_RES                 13
                        note = Aib
MOD_RES                 17
                        note = AminoEthoxyEthoxyAcetic Acyl-MaleimidoPropionic Acyl
SEQUENCE: 139
```

```
FSTGTFTSDF VEXLEIKEQK AFIEWLAQGG PSSGAPPPS                         39

SEQ ID NO: 140           moltype = AA   length = 39
FEATURE                  Location/Qualifiers
source                   1..39
                         mol_type = protein
                         organism = synthetic construct
SITE                     18
                         note = D-alanine
SITE                     27
                         note = D-serine
MOD_RES                  17
                         note = AminoEthoxyEthoxyAcetic Acyl-MaleimidoPropionic Acyl
SEQUENCE: 140
FGTGTFTSDF DGYLEDKAAK AFIQWLSGGM PSSGAPPPS                         39

SEQ ID NO: 141           moltype = AA   length = 39
FEATURE                  Location/Qualifiers
source                   1..39
                         mol_type = protein
                         organism = synthetic construct
SITE                     2
                         note = D-serine
MOD_RES                  13
                         note = Aib
MOD_RES                  20
                         note = Aib
MOD_RES                  17
                         note = AminoEthoxyEthoxyAcetic Acyl-MaleimidoPropionic Acyl
SEQUENCE: 141
HSWGTFTSDW YIXLEEKNAX DFIAWLYAGY PSSGAPPPS                         39

SEQ ID NO: 142           moltype = AA   length = 39
FEATURE                  Location/Qualifiers
source                   1..39
                         mol_type = protein
                         organism = synthetic construct
MOD_RES                  13
                         note = Aib
MOD_RES                  27..28
                         note = Aib
MOD_RES                  17
                         note = AminoEthoxyEthoxyAcetic Acyl-MaleimidoPropionic Acyl
SEQUENCE: 142
FGPGTFTSDK KFXLELKGAK AFIAWLXXGF PSSGAPPPS                         39

SEQ ID NO: 143           moltype = AA   length = 39
FEATURE                  Location/Qualifiers
source                   1..39
                         mol_type = protein
                         organism = synthetic construct
SITE                     2
                         note = D-serine
SITE                     10
                         note = D-alanine
SITE                     12
                         note = D-serine
MOD_RES                  20
                         note = Aib
MOD_RES                  28
                         note = Aib
MOD_RES                  17
                         note = AminoEthoxyEthoxyAcetic Acyl-MaleimidoPropionic Acyl
SEQUENCE: 143
HSNGTFTSDA NSYLEPKAAX DFVNWLDXGW PSSGAPPPS                         39

SEQ ID NO: 144           moltype = AA   length = 39
FEATURE                  Location/Qualifiers
source                   1..39
                         mol_type = protein
                         organism = synthetic construct
SITE                     2
                         note = D-serine
MOD_RES                  17
                         note = AminoEthoxyEthoxyAcetic Acyl-MaleimidoPropionic Acyl
SEQUENCE: 144
FSTGTFTSDP WVYLDSKQQQ AFVEWLHFGN PSSGAPPPS                         39

SEQ ID NO: 145           moltype = AA   length = 39
```

```
FEATURE                    Location/Qualifiers
source                     1..39
                           mol_type = protein
                           organism = synthetic construct
SITE                       2
                           note = D-alanine
MOD_RES                    13
                           note = Aib
MOD_RES                    20
                           note = Aib
MOD_RES                    17
                           note = AminoEthoxyEthoxyAcetic Acyl-MaleimidoPropionic Acyl
SEQUENCE: 145
FAEGTFTSDW YPXLDLKSAX DFVQWLYGGP PSSGAPPPS                                39

SEQ ID NO: 146             moltype = AA  length = 39
FEATURE                    Location/Qualifiers
source                     1..39
                           mol_type = protein
                           organism = synthetic construct
MOD_RES                    13
                           note = Aib
MOD_RES                    17
                           note = AminoEthoxyEthoxyAcetic Acyl-MaleimidoPropionic Acyl
SEQUENCE: 146
FGIGTFTSDT ARXLDDKDQK EFVQWLNDGM PSSGAPPPS                                39

SEQ ID NO: 147             moltype = AA  length = 39
FEATURE                    Location/Qualifiers
source                     1..39
                           mol_type = protein
                           organism = synthetic construct
MOD_RES                    20
                           note = Aib
SITE                       30
                           note = D-serine
MOD_RES                    17
                           note = AminoEthoxyEthoxyAcetic Acyl-MaleimidoPropionic Acyl
SEQUENCE: 147
FGYGTFTSDK STYLDEKIQX DFVEWLNDGS PSSGAPPPS                                39

SEQ ID NO: 148             moltype = AA  length = 39
FEATURE                    Location/Qualifiers
source                     1..39
                           mol_type = protein
                           organism = synthetic construct
MOD_RES                    11
                           note = Aib
MOD_RES                    17
                           note = AminoEthoxyEthoxyAcetic Acyl-MaleimidoPropionic Acyl
SEQUENCE: 148
HGSGTFTSDA XPYLDQKGAQ DFIAWLDGGP PSSGAPPPS                                39

SEQ ID NO: 149             moltype = AA  length = 39
FEATURE                    Location/Qualifiers
source                     1..39
                           mol_type = protein
                           organism = synthetic construct
SITE                       2
                           note = D-alanine
MOD_RES                    13
                           note = Aib
MOD_RES                    17
                           note = AminoEthoxyEthoxyAcetic Acyl-MaleimidoPropionic Acyl
SEQUENCE: 149
HAIGTFTSDP PVXLEQKHQQ EFVAWLDPGL PSSGAPPPS                                39

SEQ ID NO: 150             moltype = AA  length = 39
FEATURE                    Location/Qualifiers
source                     1..39
                           mol_type = protein
                           organism = synthetic construct
SITE                       2
                           note = D-alanine
MOD_RES                    20
                           note = Aib
SITE                       27
                           note = D-alanine
MOD_RES                    17
```

```
                          note = AminoEthoxyEthoxyAcetic Acyl-MaleimidoPropionic Acyl
SEQUENCE: 150
YAYGTFTSDV NKYLDPKTAX AFVEWLAQGI PSSGAPPPS                       39

SEQ ID NO: 151          moltype = AA   length = 39
FEATURE                 Location/Qualifiers
source                  1..39
                        mol_type = protein
                        organism = synthetic construct
SITE                    2
                        note = D-alanine
MOD_RES                 20
                        note = Aib
MOD_RES                 17
                        note = AminoEthoxyEthoxyAcetic Acyl-MaleimidoPropionic Acyl
SEQUENCE: 151
FAIGTFTSDR REYLEPKEQX DFIEWLRDGG PSSGAPPPS                       39

SEQ ID NO: 152          moltype = AA   length = 39
FEATURE                 Location/Qualifiers
source                  1..39
                        mol_type = protein
                        organism = synthetic construct
MOD_RES                 17
                        note = AminoEthoxyEthoxyAcetic Acyl-MaleimidoPropionic Acyl
SEQUENCE: 152
YGNGTFTSDA WIYLDDKLQK EFVQWLRLGN PSSGAPPPS                       39

SEQ ID NO: 153          moltype = AA   length = 39
FEATURE                 Location/Qualifiers
source                  1..39
                        mol_type = protein
                        organism = synthetic construct
SITE                    2
                        note = D-alanine
SITE                    10..11
                        note = D-alanine
MOD_RES                 13
                        note = Aib
MOD_RES                 20
                        note = Aib
MOD_RES                 27
                        note = Aib
MOD_RES                 17
                        note = AminoEthoxyEthoxyAcetic Acyl-MaleimidoPropionic Acyl
SEQUENCE: 153
YAPGTFTSDA AAXLEDKYQX AFIAWLXQGW PSSGAPPPS                       39

SEQ ID NO: 154          moltype = AA   length = 39
FEATURE                 Location/Qualifiers
source                  1..39
                        mol_type = protein
                        organism = synthetic construct
SITE                    3
                        note = D-alanine
SITE                    28
                        note = D-serine
MOD_RES                 17
                        note = AminoEthoxyEthoxyAcetic Acyl-MaleimidoPropionic Acyl
SEQUENCE: 154
YGAGTFTSDI RAYLDEKWAK AFVAWLVSGM PSSGAPPPS                       39

SEQ ID NO: 155          moltype = AA   length = 39
FEATURE                 Location/Qualifiers
source                  1..39
                        mol_type = protein
                        organism = synthetic construct
MOD_RES                 13
                        note = Aib
MOD_RES                 18
                        note = Aib
MOD_RES                 17
                        note = AminoEthoxyEthoxyAcetic Acyl-MaleimidoPropionic Acyl
SEQUENCE: 155
YGWGTFTSDP INXLDLKXQK DFVNWLPMGA PSSGAPPPS                       39

SEQ ID NO: 156          moltype = AA   length = 39
FEATURE                 Location/Qualifiers
source                  1..39
```

```
                          mol_type = protein
                          organism = synthetic construct
SITE                      2
                          note = D-serine
SITE                      10
                          note = D-serine
SITE                      12
                          note = D-alanine
MOD_RES                   17
                          note = AminoEthoxyEthoxyAcetic Acyl-MaleimidoPropionic Acyl
SEQUENCE: 156
HSNGTFTSDS YAYLERKDQK AFIEWLWSGP PSSGAPPPS                                39

SEQ ID NO: 157            moltype = AA   length = 39
FEATURE                   Location/Qualifiers
source                    1..39
                          mol_type = protein
                          organism = synthetic construct
SITE                      2
                          note = D-serine
MOD_RES                   28
                          note = Aib
MOD_RES                   17
                          note = AminoEthoxyEthoxyAcetic Acyl-MaleimidoPropionic Acyl
SEQUENCE: 157
YSMGTFTSDQ GKYLEAKSAQ AFINWLMXGA PSSGAPPPS                                39

SEQ ID NO: 158            moltype = AA   length = 39
FEATURE                   Location/Qualifiers
source                    1..39
                          mol_type = protein
                          organism = synthetic construct
SITE                      2
                          note = D-alanine
MOD_RES                   13
                          note = Aib
MOD_RES                   16
                          note = Aib
SITE                      28
                          note = D-alanine
MOD_RES                   17
                          note = AminoEthoxyEthoxyAcetic Acyl-MaleimidoPropionic Acyl
SEQUENCE: 158
YAFGTFTSDL TRXLDXKTAK AFIEWLDAGM PSSGAPPPS                                39

SEQ ID NO: 159            moltype = AA   length = 39
FEATURE                   Location/Qualifiers
source                    1..39
                          mol_type = protein
                          organism = synthetic construct
MOD_RES                   2
                          note = Aib
MOD_RES                   10
                          note = Aib
MOD_RES                   20
                          note = Aib
MOD_RES                   17
                          note = AminoEthoxyEthoxyAcetic Acyl-MaleimidoPropionic Acyl
SEQUENCE: 159
YXKGTFTSDX IYYLDWKNAX AFVNWLHIGI PSSGAPPPS                                39

SEQ ID NO: 160            moltype = AA   length = 39
FEATURE                   Location/Qualifiers
source                    1..39
                          mol_type = protein
                          organism = synthetic construct
MOD_RES                   2
                          note = Aib
SITE                      11
                          note = D-serine
MOD_RES                   12..13
                          note = Aib
MOD_RES                   20
                          note = Aib
MOD_RES                   27
                          note = Aib
MOD_RES                   17
                          note = AminoEthoxyEthoxyAcetic Acyl-MaleimidoPropionic Acyl
SEQUENCE: 160
```

```
HXQGTFTSDW SXXLEKKVQX EFVNWLXTGD PSSGAPPPS                              39

SEQ ID NO: 161          moltype = AA   length = 39
FEATURE                 Location/Qualifiers
source                  1..39
                        mol_type = protein
                        organism = synthetic construct
SITE                    2..3
                        note = D-serine
SITE                    12
                        note = D-alanine
MOD_RES                 13
                        note = Aib
SITE                    18
                        note = D-alanine
MOD_RES                 27
                        note = Aib
MOD_RES                 17
                        note = AminoEthoxyEthoxyAcetic Acyl-MaleimidoPropionic Acyl
SEQUENCE: 161
FSSGTFTSDD RAXLDSKAAQ AFVAWLXAGT PSSGAPPPS                              39

SEQ ID NO: 162          moltype = AA   length = 39
FEATURE                 Location/Qualifiers
source                  1..39
                        mol_type = protein
                        organism = synthetic construct
SITE                    2
                        note = D-alanine
SITE                    18
                        note = D-alanine
SITE                    30
                        note = D-serine
MOD_RES                 17
                        note = AminoEthoxyEthoxyAcetic Acyl-MaleimidoPropionic Acyl
SEQUENCE: 162
YAIGTFTSDM KIYLDEKAAK AFVQWLANGS PSSGAPPPS                              39

SEQ ID NO: 163          moltype = AA   length = 39
FEATURE                 Location/Qualifiers
source                  1..39
                        mol_type = protein
                        organism = synthetic construct
MOD_RES                 13
                        note = Aib
MOD_RES                 20
                        note = Aib
MOD_RES                 17
                        note = AminoEthoxyEthoxyAcetic Acyl-MaleimidoPropionic Acyl
SEQUENCE: 163
FGQGTFTSDY DQXLDNKPQX DFIEWLMYGE PSSGAPPPS                              39

SEQ ID NO: 164          moltype = AA   length = 39
FEATURE                 Location/Qualifiers
source                  1..39
                        mol_type = protein
                        organism = synthetic construct
SITE                    2
                        note = D-serine
MOD_RES                 13
                        note = Aib
MOD_RES                 17
                        note = AminoEthoxyEthoxyAcetic Acyl-MaleimidoPropionic Acyl
SEQUENCE: 164
FSMGTFTSDL DRXLDWKIQK DFVQWLVSGT PSSGAPPPS                              39

SEQ ID NO: 165          moltype = AA   length = 39
FEATURE                 Location/Qualifiers
source                  1..39
                        mol_type = protein
                        organism = synthetic construct
SITE                    8
                        note = D-serine
SITE                    12
                        note = D-serine
MOD_RES                 17
                        note = AminoEthoxyEthoxyAcetic Acyl-MaleimidoPropionic Acyl
SITE                    2
                        note = D-serine
```

```
SEQUENCE: 165
YSVGTFTSDL HSYLDLKGAQ DFVNWLVWGQ PSSGAPPPS                39

SEQ ID NO: 166          moltype = AA  length = 39
FEATURE                 Location/Qualifiers
source                  1..39
                        mol_type = protein
                        organism = synthetic construct
MOD_RES                 2
                        note = Aib
MOD_RES                 17
                        note = AminoEthoxyEthoxyAcetic Acyl-MaleimidoPropionic Acyl
SEQUENCE: 166
HXIGTFTSDD VYYLDLKPQK EFVEWLGLGS PSSGAPPPS                39

SEQ ID NO: 167          moltype = AA  length = 39
FEATURE                 Location/Qualifiers
source                  1..39
                        mol_type = protein
                        organism = synthetic construct
MOD_RES                 13
                        note = Aib
MOD_RES                 17
                        note = AminoEthoxyEthoxyAcetic Acyl-MaleimidoPropionic Acyl
SEQUENCE: 167
FGVGTFTSDV MIXLDIKEQK EFINWLQSGE PSSGAPPPS                39

SEQ ID NO: 168          moltype = AA  length = 39
FEATURE                 Location/Qualifiers
source                  1..39
                        mol_type = protein
                        organism = synthetic construct
MOD_RES                 2
                        note = Aib
MOD_RES                 11
                        note = Aib
SITE                    12
                        note = D-serine
SITE                    16
                        note = D-serine
SITE                    30
                        note = D-serine
MOD_RES                 17
                        note = AminoEthoxyEthoxyAcetic Acyl-MaleimidoPropionic Acyl
SEQUENCE: 168
HXFGTFTSDH XSYLESKMAQ DFINWLIIGS PSSGAPPPS                39

SEQ ID NO: 169          moltype = AA  length = 39
FEATURE                 Location/Qualifiers
source                  1..39
                        mol_type = protein
                        organism = synthetic construct
SITE                    2
                        note = D-alanine
MOD_RES                 30
                        note = Aib
MOD_RES                 17
                        note = AminoEthoxyEthoxyAcetic Acyl-MaleimidoPropionic Acyl
SEQUENCE: 169
HAGGTFTSDP AKYLDSKVQQ EFVAWLAFGX PSSGAPPPS                39

SEQ ID NO: 170          moltype = AA  length = 39
FEATURE                 Location/Qualifiers
source                  1..39
                        mol_type = protein
                        organism = synthetic construct
SITE                    2
                        note = D-alanine
SITE                    11
                        note = D-serine
MOD_RES                 13
                        note = Aib
SITE                    28
                        note = D-serine
MOD_RES                 17
                        note = AminoEthoxyEthoxyAcetic Acyl-MaleimidoPropionic Acyl
SEQUENCE: 170
YANGTFTSDV SFXLEYKDQK DFIQWLASGQ PSSGAPPPS                39
```

-continued

```
SEQ ID NO: 171          moltype = AA  length = 39
FEATURE                 Location/Qualifiers
source                  1..39
                        mol_type = protein
                        organism = synthetic construct
SITE                    2
                        note = D-serine
MOD_RES                 20
                        note = Aib
MOD_RES                 17
                        note = AminoEthoxyEthoxyAcetic Acyl-MaleimidoPropionic Acyl
SEQUENCE: 171
FSVGTFTSDN RQYLDVKNQX DFIQWLPWGI PSSGAPPPS                                   39

SEQ ID NO: 172          moltype = AA  length = 39
FEATURE                 Location/Qualifiers
source                  1..39
                        mol_type = protein
                        organism = synthetic construct
MOD_RES                 2
                        note = Aib
MOD_RES                 20
                        note = Aib
MOD_RES                 17
                        note = AminoEthoxyEthoxyAcetic Acyl-MaleimidoPropionic Acyl
SEQUENCE: 172
HXVGTFTSDK ETYLDIKKAX DFVEWLSTGR PSSGAPPPS                                   39

SEQ ID NO: 173          moltype = AA  length = 39
FEATURE                 Location/Qualifiers
source                  1..39
                        mol_type = protein
                        organism = synthetic construct
MOD_RES                 13
                        note = Aib
MOD_RES                 20
                        note = Aib
MOD_RES                 17
                        note = AminoEthoxyEthoxyAcetic Acyl-MaleimidoPropionic Acyl
SEQUENCE: 173
FGWGTFTSDD FNXLEYKHAX EFVNWLDVGQ PSSGAPPPS                                   39

SEQ ID NO: 174          moltype = AA  length = 39
FEATURE                 Location/Qualifiers
source                  1..39
                        mol_type = protein
                        organism = synthetic construct
SITE                    2
                        note = D-alanine
MOD_RES                 13
                        note = Aib
MOD_RES                 17
                        note = AminoEthoxyEthoxyAcetic Acyl-MaleimidoPropionic Acyl
SEQUENCE: 174
FAYGTFTSDQ SYXLDYKTAK DFIQWLTKGR PSSGAPPPS                                   39

SEQ ID NO: 175          moltype = AA  length = 39
FEATURE                 Location/Qualifiers
source                  1..39
                        mol_type = protein
                        organism = synthetic construct
MOD_RES                 11
                        note = Aib
SITE                    16
                        note = D-alanine
MOD_RES                 17
                        note = AminoEthoxyEthoxyAcetic Acyl-MaleimidoPropionic Acyl
SEQUENCE: 175
FGPGTFTSDD XIYLEAKNAQ AFIEWLFSGQ PSSGAPPPS                                   39

SEQ ID NO: 176          moltype = AA  length = 39
FEATURE                 Location/Qualifiers
source                  1..39
                        mol_type = protein
                        organism = synthetic construct
MOD_RES                 2
                        note = Aib
SITE                    11
                        note = D-serine
```

```
MOD_RES                 13
                        note = Aib
MOD_RES                 20
                        note = Aib
MOD_RES                 17
                        note = AminoEthoxyEthoxyAcetic Acyl-MaleimidoPropionic Acyl
SEQUENCE: 176
YXIGTFTSDS SIXLDSKAQX DFIQWLLFGQ PSSGAPPPS                         39

SEQ ID NO: 177          moltype = AA   length = 39
FEATURE                 Location/Qualifiers
source                  1..39
                        mol_type = protein
                        organism = synthetic construct
SITE                    2
                        note = D-serine
MOD_RES                 13
                        note = Aib
MOD_RES                 17
                        note = AminoEthoxyEthoxyAcetic Acyl-MaleimidoPropionic Acyl
SEQUENCE: 177
HSGGTFTSDP YGXLEQKMAK EFVEWLMTGK PSSGAPPPS                         39

SEQ ID NO: 178          moltype = AA   length = 39
FEATURE                 Location/Qualifiers
source                  1..39
                        mol_type = protein
                        organism = synthetic construct
SITE                    2
                        note = D-alanine
MOD_RES                 17
                        note = AminoEthoxyEthoxyAcetic Acyl-MaleimidoPropionic Acyl
SEQUENCE: 178
HAEGTFTSDY AKYLDAKRAK EFIAWLVNGG PSSGAPPPS                         39

SEQ ID NO: 179          moltype = AA   length = 39
FEATURE                 Location/Qualifiers
source                  1..39
                        mol_type = protein
                        organism = synthetic construct
MOD_RES                 2
                        note = Aib
MOD_RES                 13
                        note = Alpha-Methyl-Leucine
MOD_RES                 20
                        note = Aib
MOD_RES                 17
                        note = AminoEthoxyEthoxyAcetic Acyl-MaleimidoPropionic Acyl
SEQUENCE: 179
YXQGTFTSDY SIXLDKKAQX AFIEYLLEGG PSSGAPPPS                         39

SEQ ID NO: 180          moltype = AA   length = 39
FEATURE                 Location/Qualifiers
source                  1..39
                        mol_type = protein
                        organism = synthetic construct
MOD_RES                 16
                        note = AminoEthoxyEthoxyAcetic Acyl-MaleimidoPropionic Acyl
SEQUENCE: 180
HGQGTFTSDY SKYLDKRRAQ DFVEWLKNGG PSSGAPPPS                         39

SEQ ID NO: 181          moltype = AA   length = 39
FEATURE                 Location/Qualifiers
source                  1..39
                        mol_type = protein
                        organism = synthetic construct
MOD_RES                 2
                        note = Aib
MOD_RES                 13
                        note = Aib
MOD_RES                 16
                        note = AminoEthoxyEthoxyAcetic Acyl-MaleimidoPropionic Acyl
SEQUENCE: 181
HXQGTFTSDY SKXLDKRRAQ DFVEWLKNGG PSSGAPPPS                         39

SEQ ID NO: 182          moltype = AA   length = 39
FEATURE                 Location/Qualifiers
source                  1..39
                        mol_type = protein
```

|  |  |
|---|---|
| MOD_RES | 2 |
|  | note = Aib |
| MOD_RES | 16 |
|  | note = AminoEthoxyEthoxyAcetic Acyl-MaleimidoPropionic Acyl |
| SEQUENCE: 182 |  |
| HXQGTFTSDY SKYLDKRRAQ DFVEWLKNGG PSSGAPPPS | 39 |
| SEQ ID NO: 183 | moltype = AA   length = 40 |
| FEATURE | Location/Qualifiers |
| source | 1..40 |
|  | mol_type = protein |
|  | organism = synthetic construct |
| VARIANT | 1 |
|  | note = X can be H, Y or F |
| VARIANT | 2 |
|  | note = X can be G, D-Alanine, Aib or D-serine |
| SITE | 2 |
|  | note = D-alanine or D-serine |
| VARIANT | 3 |
|  | note = X can be A,R,N,D,E,Q,G,H,I,L,K,M,F,P,S,T,W,Y,D-alanine,Aib,D-serine or D-Lysine |
| SITE | 3 |
|  | note = D-alanine,D-serine or D-Lysine |
| MOD_RES | 2 |
|  | note = Aib |
| MOD_RES | 3 |
|  | note = Aib |
| VARIANT | 10 |
|  | note = X can be A,R,N,D,E,Q,G,H,I,L,K,M,F,P,S,T,W,Y,D-alanine,Aib,D-serine or D-Lysine |
| SITE | 10 |
|  | note = D-alanine,D-serine or D-Lysine |
| MOD_RES | 10 |
|  | note = Aib |
| VARIANT | 11 |
|  | note = X can be A,R,N,D,E,Q,G,H,I,L,K,M,F,P,S,T,W,Y,D-alanine,Aib,D-serine or D-Lysine |
| SITE | 11 |
|  | note = D-alanine,D-serine or D-Lysine |
| MOD_RES | 11 |
|  | note = Aib |
| VARIANT | 12 |
|  | note = X can be A,R,N,D,E,Q,G,H,I,L,K,M,F,P,S,T,W,Y,D-alanine,Aib,D-serine or D-Lysine |
| SITE | 12 |
|  | note = D-alanine,D-serine or D-Lysine |
| MOD_RES | 12 |
|  | note = Aib |
| VARIANT | 13 |
|  | note = X can be Y or Aib |
| MOD_RES | 13 |
|  | note = Aib |
| VARIANT | 15 |
|  | note = X can be D or E |
| VARIANT | 16 |
|  | note = X can be A,R,N,D,E,Q,G,H,I,L,K,M,F,P,S,T,W,Y,D-alanine,Aib,D-serine or D-Lysine |
| SITE | 16 |
|  | note = D-alanine,D-serine or D-Lysine |
| MOD_RES | 16 |
|  | note = Aib |
| VARIANT | 17 |
|  | note = X can be A,R,N,D,E,Q,G,H,I,L,K,M,F,P,S,T,W,Y,D-alanine,Aib,D-serine or D-Lysine |
| SITE | 17 |
|  | note = D-alanine,D-serine or D-Lysine |
| MOD_RES | 17 |
|  | note = Aib |
| VARIANT | 18 |
|  | note = X can be A,R,N,D,E,Q,G,H,I,L,K,M,F,P,S,T,W,Y,D-alanine,Aib,D-serine or D-Lysine |

```
SITE                     18
                         note = D-alanine,D-serine or D-Lysine
MOD_RES                  18
                         note = Aib
VARIANT                  19
                         note = X can be Q or A
VARIANT                  20
                         note = X can be Q, K or Aib
MOD_RES                  20
                         note = Aib
VARIANT                  21
                         note = X can be D, E or A
VARIANT                  23
                         note = X can be V or I
VARIANT                  24
                         note = X can be Q, A, E or N
VARIANT                  28
                         note = X can be
                          A,R,N,D,E,Q,G,H,I,L,K,M,F,P,S,T,W,Y,D-alanine,Aib,D-serine
                          or D-Lysine
SITE                     28
                         note = D-alanine,D-serine or D-Lysine
MOD_RES                  28
                         note = Aib
VARIANT                  27
                         note = X can be
                          A,R,N,D,E,Q,G,H,I,L,K,M,F,P,S,T,W,Y,D-alanine,Aib,D-serine
                          or D-Lysine
SITE                     27
                         note = D-alanine,D-serine or D-Lysine
MOD_RES                  30
                         note = Aib
VARIANT                  30
                         note = X can be
                          A,R,N,D,E,Q,G,H,I,L,K,M,F,P,S,T,W,Y,D-alanine,Aib,D-serine
                          or D-Lysine
SITE                     30
                         note = D-alanine,D-serine or D-Lysine
MOD_RES                  27
                         note = Aib
VARIANT                  40
                         note = X can be K or absent
SEQUENCE: 183
XXXGTFTSDX XXXLXXXXXX XFXXWLXXGX PSSGAPPPSX                                      40

SEQ ID NO: 184           moltype = AA   length = 41
FEATURE                  Location/Qualifiers
source                   1..41
                         mol_type = protein
                         organism = synthetic construct
VARIANT                  1
                         note = X can be H, Y or F
VARIANT                  2
                         note = X can be G, D-Alanine, Aib or D-serine
SITE                     2
                         note = D-alanine or D-serine
VARIANT                  3
                         note = X can be
                          A,R,N,D,E,Q,G,H,I,L,K,M,F,P,S,T,W,Y,D-alanine,Aib,D-serine
                          or D-Lysine
SITE                     3
                         note = D-alanine,D-serine or D-Lysine
MOD_RES                  2
                         note = Aib
MOD_RES                  3
                         note = Aib
VARIANT                  10
                         note = X can be
                          A,R,N,D,E,Q,G,H,I,L,K,M,F,P,S,T,W,Y,D-alanine,Aib,D-serine
                          or D-Lysine
SITE                     10
                         note = D-alanine,D-serine or D-Lysine
MOD_RES                  10
                         note = Aib
VARIANT                  11
                         note = X can be
                          A,R,N,D,E,Q,G,H,I,L,K,M,F,P,S,T,W,Y,D-alanine,Aib,D-serine
                          or D-Lysine
SITE                     11
```

```
                    note = D-alanine,D-serine or D-Lysine
MOD_RES             11
                    note = Aib
VARIANT             12
                    note = X can be
                    A,R,N,D,E,Q,G,H,I,L,K,M,F,P,S,T,W,Y,D-alanine,Aib,D-serine
                    or D-Lysine
SITE                12
                    note = D-alanine,D-serine or D-Lysine
MOD_RES             12
                    note = Aib
VARIANT             13
                    note = X can be Y, Q, N-Methyl-L-Leucine or Aib
MOD_RES             13
                    note = Aib
VARIANT             15
                    note = X can be D or E
VARIANT             16
                    note = X can be
                    A,R,N,D,E,Q,G,H,I,L,K,M,F,P,S,T,W,Y,D-alanine,Aib,D-serine
                    or D-Lysine
SITE                16
                    note = D-alanine,D-serine or D-Lysine
MOD_RES             16
                    note = Aib
VARIANT             17
                    note = X can be
                    A,R,N,D,E,Q,G,H,I,L,K,M,F,P,S,T,W,Y,D-alanine,Aib,D-serine
                    or D-Lysine
SITE                17
                    note = D-alanine,D-serine or D-Lysine
MOD_RES             17
                    note = Aib
VARIANT             18
                    note = X can be
                    A,R,N,D,E,Q,G,H,I,L,K,M,F,P,S,T,W,Y,D-alanine,Aib,D-serine
                    or D-Lysine
SITE                18
                    note = D-alanine,D-serine or D-Lysine
MOD_RES             18
                    note = Aib
VARIANT             19
                    note = X can be Q or A
VARIANT             20
                    note = X can be Q, K, Q, R  or Aib
MOD_RES             20
                    note = Aib
VARIANT             21
                    note = X can be D, E or A
VARIANT             23
                    note = X can be V or I
VARIANT             24
                    note = X can be Q, A, E or N
VARIANT             28
                    note = X can be
                    A,R,N,D,E,Q,G,H,I,L,K,M,F,P,S,T,W,Y,D-alanine,Aib,D-serine
                    or D-Lysine
SITE                28
                    note = D-alanine,D-serine or D-Lysine
MOD_RES             28
                    note = Aib
VARIANT             27
                    note = X can be
                    A,R,N,D,E,Q,G,H,I,L,K,M,F,P,S,T,W,Y,D-alanine,Aib,D-serine
                    or D-Lysine
SITE                27
                    note = D-alanine,D-serine or D-Lysine
MOD_RES             30
                    note = Aib
VARIANT             30
                    note = X can be
                    A,R,N,D,E,Q,G,H,I,L,K,M,F,P,S,T,W,Y,D-alanine,Aib,D-serine
                    or D-Lysine
SITE                30
                    note = D-alanine,D-serine or D-Lysine
MOD_RES             27
                    note = Aib
VARIANT             40
                    note = X can be K or absent
```

```
MOD_RES                    2
                           note = Amino-cyclobutyl-1-carboxylic acid
MOD_RES                    13
                           note = N-Methyl-L-Leucine
                           41
                           note = AminoEthoxyEthoxyAcetic Acid //
                           8-amino-3,6-dioxa-octanoic acid
SEQUENCE: 184
XXXGTFTSDX XXXLXXXXXX XFXXWLXXGX PSSGAPPPSX K                               41

SEQ ID NO: 185             moltype = AA  length = 31
FEATURE                    Location/Qualifiers
source                     1..31
                           mol_type = protein
                           organism = synthetic construct
MOD_RES                    2
                           note = Aib
MOD_RES                    31
                           note = AminoEthoxyEthoxyAcetic Acyl-MaleimidoPropionic Acyl
SEQUENCE: 185
HXEGTFTSDV SSYLEGQAAK EFIAWLVKGR K                                          31

SEQ ID NO: 186             moltype = AA  length = 31
FEATURE                    Location/Qualifiers
source                     1..31
                           mol_type = protein
                           organism = synthetic construct
MOD_RES                    2
                           note = Aib
MOD_RES                    31
                           note = AminoEthoxyEthoxyAcetic Acyl-AminoEthoxyEthoxyAcetic
                           Acyl-MaleimidoPropionic Acyl
SEQUENCE: 186
HXEGTFTSDV SSYLEGQAAK EFIAWLVKGR K                                          31

SEQ ID NO: 187             moltype = AA  length = 31
FEATURE                    Location/Qualifiers
source                     1..31
                           mol_type = protein
                           organism = synthetic construct
MOD_RES                    2
                           note = Aib
MOD_RES                    31
                           note = AminoEthoxyEthoxyAcetic Acyl-8-AminoOctanoic
                           Acyl-MaleimidoPropionic Acyl
SEQUENCE: 187
HXEGTFTSDV SSYLEGQAAK EFIAWLVKGR K                                          31

SEQ ID NO: 188             moltype = AA  length = 31
FEATURE                    Location/Qualifiers
source                     1..31
                           mol_type = protein
                           organism = synthetic construct
MOD_RES                    2
                           note = Aib
SEQUENCE: 188
HXEGTFTSDV SSYLEGQAAK EFIAWLVKGR K                                          31

SEQ ID NO: 189             moltype = AA  length = 32
FEATURE                    Location/Qualifiers
source                     1..32
                           mol_type = protein
                           organism = synthetic construct
MOD_RES                    2
                           note = Aib
MOD_RES                    32
                           note = AminoEthoxyEthoxyAcetic Acyl-MaleimidoPropionic Acyl
MOD_RES                    31
                           note = AminoEthoxyEthoxyAcetic Acid //
                           8-amino-3,6-dioxa-octanoic acid
SEQUENCE: 189
HXEGTFTSDV SSYLEGQAAK EFIAWLVKGR XK                                         32

SEQ ID NO: 190             moltype = AA  length = 40
FEATURE                    Location/Qualifiers
source                     1..40
                           mol_type = protein
                           organism = synthetic construct
MOD_RES                    40
```

```
                              note = AminoEthoxyEthoxyAcetic Acyl-AminoEthoxyEthoxyAcetic
                              Acyl-MaleimidoPropionic Acyl
SEQUENCE: 190
HGEGTFTSDL SKQMEEEAVR LFIEWLKNGG PSSGAPPPSK                              40

SEQ ID NO: 191                moltype = AA  length = 40
FEATURE                       Location/Qualifiers
source                        1..40
                              mol_type = protein
                              organism = synthetic construct
MOD_RES                       40
                              note = AminoEthoxyEthoxyAcetic Acyl-8-AminoOctanoic
                              Acyl-MaleimidoPropionic Acyl
SEQUENCE: 191
HGEGTFTSDL SKQMEEEAVR LFIEWLKNGG PSSGAPPPSK                              40

SEQ ID NO: 192                moltype = AA  length = 40
FEATURE                       Location/Qualifiers
source                        1..40
                              mol_type = protein
                              organism = synthetic construct
SEQUENCE: 192
HGEGTFTSDL SKQMEEEAVR LFIEWLKNGG PSSGAPPPSK                              40

SEQ ID NO: 193                moltype = AA  length = 41
FEATURE                       Location/Qualifiers
source                        1..41
                              mol_type = protein
                              organism = synthetic construct
MOD_RES                       40
                              note = AminoEthoxyEthoxyAcetic Acid //
                              8-amino-3,6-dioxa-octanoic acid
MOD_RES                       41
                              note = AminoEthoxyEthoxyAcetic Acyl-MaleimidoPropionic Acyl
SEQUENCE: 193
HGEGTFTSDL SKQMEEEAVR LFIEWLKNGG PSSGAPPPSX K                            41

SEQ ID NO: 194                moltype = AA  length = 40
FEATURE                       Location/Qualifiers
source                        1..40
                              mol_type = protein
                              organism = synthetic construct
SITE                          2
                              note = D-serine
MOD_RES                       40
                              note = AminoEthoxyEthoxyAcetic Acyl-MaleimidoPropionic Acyl
SEQUENCE: 194
HSQGTFTSDY SKYLDSRRAQ DFVQWLMNTG PSSGAPPPSK                              40

SEQ ID NO: 195                moltype = AA  length = 40
FEATURE                       Location/Qualifiers
source                        1..40
                              mol_type = protein
                              organism = synthetic construct
SITE                          2
                              note = D-serine
MOD_RES                       40
                              note = AminoEthoxyEthoxyAcetic Acyl-AminoEthoxyEthoxyAcetic
                              Acyl-MaleimidoPropionic Acyl
SEQUENCE: 195
HSQGTFTSDY SKYLDSRRAQ DFVQWLMNTG PSSGAPPPSK                              40

SEQ ID NO: 196                moltype = AA  length = 40
FEATURE                       Location/Qualifiers
source                        1..40
                              mol_type = protein
                              organism = synthetic construct
SITE                          2
                              note = D-serine
MOD_RES                       40
                              note = AminoEthoxyEthoxyAcetic Acyl-8-AminoOctanoic
                              Acyl-MaleimidoPropionic Acyl
SEQUENCE: 196
HSQGTFTSDY SKYLDSRRAQ DFVQWLMNTG PSSGAPPPSK                              40

SEQ ID NO: 197                moltype = AA  length = 40
FEATURE                       Location/Qualifiers
source                        1..40
                              mol_type = protein
```

```
                        organism = synthetic construct
SITE                    2
                        note = D-serine
SEQUENCE: 197
HSQGTFTSDY SKYLDSRRAQ DFVQWLMNTG PSSGAPPPSK                              40

SEQ ID NO: 198          moltype = AA  length = 41
FEATURE                 Location/Qualifiers
source                  1..41
                        mol_type = protein
                        organism = synthetic construct
SITE                    2
                        note = D-serine
MOD_RES                 40
                        note = AminoEthoxyEthoxyAcetic Acid //
                         8-amino-3,6-dioxa-octanoic acid
MOD_RES                 41
                        note = AminoEthoxyEthoxyAcetic Acyl-MaleimidoPropionic Acyl
SEQUENCE: 198
HSQGTFTSDY SKYLDSRRAQ DFVQWLMNTG PSSGAPPPSX K                            41

SEQ ID NO: 199          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 199
YAEGTFISDY SIAMDKIHQQ DFVNWLLAQG PSSGAPPPSK                              40

SEQ ID NO: 200          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-AminoEthoxyEthoxyAcetic
                         Acyl-MaleimidoPropionic Acyl
SEQUENCE: 200
YAEGTFISDY SIAMDKIHQQ DFVNWLLAQG PSSGAPPPSK                              40

SEQ ID NO: 201          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-8-AminoOctanoic
                         Acyl-MaleimidoPropionic Acyl
SEQUENCE: 201
YAEGTFISDY SIAMDKIHQQ DFVNWLLAQG PSSGAPPPSK                              40

SEQ ID NO: 202          moltype = AA  length = 40
FEATURE                 Location/Qualifiers
source                  1..40
                        mol_type = protein
                        organism = synthetic construct
SITE                    2
                        note = D-alanine
SEQUENCE: 202
YAEGTFISDY SIAMDKIHQQ DFVNWLLAQG PSSGAPPPSK                              40

SEQ ID NO: 203          moltype = AA  length = 41
FEATURE                 Location/Qualifiers
source                  1..41
                        mol_type = protein
                        organism = synthetic construct
SITE                    2
                        note = D-alanine
MOD_RES                 40
                        note = AminoEthoxyEthoxyAcetic Acid //
                         8-amino-3,6-dioxa-octanoic acid
```

```
                                -continued

MOD_RES                 41
                        note = AminoEthoxyEthoxyAcetic Acyl-MaleimidoPropionic Acyl
SEQUENCE: 203
YAEGTFISDY SIAMDKIHQQ DFVNWLLAQG PSSGAPPPSX K                            41

SEQ ID NO: 204          moltype = AA   length = 30
FEATURE                 Location/Qualifiers
source                  1..30
                        mol_type = protein
                        organism = synthetic construct
MOD_RES                 20
                        note = AminoEthoxyEthoxyAcetic Acyl-MaleimidoPropionic Acyl
SEQUENCE: 204
HAEGTFTSDV SSYLEGQAAK EFIAWLVRGR                                         30

SEQ ID NO: 205          moltype = AA   length = 31
FEATURE                 Location/Qualifiers
source                  1..31
                        mol_type = protein
                        organism = synthetic construct
MOD_RES                 20
                        note = AminoEthoxyEthoxyAcetic Acyl-MaleimidoPropionic Acyl
MOD_RES                 2
                        note = Aib
SEQUENCE: 205
HXEGTFTSDV SSYLEGQAAK EFIAWLVRGR G                                       31

SEQ ID NO: 206          moltype = AA   length = 31
FEATURE                 Location/Qualifiers
source                  1..31
                        mol_type = protein
                        organism = synthetic construct
MOD_RES                 24
                        note = AminoEthoxyEthoxyAcetic Acyl-MaleimidoPropionic Acyl
SEQUENCE: 206
HVEGTFTSDV SSYLEEQAAR EFIKWLVRGR G                                       31

SEQ ID NO: 207          moltype = AA   length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-AminoEthoxyEthoxyAcetic
                        Acyl-MaleimidoPropionic Acyl
SEQUENCE: 207
HAEGTFTSDV SSYLEGQAAK EFIAWLVNGG PSSGAPPPSK                              40

SEQ ID NO: 208          moltype = AA   length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-8-AminoOctanoic
                        Acyl-MaleimidoPropionic Acyl
SEQUENCE: 208
HAEGTFTSDV SSYLEGQAAK EFIAWLVNGG PSSGAPPPSK                              40

SEQ ID NO: 209          moltype = AA   length = 40
FEATURE                 Location/Qualifiers
source                  1..40
                        mol_type = protein
                        organism = synthetic construct
SITE                    2
                        note = D-alanine
SEQUENCE: 209
HAEGTFTSDV SSYLEGQAAK EFIAWLVNGG PSSGAPPPSK                              40

SEQ ID NO: 210          moltype = AA   length = 41
FEATURE                 Location/Qualifiers
source                  1..41
                        mol_type = protein
                        organism = synthetic construct
SITE                    2
```

```
                         note = D-alanine
MOD_RES                  40
                         note = AminoEthoxyEthoxyAcetic Acid //
                         8-amino-3,6-dioxa-octanoic acid
MOD_RES                  41
                         note = AminoEthoxyEthoxyAcetic Acyl-MaleimidoPropionic Acyl
SEQUENCE: 210
HAEGTFTSDV SSYLEGQAAK EFIAWLVNGG PSSGAPPPSX K                    41

SEQ ID NO: 211           moltype = AA   length = 40
FEATURE                  Location/Qualifiers
source                   1..40
                         mol_type = protein
                         organism = synthetic construct
SITE                     2
                         note = D-alanine
MOD_RES                  40
                         note = AminoEthoxyEthoxyAcetic Acyl-MaleimidoPropionic Acyl
SEQUENCE: 211
HAEGTFTSDV ASYLEGQAAK EFIAWLVNGG PSSGAPPPSK                      40

SEQ ID NO: 212           moltype = AA   length = 40
FEATURE                  Location/Qualifiers
source                   1..40
                         mol_type = protein
                         organism = synthetic construct
MOD_RES                  2
                         note = Aib
MOD_RES                  20
                         note = Aib
MOD_RES                  40
                         note = AminoEthoxyEthoxyAcetic Acyl-MaleimidoPropionic Acyl
SEQUENCE: 212
YXEGTFTSDY SIYLDKQAAX EFVNWLLAGG PSSGAPPPSK                      40

SEQ ID NO: 213           moltype = AA   length = 34
FEATURE                  Location/Qualifiers
source                   1..34
                         mol_type = protein
                         organism = synthetic construct
MOD_RES                  2
                         note = Aib
MOD_RES                  20
                         note = AminoEthoxyEthoxyAcetic Acyl-MaleimidoPropionic Acyl
SEQUENCE: 213
HXQGTFTSDY SKYLDEKKAK EFVEWLLEGG PSSG                            34

SEQ ID NO: 214           moltype = AA   length = 29
FEATURE                  Location/Qualifiers
source                   1..29
                         mol_type = protein
                         organism = synthetic construct
MOD_RES                  2
                         note = Aib
MOD_RES                  17
                         note = AminoEthoxyEthoxyAcetic Acyl-MaleimidoPropionic Acyl
SEQUENCE: 214
HXQGTFTSDY SKYLDEKAAK EFIQWLLQT                                  29

SEQ ID NO: 215           moltype = AA   length = 30
FEATURE                  Location/Qualifiers
source                   1..30
                         mol_type = protein
                         organism = synthetic construct
MOD_RES                  2
                         note = Aib
SEQUENCE: 215
HXQGTFTSDY SKYLDEKRAK EFVQWLMNTC                                 30

SEQ ID NO: 216           moltype = AA   length = 29
FEATURE                  Location/Qualifiers
source                   1..29
                         mol_type = protein
                         organism = synthetic construct
SITE                     2
                         note = D-serine
MOD_RES                  10
                         note = AminoEthoxyEthoxyAcetic Acyl-MaleimidoPropionic Acyl
SEQUENCE: 216
```

HSQGTFTSDK SKYLDARAAQ DFVQWLLDT                                              29

SEQ ID NO: 217          moltype = AA   length = 29
FEATURE                 Location/Qualifiers
source                  1..29
                        mol_type = protein
                        organism = synthetic construct
MOD_RES                 24
                        note = AminoEthoxyEthoxyAcetic Acyl-MaleimidoPropionic Acyl
MOD_RES                 2
                        note = Amino-cyclobutyl-1-carboxylic acid
SEQUENCE: 217
HXQGTFTSDY SKYLDERAAK DFIKWLESA                                              29

SEQ ID NO: 218          moltype = AA   length = 39
FEATURE                 Location/Qualifiers
source                  1..39
                        mol_type = protein
                        organism = synthetic construct
SITE                    2
                        note = D-serine
MOD_RES                 14
                        note = AminoEthoxyEthoxyAcetic Acyl-MaleimidoPropionic Acyl
SEQUENCE: 218
HSQGTFTSDL SKQKESKAAQ DFIEWLKAGG PSSGAPPPS                                    39

SEQ ID NO: 219          moltype = AA   length = 30
FEATURE                 Location/Qualifiers
source                  1..30
                        mol_type = protein
                        organism = synthetic construct
MOD_RES                 10
                        note = AminoEthoxyEthoxyAcetic Acyl-MaleimidoPropionic Acyl
SEQUENCE: 219
HSQGTFTSDK SEYLDSERAR DFVAWLEAGG                                              30

SEQ ID NO: 220          moltype = AA   length = 39
FEATURE                 Location/Qualifiers
source                  1..39
                        mol_type = protein
                        organism = synthetic construct
MOD_RES                 2
                        note = Aib
MOD_RES                 10
                        note = AminoEthoxyEthoxyAcetic Acyl-MaleimidoPropionic Acyl
SEQUENCE: 220
HXQGTFTSDK SKYLDERAAQ DFVQWLLDGG PSSGAPPPS                                    39

SEQ ID NO: 221          moltype = AA   length = 39
FEATURE                 Location/Qualifiers
source                  1..39
                        mol_type = protein
                        organism = synthetic construct
MOD_RES                 10
                        note = AminoEthoxyEthoxyAcetic Acyl-MaleimidoPropionic Acyl
SEQUENCE: 221
HSQGTFTSDK SKYLDERRAQ DFVQWLLDGG PSSGAPPPS                                    39

SEQ ID NO: 222          moltype = AA   length = 39
FEATURE                 Location/Qualifiers
source                  1..39
                        mol_type = protein
                        organism = synthetic construct
MOD_RES                 2
                        note = Aib
MOD_RES                 20
                        note = Aib
MOD_RES                 34
                        note = Aib
MOD_RES                 14
                        note = AminoEthoxyEthoxyAcetic Acyl-MaleimidoPropionic Acyl
SEQUENCE: 222
HXHGTGTSDL SKLKEEQRQX EFIEWLKAAG PPSXKPPPK                                    39

SEQ ID NO: 223          moltype = AA   length = 40
FEATURE                 Location/Qualifiers
source                  1..40
                        mol_type = protein
                        organism = synthetic construct

```
SITE                    2
                        note = D-alanine
MOD_RES                 40
                        note = AminoEthoxyEthoxyAcetic Acyl-MaleimidoPropionic Acyl
SEQUENCE: 223
HAQGTFTSDY AKYLDARRAK EFIAWLVNGG PSSGAPPPSK                              40

SEQ ID NO: 224          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-AminoEthoxyEthoxyAcetic
                         Acyl-MaleimidoPropionic Acyl
SEQUENCE: 224
HAQGTFTSDY AKYLDARRAK EFIAWLVNGG PSSGAPPPSK                              40

SEQ ID NO: 225          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-8-AminoOctanoic
                         Acyl-MaleimidoPropionic Acyl
SEQUENCE: 225
HAQGTFTSDY AKYLDARRAK EFIAWLVNGG PSSGAPPPSK                              40

SEQ ID NO: 226          moltype = AA  length = 40
FEATURE                 Location/Qualifiers
source                  1..40
                        mol_type = protein
                        organism = synthetic construct
SITE                    2
                        note = D-alanine
SEQUENCE: 226
HAQGTFTSDY AKYLDARRAK EFIAWLVNGG PSSGAPPPSK                              40

SEQ ID NO: 227          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-AminoEthoxyEthoxyAcetic
                         Acyl-MaleimidoPropionic Acyl
SEQUENCE: 227
HAEGTFTSDY AKYLDARRAK EFIAWLVNGG PSSGAPPPSK                              40

SEQ ID NO: 228          moltype = AA  length = 40
FEATURE                 Location/Qualifiers
source                  1..40
                        mol_type = protein
                        organism = synthetic construct
MOD_RES                 40
                        note = AminoEthoxyEthoxyAcetic Acyl-8-AminoOctanoic
                         Acyl-MaleimidoPropionic Acyl
SITE                    2
                        note = D-alanine
SEQUENCE: 228
HAEGTFTSDY AKYLDARRAK EFIAWLVNGG PSSGAPPPSK                              40

SEQ ID NO: 229          moltype = AA  length = 40
FEATURE                 Location/Qualifiers
source                  1..40
                        mol_type = protein
                        organism = synthetic construct
SITE                    2
                        note = D-alanine
SEQUENCE: 229
HAEGTFTSDY AKYLDARRAK EFIAWLVNGG PSSGAPPPSK                              40
```

```
SEQ ID NO: 230            moltype = AA   length = 41
FEATURE                   Location/Qualifiers
source                    1..41
                          mol_type = protein
                          organism = synthetic construct
SITE                      2
                          note = D-alanine
MOD_RES                   40
                          note = AminoEthoxyEthoxyAcetic Acid //
                           8-amino-3,6-dioxa-octanoic acid
MOD_RES                   41
                          note = AminoEthoxyEthoxyAcetic Acyl-MaleimidoPropionic Acyl
SEQUENCE: 230
HAEGTFTSDY AKYLDARRAK EFIAWLVNGG PSSGAPPPSX K                          41

SEQ ID NO: 231            moltype = AA   length = 42
FEATURE                   Location/Qualifiers
source                    1..42
                          mol_type = protein
                          organism = synthetic construct
SEQUENCE: 231
YAEGTFISDY SIAMDKIHQQ DFVNWLLAQK GKKNDWKHNI TQ                         42

SEQ ID NO: 232            moltype = AA   length = 41
FEATURE                   Location/Qualifiers
source                    1..41
                          mol_type = protein
                          organism = synthetic construct
SITE                      2
                          note = D-alanine
MOD_RES                   40
                          note = AminoEthoxyEthoxyAcetic Acid //
                           8-amino-3,6-dioxa-octanoic acid
MOD_RES                   41
                          note = AminoEthoxyEthoxyAcetic Acyl-MaleimidoPropionic Acyl
SEQUENCE: 232
HAEGTFTSDV ASYLEGQAAK EFIAWLVNGG PSSGAPPPSX K                          41

SEQ ID NO: 233            moltype = AA   length = 31
FEATURE                   Location/Qualifiers
source                    1..31
                          mol_type = protein
                          organism = synthetic construct
MOD_RES                   2
                          note = Aib
MOD_RES                   20
                          note = AminoEthoxyEthoxyAcetic Acyl-AminoEthoxyEthoxyAcetic
                           Acyl-MaleimidoPropionic Acyl
SEQUENCE: 233
HXEGTFTSDV SSYLEGQAAK EFIAWLVRGR G                                     31

SEQ ID NO: 234            moltype = AA   length = 32
FEATURE                   Location/Qualifiers
source                    1..32
                          mol_type = protein
                          organism = synthetic construct
MOD_RES                   2
                          note = Aib
MOD_RES                   32
                          note = AminoEthoxyEthoxyAcetic Acyl-MaleimidoPropionic Acyl
SEQUENCE: 234
HXEGTFTSDV SSYLEGQAAK EFIAWLVRGR GK                                    32

SEQ ID NO: 235            moltype = AA   length = 32
FEATURE                   Location/Qualifiers
source                    1..32
                          mol_type = protein
                          organism = synthetic construct
MOD_RES                   2
                          note = Aib
MOD_RES                   32
                          note = AminoEthoxyEthoxyAcetic Acyl-8-AminoOctanoic
                           Acyl-MaleimidoPropionic Acyl
MOD_RES                   20
                          note = Aib
SEQUENCE: 235
HXEGTFTSDV SSYLEGQAAX EFIAWLVRGR GK                                    32

SEQ ID NO: 236            moltype = AA   length = 39
```

```
                                    -continued

FEATURE                 Location/Qualifiers
source                  1..39
                        mol_type = protein
                        organism = synthetic construct
MOD_RES                 2
                        note = Aib
MOD_RES                 13
                        note = Aib
MOD_RES                 20
                        note = AminoEthoxyEthoxyAcetic Acyl-8-AminoOctanoic
                        Acyl-MaleimidoPropionic Acyl
SEQUENCE: 236
YXEGTFTSDY SIXLDKIAQK AFVQWLIAGG PSSGAPPPS                              39

SEQ ID NO: 237          moltype = AA  length = 39
FEATURE                 Location/Qualifiers
source                  1..39
                        mol_type = protein
                        organism = synthetic construct
MOD_RES                 2
                        note = Aib
MOD_RES                 13
                        note = Aib
MOD_RES                 20
                        note = AminoEthoxyEthoxyAcetic Acyl-AminoEthoxyEthoxyAcetic
                        Acyl-MaleimidoPropionic Acyl
SEQUENCE: 237
YXEGTFTSDY SIXLDKIAQK AFVQWLIAGG PSSGAPPPS                              39

SEQ ID NO: 238          moltype = AA  length = 40
FEATURE                 Location/Qualifiers
source                  1..40
                        mol_type = protein
                        organism = synthetic construct
MOD_RES                 2
                        note = Aib
MOD_RES                 20
                        note = Aib
MOD_RES                 40
                        note = AminoEthoxyEthoxyAcetic Acyl-AminoEthoxyEthoxyAcetic
                        Acyl-MaleimidoPropionic Acyl
SEQUENCE: 238
YXEGTFTSDY SIYLDKQAAX EFVQWLLAGG PSSGAPPPSK                             40

SEQ ID NO: 239          moltype = AA  length = 40
FEATURE                 Location/Qualifiers
source                  1..40
                        mol_type = protein
                        organism = synthetic construct
MOD_RES                 2
                        note = Aib
MOD_RES                 20
                        note = Aib
MOD_RES                 40
                        note = AminoEthoxyEthoxyAcetic Acyl-8-AminoOctanoic
                        Acyl-AminoEthoxyEthoxyAcetic Acyl-MaleimidoPropionic Acyl
SEQUENCE: 239
YXEGTFTSDY SIYLDKQAAX EFVQWLLAGG PSSGAPPPSK                             40

SEQ ID NO: 240          moltype = AA  length = 34
FEATURE                 Location/Qualifiers
source                  1..34
                        mol_type = protein
                        organism = synthetic construct
MOD_RES                 2
                        note = Aib
MOD_RES                 20
                        note = AminoEthoxyEthoxyAcetic Acyl-AminoEthoxyEthoxyAcetic
                        Acyl-MaleimidoPropionic Acyl
SEQUENCE: 240
HXQGTFTSDY SKYLDEKKAK EFVEWLLEGG PSSG                                   34

SEQ ID NO: 241          moltype = AA  length = 34
FEATURE                 Location/Qualifiers
source                  1..34
                        mol_type = protein
                        organism = synthetic construct
MOD_RES                 2
                        note = Aib
```

```
MOD_RES              20
                     note = AminoEthoxyEthoxyAcetic Acyl-8-AminoOctanoic
                     Acyl-MaleimidoPropionic Acyl
SEQUENCE: 241
HXQGTFTSDY SKYLDEKKAK EFVEWLLEGG PSSG                               34

SEQ ID NO: 242       moltype = AA  length = 34
FEATURE              Location/Qualifiers
source               1..34
                     mol_type = protein
                     organism = synthetic construct
MOD_RES              2
                     note = Aib
MOD_RES              20
                     note = AminoEthoxyEthoxyAcetic Acyl-8-AminoOctanoic
                     Acyl-AminoEthoxyEthoxyAcetic Acyl-MaleimidoPropionic Acyl
SEQUENCE: 242
HXQGTFTSDY SKYLDEKKAK EFVEWLLEGG PSSG                               34

SEQ ID NO: 243       moltype = AA  length = 35
FEATURE              Location/Qualifiers
source               1..35
                     mol_type = protein
                     organism = synthetic construct
MOD_RES              2
                     note = Aib
MOD_RES              35
                     note = AminoEthoxyEthoxyAcetic Acyl-MaleimidoPropionic Acyl
SEQUENCE: 243
HXQGTFTSDY SKYLDEKKAK EFVEWLLEGG PSSGK                              35

SEQ ID NO: 244       moltype = AA  length = 29
FEATURE              Location/Qualifiers
source               1..29
                     mol_type = protein
                     organism = synthetic construct
MOD_RES              2
                     note = Aib
MOD_RES              17
                     note = AminoEthoxyEthoxyAcetic Acyl-AminoEthoxyEthoxyAcetic
                     Acyl-MaleimidoPropionic Acyl
SEQUENCE: 244
HXQGTFTSDY SKYLDEKAAK EFIQWLLQT                                     29

SEQ ID NO: 245       moltype = AA  length = 29
FEATURE              Location/Qualifiers
source               1..29
                     mol_type = protein
                     organism = synthetic construct
MOD_RES              2
                     note = Aib
MOD_RES              17
                     note = AminoEthoxyEthoxyAcetic Acyl-8-AminoOctanoic
                     Acyl-MaleimidoPropionic Acyl
SEQUENCE: 245
HXQGTFTSDY SKYLDEKAAK EFIQWLLQT                                     29

SEQ ID NO: 246       moltype = AA  length = 39
FEATURE              Location/Qualifiers
source               1..39
                     mol_type = protein
                     organism = synthetic construct
SITE                 2
                     note = D-serine
MOD_RES              14
                     note = AminoEthoxyEthoxyAcetic Acyl-AminoEthoxyEthoxyAcetic
                     Acyl-MaleimidoPropionic Acyl
SEQUENCE: 246
HSQGTFTSDL SKQKESKAAQ DFIEWLKAGG PSSGAPPPS                          39

SEQ ID NO: 247       moltype = AA  length = 39
FEATURE              Location/Qualifiers
source               1..39
                     mol_type = protein
                     organism = synthetic construct
SITE                 2
                     note = D-serine
MOD_RES              14
                     note = AminoEthoxyEthoxyAcetic Acyl-8-AminoOctanoic
```

```
                        Acyl-AminoEthoxyEthoxyAcetic Acyl-MaleimidoPropionic Acyl
SEQUENCE: 247
HSQGTFTSDL SKQKESKAAQ DFIEWLKAGG PSSGAPPPS                                    39

SEQ ID NO: 248          moltype = AA   length = 40
FEATURE                 Location/Qualifiers
source                  1..40
                        mol_type = protein
                        organism = synthetic construct
SITE                    2
                        note = D-serine
MOD_RES                 40
                        note = AminoEthoxyEthoxyAcetic Acyl-MaleimidoPropionic Acyl
SEQUENCE: 248
HSQGTFTSDL SKQLESKAAQ DFIEWLKAGG PSSGAPPPSK                                   40

SEQ ID NO: 249          moltype = AA   length = 40
FEATURE                 Location/Qualifiers
source                  1..40
                        mol_type = protein
                        organism = synthetic construct
SITE                    2
                        note = D-serine
MOD_RES                 40
                        note = AminoEthoxyEthoxyAcetic Acyl-8-AminoOctanoic
                         Acyl-MaleimidoPropionic Acyl
SEQUENCE: 249
HSQGTFTSDL SKQLESKAAQ DFIEWLKAGG PSSGAPPPSK                                   40

SEQ ID NO: 250          moltype = AA   length = 31
FEATURE                 Location/Qualifiers
source                  1..31
                        mol_type = protein
                        organism = synthetic construct
MOD_RES                 31
                        note = AminoEthoxyEthoxyAcetic
                         Acyl-Bromo-MaleimidoPropionic
                         Acyl//8-amino-3,6-dioxa-octanoic
                         acyl-3-(3-Bromo-2,5-dioxopyrrol-1-yl)propanoic acyl
SEQUENCE: 250
HSQGTFTSDL SEYLDSERAR DFVAWLEAGG K                                            31

SEQ ID NO: 251          moltype = AA   length = 39
FEATURE                 Location/Qualifiers
source                  1..39
                        mol_type = protein
                        organism = synthetic construct
MOD_RES                 2
                        note = Aib
MOD_RES                 13
                        note = Alpha-Methyl-Leucine
MOD_RES                 17
                        note = AminoEthoxyEthoxyAcetic Acyl-AminoEthoxyEthoxyAcetic
                         Acyl-MaleimidoPropionic Acyl
MOD_RES                 20
                        note = Aib
SEQUENCE: 251
YXQGTFTSDY SIXLDKKAQX AFIEYLLEGG PSSGAPPPS                                    39

SEQ ID NO: 252          moltype = AA   length = 39
FEATURE                 Location/Qualifiers
source                  1..39
                        mol_type = protein
                        organism = synthetic construct
MOD_RES                 2
                        note = Aib
MOD_RES                 20
                        note = Aib
MOD_RES                 13
                        note = Alpha-Methyl-Leucine
MOD_RES                 17
                        note = AminoEthoxyEthoxyAcetic Acyl-8-AminoOctanoic
                         Acyl-MaleimidoPropionic Acyl
SEQUENCE: 252
YXQGTFTSDY SIXLDKKAQX AFIEYLLEGG PSSGAPPPS                                    39

SEQ ID NO: 253          moltype = AA   length = 39
FEATURE                 Location/Qualifiers
source                  1..39
```

```
                        mol_type = protein
                        organism = synthetic construct
MOD_RES                 2
                        note = Aib
MOD_RES                 20
                        note = Aib
MOD_RES                 13
                        note = Alpha-Methyl-Leucine
MOD_RES                 17
                        note = AminoEthoxyEthoxyAcetic Acyl-8-AminoOctanoic
                           Acyl-AminoEthoxyEthoxyAcetic Acyl-MaleimidoPropionic Acyl
SEQUENCE: 253
YXQGTFTSDY SIXLDKKAQX AFIEYLLEGG PSSGAPPPS                                    39

SEQ ID NO: 254          moltype = AA   length = 40
FEATURE                 Location/Qualifiers
source                  1..40
                        mol_type = protein
                        organism = synthetic construct
MOD_RES                 2
                        note = Aib
MOD_RES                 13
                        note = Alpha-Methyl-Leucine
MOD_RES                 20
                        note = Aib
MOD_RES                 40
                        note = AminoEthoxyEthoxyAcetic Acyl-AminoEthoxyEthoxyAcetic
                           Acyl-MaleimidoPropionic Acyl
SEQUENCE: 254
YXQGTFTSDY SIXLDKIAQX AFIEYLLEGG PSSGAPPPSK                                   40

SEQ ID NO: 255          moltype = AA   length = 40
FEATURE                 Location/Qualifiers
source                  1..40
                        mol_type = protein
                        organism = synthetic construct
MOD_RES                 2
                        note = Aib
MOD_RES                 20
                        note = Aib
MOD_RES                 13
                        note = Alpha-Methyl-Leucine
MOD_RES                 40
                        note = AminoEthoxyEthoxyAcetic Acyl-8-AminoOctanoic
                           Acyl-MaleimidoPropionic Acyl
SEQUENCE: 255
YXQGTFTSDY SIXLDKIAQX AFIEYLLEGG PSSGAPPPSK                                   40

SEQ ID NO: 256          moltype = AA   length = 40
FEATURE                 Location/Qualifiers
source                  1..40
                        mol_type = protein
                        organism = synthetic construct
MOD_RES                 2
                        note = Aib
MOD_RES                 20
                        note = Aib
MOD_RES                 13
                        note = Alpha-Methyl-Leucine
MOD_RES                 40
                        note = AminoEthoxyEthoxyAcetic Acyl-8-AminoOctanoic
                           Acyl-AminoEthoxyEthoxyAcetic Acyl-MaleimidoPropionic Acyl
SEQUENCE: 256
YXQGTFTSDY SIXLDKIAQX AFIEYLLEGG PSSGAPPPSK                                   40

SEQ ID NO: 257          moltype = AA   length = 39
FEATURE                 Location/Qualifiers
source                  1..39
                        mol_type = protein
                        organism = synthetic construct
MOD_RES                 10
                        note = AminoEthoxyEthoxyAcetic Acyl-AminoEthoxyEthoxyAcetic
                           Acyl-MaleimidoPropionic Acyl
SEQUENCE: 257
HSQGTFTSDK SKYLDERRAQ DFVQWLLDGG PSSGAPPPS                                    39

SEQ ID NO: 258          moltype = AA   length = 39
FEATURE                 Location/Qualifiers
source                  1..39
```

```
                            mol_type = protein
                            organism = synthetic construct
MOD_RES                     10
                            note = AminoEthoxyEthoxyAcetic Acyl-8-AminoOctanoic
                             Acyl-MaleimidoPropionic Acyl
SEQUENCE: 258
HSQGTFTSDK SKYLDERRAQ DFVQWLLDGG PSSGAPPPS                                39

SEQ ID NO: 259              moltype = AA   length = 40
FEATURE                     Location/Qualifiers
source                      1..40
                            mol_type = protein
                            organism = synthetic construct
MOD_RES                     40
                            note = AminoEthoxyEthoxyAcetic Acyl-MaleimidoPropionic Acyl
SEQUENCE: 259
HSQGTFTSDY SKYLDERRAQ DFVQWLLDGG PSSGAPPPSK                               40

SEQ ID NO: 260              moltype = AA   length = 40
FEATURE                     Location/Qualifiers
source                      1..40
                            mol_type = protein
                            organism = synthetic construct
MOD_RES                     40
                            note = AminoEthoxyEthoxyAcetic
                             Acyl-Bromo-MaleimidoPropionic
                             Acyl//8-amino-3,6-dioxa-octanoic
                             acyl-3-(3-Bromo-2,5-dioxopyrrol-1-yl)propanoic acyl
SEQUENCE: 260
HSQGTFTSDY SKYLDERRAQ DFVQWLLDGG PSSGAPPPSK                               40

SEQ ID NO: 261              moltype = AA   length = 39
FEATURE                     Location/Qualifiers
source                      1..39
                            mol_type = protein
                            organism = synthetic construct
MOD_RES                     2
                            note = Aib
MOD_RES                     34
                            note = Aib
MOD_RES                     14
                            note = AminoEthoxyEthoxyAcetic Acyl-AminoEthoxyEthoxyAcetic
                             Acyl-MaleimidoPropionic Acyl
SITE                        29
                            note = D-alanine
MOD_RES                     20
                            note = Aib
SEQUENCE: 261
HXHGTGTSDL SKLKEEQRQX EFIEWLKAAG PPSXKPPPK                                39

SEQ ID NO: 262              moltype = AA   length = 39
FEATURE                     Location/Qualifiers
source                      1..39
                            mol_type = protein
                            organism = synthetic construct
MOD_RES                     2
                            note = Aib
MOD_RES                     20
                            note = Aib
MOD_RES                     34
                            note = Aib
SITE                        29
                            note = D-alanine
MOD_RES                     39
                            note = AminoEthoxyEthoxyAcetic Acyl-MaleimidoPropionic Acyl
SEQUENCE: 262
HXHGTGTSDL SKLLEEQRQX EFIEWLKAAG PPSXKPPPK                                39

SEQ ID NO: 263              moltype = AA   length = 40
FEATURE                     Location/Qualifiers
source                      1..40
                            mol_type = protein
                            organism = synthetic construct
MOD_RES                     2
                            note = Aib
MOD_RES                     20
                            note = Aib
MOD_RES                     34
                            note = Aib
```

```
SITE                    29
                        note = D-alanine
MOD_RES                 39
                        note = AminoEthoxyEthoxyAcetic Acid //
                        8-amino-3,6-dioxa-octanoic acid
MOD_RES                 40
                        note = AminoEthoxyEthoxyAcetic Acyl-MaleimidoPropionic Acyl
SEQUENCE: 263
HXHGTGTSDL SKLLEEQRQX EFIEWLKAAG PPSXKPPPXK                             40

SEQ ID NO: 264          moltype = AA  length = 40
FEATURE                 Location/Qualifiers
source                  1..40
                        mol_type = protein
                        organism = synthetic construct
SITE                    2
                        note = D-alanine
MOD_RES                 20
                        note = Aib
MOD_RES                 40
                        note = AminoEthoxyEthoxyAcetic Acyl-MaleimidoPropionic Acyl
SEQUENCE: 264
YAEGTFTSDY AKYLDARRAX EFIAWLVNGG PSSGAPPPSK                             40

SEQ ID NO: 265          moltype = AA  length = 40
FEATURE                 Location/Qualifiers
source                  1..40
                        mol_type = protein
                        organism = synthetic construct
MOD_RES                 2
                        note = Aib
MOD_RES                 20
                        note = Aib
MOD_RES                 40
                        note = AminoEthoxyEthoxyAcetic Acyl-MaleimidoPropionic Acyl
SEQUENCE: 265
YXEGTFTSDY AKYLDARRAX EFIAWLVNGG PSSGAPPPSK                             40

SEQ ID NO: 266          moltype = AA  length = 40
FEATURE                 Location/Qualifiers
source                  1..40
                        mol_type = protein
                        organism = synthetic construct
MOD_RES                 2
                        note = Aib
MOD_RES                 13
                        note = Aib
MOD_RES                 20
                        note = Aib
MOD_RES                 40
                        note = AminoEthoxyEthoxyAcetic Acyl-MaleimidoPropionic Acyl
SEQUENCE: 266
YXEGTFTSDY SIXLDKRRAX EFIAWLVNGG PSSGAPPPSK                             40

SEQ ID NO: 267          moltype = AA  length = 40
FEATURE                 Location/Qualifiers
source                  1..40
                        mol_type = protein
                        organism = synthetic construct
SITE                    2
                        note = D-alanine
MOD_RES                 13
                        note = Aib
MOD_RES                 20
                        note = Aib
MOD_RES                 40
                        note = AminoEthoxyEthoxyAcetic Acyl-MaleimidoPropionic Acyl
SEQUENCE: 267
HAEGTFTSDY SIXLDKRRAX EFIAWLVNGG PSSGAPPPSK                             40

SEQ ID NO: 268          moltype = AA  length = 40
FEATURE                 Location/Qualifiers
source                  1..40
                        mol_type = protein
                        organism = synthetic construct
SITE                    2
                        note = D-alanine
MOD_RES                 13
                        note = Aib
```

```
MOD_RES              20
                     note = Aib
MOD_RES              40
                     note = AminoEthoxyEthoxyAcetic Acyl-MaleimidoPropionic Acyl
SEQUENCE: 268
YAEGTFTSDY SIXLDKRRAX EFIAWLVNGG PSSGAPPPSK                              40

SEQ ID NO: 269       moltype = AA  length = 40
FEATURE              Location/Qualifiers
source               1..40
                     mol_type = protein
                     organism = synthetic construct
MOD_RES              2
                     note = Aib
MOD_RES              13
                     note = Aib
MOD_RES              20
                     note = Aib
MOD_RES              40
                     note = AminoEthoxyEthoxyAcetic Acyl-MaleimidoPropionic Acyl
SEQUENCE: 269
YXEGTFTSDY SIXLDKIAQX AFIAWLVNGG PSSGAPPPSK                              40

SEQ ID NO: 270       moltype = AA  length = 40
FEATURE              Location/Qualifiers
source               1..40
                     mol_type = protein
                     organism = synthetic construct
SITE                 2
                     note = D-alanine
MOD_RES              13
                     note = Aib
MOD_RES              20
                     note = Aib
MOD_RES              40
                     note = AminoEthoxyEthoxyAcetic Acyl-MaleimidoPropionic Acyl
SEQUENCE: 270
HAEGTFTSDY SIXLDKIAQX AFIAWLVNGG PSSGAPPPSK                              40

SEQ ID NO: 271       moltype = AA  length = 40
FEATURE              Location/Qualifiers
source               1..40
                     mol_type = protein
                     organism = synthetic construct
SITE                 2
                     note = D-alanine
MOD_RES              13
                     note = Aib
MOD_RES              20
                     note = Aib
MOD_RES              40
                     note = AminoEthoxyEthoxyAcetic Acyl-MaleimidoPropionic Acyl
SEQUENCE: 271
YAEGTFTSDY SIXLDKIAQX AFIAWLVNGG PSSGAPPPSK                              40

SEQ ID NO: 272       moltype = AA  length = 40
FEATURE              Location/Qualifiers
source               1..40
                     mol_type = protein
                     organism = synthetic construct
SITE                 2
                     note = D-alanine
MOD_RES              13
                     note = Aib
MOD_RES              20
                     note = Aib
MOD_RES              40
                     note = AminoEthoxyEthoxyAcetic Acyl-MaleimidoPropionic Acyl
SEQUENCE: 272
HAEGTFTSDY SIXLDKIAQX AFVQWLIAGG PSSGAPPPSK                              40

SEQ ID NO: 273       moltype = AA  length = 40
FEATURE              Location/Qualifiers
source               1..40
                     mol_type = protein
                     organism = synthetic construct
SITE                 2
                     note = D-alanine
MOD_RES              13
```

```
                        note = Aib
MOD_RES                 20
                        note = Aib
MOD_RES                 40
                        note = AminoEthoxyEthoxyAcetic Acyl-MaleimidoPropionic Acyl
SEQUENCE: 273
YAEGTFTSDY SIXLDKIAQX AFVQWLIAGG PSSGAPPPSK                              40

SEQ ID NO: 274          moltype = AA  length = 41
FEATURE                 Location/Qualifiers
source                  1..41
                        mol_type = protein
                        organism = synthetic construct
MOD_RES                 2
                        note = Aib
MOD_RES                 13
                        note = Aib
MOD_RES                 20
                        note = Aib
MOD_RES                 40
                        note = AminoEthoxyEthoxyAcetic Acid //
                        8-amino-3,6-dioxa-octanoic acid
MOD_RES                 41
                        note = AminoEthoxyEthoxyAcetic Acyl-MaleimidoPropionic Acyl
SEQUENCE: 274
YXEGTFTSDY SIXLDKIAQX AFVQWLIAGG PSSGAPPPSX K                            41

SEQ ID NO: 275          moltype = AA  length = 40
FEATURE                 Location/Qualifiers
source                  1..40
                        mol_type = protein
                        organism = synthetic construct
SITE                    2
                        note = D-alanine
MOD_RES                 20
                        note = Aib
MOD_RES                 40
                        note = AminoEthoxyEthoxyAcetic Acyl-MaleimidoPropionic Acyl
SEQUENCE: 275
HAEGTFTSDY AKYLDARRAX EFVQWLIAGG PSSGAPPPSK                              40

SEQ ID NO: 276          moltype = AA  length = 40
FEATURE                 Location/Qualifiers
source                  1..40
                        mol_type = protein
                        organism = synthetic construct
SITE                    2
                        note = D-alanine
MOD_RES                 20
                        note = Aib
MOD_RES                 40
                        note = AminoEthoxyEthoxyAcetic Acyl-MaleimidoPropionic Acyl
SEQUENCE: 276
YAEGTFTSDY AKYLDARRAX EFVQWLIAGG PSSGAPPPSK                              40

SEQ ID NO: 277          moltype = AA  length = 40
FEATURE                 Location/Qualifiers
source                  1..40
                        mol_type = protein
                        organism = synthetic construct
MOD_RES                 2
                        note = Aib
MOD_RES                 40
                        note = AminoEthoxyEthoxyAcetic Acyl-MaleimidoPropionic Acyl
MOD_RES                 20
                        note = Aib
SEQUENCE: 277
YXEGTFTSDY AKYLDARRAX EFVQWLIAGG PSSGAPPPSK                              40

SEQ ID NO: 278          moltype = AA  length = 40
FEATURE                 Location/Qualifiers
source                  1..40
                        mol_type = protein
                        organism = synthetic construct
SITE                    2
                        note = D-alanine
MOD_RES                 20
                        note = Aib
MOD_RES                 40
```

```
                           note = AminoEthoxyEthoxyAcetic Acyl-MaleimidoPropionic Acyl
SEQUENCE: 278
HAEGTFTSDY AKYLDKIAQX AFVQWLIAGG PSSGAPPPSK                              40

SEQ ID NO: 279         moltype = AA  length = 40
FEATURE                Location/Qualifiers
source                 1..40
                       mol_type = protein
                       organism = synthetic construct
SITE                   2
                       note = D-alanine
MOD_RES                20
                       note = Aib
MOD_RES                40
                       note = AminoEthoxyEthoxyAcetic Acyl-MaleimidoPropionic Acyl
SEQUENCE: 279
YAEGTFTSDY AKYLDKIAQX AFVQWLIAGG PSSGAPPPSK                              40

SEQ ID NO: 280         moltype = AA  length = 40
FEATURE                Location/Qualifiers
source                 1..40
                       mol_type = protein
                       organism = synthetic construct
MOD_RES                2
                       note = Aib
MOD_RES                20
                       note = Aib
MOD_RES                40
                       note = AminoEthoxyEthoxyAcetic Acyl-MaleimidoPropionic Acyl
SEQUENCE: 280
YXEGTFTSDY AKYLDKIAQX AFVQWLIAGG PSSGAPPPSK                              40

SEQ ID NO: 281         moltype = AA  length = 40
FEATURE                Location/Qualifiers
source                 1..40
                       mol_type = protein
                       organism = synthetic construct
MOD_RES                2
                       note = Aib
MOD_RES                40
                       note = AminoEthoxyEthoxyAcetic Acyl-MaleimidoPropionic Acyl
SEQUENCE: 281
YXQGTFTSDY AKYLDARRAK EFIAWLVNGG PSSGAPPPSK                              40

SEQ ID NO: 282         moltype = AA  length = 40
FEATURE                Location/Qualifiers
source                 1..40
                       mol_type = protein
                       organism = synthetic construct
SITE                   2
                       note = D-alanine
MOD_RES                40
                       note = AminoEthoxyEthoxyAcetic Acyl-MaleimidoPropionic Acyl
SEQUENCE: 282
YAQGTFTSDY AKYLDARRAK EFIAWLVNGG PSSGAPPPSK                              40

SEQ ID NO: 283         moltype = AA  length = 40
FEATURE                Location/Qualifiers
source                 1..40
                       mol_type = protein
                       organism = synthetic construct
MOD_RES                2
                       note = Aib
MOD_RES                13
                       note = Alpha-Methyl-Leucine
MOD_RES                40
                       note = AminoEthoxyEthoxyAcetic Acyl-MaleimidoPropionic Acyl
SEQUENCE: 283
YXQGTFTSDY SIXLDKRRAK EFIAWLVNGG PSSGAPPPSK                              40

SEQ ID NO: 284         moltype = AA  length = 40
FEATURE                Location/Qualifiers
source                 1..40
                       mol_type = protein
                       organism = synthetic construct
SITE                   2
                       note = D-alanine
MOD_RES                13
                       note = Alpha-Methyl-Leucine
```

```
MOD_RES               40
                      note = AminoEthoxyEthoxyAcetic Acyl-MaleimidoPropionic Acyl
SEQUENCE: 284
YAQGTFTSDY SIXLDKRRAK EFIAWLVNGG PSSGAPPPSK                                40

SEQ ID NO: 285        moltype = AA  length = 40
FEATURE               Location/Qualifiers
source                1..40
                      mol_type = protein
                      organism = synthetic construct
SITE                  2
                      note = D-alanine
MOD_RES               13
                      note = Alpha-Methyl-Leucine
MOD_RES               40
                      note = AminoEthoxyEthoxyAcetic Acyl-MaleimidoPropionic Acyl
SEQUENCE: 285
HAQGTFTSDY SIXLDKRRAK EFIAWLVNGG PSSGAPPPSK                                40

SEQ ID NO: 286        moltype = AA  length = 40
FEATURE               Location/Qualifiers
source                1..40
                      mol_type = protein
                      organism = synthetic construct
MOD_RES               2
                      note = Aib
MOD_RES               13
                      note = Alpha-Methyl-Leucine
MOD_RES               20
                      note = Aib
MOD_RES               40
                      note = AminoEthoxyEthoxyAcetic Acyl-MaleimidoPropionic Acyl
SEQUENCE: 286
YXQGTFTSDY SIXLDKIAQX AFIAWLVNGG PSSGAPPPSK                                40

SEQ ID NO: 287        moltype = AA  length = 40
FEATURE               Location/Qualifiers
source                1..40
                      mol_type = protein
                      organism = synthetic construct
SITE                  2
                      note = D-alanine
MOD_RES               13
                      note = Alpha-Methyl-Leucine
MOD_RES               20
                      note = Aib
MOD_RES               40
                      note = AminoEthoxyEthoxyAcetic Acyl-MaleimidoPropionic Acyl
SEQUENCE: 287
YAQGTFTSDY SIXLDKIAQX AFIAWLVNGG PSSGAPPPSK                                40

SEQ ID NO: 288        moltype = AA  length = 40
FEATURE               Location/Qualifiers
source                1..40
                      mol_type = protein
                      organism = synthetic construct
SITE                  2
                      note = D-alanine
MOD_RES               20
                      note = Aib
MOD_RES               40
                      note = AminoEthoxyEthoxyAcetic Acyl-MaleimidoPropionic Acyl
MOD_RES               13
                      note = Alpha-Methyl-Leucine
SEQUENCE: 288
HAQGTFTSDY SIXLDKIAQX AFIAWLVNGG PSSGAPPPSK                                40

SEQ ID NO: 289        moltype = AA  length = 40
FEATURE               Location/Qualifiers
source                1..40
                      mol_type = protein
                      organism = synthetic construct
SITE                  2
                      note = D-alanine
MOD_RES               20
                      note = Aib
MOD_RES               40
                      note = AminoEthoxyEthoxyAcetic Acyl-MaleimidoPropionic Acyl
MOD_RES               13
```

```
                       note = Alpha-Methyl-Leucine
SEQUENCE: 289
YAQGTFTSDY SIXLDKIAQX AFIEYLLEGG PSSGAPPPSK                              40

SEQ ID NO: 290         moltype = AA   length = 40
FEATURE                Location/Qualifiers
source                 1..40
                       mol_type = protein
                       organism = synthetic construct
SITE                   2
                       note = D-alanine
MOD_RES                20
                       note = Aib
MOD_RES                40
                       note = AminoEthoxyEthoxyAcetic Acyl-MaleimidoPropionic Acyl
MOD_RES                13
                       note = Alpha-Methyl-Leucine
SEQUENCE: 290
HAQGTFTSDY SIXLDKIAQX AFIEYLLEGG PSSGAPPPSK                              40

SEQ ID NO: 291         moltype = AA   length = 41
FEATURE                Location/Qualifiers
source                 1..41
                       mol_type = protein
                       organism = synthetic construct
MOD_RES                2
                       note = Aib
MOD_RES                20
                       note = Aib
MOD_RES                13
                       note = Alpha-Methyl-Leucine
MOD_RES                40
                       note = AminoEthoxyEthoxyAcetic Acid //
                        8-amino-3,6-dioxa-octanoic acid
MOD_RES                41
                       note = AminoEthoxyEthoxyAcetic Acyl-MaleimidoPropionic Acyl
SEQUENCE: 291
YXQGTFTSDY SIXLDKIAQX AFIEYLLEGG PSSGAPPPSX K                            41

SEQ ID NO: 292         moltype = AA   length = 40
FEATURE                Location/Qualifiers
source                 1..40
                       mol_type = protein
                       organism = synthetic construct
SITE                   2
                       note = D-alanine
MOD_RES                40
                       note = AminoEthoxyEthoxyAcetic Acyl-MaleimidoPropionic Acyl
SEQUENCE: 292
HAQGTFTSDY AKYLDARRAK EFIEYLLEGG PSSGAPPPSK                              40

SEQ ID NO: 293         moltype = AA   length = 40
FEATURE                Location/Qualifiers
source                 1..40
                       mol_type = protein
                       organism = synthetic construct
MOD_RES                40
                       note = AminoEthoxyEthoxyAcetic Acyl-MaleimidoPropionic Acyl
MOD_RES                2
                       note = Aib
SEQUENCE: 293
HXQGTFTSDY AKYLDARRAK EFIEYLLEGG PSSGAPPPSK                              40

SEQ ID NO: 294         moltype = AA   length = 40
FEATURE                Location/Qualifiers
source                 1..40
                       mol_type = protein
                       organism = synthetic construct
MOD_RES                2
                       note = Aib
MOD_RES                40
                       note = AminoEthoxyEthoxyAcetic Acyl-MaleimidoPropionic Acyl
SEQUENCE: 294
YXQGTFTSDY AKYLDARRAK EFIEYLLEGG PSSGAPPPSK                              40

SEQ ID NO: 295         moltype = AA   length = 40
FEATURE                Location/Qualifiers
source                 1..40
                       mol_type = protein
```

-continued

|  |  |
|---|---|
| SITE | 2 |
|  | note = D-alanine |
| MOD_RES | 40 |
|  | note = AminoEthoxyEthoxyAcetic Acyl-MaleimidoPropionic Acyl |
| SEQUENCE: 295 | |
| YAQGTFTSDY AKYLDARRAK EFIEYLLEGG PSSGAPPPSK | 40 |
| | |
| SEQ ID NO: 296 | moltype = AA   length = 40 |
| FEATURE | Location/Qualifiers |
| source | 1..40 |
|  | mol_type = protein |
|  | organism = synthetic construct |
| SITE | 2 |
|  | note = D-alanine |
| MOD_RES | 20 |
|  | note = Aib |
| MOD_RES | 40 |
|  | note = AminoEthoxyEthoxyAcetic Acyl-MaleimidoPropionic Acyl |
| SEQUENCE: 296 | |
| HAQGTFTSDY AKYLDKIAQX AFIEYLLEGG PSSGAPPPSK | 40 |
| | |
| SEQ ID NO: 297 | moltype = AA   length = 40 |
| FEATURE | Location/Qualifiers |
| source | 1..40 |
|  | mol_type = protein |
|  | organism = synthetic construct |
| MOD_RES | 2 |
|  | note = Aib |
| MOD_RES | 20 |
|  | note = Aib |
| MOD_RES | 40 |
|  | note = AminoEthoxyEthoxyAcetic Acyl-MaleimidoPropionic Acyl |
| SEQUENCE: 297 | |
| HXQGTFTSDY AKYLDKIAQX AFIEYLLEGG PSSGAPPPSK | 40 |
| | |
| SEQ ID NO: 298 | moltype = AA   length = 40 |
| FEATURE | Location/Qualifiers |
| source | 1..40 |
|  | mol_type = protein |
|  | organism = synthetic construct |
| MOD_RES | 2 |
|  | note = Aib |
| MOD_RES | 20 |
|  | note = Aib |
| MOD_RES | 40 |
|  | note = AminoEthoxyEthoxyAcetic Acyl-MaleimidoPropionic Acyl |
| SEQUENCE: 298 | |
| YXQGTFTSDY AKYLDKIAQX AFIEYLLEGG PSSGAPPPSK | 40 |
| | |
| SEQ ID NO: 299 | moltype = AA   length = 40 |
| FEATURE | Location/Qualifiers |
| source | 1..40 |
|  | mol_type = protein |
|  | organism = synthetic construct |
| SITE | 2 |
|  | note = D-alanine |
| MOD_RES | 20 |
|  | note = Aib |
| MOD_RES | 40 |
|  | note = AminoEthoxyEthoxyAcetic Acyl-MaleimidoPropionic Acyl |
| SEQUENCE: 299 | |
| YAQGTFTSDY AKYLDKIAQX AFIEYLLEGG PSSGAPPPSK | 40 |
| | |
| SEQ ID NO: 300 | moltype = AA   length = 40 |
| FEATURE | Location/Qualifiers |
| source | 1..40 |
|  | mol_type = protein |
|  | organism = synthetic construct |
| MOD_RES | 2 |
|  | note = Aib |
| MOD_RES | 20 |
|  | note = Aib |
| MOD_RES | 40 |
|  | note = AminoEthoxyEthoxyAcetic Acyl-MaleimidoPropionic Acyl |
| MOD_RES | 13 |
|  | note = Alpha-Methyl-Leucine |
| SEQUENCE: 300 | |
| HXQGTFTSDY SIXLDKIAQX AFIEYLLEGG PSSGAPPPSK | 40 |

```
SEQ ID NO: 301          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-8-AminoOctanoic
                        Acyl-AminoEthoxyEthoxyAcetic Acyl-MaleimidoPropionic Acyl
SEQUENCE: 301
HAQGTFTSDY AKYLDARRAK EFIAWLVNGG PSSGAPPPSK                          40

SEQ ID NO: 302          moltype = AA  length = 39
FEATURE                 Location/Qualifiers
source                  1..39
                        mol_type = protein
                        organism = synthetic construct
SITE                    2
                        note = D-alanine
MOD_RES                 17
                        note = AminoEthoxyEthoxyAcetic Acyl-MaleimidoPropionic Acyl
SEQUENCE: 302
HAEGTFTSDY AKYLDAKRAK EFIAWLVNGG PSSGAPPPS                           39

SEQ ID NO: 303          moltype = AA  length = 39
FEATURE                 Location/Qualifiers
source                  1..39
                        mol_type = protein
                        organism = synthetic construct
SITE                    2
                        note = D-alanine
MOD_RES                 17
                        note = AminoEthoxyEthoxyAcetic Acyl-AminoEthoxyEthoxyAcetic
                        Acyl-MaleimidoPropionic Acyl
SEQUENCE: 303
HAEGTFTSDY AKYLDAKRAK EFIAWLVNGG PSSGAPPPS                           39

SEQ ID NO: 304          moltype = AA  length = 39
FEATURE                 Location/Qualifiers
source                  1..39
                        mol_type = protein
                        organism = synthetic construct
SITE                    2
                        note = D-alanine
MOD_RES                 17
                        note = AminoEthoxyEthoxyAcetic Acyl-AminoEthoxyEthoxyAcetic
                        Acyl-8-AminoOctanoic Acyl-MaleimidoPropionic Acyl
SEQUENCE: 304
HAEGTFTSDY AKYLDAKRAK EFIAWLVNGG PSSGAPPPS                           39

SEQ ID NO: 305          moltype = AA  length = 39
FEATURE                 Location/Qualifiers
source                  1..39
                        mol_type = protein
                        organism = synthetic construct
SITE                    2
                        note = D-alanine
MOD_RES                 17
                        note = AminoEthoxyEthoxyAcetic Acyl-8-AminoOctanoic
                        Acyl-MaleimidoPropionic Acyl
SEQUENCE: 305
HAEGTFTSDY AKYLDAKRAK EFIAWLVNGG PSSGAPPPS                           39

SEQ ID NO: 306          moltype = AA  length = 39
FEATURE                 Location/Qualifiers
source                  1..39
                        mol_type = protein
                        organism = synthetic construct
SITE                    2
                        note = D-alanine
MOD_RES                 20
                        note = AminoEthoxyEthoxyAcetic Acyl-AminoEthoxyEthoxyAcetic
                        Acyl-MaleimidoPropionic Acyl
SEQUENCE: 306
HAEGTFTSDY AKYLDARRAK EFIAWLVNGG PSSGAPPPS                           39

SEQ ID NO: 307          moltype = AA  length = 39
```

```
FEATURE                 Location/Qualifiers
source                  1..39
                        mol_type = protein
                        organism = synthetic construct
SITE                    2
                        note = D-alanine
MOD_RES                 20
                        note = AminoEthoxyEthoxyAcetic Acyl-AminoEthoxyEthoxyAcetic
                        Acyl-8-AminoOctanoic Acyl-MaleimidoPropionic Acyl
SEQUENCE: 307
HAEGTFTSDY AKYLDARRAK EFIAWLVNGG PSSGAPPPS                                       39

SEQ ID NO: 308          moltype = AA   length = 39
FEATURE                 Location/Qualifiers
source                  1..39
                        mol_type = protein
                        organism = synthetic construct
SITE                    2
                        note = D-alanine
MOD_RES                 20
                        note = AminoEthoxyEthoxyAcetic Acyl-8-AminoOctanoic
                        Acyl-MaleimidoPropionic Acyl
SEQUENCE: 308
HAEGTFTSDY AKYLDARRAK EFIAWLVNGG PSSGAPPPS                                       39

SEQ ID NO: 309          moltype = AA   length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-AminoEthoxyEthoxyAcetic
                        Acyl-gamma-glutamic acid 1-Amido Eicosanedioic acyl //
                        2-[(20-oxoicosanoyl)amino]-5-[2-[2-[2-[2-[2-(carboxymethoxy
                        )ethoxy]ethylamino]-2-oxoethoxy]ethoxy]ethylamino]-5-oxopen
                        tanoic acyl
SEQUENCE: 309
HAQGTFTSDY AKYLDARRAK EFIAWLVNGG PSSGAPPPSK                                      40

SEQ ID NO: 310          moltype = AA   length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-gamma-glutamic acid
                        1-Amido Eicosanedioic acyl //
                        2-[(20-oxoicosanoyl)amino]-5-[2-[2-[2-[2-[2-(carboxymethoxy
                        )ethoxy]ethylamino]-2-oxoethoxy]ethoxy]ethylamino]-5-oxopen
                        tanoic acyl
SEQUENCE: 310
HAQGTFTSDY AKYLDARRAK EFIAWLVNGG PSSGAPPPSK                                      40

SEQ ID NO: 311          moltype = AA   length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-AminoEthoxyEthoxyAcetic
                        Acyl-gamma-glutamic acid 1-Amido 19-Phosphatidyl
                        Nonadecanoic acyl
SEQUENCE: 311
HAQGTFTSDY AKYLDARRAK EFIAWLVNGG PSSGAPPPSK                                      40

SEQ ID NO: 312          moltype = AA   length = 40
FEATURE                 Location/Qualifiers
source                  1..40
                        mol_type = protein
                        organism = synthetic construct
SITE                    2
                        note = D-alanine
MOD_RES                 40
```

```
                        note = PolyEthylene Glycol
SEQUENCE: 312
HAQGTFTSDY AKYLDARRAK EFIAWLVNGG PSSGAPPPSC                          40

SEQ ID NO: 313          moltype = AA  length = 39
FEATURE                 Location/Qualifiers
source                  1..39
                        mol_type = protein
                        organism = synthetic construct
SITE                    2
                        note = D-alanine
MOD_RES                 17
                        note = AminoEthoxyEthoxyAcetic Acyl-AminoEthoxyEthoxyAcetic
                         Acyl-gamma-glutamic acid 1-Amido Eicosanedioic acyl //
                         2-[(20-oxoicosanoyl)amino]-5-[2-[2-[2-[2-(carboxymethoxy
                         )ethoxy]ethylamino]-2-oxoethoxy]ethoxy]ethylamino]-5-oxopen
                         tanoic acyl
SEQUENCE: 313
HAQGTFTSDY AKYLDAKRAK EFIAWLVNGG PSSGAPPPS                           39

SEQ ID NO: 314          moltype = AA  length = 39
FEATURE                 Location/Qualifiers
source                  1..39
                        mol_type = protein
                        organism = synthetic construct
SITE                    2
                        note = D-alanine
MOD_RES                 17
                        note = AminoEthoxyEthoxyAcetic Acyl-AminoEthoxyEthoxyAcetic
                         Acyl-gamma-glutamic acid 1-Amido Eicosanedioic acyl //
                         2-[(20-oxoicosanoyl)amino]-5-[2-[2-[2-[2-(carboxymethoxy
                         )ethoxy]ethylamino]-2-oxoethoxy]ethoxy]ethylamino]-5-oxopen
                         tanoic acyl
SEQUENCE: 314
HAQGTFTSDY AKYLDAKRAK EFIAWLVNGG PSSGAPPPS                           39

SEQ ID NO: 315          moltype = AA  length = 39
FEATURE                 Location/Qualifiers
source                  1..39
                        mol_type = protein
                        organism = synthetic construct
SITE                    2
                        note = D-alanine
MOD_RES                 17
                        note = AminoEthoxyEthoxyAcetic Acyl-AminoEthoxyEthoxyAcetic
                         Acyl-gamma-glutamic acid 1-Amido 19-Phosphatidyl
                         Nonadecanoic acyl //
SEQUENCE: 315
HAQGTFTSDY AKYLDAKRAK EFIAWLVNGG PSSGAPPPS                           39

SEQ ID NO: 316          moltype = AA  length = 39
FEATURE                 Location/Qualifiers
source                  1..39
                        mol_type = protein
                        organism = synthetic construct
SITE                    2
                        note = D-alanine
MOD_RES                 17
                        note = N6-[1-O-(17-carboxyheptadecyl)-D-glucopyranuronoyl]
SEQUENCE: 316
HAQGTFTSDY AKYLDAKRAK EFIAWLVNGG PSSGAPPPS                           39

SEQ ID NO: 317          moltype = AA  length = 39
FEATURE                 Location/Qualifiers
source                  1..39
                        mol_type = protein
                        organism = synthetic construct
MOD_RES                 2
                        note = Aib
MOD_RES                 20
                        note = Aib
MOD_RES                 17
                        note = AminoEthoxyEthoxyAcetic Acyl-AminoEthoxyEthoxyAcetic
                         Acyl-gamma-glutamic acid 1-Amido Eicosanedioic acyl //
                         2-[(20-oxoicosanoyl)amino]-5-[2-[2-[2-[2-(carboxymethoxy
                         )ethoxy]ethylamino]-2-oxoethoxy]ethoxy]ethylamino]-5-oxopen
                         tanoic acyl
MOD_RES                 13
                        note = Alpha-Methyl-Leucine
```

```
SEQUENCE: 317
YXQGTFTSDY SIXLDKKAQX AFIEYLLEGG PSSGAPPPS                                39

SEQ ID NO: 318          moltype = AA   length = 33
FEATURE                 Location/Qualifiers
source                  1..33
                        mol_type = protein
                        organism = synthetic construct
SEQUENCE: 318
HADGSFSDEM NTILDNLAAR DFINWLIQTK ITD                                      33

SEQ ID NO: 319          moltype = AA   length = 28
FEATURE                 Location/Qualifiers
source                  1..28
                        mol_type = protein
                        organism = synthetic construct
SEQUENCE: 319
HSDAVFTDNY TRLRKQMAVK KYLNSILN                                            28

SEQ ID NO: 320          moltype = AA   length = 37
FEATURE                 Location/Qualifiers
source                  1..37
                        mol_type = protein
                        organism = synthetic construct
SEQUENCE: 320
KCNTATCATQ RLANFLVHSS NNFGAILSST NVGSNTY                                  37

SEQ ID NO: 321          moltype = AA   length = 29
FEATURE                 Location/Qualifiers
source                  1..29
                        mol_type = protein
                        organism = synthetic construct
SEQUENCE: 321
YADAIFTNSY RKVLGQLSAR KLLQDIMSR                                           29

SEQ ID NO: 322          moltype = AA   length = 40
FEATURE                 Location/Qualifiers
source                  1..40
                        mol_type = protein
                        organism = synthetic construct
VARIANT                 1
                        note = X can be H, Y or F
VARIANT                 2
                        note = X can be G, D-Alanine, Aib or
                         D-serine,Amino-cyclobutyl-1-carboxylic acid
SITE                    2
                        note = D-alanine or D-serine
VARIANT                 3
                        note = X can be
                         A,R,N,D,E,Q,G,H,I,L,K,M,F,P,S,T,W,Y,D-alanine,Aib,D-serine
                         or D-Lysine
SITE                    3
                        note = D-alanine,D-serine or D-Lysine
MOD_RES                 2
                        note = Aib or Amino-cyclobutyl-1-carboxylic acid
MOD_RES                 3
                        note = Aib
VARIANT                 10
                        note = X can be
                         A,R,N,D,E,Q,G,H,I,L,K,M,F,P,S,T,W,Y,D-alanine,Aib,D-serine
                         or D-Lysine
SITE                    10
                        note = D-alanine,D-serine or D-Lysine
MOD_RES                 10
                        note = Aib
VARIANT                 11
                        note = X can be
                         A,R,N,D,E,Q,G,H,I,L,K,M,F,P,S,T,W,Y,D-alanine,Aib,D-serine
                         or D-Lysine
SITE                    11
                        note = D-alanine,D-serine or D-Lysine
MOD_RES                 11
                        note = Aib
VARIANT                 12
                        note = X can be
                         A,R,N,D,E,Q,G,H,I,L,K,M,F,P,S,T,W,Y,D-alanine,Aib,D-serine
                         or D-Lysine
SITE                    12
                        note = D-alanine,D-serine or D-Lysine
```

| | | |
|---|---|---|
| MOD_RES | 12 | |
| | note = Aib | |
| VARIANT | 13 | |
| | note = X can be Y, Aib, Q or Alpha-Methyl-Leucine | |
| MOD_RES | 13 | |
| | note = Aib or Alpha-Methyl-Leucine | |
| VARIANT | 15 | |
| | note = X can be D or E | |
| VARIANT | 16 | |
| | note = X can be A,R,N,D,E,Q,G,H,I,L,K,M,F,P,S,T,W,Y,D-alanine,Aib,D-serine or D-Lysine | |
| SITE | 16 | |
| | note = D-alanine,D-serine or D-Lysine | |
| MOD_RES | 16 | |
| | note = Aib | |
| VARIANT | 17 | |
| | note = X can be A,R,N,D,E,Q,G,H,I,L,K,M,F,P,S,T,W,Y,D-alanine,Aib,D-serine or D-Lysine | |
| SITE | 17 | |
| | note = D-alanine,D-serine or D-Lysine | |
| MOD_RES | 17 | |
| | note = Aib | |
| VARIANT | 18 | |
| | note = X can be A,R,N,D,E,Q,G,H,I,L,K,M,F,P,S,T,W,Y,D-alanine,Aib,D-serine or D-Lysine | |
| SITE | 18 | |
| | note = D-alanine,D-serine or D-Lysine | |
| MOD_RES | 18 | |
| | note = Aib | |
| VARIANT | 19 | |
| | note = X can be Q or A | |
| VARIANT | 20 | |
| | note = X can be Q, K ,R or Aib | |
| MOD_RES | 20 | |
| | note = Aib | |
| VARIANT | 21 | |
| | note = X can be D, E or A | |
| VARIANT | 23 | |
| | note = X can be V or I | |
| VARIANT | 24 | |
| | note = X can be Q, A, E or N | |
| VARIANT | 28 | |
| | note = X can be A,R,N,D,E,Q,G,H,I,L,K,M,F,P,S,T,W,Y,D-alanine,Aib,D-serine or D-Lysine | |
| SITE | 28 | |
| | note = D-alanine,D-serine or D-Lysine | |
| MOD_RES | 28 | |
| | note = Aib | |
| VARIANT | 27 | |
| | note = X can be A,R,N,D,E,Q,G,H,I,L,K,M,F,P,S,T,W,Y,D-alanine,Aib,D-serine or D-Lysine | |
| SITE | 27 | |
| | note = D-alanine,D-serine or D-Lysine | |
| MOD_RES | 30 | |
| | note = Aib | |
| VARIANT | 30 | |
| | note = X can be A,R,N,D,E,Q,G,H,I,L,K,M,F,P,S,T,W,Y,D-alanine,Aib,D-serine or D-Lysine | |
| SITE | 30 | |
| | note = D-alanine,D-serine or D-Lysine | |
| MOD_RES | 27 | |
| | note = Aib | |
| VARIANT | 40 | |
| | note = X can be K, AminoEthoxyEthoxyAcetic Acid // 8-amino-3,6-dioxa-octanoic acid or absent | |
| MOD_RES | 40 | |
| | note = AminoEthoxyEthoxyAcetic Acid // 8-amino-3,6-dioxa-octanoic acid | |
| SEQUENCE: 322 | | |
| XXXGTFTSDX XXXLXXXXXX XFXXWLXXGX PSSGAPPPSX | | 40 |
| | | |
| SEQ ID NO: 323 | moltype = AA  length = 39 | |
| FEATURE | Location/Qualifiers | |

-continued

```
source          1..39
                mol_type = protein
                organism = synthetic construct
VARIANT         1
                note = X can be H, Y or F
VARIANT         2
                note = X can be G, D-Alanine, Aib or
                D-serine,Amino-cyclobutyl-1-carboxylic acid
SITE            2
                note = D-alanine or D-serine
MOD_RES         2
                note = Aib or Amino-cyclobutyl-1-carboxylic acid
VARIANT         3
                note = X can be
                A,R,N,D,E,Q,G,H,I,L,K,M,F,P,S,T,W,Y,D-alanine,Aib,D-serine
                or D-Lysine
SITE            3
                note = D-alanine,D-serine or D-Lysine
MOD_RES         3
                note = Aib
VARIANT         10
                note = X can be
                A,R,N,D,E,Q,G,H,I,L,K,M,F,P,S,T,W,Y,D-alanine,Aib,D-serine
                or D-Lysine
SITE            10
                note = D-alanine,D-serine or D-Lysine
MOD_RES         10
                note = Aib
VARIANT         11
                note = X can be
                A,R,N,D,E,Q,G,H,I,L,K,M,F,P,S,T,W,Y,D-alanine,Aib,D-serine
                or D-Lysine
SITE            11
                note = D-alanine,D-serine or D-Lysine
MOD_RES         11
                note = Aib
VARIANT         12
                note = X can be
                A,R,N,D,E,Q,G,H,I,L,K,M,F,P,S,T,W,Y,D-alanine,Aib,D-serine
                or D-Lysine
SITE            12
                note = D-alanine,D-serine or D-Lysine
MOD_RES         12
                note = Aib
VARIANT         13
                note = X can be Y, Aib, Q or Alpha-Methyl-Leucine
MOD_RES         13
                note = Aib or Alpha-Methyl-Leucine
VARIANT         15
                note = X can be D or E
VARIANT         16
                note = X can be
                A,R,N,D,E,Q,G,H,I,L,K,M,F,P,S,T,W,Y,D-alanine,Aib,D-serine
                or D-Lysine
SITE            16
                note = D-alanine,D-serine or D-Lysine
MOD_RES         2
                note = Aib
MOD_RES         16
                note = Aib
VARIANT         17
                note = X can be
                A,R,N,D,E,Q,G,H,I,L,K,M,F,P,S,T,W,Y,D-alanine,Aib,D-serine
                or D-Lysine
SITE            17
                note = D-alanine,D-serine or D-Lysine
MOD_RES         17
                note = Aib
VARIANT         18
                note = X can be
                A,R,N,D,E,Q,G,H,I,L,K,M,F,P,S,T,W,Y,D-alanine,Aib,D-serine
                or D-Lysine
SITE            18
                note = D-alanine,D-serine or D-Lysine
MOD_RES         18
                note = Aib
VARIANT         19
                note = X can be Q or A
VARIANT         20
```

|  |  |
|---|---|
|  | note = X can be Q, K ,R or Aib |
| MOD_RES | 20 |
|  | note = Aib |
| VARIANT | 21 |
|  | note = X can be D, E or A |
| VARIANT | 23 |
|  | note = X can be V or I |
| VARIANT | 24 |
|  | note = X can be Q, A, E or N |
| VARIANT | 28 |
|  | note = X can be<br>A,R,N,D,E,Q,G,H,I,L,K,M,F,P,S,T,W,Y,D-alanine,Aib,D-serine<br>or D-Lysine |
| SITE | 28 |
|  | note = D-alanine,D-serine or D-Lysine |
| MOD_RES | 28 |
|  | note = Aib |
| VARIANT | 27 |
|  | note = X can be<br>A,R,N,D,E,Q,G,H,I,L,K,M,F,P,S,T,W,Y,D-alanine,Aib,D-serine<br>or D-Lysine |
| MOD_RES | 30 |
|  | note = Aib |
| VARIANT | 30 |
|  | note = X can be<br>A,R,N,D,E,Q,G,H,I,L,K,M,F,P,S,T,W,Y,D-alanine,Aib,D-serine<br>or D-Lysine |
| SITE | 30 |
|  | note = D-alanine,D-serine or D-Lysine |
| MOD_RES | 27 |
|  | note = Aib |
| SEQUENCE: 323 |  |
| XXXGTFTSDX XXXLXXXXXX XFXXWLXXGX PSSGAPPPS | 39 |
|  |  |
| SEQ ID NO: 324 | moltype = AA   length = 11 |
| FEATURE | Location/Qualifiers |
| source | 1..11<br>mol_type = protein<br>organism = synthetic construct |
| VARIANT | 1 |
|  | note = X can be<br>A,R,N,D,E,Q,G,H,I,L,K,M,F,P,S,T,W,Y,D-alanine,Aib,D-serine<br>or D-Lysine |
| SITE | 1 |
|  | note = D-alanine,D-serine or D-Lysine |
| MOD_RES | 1 |
|  | note = Aib |
| VARIANT | 11 |
|  | note = X can be K, AminoEthoxyEthoxyAcetic Acid //<br>8-amino-3,6-dioxa-octanoic acid or absent |
| MOD_RES | 11 |
|  | note = AminoEthoxyEthoxyAcetic Acid //<br>8-amino-3,6-dioxa-octanoic acid |
| SEQUENCE: 324 |  |
| XPSSGAPPPS X | 11 |
|  |  |
| SEQ ID NO: 325 | moltype = AA   length = 12 |
| FEATURE | Location/Qualifiers |
| source | 1..12<br>mol_type = protein<br>organism = synthetic construct |
| VARIANT | 1 |
|  | note = X can be<br>A,R,N,D,E,Q,G,H,I,L,K,M,F,P,S,T,W,Y,D-alanine,Aib,D-serine<br>or D-Lysine |
| SITE | 1 |
|  | note = D-alanine,D-serine or D-Lysine |
| MOD_RES | 1 |
|  | note = Aib |
| VARIANT | 2 |
|  | note = X can be Q or A |
| VARIANT | 3 |
|  | note = X can be Q, K ,R or Aib |
| MOD_RES | 3 |
|  | note = Aib |
| VARIANT | 4 |
|  | note = X can be D, E or A |
| VARIANT | 6 |
|  | note = X can be V or I |

```
VARIANT             7
                    note = X can be Q, A, E or N
VARIANT             10
                    note = X can be
                     A,R,N,D,E,Q,G,H,I,L,K,M,F,P,S,T,W,Y,D-alanine,Aib,D-serine
                     or D-Lysine
SITE                10
                    note = D-alanine,D-serine or D-Lysine
MOD_RES             10
                    note = Aib
VARIANT             11
                    note = X can be
                     A,R,N,D,E,Q,G,H,I,L,K,M,F,P,S,T,W,Y,D-alanine,Aib,D-serine
                     or D-Lysine
SITE                11
                    note = D-alanine,D-serine or D-Lysine
MOD_RES             11
                    note = Aib
SEQUENCE: 325
XXXXFXXWLX XG                                                                 12

SEQ ID NO: 326      moltype = AA  length = 17
FEATURE             Location/Qualifiers
source              1..17
                    mol_type = protein
                    organism = synthetic construct
VARIANT             1
                    note = X can be H, Y or F
VARIANT             2
                    note = X can be G, D-Alanine, Aib or
                     D-serine,Amino-cyclobutyl-1-carboxylic acid
SITE                2
                    note = D-alanine or D-serine
MOD_RES             2
                    note = Aib or Amino-cyclobutyl-1-carboxylic acid
VARIANT             3
                    note = X can be
                     A,R,N,D,E,Q,G,H,I,L,K,M,F,P,S,T,W,Y,D-alanine,Aib,D-serine
                     or D-Lysine
SITE                3
                    note = D-alanine,D-serine or D-Lysine
MOD_RES             3
                    note = Aib
VARIANT             10
                    note = X can be
                     A,R,N,D,E,Q,G,H,I,L,K,M,F,P,S,T,W,Y,D-alanine,Aib,D-serine
                     or D-Lysine
SITE                10
                    note = D-alanine,D-serine or D-Lysine
MOD_RES             10
                    note = Aib
VARIANT             11
                    note = X can be
                     A,R,N,D,E,Q,G,H,I,L,K,M,F,P,S,T,W,Y,D-alanine,Aib,D-serine
                     or D-Lysine
SITE                11
                    note = D-alanine,D-serine or D-Lysine
MOD_RES             11
                    note = Aib
VARIANT             12
                    note = X can be
                     A,R,N,D,E,Q,G,H,I,L,K,M,F,P,S,T,W,Y,D-alanine,Aib,D-serine
                     or D-Lysine
SITE                12
                    note = D-alanine,D-serine or D-Lysine
MOD_RES             12
                    note = Aib
VARIANT             13
                    note = X can be Y, Aib, Q or Alpha-Methyl-Leucine
MOD_RES             13
                    note = Aib or Alpha-Methyl-Leucine
VARIANT             15
                    note = X can be D or E
VARIANT             16
                    note = X can be
                     A,R,N,D,E,Q,G,H,I,L,K,M,F,P,S,T,W,Y,D-alanine,Aib,D-serine
                     or D-Lysine
SITE                16
                    note = D-alanine,D-serine or D-Lysine
```

```
MOD_RES            16
                   note = Aib
VARIANT            17
                   note = X can be
                    A,R,N,D,E,Q,G,H,I,L,K,M,F,P,S,T,W,Y,D-alanine,Aib,D-serine
                    or D-Lysine
SITE               17
                   note = D-alanine,D-serine or D-Lysine
MOD_RES            17
                   note = Aib
SEQUENCE: 326
XXXGTFTSDX XXXLXXX                                                         17

SEQ ID NO: 327     moltype = AA  length = 11
FEATURE            Location/Qualifiers
source             1..11
                   mol_type = protein
                   organism = synthetic construct
VARIANT            1
                   note = X can be
                    A,R,N,D,E,Q,G,H,I,L,K,M,F,P,S,T,W,Y,D-alanine,Aib,D-serine
                    or D-Lysine
SITE               1
                   note = D-alanine,D-serine or D-Lysine
MOD_RES            1
                   note = Aib
SEQUENCE: 327
XPSSGAPPPS K                                                               11

SEQ ID NO: 328     moltype = AA  length = 23
FEATURE            Location/Qualifiers
source             1..23
                   mol_type = protein
                   organism = synthetic construct
VARIANT            1
                   note = X can be
                    A,R,N,D,E,Q,G,H,I,L,K,M,F,P,S,T,W,Y,D-alanine,Aib,D-serine
                    or D-Lysine
SITE               1
                   note = D-alanine,D-serine or D-Lysine
MOD_RES            1
                   note = Aib
VARIANT            2
                   note = X can be Q or A
VARIANT            3
                   note = X can be Q, K ,R or Aib
MOD_RES            3
                   note = Aib
VARIANT            21
                   note = X can be D, E or A
VARIANT            6
                   note = X can be V or I
VARIANT            7
                   note = X can be Q, A, E or N
VARIANT            10
                   note = X can be
                    A,R,N,D,E,Q,G,H,I,L,K,M,F,P,S,T,W,Y,D-alanine,Aib,D-serine
                    or D-Lysine
SITE               10
                   note = D-alanine,D-serine or D-Lysine
MOD_RES            10
                   note = Aib
VARIANT            11
                   note = X can be
                    A,R,N,D,E,Q,G,H,I,L,K,M,F,P,S,T,W,Y,D-alanine,Aib,D-serine
                    or D-Lysine
SITE               11
                   note = D-alanine,D-serine or D-Lysine
MOD_RES            11
                   note = Aib
VARIANT            13
                   note = X can be
                    A,R,N,D,E,Q,G,H,I,L,K,M,F,P,S,T,W,Y,D-alanine,Aib,D-serine
                    or D-Lysine
SITE               13
                   note = D-alanine,D-serine or D-Lysine
MOD_RES            13
                   note = Aib
VARIANT            23
```

```
                         note = X can be K, AminoEthoxyEthoxyAcetic Acid //
                         8-amino-3,6-dioxa-octanoic acid or absent
MOD_RES                  23
                         note = AminoEthoxyEthoxyAcetic Acid //
                         8-amino-3,6-dioxa-octanoic acid
VARIANT                  4
                         note = X can be D, E or A
SEQUENCE: 328
XXXXFXXWLX XGXPSSGAPP PSX                                                    23

SEQ ID NO: 329           moltype = AA  length = 40
FEATURE                  Location/Qualifiers
source                   1..40
                         mol_type = protein
                         organism = synthetic construct
VARIANT                  1
                         note = X can be H, Y or F
VARIANT                  2
                         note = X can be G, D-Alanine, Aib or
                         D-serine,Amino-cyclobutyl-1-carboxylic acid
SITE                     2
                         note = D-alanine or D-serine
VARIANT                  3
                         note = X can be
                         A,R,N,D,E,Q,G,H,I,L,K,M,F,P,S,T,W,Y,D-alanine,Aib,D-serine
                         or D-Lysine
SITE                     3
                         note = D-alanine,D-serine or D-Lysine
MOD_RES                  2
                         note = Aib or Amino-cyclobutyl-1-carboxylic acid
MOD_RES                  3
                         note = Aib
VARIANT                  10
                         note = X can be
                         A,R,N,D,E,Q,G,H,I,L,K,M,F,P,S,T,W,Y,D-alanine,Aib,D-serine
                         or D-Lysine
SITE                     10
                         note = D-alanine,D-serine or D-Lysine
MOD_RES                  10
                         note = Aib
VARIANT                  11
                         note = X can be
                         A,R,N,D,E,Q,G,H,I,L,K,M,F,P,S,T,W,Y,D-alanine,Aib,D-serine
                         or D-Lysine
SITE                     11
                         note = D-alanine,D-serine or D-Lysine
MOD_RES                  11
                         note = Aib
VARIANT                  12
                         note = X can be
                         A,R,N,D,E,Q,G,H,I,L,K,M,F,P,S,T,W,Y,D-alanine,Aib,D-serine
                         or D-Lysine
SITE                     12
                         note = D-alanine,D-serine or D-Lysine
MOD_RES                  12
                         note = Aib
VARIANT                  13
                         note = X can be Y, Aib, Q or Alpha-Methyl-Leucine
MOD_RES                  13
                         note = Aib or Alpha-Methyl-Leucine
VARIANT                  15
                         note = X can be D or E
VARIANT                  16
                         note = X can be
                         A,R,N,D,E,Q,G,H,I,L,K,M,F,P,S,T,W,Y,D-alanine,Aib,D-serine
                         or D-Lysine
SITE                     16
                         note = D-alanine,D-serine or D-Lysine
MOD_RES                  16
                         note = Aib
VARIANT                  17
                         note = X can be
                         A,R,N,D,E,Q,G,H,I,L,K,M,F,P,S,T,W,Y,D-alanine,Aib,D-serine
                         or D-Lysine
SITE                     17
                         note = D-alanine,D-serine or D-Lysine
MOD_RES                  17
                         note = Aib
VARIANT                  18
```

```
                       note = X can be
                       A,R,N,D,E,Q,G,H,I,L,K,M,F,P,S,T,W,Y,D-alanine,Aib,D-serine
                       or D-Lysin
SITE                   18
                       note = D-alanine,D-serine or D-Lysine
MOD_RES                18
                       note = Aib
VARIANT                19
                       note = X can be Q or A
VARIANT                20
                       note = X can be Q, K ,R or Aib
MOD_RES                20
                       note = Aib
VARIANT                21
                       note = X can be D, E or A
VARIANT                23
                       note = X can be V or I
VARIANT                24
                       note = X can be Q, A, E or N
VARIANT                28
                       note = X can be
                       A,R,N,D,E,Q,G,H,I,L,K,M,F,P,S,T,W,Y,D-alanine,Aib,D-serine
                       or D-Lysine
SITE                   28
                       note = D-alanine,D-serine or D-Lysine
MOD_RES                28
                       note = Aib
VARIANT                27
                       note = X can be
                       A,R,N,D,E,Q,G,H,I,L,K,M,F,P,S,T,W,Y,D-alanine,Aib,D-serine
                       or D-Lysine
SITE                   27
                       note = D-alanine,D-serine or D-Lysine
MOD_RES                30
                       note = Aib
VARIANT                30
                       note = X can be
                       A,R,N,D,E,Q,G,H,I,L,K,M,F,P,S,T,W,Y,D-alanine,Aib,D-serine
                       or D-Lysine
SITE                   30
                       note = D-alanine,D-serine or D-Lysine
MOD_RES                27
                       note = Aib
VARIANT                40
                       note = X can be K, AminoEthoxyEthoxyAcetic Acid //
                       8-amino-3,6-dioxa-octanoic acid or absent
MOD_RES                40
                       note = AminoEthoxyEthoxyAcetic Acid //
                       8-amino-3,6-dioxa-octanoic acid
SEQUENCE: 329
XXXGTFTSDX XXXLXXXXXX XFXXWLXXGX PSSGAPPPSX                                     40

SEQ ID NO: 330         moltype = AA  length = 40
FEATURE                Location/Qualifiers
source                 1..40
                       mol_type = protein
                       organism = synthetic construct
SITE                   2
                       note = D-alanine
MOD_RES                40
                       note = AminoEthoxyEthoxyAcetic Acyl-MaleimidoPropionic Acyl
SEQUENCE: 330
HAEGTFTSDV SSYLEGQAAK EFIAWLVKGR PSSGAPPPSK                                     40

SEQ ID NO: 331         moltype = AA  length = 40
FEATURE                Location/Qualifiers
source                 1..40
                       mol_type = protein
                       organism = synthetic construct
MOD_RES                40
                       note = AminoEthoxyEthoxyAcetic Acyl-MaleimidoPropionic Acyl
SEQUENCE: 331
HAEGTFTSDV SSYLEGQAAK EFIAWLVKGR PSSGAPPPSK                                     40

SEQ ID NO: 332         moltype = AA  length = 31
FEATURE                Location/Qualifiers
source                 1..31
                       mol_type = protein
                       organism = synthetic construct
```

```
SITE                        2
                            note = D-alanine
MOD_RES                     31
                            note = AminoEthoxyEthoxyAcetic Acyl-MaleimidoPropionic Acyl
SEQUENCE: 332
HAEGTFTSDV SSYLEGQAAK EFIAWLVNGG K                                        31

SEQ ID NO: 333              moltype = AA  length = 31
FEATURE                     Location/Qualifiers
source                      1..31
                            mol_type = protein
                            organism = synthetic construct
SITE                        2
                            note = D-alanine
MOD_RES                     31
                            note = AminoEthoxyEthoxyAcetic Acyl-MaleimidoPropionic Acyl
SEQUENCE: 333
HAEGTFTSDI NKVLDTIAAK EFIAWLVKGR K                                        31

SEQ ID NO: 334              moltype = AA  length = 31
FEATURE                     Location/Qualifiers
source                      1..31
                            mol_type = protein
                            organism = synthetic construct
SITE                        2
                            note = D-alanine
MOD_RES                     31
                            note = AminoEthoxyEthoxyAcetic Acyl-MaleimidoPropionic Acyl
SEQUENCE: 334
HAEGTFTSDA EKAKEAEKAK EFIAWLVKGR K                                        31

SEQ ID NO: 335              moltype = AA  length = 31
FEATURE                     Location/Qualifiers
source                      1..31
                            mol_type = protein
                            organism = synthetic construct
SITE                        2
                            note = D-alanine
MOD_RES                     31
                            note = AminoEthoxyEthoxyAcetic Acyl-MaleimidoPropionic Acyl
MOD_RES                     10
                            note = Aib
MOD_RES                     13
                            note = Aib
MOD_RES                     16
                            note = Aib
SEQUENCE: 335
HAEGTFTSDX EKXKEXEKAK EFIAWLVKGR K                                        31

SEQ ID NO: 336              moltype = AA  length = 40
FEATURE                     Location/Qualifiers
source                      1..40
                            mol_type = protein
                            organism = synthetic construct
SITE                        2
                            note = D-alanine
MOD_RES                     10
                            note = Aib
MOD_RES                     13
                            note = Aib
MOD_RES                     16
                            note = Aib
MOD_RES                     19
                            note = Aib
MOD_RES                     40
                            note = AminoEthoxyEthoxyAcetic Acyl-MaleimidoPropionic Acyl
SEQUENCE: 336
HAEGTFTSDX ESXKEXEKXK EFIAWLVKGR PSSGAPPPSK                               40

SEQ ID NO: 337              moltype = AA  length = 40
FEATURE                     Location/Qualifiers
source                      1..40
                            mol_type = protein
                            organism = synthetic construct
SITE                        2
                            note = D-alanine
MOD_RES                     11
                            note = Aib
MOD_RES                     14
```

```
                            note = Aib
MOD_RES                  18
                            note = Aib
MOD_RES                  40
                            note = AminoEthoxyEthoxyAcetic Acyl-MaleimidoPropionic Acyl
SEQUENCE: 337
HAEGTFTSDV XSYXEGQXAK EFIAWLVKGR PSSGAPPPSK                               40

SEQ ID NO: 338           moltype = AA  length = 39
FEATURE                  Location/Qualifiers
source                   1..39
                            mol_type = protein
                            organism = synthetic construct
SITE                     2
                            note = D-alanine
MOD_RES                  17
                            note = AminoEthoxyEthoxyAcetic Acyl-MaleimidoPropionic Acyl
SEQUENCE: 338
HAEGTFTSDV SSYLEGKAAK EFIAWLVKGR PSSGAPPPS                                39

SEQ ID NO: 339           moltype = AA  length = 40
FEATURE                  Location/Qualifiers
source                   1..40
                            mol_type = protein
                            organism = synthetic construct
SITE                     2
                            note = D-alanine
MOD_RES                  40
                            note = AminoEthoxyEthoxyAcetic Acyl-MaleimidoPropionic Acyl
SEQUENCE: 339
HAEGTFTSDV SSYLEGQAAK EFIAWLVKGR LLLLLLLLLK                               40

SEQ ID NO: 340           moltype = AA  length = 42
FEATURE                  Location/Qualifiers
source                   1..42
                            mol_type = protein
                            organism = synthetic construct
SITE                     2
                            note = D-alanine
SEQUENCE: 340
HAEGTFTSDV SSYLEGQAAK EFIAWLVKGR PEAPTDPEAP TD                            42

SEQ ID NO: 341           moltype = AA  length = 40
FEATURE                  Location/Qualifiers
source                   1..40
                            mol_type = protein
                            organism = synthetic construct
MOD_RES                  40
                            note = AminoEthoxyEthoxyAcetic Acyl-MaleimidoPropionic Acyl
SEQUENCE: 341
HGEGTFTSDL SKQMEEEAVR LFIEWLKNGG GGGGGGGGGK                               40

SEQ ID NO: 342           moltype = AA  length = 31
FEATURE                  Location/Qualifiers
source                   1..31
                            mol_type = protein
                            organism = synthetic construct
SITE                     2
                            note = D-alanine
MOD_RES                  31
                            note = (AminoEthoxyEthoxyAcetic Acyl)4-3-MaleimidoPropionic
                              Acyl
SEQUENCE: 342
HAEGTFTSDV SSYLEGQAAK EFIAWLVKGR K                                        31

SEQ ID NO: 343           moltype = AA  length = 30
FEATURE                  Location/Qualifiers
source                   1..30
                            mol_type = protein
                            organism = synthetic construct
SITE                     2
                            note = D-alanine
MOD_RES                  17
                            note = AminoEthoxyEthoxyAcetic Acyl-MaleimidoPropionic Acyl
SEQUENCE: 343
HAEGTFTSDV SSYLEGKAAK EFIAWLVKGR                                          30

SEQ ID NO: 344           moltype = AA  length = 31
FEATURE                  Location/Qualifiers
```

```
source                  1..31
                        mol_type = protein
                        organism = synthetic construct
SITE                    2
                        note = D-alanine
MOD_RES                 31
                        note = 3-MaleimidoPropionic Acid // 3-(2,5-Dioxo-2,5-dihydr
                        o-1H-pyrrol-1-yl)propanoic Acid
SEQUENCE: 344
HAEGTFTSDV SSYLEGQAAK EFIAWLVKGR K                                          31

SEQ ID NO: 345          moltype = AA  length = 37
FEATURE                 Location/Qualifiers
source                  1..37
                        mol_type = protein
                        organism = synthetic construct
SEQUENCE: 345
HSQGTFTSDY SKYLDSRRAQ DFVQWLMNTK RNKNNIA                                    37

SEQ ID NO: 346          moltype = AA  length = 41
FEATURE                 Location/Qualifiers
source                  1..41
                        mol_type = protein
                        organism = synthetic construct
SITE                    2
                        note = D-alanine
SEQUENCE: 346
HAEGTFTSDV SSYLEGQAAK EFIAWLVKGP EAPTDPEAPT D                               41

SEQ ID NO: 347          moltype = AA  length = 31
FEATURE                 Location/Qualifiers
source                  1..31
                        mol_type = protein
                        organism = synthetic construct
SITE                    2
                        note = D-alanine
MOD_RES                 31
                        note = (AminoEthoxyEthoxyAcetic Acyl)4-3-MaleimidoPropionic
                        Acyl
SEQUENCE: 347
HAEGTFTSDV SSYLEGQAAK EFIAWLVKGR K                                          31

SEQ ID NO: 348          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 348
HAEGTFTSDI NKVLDIIAAK EFIAWLVKGR PSSGAPPPSK                                 40

SEQ ID NO: 349          moltype = AA  length = 31
FEATURE                 Location/Qualifiers
source                  1..31
                        mol_type = protein
                        organism = synthetic construct
SITE                    2
                        note = D-alanine
MOD_RES                 31
                        note = AminoEthoxyEthoxyAcetic Acyl-MaleimidoPropionic Acyl
SEQUENCE: 349
HAEGTFTSDI NKVLDIIAAK EFIAWLVKGR K                                          31

SEQ ID NO: 350          moltype = AA  length = 40
FEATURE                 Location/Qualifiers
source                  1..40
                        mol_type = protein
                        organism = synthetic construct
MOD_RES                 40
                        note = 3-MaleimidoPropionic Acid // 3-(2,5-Dioxo-2,5-dihydr
                        o-1H-pyrrol-1-yl)propanoic Acid
SEQUENCE: 350
HGEGTFTSDL SKQMEEEAVR LFIEWLKNGG PSSGAPPPSK                                 40

SEQ ID NO: 351          moltype = AA  length = 40
FEATURE                 Location/Qualifiers
```

```
source                   1..40
                         mol_type = protein
                         organism = synthetic construct
MOD_RES                  2
                         note = Aib
MOD_RES                  40
                         note = AminoEthoxyEthoxyAcetic Acyl-MaleimidoPropionic Acyl
SEQUENCE: 351
HXEGTFTSDY SKYLDKIRAQ EFVAWLMNGG PSSGAPPPSK                                      40

SEQ ID NO: 352           moltype = AA  length = 40
FEATURE                  Location/Qualifiers
source                   1..40
                         mol_type = protein
                         organism = synthetic construct
MOD_RES                  2
                         note = Aib
MOD_RES                  40
                         note = AminoEthoxyEthoxyAcetic Acyl-MaleimidoPropionic Acyl
SEQUENCE: 352
HXQGTFTSDY SKYLDKIAAQ DFVAWLLNGG PSSGAPPPSK                                      40

SEQ ID NO: 353           moltype = AA  length = 40
FEATURE                  Location/Qualifiers
source                   1..40
                         mol_type = protein
                         organism = synthetic construct
MOD_RES                  40
                         note = AminoEthoxyEthoxyAcetic Acyl-MaleimidoPropionic Acyl
MOD_RES                  2
                         note = Aib
SEQUENCE: 353
HXQGTFTSDY AKYLDKIAAQ DFVAWLLDGG PSSGAPPPSK                                      40

SEQ ID NO: 354           moltype = AA  length = 40
FEATURE                  Location/Qualifiers
source                   1..40
                         mol_type = protein
                         organism = synthetic construct
MOD_RES                  2
                         note = Aib
MOD_RES                  40
                         note = AminoEthoxyEthoxyAcetic Acyl-MaleimidoPropionic Acyl
SEQUENCE: 354
HXQGTFTSDY SKYLDKIAAQ DFVAWLLDGG PSSGAPPPSK                                      40

SEQ ID NO: 355           moltype = AA  length = 40
FEATURE                  Location/Qualifiers
source                   1..40
                         mol_type = protein
                         organism = synthetic construct
MOD_RES                  2
                         note = Aib
MOD_RES                  40
                         note = AminoEthoxyEthoxyAcetic Acyl-AminoEthoxyEthoxyAcetic
                            Acyl-MaleimidoPropionic Acyl
SEQUENCE: 355
HXQGTFTSDY SKYLDKIAAQ DFVAYLLDGG PSSGAPPPSK                                      40

SEQ ID NO: 356           moltype = AA  length = 40
FEATURE                  Location/Qualifiers
source                   1..40
                         mol_type = protein
                         organism = synthetic construct
MOD_RES                  40
                         note = AminoEthoxyEthoxyAcetic Acyl-AminoEthoxyEthoxyAcetic
                            Acyl-MaleimidoPropionic Acyl
MOD_RES                  2
                         note = Aib
SEQUENCE: 356
HXQGTFTSDL SKYLDEIAVQ DFIEWLLDGG PSSGAPPPSK                                      40

SEQ ID NO: 357           moltype = AA  length = 37
FEATURE                  Location/Qualifiers
source                   1..37
                         mol_type = protein
                         organism = synthetic construct
SEQUENCE: 357
HSQGTFTSDY SKYLDSRRAQ DFVQWLMNTK RNRNNIA                                         37
```

```
SEQ ID NO: 358          moltype = AA   length = 34
FEATURE                 Location/Qualifiers
source                  1..34
                        mol_type = protein
                        organism = synthetic construct
SEQUENCE: 358
IKPEAPGEDA SPEELNRYYA SLRHYLNLVT RQRY                                      34

SEQ ID NO: 359          moltype = AA   length = 31
FEATURE                 Location/Qualifiers
source                  1..31
                        mol_type = protein
                        organism = synthetic construct
MOD_RES                 2
                        note = Aib
SEQUENCE: 359
HXEGTFTSDV SSYLEGQALR HYINWLTRQR Y                                         31

SEQ ID NO: 360          moltype = AA   length = 45
FEATURE                 Location/Qualifiers
source                  1..45
                        mol_type = protein
                        organism = synthetic construct
SEQUENCE: 360
HGEGTFTSDL SKQMEEEAVR LFIEWLKNGG PSSRHYLNLV TRQRY                          45

SEQ ID NO: 361          moltype = AA   length = 51
FEATURE                 Location/Qualifiers
source                  1..51
                        mol_type = protein
                        organism = synthetic construct
SITE                    2
                        note = D-Serine
SEQUENCE: 361
HXQGTFTSDL SKYLEEEAVR EFIAWLKNGG PSSGAPPPSR HYLNLVTRQR Y                   51

SEQ ID NO: 362          moltype = AA   length = 39
FEATURE                 Location/Qualifiers
source                  1..39
                        mol_type = protein
                        organism = synthetic construct
SITE                    2
                        note = D-Serine
SEQUENCE: 362
HXQGTYTNDV SKYXDSRRAQ DFIEWLKNGG PSSGAPPPS                                 39

SEQ ID NO: 363          moltype = AA   length = 40
FEATURE                 Location/Qualifiers
source                  1..40
                        mol_type = protein
                        organism = synthetic construct
SITE                    2
                        note = D-Serine
SEQUENCE: 363
HXQGTYTNDV SKYKDSRRAQ DFIEWLKNGG PSSGAPPPSC                                40

SEQ ID NO: 364          moltype = AA   length = 40
FEATURE                 Location/Qualifiers
source                  1..40
                        mol_type = protein
                        organism = synthetic construct
SITE                    2
                        note = D-Serine
SEQUENCE: 364
HXQGTFTSDL SKQKDSRRAQ DFIEWLKNGG PSSGAPPPSC                                40

SEQ ID NO: 365          moltype = AA   length = 40
FEATURE                 Location/Qualifiers
source                  1..40
                        mol_type = protein
                        organism = synthetic construct
SITE                    2
                        note = D-Serine
SEQUENCE: 365
HXQGTYTNDV SKYXDSRRAQ DFIEWLKNGG PSSGAPPPSC                                40

SEQ ID NO: 366          moltype = AA   length = 34
FEATURE                 Location/Qualifiers
```

```
                        -continued
source                  1..34
                        mol_type = protein
                        organism = synthetic construct
SEQUENCE: 366
PKPEAPGKDA SPEEWNRYYA DLRHYLNWLT RQRY                               34

SEQ ID NO: 367          moltype = AA  length = 34
FEATURE                 Location/Qualifiers
source                  1..34
                        mol_type = protein
                        organism = synthetic construct
SEQUENCE: 367
IKPEAPGEDA SPEELNRYYA SLRHYLNWVT RQXY                               34

SEQ ID NO: 368          moltype = AA  length = 40
FEATURE                 Location/Qualifiers
source                  1..40
                        mol_type = protein
                        organism = synthetic construct
MOD_RES                 2
                        note = Aib
MOD_RES                 20
                        note = Aib
MOD_RES                 40
                        note = AminoEthoxyEthoxyAcetic Acyl-MaleimidoPropionic Acyl
SEQUENCE: 368
YXEGTFTSDY SIYLDKQAAX AFVQWLIAGG PSSGAPPPSK                         40

SEQ ID NO: 369          moltype = AA  length = 40
FEATURE                 Location/Qualifiers
source                  1..40
                        mol_type = protein
                        organism = synthetic construct
MOD_RES                 2
                        note = Aib
MOD_RES                 20
                        note = Aib
MOD_RES                 40
                        note = AminoEthoxyEthoxyAcetic Acyl-MaleimidoPropionic Acyl
SEQUENCE: 369
YXEGTFTSDY SIYLDKQAAX AFVQWLLAGG PSSGAPPPSK                         40

SEQ ID NO: 370          moltype = AA  length = 40
FEATURE                 Location/Qualifiers
source                  1..40
                        mol_type = protein
                        organism = synthetic construct
MOD_RES                 40
                        note = AminoEthoxyEthoxyAcetic Acyl-MaleimidoPropionic Acyl
MOD_RES                 2
                        note = Aib
MOD_RES                 20
                        note = Aib
SEQUENCE: 370
YXEGTFTSDY SIYLDKQAAX EFVQWLIAGG PSSGAPPPSK                         40

SEQ ID NO: 371          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
MOD_RES                 20
                        note = Aib
SEQUENCE: 371
HAEGTFTSDY SIYLDKQAAX EFVQWLLAGG PSSGAPPPSK                         40

SEQ ID NO: 372          moltype = AA  length = 40
FEATURE                 Location/Qualifiers
source                  1..40
                        mol_type = protein
                        organism = synthetic construct
MOD_RES                 2
                        note = D-alanine
MOD_RES                 40
                        note = AminoEthoxyEthoxyAcetic Acyl-MaleimidoPropionic Acyl
```

```
MOD_RES                 20
                        note = Aib
SEQUENCE: 372
YAEGTFTSDY SIYLDKQAAX EFVQWLLAGG PSSGAPPPSK                          40

SEQ ID NO: 373          moltype = AA  length = 40
FEATURE                 Location/Qualifiers
source                  1..40
                        mol_type = protein
                        organism = synthetic construct
MOD_RES                 2
                        note = Aib
MOD_RES                 20
                        note = Aib
MOD_RES                 40
                        note = AminoEthoxyEthoxyAcetic Acyl-MaleimidoPropionic Acyl
SEQUENCE: 373
HXEGTFTSDY SIYLDKQAAX EFVQWLLAGG PSSGAPPPSK                          40

SEQ ID NO: 374          moltype = AA  length = 40
FEATURE                 Location/Qualifiers
source                  1..40
                        mol_type = protein
                        organism = synthetic construct
SITE                    2
                        note = D-alanine
MOD_RES                 20
                        note = Aib
MOD_RES                 40
                        note = AminoEthoxyEthoxyAcetic Acyl-MaleimidoPropionic Acyl
SEQUENCE: 374
HAEGTFTSDY SIYLDKQAAX AFVQWLIAGG PSSGAPPPSK                          40

SEQ ID NO: 375          moltype = AA  length = 40
FEATURE                 Location/Qualifiers
source                  1..40
                        mol_type = protein
                        organism = synthetic construct
SITE                    2
                        note = D-alanine
MOD_RES                 20
                        note = Aib
MOD_RES                 40
                        note = AminoEthoxyEthoxyAcetic Acyl-MaleimidoPropionic Acyl
SEQUENCE: 375
HAEGTFTSDY SIYLDKQAAX AFVQWLLAGG PSSGAPPPSK                          40

SEQ ID NO: 376          moltype = AA  length = 40
FEATURE                 Location/Qualifiers
source                  1..40
                        mol_type = protein
                        organism = synthetic construct
SITE                    2
                        note = D-alanine
MOD_RES                 20
                        note = Aib
MOD_RES                 40
                        note = AminoEthoxyEthoxyAcetic Acyl-MaleimidoPropionic Acyl
SEQUENCE: 376
HAEGTFTSDY SIYLDKQAAX EFVQWLIAGG PSSGAPPPSK                          40

SEQ ID NO: 377          moltype = AA  length = 40
FEATURE                 Location/Qualifiers
source                  1..40
                        mol_type = protein
                        organism = synthetic construct
SITE                    2
                        note = D-alanine
MOD_RES                 20
                        note = Aib
MOD_RES                 40
                        note = AminoEthoxyEthoxyAcetic Acyl-MaleimidoPropionic Acyl
SEQUENCE: 377
YAEGTFTSDY SIYLDKQAAX AFVQWLIAGG PSSGAPPPSK                          40

SEQ ID NO: 378          moltype = AA  length = 40
FEATURE                 Location/Qualifiers
source                  1..40
                        mol_type = protein
```

```
                              organism = synthetic construct
SITE                          2
                              note = D-alanine
MOD_RES                       20
                              note = Aib
MOD_RES                       40
                              note = AminoEthoxyEthoxyAcetic Acyl-MaleimidoPropionic Acyl
SEQUENCE: 378
YAEGTFTSDY SIYLDKQAAX AFVQWLLAGG PSSGAPPPSK                             40

SEQ ID NO: 379                moltype = AA  length = 40
FEATURE                       Location/Qualifiers
source                        1..40
                              mol_type = protein
                              organism = synthetic construct
MOD_RES                       20
                              note = Aib
SITE                          2
                              note = D-alanine
MOD_RES                       40
                              note = AminoEthoxyEthoxyAcetic Acyl-MaleimidoPropionic Acyl
SEQUENCE: 379
YAEGTFTSDY SIYLDKQAAX EFVQWLIAGG PSSGAPPPSK                             40

SEQ ID NO: 380                moltype = AA  length = 40
FEATURE                       Location/Qualifiers
source                        1..40
                              mol_type = protein
                              organism = synthetic construct
MOD_RES                       2
                              note = Aib
MOD_RES                       40
                              note = AminoEthoxyEthoxyAcetic Acyl-MaleimidoPropionic Acyl
SEQUENCE: 380
YXEGTFTSDY AKYLDARRAK EFVQWLLAGG PSSGAPPPSK                             40

SEQ ID NO: 381                moltype = AA  length = 40
FEATURE                       Location/Qualifiers
source                        1..40
                              mol_type = protein
                              organism = synthetic construct
MOD_RES                       2
                              note = Aib
MOD_RES                       40
                              note = AminoEthoxyEthoxyAcetic Acyl-MaleimidoPropionic Acyl
SEQUENCE: 381
YXEGTFTSDY SKYLDARRAK EFVQWLLAGG PSSGAPPPSK                             40

SEQ ID NO: 382                moltype = AA  length = 40
FEATURE                       Location/Qualifiers
source                        1..40
                              mol_type = protein
                              organism = synthetic construct
MOD_RES                       2
                              note = Aib
MOD_RES                       40
                              note = AminoEthoxyEthoxyAcetic Acyl-MaleimidoPropionic Acyl
SEQUENCE: 382
YXEGTFTSDY SKYLDKRRAK EFVQWLLAGG PSSGAPPPSK                             40

SEQ ID NO: 383                moltype = AA  length = 40
FEATURE                       Location/Qualifiers
source                        1..40
                              mol_type = protein
                              organism = synthetic construct
SITE                          2
                              note = D-alanine
MOD_RES                       40
                              note = AminoEthoxyEthoxyAcetic Acyl-MaleimidoPropionic Acyl
SEQUENCE: 383
HAEGTFTSDY AKYLDARRAK EFVQWLLAGG PSSGAPPPSK                             40

SEQ ID NO: 384                moltype = AA  length = 40
FEATURE                       Location/Qualifiers
source                        1..40
                              mol_type = protein
                              organism = synthetic construct
SITE                          2
                              note = D-alanine
```

```
MOD_RES                 40
                        note = AminoEthoxyEthoxyAcetic Acyl-MaleimidoPropionic Acyl
SEQUENCE: 384
HAEGTFTSDY SKYLDARRAK EFVQWLLAGG PSSGAPPPSK                                       40

SEQ ID NO: 385          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 385
HAEGTFTSDY SKYLDKRRAK EFVQWLLAGG PSSGAPPPSK                                       40

SEQ ID NO: 386          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 386
YAEGTFTSDY AKYLDARRAK EFVQWLLAGG PSSGAPPPSK                                       40

SEQ ID NO: 387          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 387
YAEGTFTSDY SKYLDARRAK EFVQWLLAGG PSSGAPPPSK                                       40

SEQ ID NO: 388          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 388
YAEGTFTSDY SKYLDKRRAK EFVQWLLAGG PSSGAPPPSK                                       40

SEQ ID NO: 389          moltype = AA  length = 40
FEATURE                 Location/Qualifiers
source                  1..40
                        mol_type = protein
                        organism = synthetic construct
MOD_RES                 40
                        note = AminoEthoxyEthoxyAcetic Acyl-MaleimidoPropionic Acyl
MOD_RES                 2
                        note = Aib
SEQUENCE: 389
HXEGTFTSDY AKYLDARRAK EFVQWLLAGG PSSGAPPPSK                                       40

SEQ ID NO: 390          moltype = AA  length = 40
FEATURE                 Location/Qualifiers
source                  1..40
                        mol_type = protein
                        organism = synthetic construct
MOD_RES                 2
                        note = Aib
MOD_RES                 40
                        note = AminoEthoxyEthoxyAcetic Acyl-MaleimidoPropionic Acyl
SEQUENCE: 390
HXEGTFTSDY SKYLDARRAK EFVQWLLAGG PSSGAPPPSK                                       40

SEQ ID NO: 391          moltype = AA  length = 40
FEATURE                 Location/Qualifiers
```

```
                             -continued source               1..40
                     mol_type = protein
                     organism = synthetic construct
MOD_RES              2
                     note = Aib
MOD_RES              40
                     note = AminoEthoxyEthoxyAcetic Acyl-MaleimidoPropionic Acyl
SEQUENCE: 391
HXEGTFTSDY SKYLDKRRAK EFVQWLLAGG PSSGAPPPSK                                40

SEQ ID NO: 392       moltype = AA   length = 40
FEATURE              Location/Qualifiers
source               1..40
                     mol_type = protein
                     organism = synthetic construct
MOD_RES              2
                     note = Aib
MOD_RES              40
                     note = AminoEthoxyEthoxyAcetic Acyl-MaleimidoPropionic Acyl
SEQUENCE: 392
YXEGTFTSDY AKYLDARRAK AFVQWLIAGG PSSGAPPPSK                                40

SEQ ID NO: 393       moltype = AA   length = 40
FEATURE              Location/Qualifiers
source               1..40
                     mol_type = protein
                     organism = synthetic construct
MOD_RES              2
                     note = Aib
MOD_RES              40
                     note = AminoEthoxyEthoxyAcetic Acyl-MaleimidoPropionic Acyl
SEQUENCE: 393
YXEGTFTSDY SKYLDARRAK AFVQWLIAGG PSSGAPPPSK                                40

SEQ ID NO: 394       moltype = AA   length = 40
FEATURE              Location/Qualifiers
source               1..40
                     mol_type = protein
                     organism = synthetic construct
MOD_RES              2
                     note = Aib
MOD_RES              40
                     note = AminoEthoxyEthoxyAcetic Acyl-MaleimidoPropionic Acyl
SEQUENCE: 394
YXEGTFTSDY SKYLDKRRAK AFVQWLIAGG PSSGAPPPSK                                40

SEQ ID NO: 395       moltype = AA   length = 40
FEATURE              Location/Qualifiers
source               1..40
                     mol_type = protein
                     organism = synthetic construct
SITE                 2
                     note = D-alanine
MOD_RES              40
                     note = AminoEthoxyEthoxyAcetic Acyl-MaleimidoPropionic Acyl
SEQUENCE: 395
HAEGTFTSDY AKYLDARRAK AFVQWLIAGG PSSGAPPPSK                                40

SEQ ID NO: 396       moltype = AA   length = 40
FEATURE              Location/Qualifiers
source               1..40
                     mol_type = protein
                     organism = synthetic construct
SITE                 2
                     note = D-alanine
MOD_RES              40
                     note = AminoEthoxyEthoxyAcetic Acyl-MaleimidoPropionic Acyl
SEQUENCE: 396
HAEGTFTSDY SKYLDARRAK AFVQWLIAGG PSSGAPPPSK                                40

SEQ ID NO: 397       moltype = AA   length = 40
FEATURE              Location/Qualifiers
source               1..40
                     mol_type = protein
                     organism = synthetic construct
SITE                 2
                     note = D-alanine
MOD_RES              40
                     note = AminoEthoxyEthoxyAcetic Acyl-MaleimidoPropionic Acyl
```

```
SEQUENCE: 397
HAEGTFTSDY SKYLDKRRAK AFVQWLIAGG PSSGAPPPSK                              40

SEQ ID NO: 398         moltype = AA  length = 40
FEATURE                Location/Qualifiers
source                 1..40
                       mol_type = protein
                       organism = synthetic construct
SITE                   2
                       note = D-alanine
MOD_RES                40
                       note = AminoEthoxyEthoxyAcetic Acyl-MaleimidoPropionic Acyl
SEQUENCE: 398
YAEGTFTSDY AKYLDARRAK AFVQWLIAGG PSSGAPPPSK                              40

SEQ ID NO: 399         moltype = AA  length = 40
FEATURE                Location/Qualifiers
source                 1..40
                       mol_type = protein
                       organism = synthetic construct
SITE                   2
                       note = D-alanine
MOD_RES                40
                       note = AminoEthoxyEthoxyAcetic Acyl-MaleimidoPropionic Acyl
SEQUENCE: 399
YAEGTFTSDY SKYLDARRAK AFVQWLIAGG PSSGAPPPSK                              40

SEQ ID NO: 400         moltype = AA  length = 40
FEATURE                Location/Qualifiers
source                 1..40
                       mol_type = protein
                       organism = synthetic construct
SITE                   2
                       note = D-alanine
MOD_RES                40
                       note = AminoEthoxyEthoxyAcetic Acyl-MaleimidoPropionic Acyl
SEQUENCE: 400
YAEGTFTSDY SKYLDKRRAK AFVQWLIAGG PSSGAPPPSK                              40

SEQ ID NO: 401         moltype = AA  length = 40
FEATURE                Location/Qualifiers
source                 1..40
                       mol_type = protein
                       organism = synthetic construct
MOD_RES                2
                       note = Aib
MOD_RES                40
                       note = AminoEthoxyEthoxyAcetic Acyl-MaleimidoPropionic Acyl
SEQUENCE: 401
HXEGTFTSDY AKYLDARRAK AFVQWLIAGG PSSGAPPPSK                              40

SEQ ID NO: 402         moltype = AA  length = 40
FEATURE                Location/Qualifiers
source                 1..40
                       mol_type = protein
                       organism = synthetic construct
MOD_RES                2
                       note = Aib
MOD_RES                40
                       note = AminoEthoxyEthoxyAcetic Acyl-MaleimidoPropionic Acyl
SEQUENCE: 402
HXEGTFTSDY SKYLDARRAK AFVQWLIAGG PSSGAPPPSK                              40

SEQ ID NO: 403         moltype = AA  length = 40
FEATURE                Location/Qualifiers
source                 1..40
                       mol_type = protein
                       organism = synthetic construct
MOD_RES                2
                       note = Aib
MOD_RES                40
                       note = AminoEthoxyEthoxyAcetic Acyl-MaleimidoPropionic Acyl
SEQUENCE: 403
HXEGTFTSDY SKYLDKRRAK AFVQWLIAGG PSSGAPPPSK                              40

SEQ ID NO: 404         moltype = AA  length = 40
FEATURE                Location/Qualifiers
source                 1..40
                       mol_type = protein
```

```
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 404
HAQGTFTSDL SKQLESKAAQ DFIEWLKAGG PSSGAPPPSK                              40

SEQ ID NO: 405          moltype = AA  length = 40
FEATURE                 Location/Qualifiers
source                  1..40
                        mol_type = protein
                        organism = synthetic construct
SITE                    2
                        note = D-serine
MOD_RES                 40
                        note = AminoEthoxyEthoxyAcetic Acyl-MaleimidoPropionic Acyl
SEQUENCE: 405
HSQGTFTSDY AKYLDARRAK EFIEWLKAGG PSSGAPPPSK                              40

SEQ ID NO: 406          moltype = AA  length = 40
FEATURE                 Location/Qualifiers
source                  1..40
                        mol_type = protein
                        organism = synthetic construct
SITE                    2
                        note = D-serine
MOD_RES                 40
                        note = AminoEthoxyEthoxyAcetic Acyl-MaleimidoPropionic Acyl
SEQUENCE: 406
HSQGTFTSDY SKYLDARRAK EFIEWLKAGG PSSGAPPPSK                              40

SEQ ID NO: 407          moltype = AA  length = 40
FEATURE                 Location/Qualifiers
source                  1..40
                        mol_type = protein
                        organism = synthetic construct
SITE                    2
                        note = D-serine
MOD_RES                 40
                        note = AminoEthoxyEthoxyAcetic Acyl-MaleimidoPropionic Acyl
SEQUENCE: 407
HSQGTFTSDY AKYLDSRRAK EFIEWLKAGG PSSGAPPPSK                              40

SEQ ID NO: 408          moltype = AA  length = 40
FEATURE                 Location/Qualifiers
source                  1..40
                        mol_type = protein
                        organism = synthetic construct
SITE                    2
                        note = D-serine
MOD_RES                 40
                        note = AminoEthoxyEthoxyAcetic Acyl-MaleimidoPropionic Acyl
SEQUENCE: 408
HSQGTFTSDY SKYLDSRRAK EFIEWLKAGG PSSGAPPPSK                              40

SEQ ID NO: 409          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 409
HAQGTFTSDY SKYLDSRRAK EFIEWLKAGG PSSGAPPPSK                              40

SEQ ID NO: 410          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 410
HAQGTFTSDY AKYLDARRAK EFIEWLKAGG PSSGAPPPSK                              40
```

```
SEQ ID NO: 411          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 411
HAQGTFTSDL SKQLESKAAQ DFIAWLVNGG PSSGAPPPSK                              40

SEQ ID NO: 412          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 412
HAQGTFTSDY AKYLDARRAK DFIEWLKAGG PSSGAPPPSK                              40

SEQ ID NO: 413          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 413
HAQGTFTSDY SKYLDARRAQ EFIEWLKAGG PSSGAPPPSK                              40

SEQ ID NO: 414          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 414
HAQGTFTSDY AKYLDSRAAK EFIEWLKAGG PSSGAPPPSK                              40

SEQ ID NO: 415          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 415
HAQGTFTSDY SKYLDSKRAK EFIEWLKAGG PSSGAPPPSK                              40

SEQ ID NO: 416          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 416
HAQGTFTSDY AKYLEARRAK EFIEWLKAGG PSSGAPPPSK                              40

SEQ ID NO: 417          moltype = AA  length = 40
FEATURE                 Location/Qualifiers
source                  1..40
                        mol_type = protein
                        organism = synthetic construct
SITE                    2
```

```
                         note = D-alanine
MOD_RES                  40
                         note = AminoEthoxyEthoxyAcetic Acyl-MaleimidoPropionic Acyl
SEQUENCE: 417
HAQGTFTSDY AKQLEARRAK EFIEWLKAGG PSSGAPPPSK                         40

SEQ ID NO: 418           moltype = AA  length = 40
FEATURE                  Location/Qualifiers
source                   1..40
                         mol_type = protein
                         organism = synthetic construct
MOD_RES                  2
                         note = Aib
MOD_RES                  40
                         note = AminoEthoxyEthoxyAcetic Acyl-MaleimidoPropionic Acyl
SEQUENCE: 418
HXQGTFTSDY SKYLDERAAQ AFIEYLLEGG PSSGAPPPSK                         40

SEQ ID NO: 419           moltype = AA  length = 40
FEATURE                  Location/Qualifiers
source                   1..40
                         mol_type = protein
                         organism = synthetic construct
SITE                     2
                         note = D-alanine
MOD_RES                  40
                         note = AminoEthoxyEthoxyAcetic Acyl-MaleimidoPropionic Acyl
SEQUENCE: 419
HAQGTFTSDY SKYLDERAAQ DFVQWLLDGG PSSGAPPPSK                         40

SEQ ID NO: 420           moltype = AA  length = 40
FEATURE                  Location/Qualifiers
source                   1..40
                         mol_type = protein
                         organism = synthetic construct
SITE                     2
                         note = D-alanine
MOD_RES                  40
                         note = AminoEthoxyEthoxyAcetic Acyl-MaleimidoPropionic Acyl
SEQUENCE: 420
HAQGTFTSDY SKYLDERAAQ AFIEYLLEGG PSSGAPPPSK                         40

SEQ ID NO: 421           moltype = AA  length = 40
FEATURE                  Location/Qualifiers
source                   1..40
                         mol_type = protein
                         organism = synthetic construct
MOD_RES                  2
                         note = Aib
MOD_RES                  40
                         note = AminoEthoxyEthoxyAcetic Acyl-MaleimidoPropionic Acyl
SEQUENCE: 421
HXQGTFTSDY SKYLDARRAK EFVQWLLDGG PSSGAPPPSK                         40

SEQ ID NO: 422           moltype = AA  length = 40
FEATURE                  Location/Qualifiers
source                   1..40
                         mol_type = protein
                         organism = synthetic construct
MOD_RES                  2
                         note = Aib
MOD_RES                  40
                         note = AminoEthoxyEthoxyAcetic Acyl-MaleimidoPropionic Acyl
SEQUENCE: 422
HXQGTFTSDY SKYLDARRAK EFIEYLLEGG PSSGAPPPSK                         40

SEQ ID NO: 423           moltype = AA  length = 40
FEATURE                  Location/Qualifiers
source                   1..40
                         mol_type = protein
                         organism = synthetic construct
MOD_RES                  2
                         note = Aib
MOD_RES                  40
                         note = AminoEthoxyEthoxyAcetic Acyl-MaleimidoPropionic Acyl
SEQUENCE: 423
HXQGTFTSDY AKYLDARRAK EFVQWLLDGG PSSGAPPPSK                         40

SEQ ID NO: 424           moltype = AA  length = 40
```

| | | |
|---|---|---|
| FEATURE | Location/Qualifiers | |
| source | 1..40 | |
| | mol_type = protein | |
| | organism = synthetic construct | |
| SITE | 2 | |
| | note = D-alanine | |
| MOD_RES | 40 | |
| | note = AminoEthoxyEthoxyAcetic Acyl-MaleimidoPropionic Acyl | |
| SEQUENCE: 424 | | |
| HAQGTFTSDY SKYLDARRAK EFVQWLLDGG PSSGAPPPSK | | 40 |
| | | |
| SEQ ID NO: 425 | moltype = AA   length = 40 | |
| FEATURE | Location/Qualifiers | |
| source | 1..40 | |
| | mol_type = protein | |
| | organism = synthetic construct | |
| SITE | 2 | |
| | note = D-alanine | |
| MOD_RES | 40 | |
| | note = AminoEthoxyEthoxyAcetic Acyl-MaleimidoPropionic Acyl | |
| SEQUENCE: 425 | | |
| HAQGTFTSDY AKYLDARRAK EFVQWLLDGG PSSGAPPPSK | | 40 |
| | | |
| SEQ ID NO: 426 | moltype = AA   length = 40 | |
| FEATURE | Location/Qualifiers | |
| source | 1..40 | |
| | mol_type = protein | |
| | organism = synthetic construct | |
| SITE | 2 | |
| | note = D-alanine | |
| MOD_RES | 40 | |
| | note = AminoEthoxyEthoxyAcetic Acyl-MaleimidoPropionic Acyl | |
| SEQUENCE: 426 | | |
| HAQGTFTSDY SKYLDARRAK EFIEYLLEGG PSSGAPPPSK | | 40 |
| | | |
| SEQ ID NO: 427 | moltype = AA   length = 40 | |
| FEATURE | Location/Qualifiers | |
| source | 1..40 | |
| | mol_type = protein | |
| | organism = synthetic construct | |
| MOD_RES | 2 | |
| | note = Aib | |
| MOD_RES | 40 | |
| | note = AminoEthoxyEthoxyAcetic Acyl-MaleimidoPropionic Acyl | |
| SEQUENCE: 427 | | |
| HXQGTFTSDY SKYLDERAAQ AFIEYLLDGG PSSGAPPPSK | | 40 |
| | | |
| SEQ ID NO: 428 | moltype = AA   length = 40 | |
| FEATURE | Location/Qualifiers | |
| source | 1..40 | |
| | mol_type = protein | |
| | organism = synthetic construct | |
| SITE | 2 | |
| | note = D-alanine | |
| MOD_RES | 40 | |
| | note = AminoEthoxyEthoxyAcetic Acyl-MaleimidoPropionic Acyl | |
| SEQUENCE: 428 | | |
| HAQGTFTSDY SKYLDERAAQ DFVQWLLEGG PSSGAPPPSK | | 40 |
| | | |
| SEQ ID NO: 429 | moltype = AA   length = 40 | |
| FEATURE | Location/Qualifiers | |
| source | 1..40 | |
| | mol_type = protein | |
| | organism = synthetic construct | |
| SITE | 2 | |
| | note = D-alanine | |
| MOD_RES | 40 | |
| | note = AminoEthoxyEthoxyAcetic Acyl-MaleimidoPropionic Acyl | |
| SEQUENCE: 429 | | |
| HAQGTFTSDY SKYLDERAAQ AFIEYLLDGG PSSGAPPPSK | | 40 |
| | | |
| SEQ ID NO: 430 | moltype = AA   length = 40 | |
| FEATURE | Location/Qualifiers | |
| source | 1..40 | |
| | mol_type = protein | |
| | organism = synthetic construct | |
| MOD_RES | 2 | |
| | note = Aib | |
| MOD_RES | 40 | |

```
                     note = AminoEthoxyEthoxyAcetic Acyl-MaleimidoPropionic Acyl
SEQUENCE: 430
HXQGTFTSDY SKYLDARRAK EFVQWLLEGG PSSGAPPPSK                              40

SEQ ID NO: 431           moltype = AA   length = 40
FEATURE                  Location/Qualifiers
source                   1..40
                         mol_type = protein
                         organism = synthetic construct
MOD_RES                  2
                         note = Aib
MOD_RES                  40
                         note = AminoEthoxyEthoxyAcetic Acyl-MaleimidoPropionic Acyl
SEQUENCE: 431
HXQGTFTSDY SKYLDARRAK EFIEYLLDGG PSSGAPPPSK                              40

SEQ ID NO: 432           moltype = AA   length = 40
FEATURE                  Location/Qualifiers
source                   1..40
                         mol_type = protein
                         organism = synthetic construct
MOD_RES                  2
                         note = Aib
MOD_RES                  40
                         note = AminoEthoxyEthoxyAcetic Acyl-MaleimidoPropionic Acyl
SEQUENCE: 432
HXQGTFTSDY AKYLDARRAK EFVQWLLEGG PSSGAPPPSK                              40

SEQ ID NO: 433           moltype = AA   length = 40
FEATURE                  Location/Qualifiers
source                   1..40
                         mol_type = protein
                         organism = synthetic construct
MOD_RES                  2
                         note = Aib
MOD_RES                  40
                         note = AminoEthoxyEthoxyAcetic Acyl-MaleimidoPropionic Acyl
SEQUENCE: 433
HXQGTFTSDY AKYLDARRAK EFIEYLLDGG PSSGAPPPSK                              40

SEQ ID NO: 434           moltype = AA   length = 40
FEATURE                  Location/Qualifiers
source                   1..40
                         mol_type = protein
                         organism = synthetic construct
SITE                     2
                         note = D-alanine
MOD_RES                  40
                         note = AminoEthoxyEthoxyAcetic Acyl-MaleimidoPropionic Acyl
SEQUENCE: 434
HAQGTFTSDY SKYLDARRAK EFVQWLLEGG PSSGAPPPSK                              40

SEQ ID NO: 435           moltype = AA   length = 40
FEATURE                  Location/Qualifiers
source                   1..40
                         mol_type = protein
                         organism = synthetic construct
SITE                     2
                         note = D-alanine
MOD_RES                  40
                         note = AminoEthoxyEthoxyAcetic Acyl-MaleimidoPropionic Acyl
SEQUENCE: 435
HAQGTFTSDY AKYLDARRAK EFVQWLLEGG PSSGAPPPSK                              40

SEQ ID NO: 436           moltype = AA   length = 40
FEATURE                  Location/Qualifiers
source                   1..40
                         mol_type = protein
                         organism = synthetic construct
SITE                     2
                         note = D-alanine
MOD_RES                  40
                         note = AminoEthoxyEthoxyAcetic Acyl-MaleimidoPropionic Acyl
SEQUENCE: 436
HAQGTFTSDY SKYLDARRAK EFIEYLLDGG PSSGAPPPSK                              40

SEQ ID NO: 437           moltype = AA   length = 40
FEATURE                  Location/Qualifiers
source                   1..40
```

```
                         mol_type = protein
                         organism = synthetic construct
SITE                     2
                         note = D-alanine
MOD_RES                  40
                         note = AminoEthoxyEthoxyAcetic Acyl-MaleimidoPropionic Acyl
SEQUENCE: 437
HAQGTFTSDY AKYLDARRAK EFIEYLLDGG PSSGAPPPSK                                  40

SEQ ID NO: 438           moltype = AA  length = 40
FEATURE                  Location/Qualifiers
source                   1..40
                         mol_type = protein
                         organism = synthetic construct
MOD_RES                  2
                         note = Aib
MOD_RES                  40
                         note = AminoEthoxyEthoxyAcetic Acyl-MaleimidoPropionic Acyl
SEQUENCE: 438
HXQGTFTSDY SKYLDERAAQ AFIEWLLEGG PSSGAPPPSK                                  40

SEQ ID NO: 439           moltype = AA  length = 40
FEATURE                  Location/Qualifiers
source                   1..40
                         mol_type = protein
                         organism = synthetic construct
SITE                     2
                         note = D-alanine
MOD_RES                  40
                         note = AminoEthoxyEthoxyAcetic Acyl-MaleimidoPropionic Acyl
SEQUENCE: 439
HAQGTFTSDY SKYLDERAAQ DFVQYLLDGG PSSGAPPPSK                                  40

SEQ ID NO: 440           moltype = AA  length = 40
FEATURE                  Location/Qualifiers
source                   1..40
                         mol_type = protein
                         organism = synthetic construct
SITE                     2
                         note = D-alanine
MOD_RES                  40
                         note = AminoEthoxyEthoxyAcetic Acyl-MaleimidoPropionic Acyl
SEQUENCE: 440
HAQGTFTSDY SKYLDERAAQ AFIEWLLEGG PSSGAPPPSK                                  40

SEQ ID NO: 441           moltype = AA  length = 40
FEATURE                  Location/Qualifiers
source                   1..40
                         mol_type = protein
                         organism = synthetic construct
MOD_RES                  2
                         note = Aib
MOD_RES                  40
                         note = AminoEthoxyEthoxyAcetic Acyl-MaleimidoPropionic Acyl
SEQUENCE: 441
HXQGTFTSDY SKYLDARRAK EFVQYLLDGG PSSGAPPPSK                                  40

SEQ ID NO: 442           moltype = AA  length = 40
FEATURE                  Location/Qualifiers
source                   1..40
                         mol_type = protein
                         organism = synthetic construct
MOD_RES                  2
                         note = Aib
MOD_RES                  40
                         note = AminoEthoxyEthoxyAcetic Acyl-MaleimidoPropionic Acyl
SEQUENCE: 442
HXQGTFTSDY SKYLDARRAK EFIEWLLEGG PSSGAPPPSK                                  40

SEQ ID NO: 443           moltype = AA  length = 40
FEATURE                  Location/Qualifiers
source                   1..40
                         mol_type = protein
                         organism = synthetic construct
MOD_RES                  2
                         note = Aib
MOD_RES                  40
                         note = AminoEthoxyEthoxyAcetic Acyl-MaleimidoPropionic Acyl
SEQUENCE: 443
```

```
HXQGTFTSDY AKYLDARRAK EFVQYLLDGG PSSGAPPPSK                                        40

SEQ ID NO: 444            moltype = AA  length = 40
FEATURE                   Location/Qualifiers
source                    1..40
                          mol_type = protein
                          organism = synthetic construct
MOD_RES                   2
                          note = Aib
MOD_RES                   40
                          note = AminoEthoxyEthoxyAcetic Acyl-MaleimidoPropionic Acyl
SEQUENCE: 444
HXQGTFTSDY AKYLDARRAK EFIEWLLEGG PSSGAPPPSK                                        40

SEQ ID NO: 445            moltype = AA  length = 40
FEATURE                   Location/Qualifiers
source                    1..40
                          mol_type = protein
                          organism = synthetic construct
SITE                      2
                          note = D-alanine
MOD_RES                   40
                          note = AminoEthoxyEthoxyAcetic Acyl-MaleimidoPropionic Acyl
SEQUENCE: 445
HAQGTFTSDY SKYLDARRAK EFVQYLLDGG PSSGAPPPSK                                        40

SEQ ID NO: 446            moltype = AA  length = 40
FEATURE                   Location/Qualifiers
source                    1..40
                          mol_type = protein
                          organism = synthetic construct
SITE                      2
                          note = D-alanine
MOD_RES                   40
                          note = AminoEthoxyEthoxyAcetic Acyl-MaleimidoPropionic Acyl
SEQUENCE: 446
HAQGTFTSDY AKYLDARRAK EFVQYLLDGG PSSGAPPPSK                                        40

SEQ ID NO: 447            moltype = AA  length = 40
FEATURE                   Location/Qualifiers
source                    1..40
                          mol_type = protein
                          organism = synthetic construct
SITE                      2
                          note = D-alanine
MOD_RES                   40
                          note = AminoEthoxyEthoxyAcetic Acyl-MaleimidoPropionic Acyl
SEQUENCE: 447
HAQGTFTSDY SKYLDARRAK EFIEWLLEGG PSSGAPPPSK                                        40

SEQ ID NO: 448            moltype = AA  length = 40
FEATURE                   Location/Qualifiers
source                    1..40
                          mol_type = protein
                          organism = synthetic construct
SITE                      2
                          note = D-alanine
MOD_RES                   40
                          note = AminoEthoxyEthoxyAcetic Acyl-MaleimidoPropionic Acyl
SEQUENCE: 448
HAQGTFTSDY AKYLDARRAK EFIEWLLEGG PSSGAPPPSK                                        40

SEQ ID NO: 449            moltype = AA  length = 40
FEATURE                   Location/Qualifiers
source                    1..40
                          mol_type = protein
                          organism = synthetic construct
MOD_RES                   2
                          note = Aib
MOD_RES                   40
                          note = AminoEthoxyEthoxyAcetic Acyl-MaleimidoPropionic Acyl
SEQUENCE: 449
HXQGTFTSDY SKYLDERAAQ AFVQYLLEGG PSSGAPPPSK                                        40

SEQ ID NO: 450            moltype = AA  length = 40
FEATURE                   Location/Qualifiers
source                    1..40
                          mol_type = protein
                          organism = synthetic construct
```

```
SITE                    2
                        note = D-alanine
MOD_RES                 40
                        note = AminoEthoxyEthoxyAcetic Acyl-MaleimidoPropionic Acyl
SEQUENCE: 450
HAQGTFTSDY SKYLDERAAQ DFIEWLLDGG PSSGAPPPSK                              40

SEQ ID NO: 451          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 451
HAQGTFTSDY SKYLDERAAQ AFVQYLLEGG PSSGAPPPSK                              40

SEQ ID NO: 452          moltype = AA  length = 40
FEATURE                 Location/Qualifiers
source                  1..40
                        mol_type = protein
                        organism = synthetic construct
MOD_RES                 2
                        note = Aib
MOD_RES                 40
                        note = AminoEthoxyEthoxyAcetic Acyl-MaleimidoPropionic Acyl
SEQUENCE: 452
HXQGTFTSDY SKYLDARRAK EFIEWLLDGG PSSGAPPPSK                              40

SEQ ID NO: 453          moltype = AA  length = 40
FEATURE                 Location/Qualifiers
source                  1..40
                        mol_type = protein
                        organism = synthetic construct
MOD_RES                 2
                        note = Aib
MOD_RES                 40
                        note = AminoEthoxyEthoxyAcetic Acyl-MaleimidoPropionic Acyl
SEQUENCE: 453
HXQGTFTSDY SKYLDARRAK EFVQYLLEGG PSSGAPPPSK                              40

SEQ ID NO: 454          moltype = AA  length = 40
FEATURE                 Location/Qualifiers
source                  1..40
                        mol_type = protein
                        organism = synthetic construct
MOD_RES                 2
                        note = Aib
MOD_RES                 40
                        note = AminoEthoxyEthoxyAcetic Acyl-MaleimidoPropionic Acyl
SEQUENCE: 454
HXQGTFTSDY AKYLDARRAK EFIEWLLDGG PSSGAPPPSK                              40

SEQ ID NO: 455          moltype = AA  length = 40
FEATURE                 Location/Qualifiers
source                  1..40
                        mol_type = protein
                        organism = synthetic construct
MOD_RES                 2
                        note = Aib
MOD_RES                 40
                        note = AminoEthoxyEthoxyAcetic Acyl-MaleimidoPropionic Acyl
SEQUENCE: 455
HXQGTFTSDY AKYLDARRAK EFVQYLLEGG PSSGAPPPSK                              40

SEQ ID NO: 456          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 456
HAQGTFTSDY SKYLDARRAK EFIEWLLDGG PSSGAPPPSK                              40
```

-continued

```
SEQ ID NO: 457         moltype = AA  length = 40
FEATURE                Location/Qualifiers
source                 1..40
                       mol_type = protein
                       organism = synthetic construct
SITE                   2
                       note = D-alanine
MOD_RES                40
                       note = AminoEthoxyEthoxyAcetic Acyl-MaleimidoPropionic Acyl
SEQUENCE: 457
HAQGTFTSDY AKYLDARRAK EFIEWLLDGG PSSGAPPPSK                              40

SEQ ID NO: 458         moltype = AA  length = 40
FEATURE                Location/Qualifiers
source                 1..40
                       mol_type = protein
                       organism = synthetic construct
SITE                   2
                       note = D-alanine
MOD_RES                40
                       note = AminoEthoxyEthoxyAcetic Acyl-MaleimidoPropionic Acyl
SEQUENCE: 458
HAQGTFTSDY SKYLDARRAK EFVQYLLEGG PSSGAPPPSK                              40

SEQ ID NO: 459         moltype = AA  length = 40
FEATURE                Location/Qualifiers
source                 1..40
                       mol_type = protein
                       organism = synthetic construct
SITE                   2
                       note = D-alanine
MOD_RES                40
                       note = AminoEthoxyEthoxyAcetic Acyl-MaleimidoPropionic Acyl
SEQUENCE: 459
HAQGTFTSDY AKYLDARRAK EFVQYLLEGG PSSGAPPPSK                              40

SEQ ID NO: 460         moltype = AA  length = 40
FEATURE                Location/Qualifiers
source                 1..40
                       mol_type = protein
                       organism = synthetic construct
SITE                   2
                       note = D-alanine
MOD_RES                40
                       note = AminoEthoxyEthoxyAcetic Acyl-MaleimidoPropionic Acyl
SEQUENCE: 460
HAEGTFTSDY AKYLDARRAK EFVQWLVNGG PSSGAPPPSK                              40

SEQ ID NO: 461         moltype = AA  length = 40
FEATURE                Location/Qualifiers
source                 1..40
                       mol_type = protein
                       organism = synthetic construct
SITE                   2
                       note = D-alanine
MOD_RES                40
                       note = AminoEthoxyEthoxyAcetic Acyl-MaleimidoPropionic Acyl
SEQUENCE: 461
HAEGTFTSDY AKYLDARRAK EFIAWLLDGG PSSGAPPPSK                              40

SEQ ID NO: 462         moltype = AA  length = 40
FEATURE                Location/Qualifiers
source                 1..40
                       mol_type = protein
                       organism = synthetic construct
SITE                   2
                       note = D-alanine
MOD_RES                40
                       note = AminoEthoxyEthoxyAcetic Acyl-MaleimidoPropionic Acyl
SEQUENCE: 462
HAEGTFTSDY AKYLDARRAK EFIEYLVNGG PSSGAPPPSK                              40

SEQ ID NO: 463         moltype = AA  length = 40
FEATURE                Location/Qualifiers
source                 1..40
                       mol_type = protein
                       organism = synthetic construct
SITE                   2
                       note = D-alanine
```

```
MOD_RES                 40
                        note = AminoEthoxyEthoxyAcetic Acyl-MaleimidoPropionic Acyl
SEQUENCE: 463
HAEGTFTSDY AKYLDARRAK EFIAYLLEGG PSSGAPPPSK                           40

SEQ ID NO: 464          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 464
HAEGTFTSDY AKYLDARRAK EFIEWLVNGG PSSGAPPPSK                           40

SEQ ID NO: 465          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-MaleimidoPropionic Acyl
SEQUENCE: 465
HAEGTFTSDY AKYLDARRAK EFVQWLKAGG PSSGAPPPSK                           40

SEQ ID NO: 466          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-AminoEthoxyEthoxyAcetic
                           Acyl-MaleimidoPropionic Acyl
SEQUENCE: 466
YAEGTFTSDY AIYLDAQAQQ DFVQWLLAGG PSSGAPPPSK                           40

SEQ ID NO: 467          moltype = AA  length = 40
FEATURE                 Location/Qualifiers
source                  1..40
                        mol_type = protein
                        organism = synthetic construct
SITE                    2
                        note = D-alanine
MOD_RES                 40
                        note = AminoEthoxyEthoxyAcetic Acyl-AminoEthoxyEthoxyAcetic
                           Acyl-MaleimidoPropionic Acyl
SEQUENCE: 467
YAEGTFTSDY SIYLDKIAQQ DFVQWLLAGG PSSGAPPPSK                           40

SEQ ID NO: 468          moltype = AA  length = 40
FEATURE                 Location/Qualifiers
source                  1..40
                        mol_type = protein
                        organism = synthetic construct
MOD_RES                 2
                        note = Aib
MOD_RES                 40
                        note = AminoEthoxyEthoxyAcetic Acyl-MaleimidoPropionic Acyl
SEQUENCE: 468
HXQGTFTSDY SKYLDERAAQ DFVQWLLDGG PSSGAPPPSK                           40

SEQ ID NO: 469          moltype = AA  length = 40
FEATURE                 Location/Qualifiers
source                  1..40
                        mol_type = protein
                        organism = synthetic construct
MOD_RES                 2
                        note = Aib
MOD_RES                 40
                        note = AminoEthoxyEthoxyAcetic Acyl-AminoEthoxyEthoxyAcetic
                           Acyl-MaleimidoPropionic Acyl
SEQUENCE: 469
HXQGTFTSDY SKYLDKIAAQ DFVAYLLDGG PSSGAPPPSK                           40
```

```
SEQ ID NO: 470         moltype = AA  length = 40
FEATURE                Location/Qualifiers
source                 1..40
                       mol_type = protein
                       organism = synthetic construct
SITE                   2
                       note = D-alanine
MOD_RES                40
                       note = AminoEthoxyEthoxyAcetic Acyl-MaleimidoPropionic Acyl
SEQUENCE: 470
YAEGTFTSDY SIYLDKIAQQ DFVQWLLAGG PSSGAPPPSK                           40

SEQ ID NO: 471         moltype = AA  length = 39
FEATURE                Location/Qualifiers
source                 1..39
                       mol_type = protein
                       organism = synthetic construct
MOD_RES                2
                       note = Aib
MOD_RES                13
                       note = Aib
MOD_RES                20
                       note = AminoEthoxyEthoxyAcetic Acyl-AminoEthoxyEthoxyAcetic
                       Acyl-MaleimidoPropionic Acyl
SEQUENCE: 471
YXEGTFTSDY SIXLDKIAQK AFVQWLIAGG PSSGAPPPS                            39
```